(12) United States Patent
Kai et al.

(10) Patent No.: US 8,937,762 B2
(45) Date of Patent: Jan. 20, 2015

(54) LEVEL CONTROL CIRCUIT, LEVEL CONTROL METHOD, AND LEVEL CONTROL SYSTEM

(75) Inventors: Yutaka Kai, Kawasaki (JP); Setsuo Yoshida, Inagi (JP); Taku Yoshida, Kurate (JP); Keisuke Harada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 13/450,577

(22) Filed: Apr. 19, 2012

(65) Prior Publication Data

US 2012/0293228 A1 Nov. 22, 2012

Related U.S. Application Data

(63) Continuation-in-part of application No. 13/086,766, filed on Apr. 14, 2011, now abandoned.

(30) Foreign Application Priority Data

Apr. 20, 2010 (JP) ................. 2010-097448
Aug. 27, 2010 (JP) ................. 2010-191169
Apr. 20, 2011 (JP) ................. 2011-094503

(51) Int. Cl.
*H01S 3/102* (2006.01)

(52) U.S. Cl.
USPC ................................... 359/341.42

(58) Field of Classification Search
USPC ................................... 359/341.42
See application file for complete search history.

(56) References Cited

U.S. PATENT DOCUMENTS

| | | | |
|---|---|---|---|
| 6,008,935 A | 12/1999 | Fujita et al. | |
| 6,351,529 B1 | 2/2002 | Holeva | |
| 6,542,291 B1 | 4/2003 | Kinoshita et al. | |
| 7,860,409 B2 | 12/2010 | Sato et al. | |
| 7,864,411 B2 * | 1/2011 | Mino ........................ | 359/341.41 |

FOREIGN PATENT DOCUMENTS

| | | |
|---|---|---|
| JP | 10-229237 | 8/1998 |
| JP | 2002-290175 | 10/2002 |
| JP | 2003-513498 | 4/2003 |
| JP | 2004-254191 | 9/2004 |
| JP | 2006-230020 | 8/2006 |
| JP | 2008-053869 | 3/2008 |
| WO | WO-01/31778 | 5/2001 |

OTHER PUBLICATIONS

Japanese Office Action issued Sep. 2, 2014 in corresponding Japanese Patent Application No. 2011-094503.

* cited by examiner

*Primary Examiner* — Mark Hellner
(74) *Attorney, Agent, or Firm* — Staas & Halsey LLP

(57) ABSTRACT

A level control circuit that generates output signal for level control includes: a control information storage that stores control information corresponding to a signal level, a control information circuit that outputs the output signal for level control corresponding to the signal level of a first input signal based on the control information stored in the control information storage; and an information update circuit that updates the control information of the control information storage according to the signal level of a second input signal.

21 Claims, 124 Drawing Sheets

FIG. 2

| SIGNAL LEVEL | LEVEL CONTROL AMOUNT |
|---|---|
| 0 | 48000 |
| 1 | 47900 |
| 2 | 47810 |
| ⋮ | ⋮ |
| 4095 | 9230 |

FIG. 16

| INPUT PD VALUE (ADC VALUE) | OUTPUT LEVEL (dBm) | | | | | | |
|---|---|---|---|---|---|---|---|
| | −10.0 | −9.9 | −9.8 | ... | 9.8 | 9.9 | 10.0 |
| 0 | 16000 | 16010 | 16020 | ... | 16300 | 16310 | 16320 |
| 1 | 15500 | 15510 | 15520 | ... | 15800 | 15850 | 15900 |
| 2 | 15100 | 15110 | 15120 | ... | 15400 | 15410 | 15420 |
| ⋮ | ⋮ | ⋮ | ⋮ | ... | ⋮ | ⋮ | ⋮ |
| 4095 | 2500 | 2510 | 2520 | ... | 3010 | 3020 | 3030 |

DRIVE CONTROL AMOUNT

FIG. 19

TABLE OF ORIGINAL LUT DATA

| INPUT PD VALUE: 12-BIT | DRIVE CURRENT: 14-BIT |
|---|---|
| 0 | 0 |
| 1 | 0 |
| 2 | 0 |
| ⋮ | ⋮ |
| m | 0 |
| m+1 | Z |
| m+2 | Y |
| ⋮ | ⋮ |
| n | B |
| n+1 | A |
| n+2 | 0 |
| ⋮ | ⋮ |
| 4094 | 0 |
| 4095 | 0 |

INPUT PD VALUE < THRESHOLD

THRESHOLD (m)

A, B, Y, Z: DRIVE CURRENT VALUES (0 ≤ A < B < Y < Z ≤ 16383)
m, n: INPUT PD VALUES (0 < m, m+2 < n, n+2 < 4095)

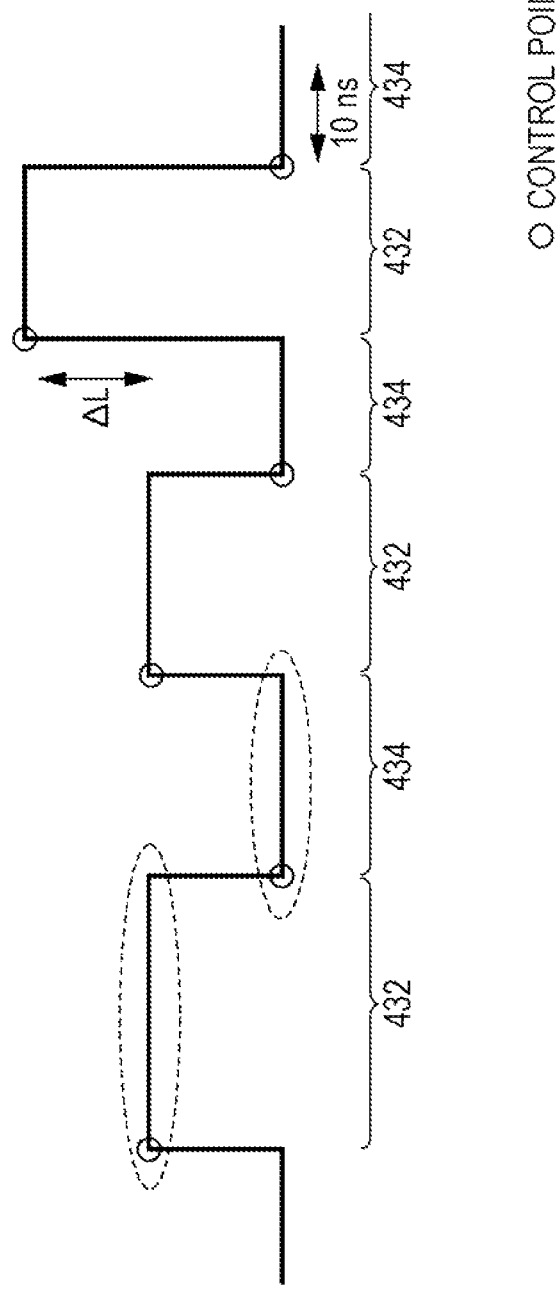

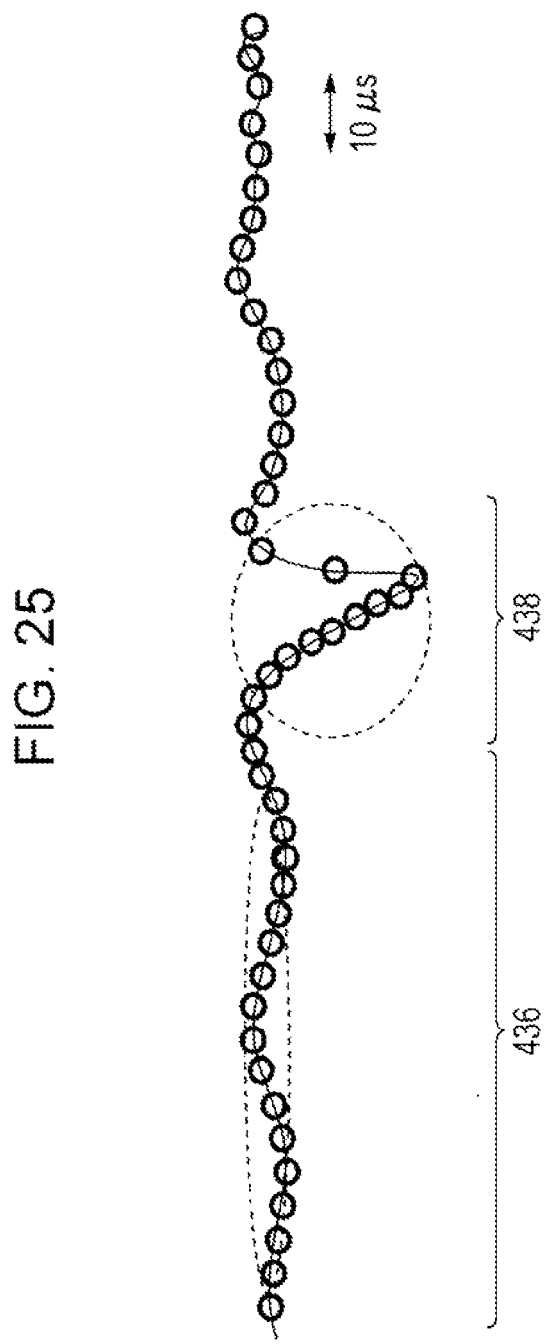

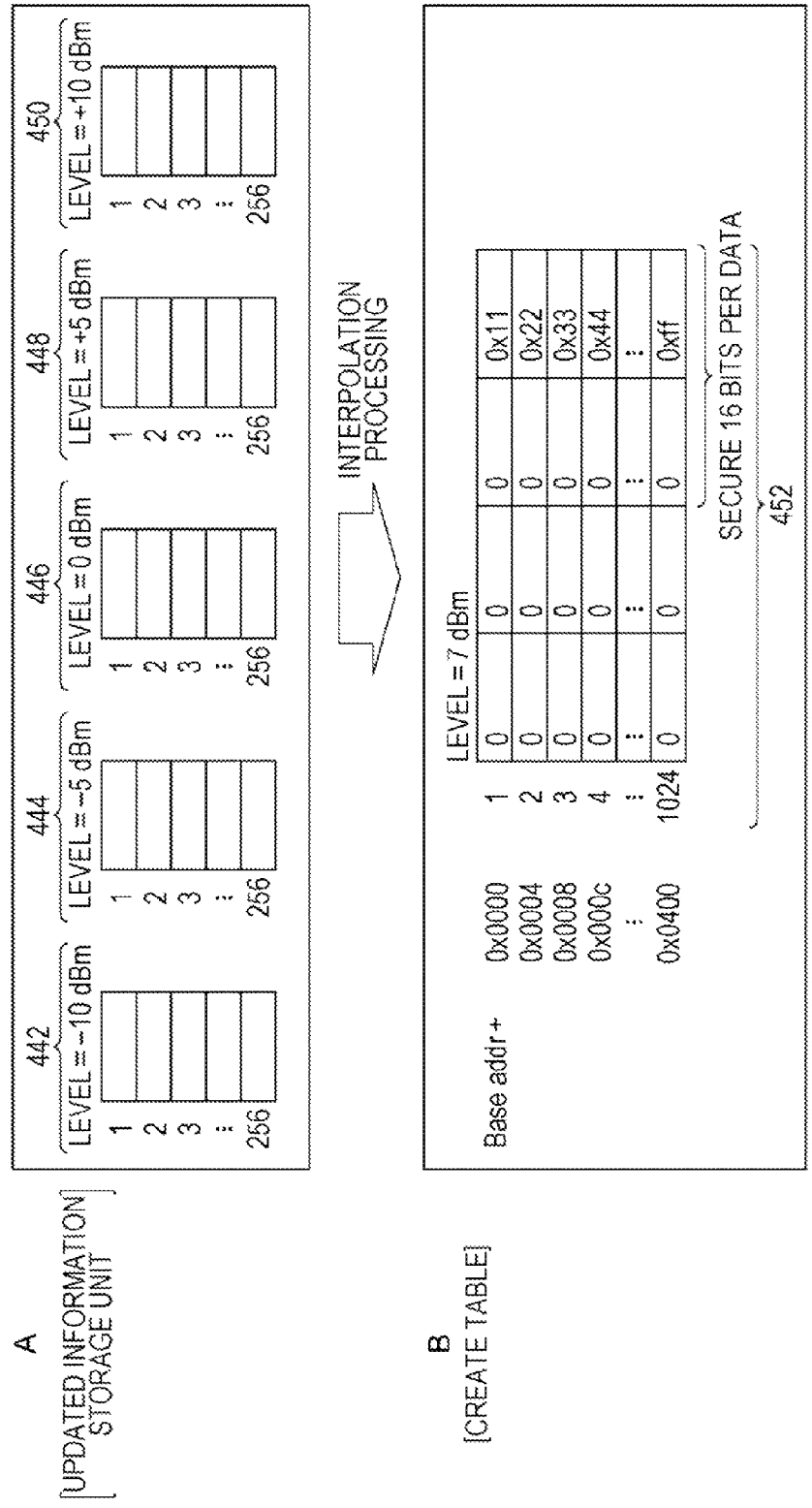

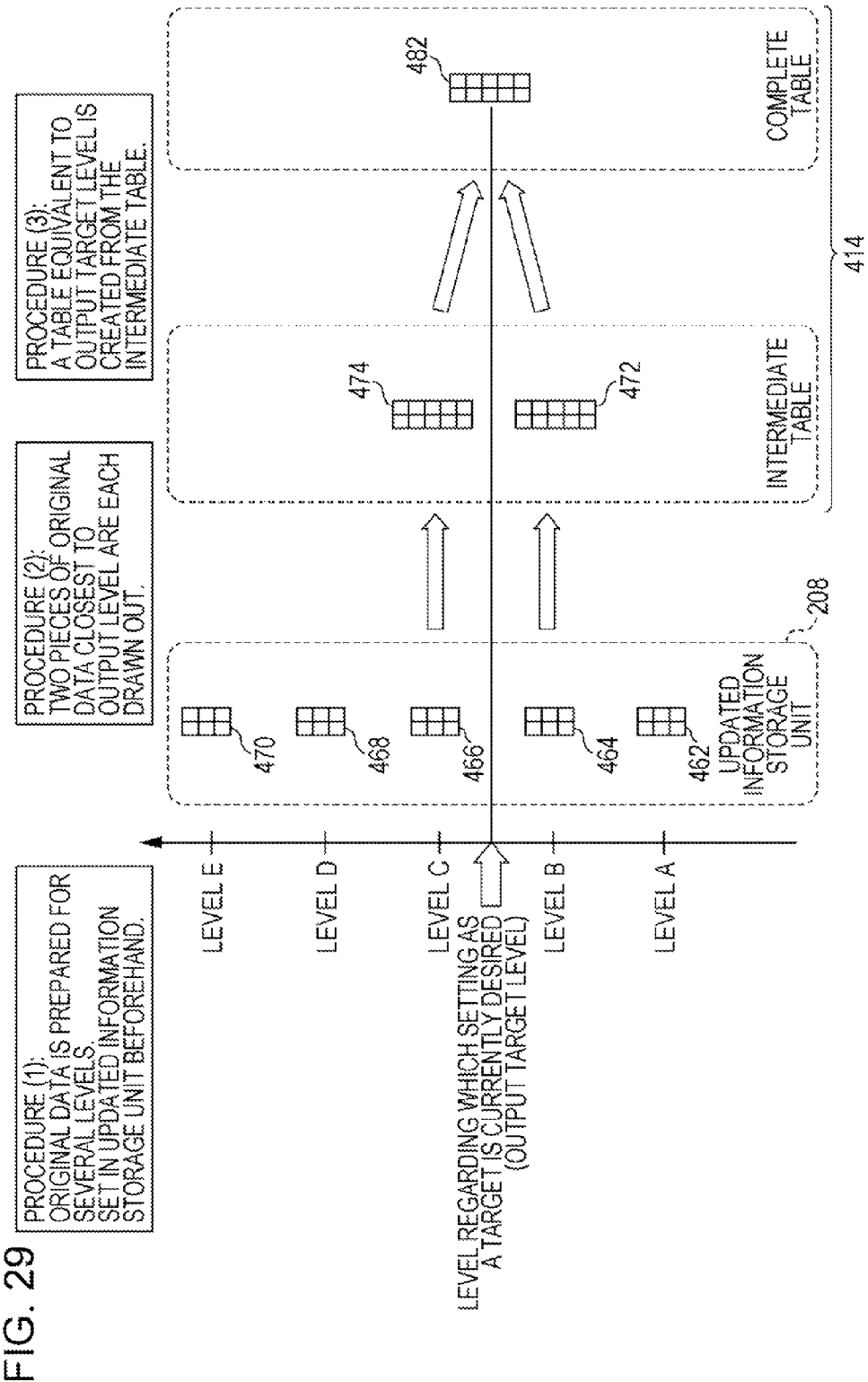

FIG. 31

| SETTING ITEMS | SETTING VALUES | NOTES |
|---|---|---|
| NUMBER OF LINES OF COMPLETE TABLE Ncmpline | 2048 | FIXED |
| NUMBER OF ORIGINAL DATA TABLES Nsrctbl | 3, 6, 12, 22, 43, 85 | PERMIT ONLY DISCRETE VALUES SHOWN TO THE LEFT. OTHER VALUES ARE CHANGED TO TRUNCATED VALUES (WHERE MINIMUM IS 3) |
| NUMBER OF LINES OF ORIGINAL DATA TABLE Nsrcline | 64 TO 2048 (N = 6 TO 11) | PARAMETER EXPRESSED IN THE TERM OF 2 TO THE N'TH POWER. N IS PARAMETER VALUE IF N IS OUT OF RANGE, N = 6 IS SET. |
| MAXIMUM VALUE OF TARGET SETTING LEVEL Level_Max | 10 | FIXED |
| MINIMUM VALUE OF TARGET SETTING LEVEL Level_Min | −11 | FIXED |
| TARGET SETTING LEVEL Level_target | −11 TO 10 | MINIMUM INCREMENT OF 0.1 DETERMINED WHEN STARTING UP DEVICE, AND UNCHANGEABLE WHILE RUNNING. |

FIG. 43

| AMOUNT OF DATA | STORE ALL DATA | STORE DISCRETE DATA | COMPARE |
|---|---|---|---|
| | 12bit×16bit×200<br>=38400 kbit | 12bit×16bit×5<br>=960 kbit | MEMORY SIZE IS 1/40<br>(MEMORY CAPACITY REDUCED) |
| TIMES MEASURED | 200 TIMES | 5 TIMES | NUMBER OF TIMES OF MEASUREMENT IS 1/40<br>(NUMBER OF MEASUREMENT TIMES REDUCED) |

FIG. 49

| LEVEL RANGE | Xr |
|---|---|
| FROM A TO B | Xr1 |
| FROM B TO C | Xr2 |
| FROM C TO D | Xr3 |
| D OR GREATER | Xr4 |

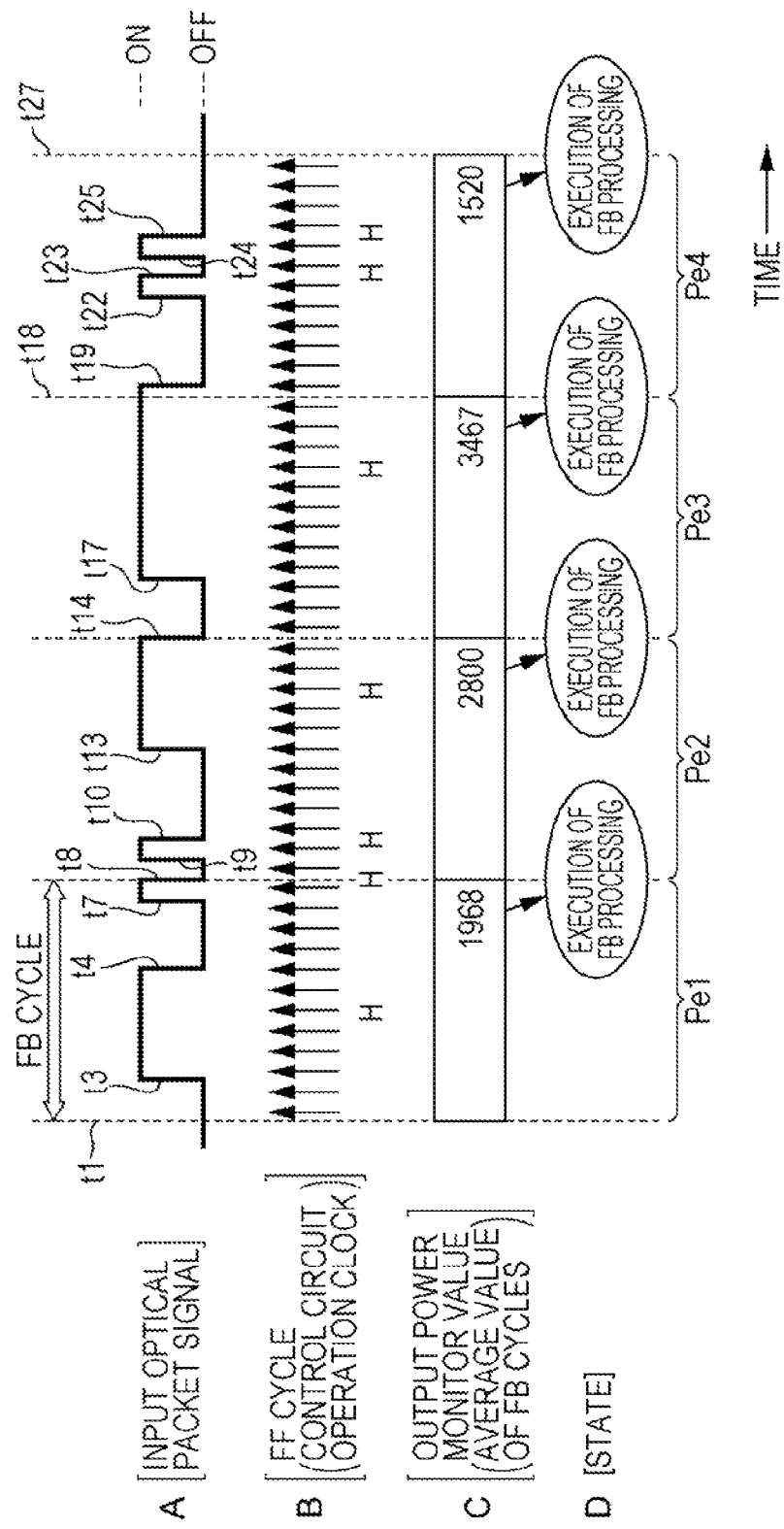

FIG. 89

DAC-ASE TABLE (2050)

| DAC VALUE (DRIVING AMOUNT) | ASE AMOUNT [mW] |
|---|---|
| 0 | →  |
| ⋮ | ⟿ ——ASE |
| DACmax (FOR EXAMPLE, 4095) | ⟿ ——ASE |

TABLE OF ORIGINAL LUT DATA

| INPUT PD VALUE: 12-BIT | DRIVE CURRENT: 14-BIT |
|---|---|
| 000000000000 | 00000000000000 |
| 000000000001 | 00000000000000 |
| 000000000010 | 00000000000000 |
| 000000000011 | 00000000000000 |
| | |
| 00000000xxx0 | 00000000000000 |
| 00000000xxx1 | 00000000000000 |
| | |
| 00000000yyyy | 00000000000001 |
| | |
| | |
| | |
| | |
| ⋮ | |
| | |
| | |
| | |
| 111111111111 | 11111111111111 |

INPUT PD VALUE <THRESHOLD

THRESHOLD

FIG. 102

| INPUT-SIDE ADC VALUE | BEFORE CORRECTION (IN USE) +0 dBm | AFTER CORRECTION +0 dBm |
|---|---|---|
| 0 | 48000 | 48000−$\alpha$ |
| 1 | 47900 | 47900−$\alpha$ |
| 2 | 47810 | 47810−$\alpha$ |
| ⋮ | ⋮ | ⋮ |
| 4095 | 9230 | 9230−$\alpha$ |

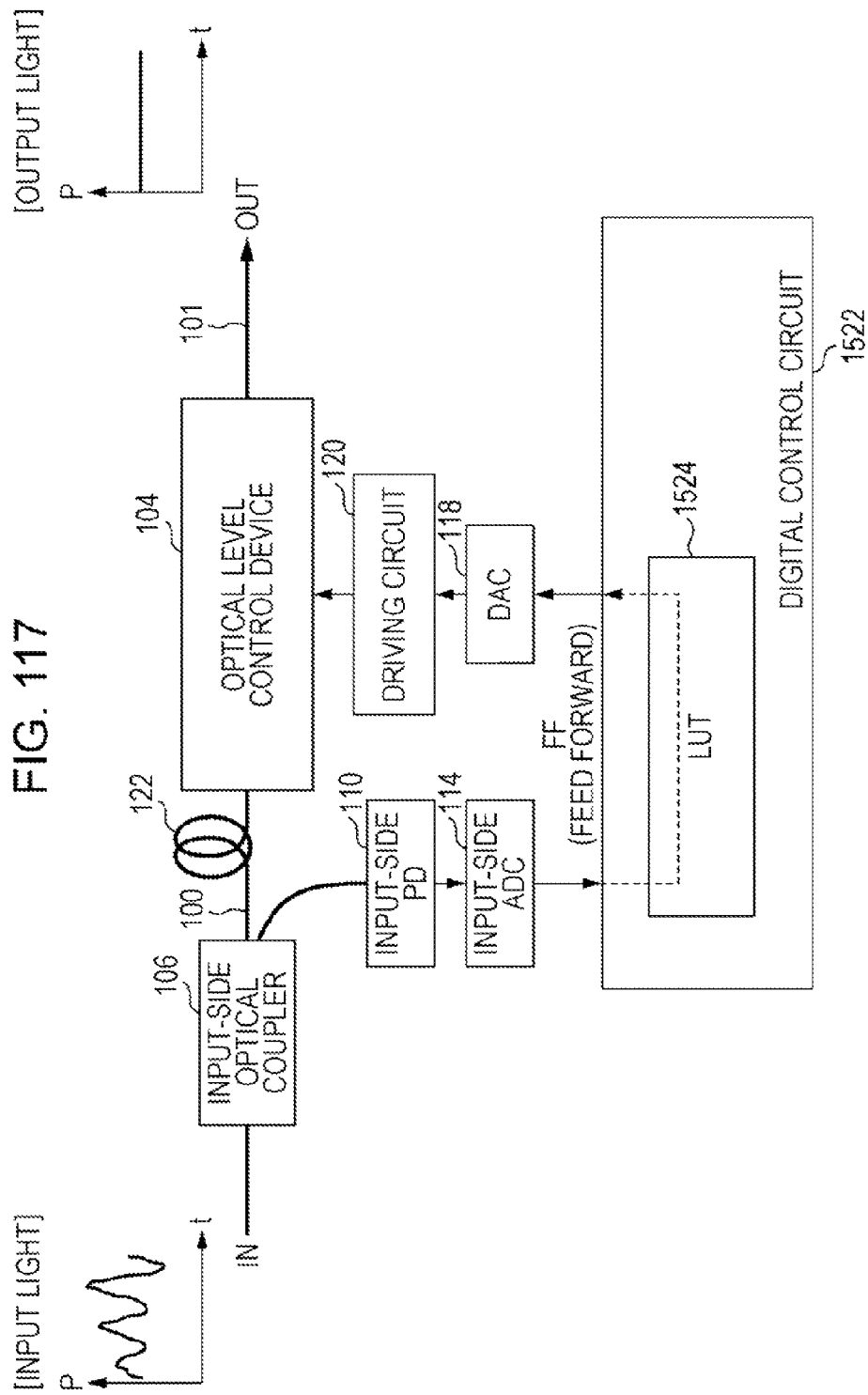

FIG. 118

| INPUT SIDE ADC VALUE | OUTPUT −10 dBm | OUTPUT −5 dBm | OUTPUT +0 dBm | OUTPUT +5 dBm |
|---|---|---|---|---|
| 0 | 42000 | 45000 | 48000 | 51800 |
| 1 | 41900 | 44900 | 47900 | 51710 |
| 2 | 41800 | 44800 | 47810 | 51620 |
| ⋮ | ⋮ | ⋮ | ⋮ | ⋮ |
| 4095 | 3000 | 6120 | 9230 | 12327 |

LEVEL CONTROL CIRCUIT, LEVEL CONTROL METHOD, AND LEVEL CONTROL SYSTEM

CROSS-REFERENCE TO RELATED APPLICATIONS

This application is a continuation-in-part of U.S. application Ser. No. 13/086,766 filed on Apr. 14, 2011, and claims the benefit of priority from the prior Japanese Patent Application NO. 2010-191169 filed on Aug. 27, 2010, the prior Japanese Patent Application NO. 2010-097448 filed on Apr. 20, 2010, and the prior Japanese Patent Application NO. 2011-94503 filed on Apr. 20, 2011, the entire contents of which are incorporated herein by reference.

FIELD

The embodiments discussed herein are related to a level control circuit that control a level of an optical signal or electronic signal, level control method, and level control system.

BACKGROUND

Relating to communication that uses optical or electronic signals, level control by amplification or attenuation of a signal is known. Relating to this level control, automatic gain control unit (Automatic Gain Control: AGC) in which control is performed such that the level ratio (gain) of the signal light before and after amplification becomes constant, and automatic level control unit (ALC: Automatic Level Control) in which control is performed such that the level of the signal light after amplification becomes constant, are known (Japanese Laid-open Patent Publication No. 2006-230020). Also, a process by which the distortion property of an amplifier is measured and the distortion property of the amplifier is compensated for is known (Japanese Laid-open Patent Publication No. 2003-513498). Also, maintaining the electrical output level of a light receiving device constant in the case that the wavelength of the optical signal has changed is known (Japanese Laid-open Patent Publication No. 2008-53869).

Now, according to a communication system using a transfer path, due to vibrations or impacts to the transfer path, or tension applied thereto, or by variations in temperature or humidity occurring, the polarization of the signal flowing through the transfer path is rotated, and variations to signal strength occur. For example, with a communication system performing information transfer with a high-frequency signal, deterioration of receiving property by such signal variations has to be prevented. Specifically, vibrations, impacts, and tension load are suppressed, optical power variations due to changes in temperature and humidity are suppressed, and deterioration in receiving properties is prevented, by preparing a dedicating space to install a transfer path underground where environment variations are few, and by installing the transfer path in this space. Also, various standards are set for the devices making up the communication system, thereby improving reliability.

However, there are limits to the reliability gained by such measures. For the given problems, there is neither disclosure nor suggestion in Japanese Laid-open Patent Publication No. 2006-230020, Japanese Laid-open Patent Publication No. 2003-513498, or Japanese Laid-open Patent Publication No. 2008-53869 and neither disclosure nor suggestions for the configuration or the like to solve these problems.

SUMMARY

According to one aspect of the embodiments, there is the level control circuit that generates level control output. The level control circuit includes: a control information storage unit that stores control information corresponding to a signal level, and outputs control information corresponding to the signal level of a first input signal; and an information updating unit that updates said control information of said control information storage unit according to the signal level of a second input signal.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 2 is a diagram illustrating an example of control information;

FIG. 16 is a diagram illustrating an example of updated information;

FIG. 19 is a diagram illustrating an example of a table in which a threshold is set;

FIG. 24 is a diagram illustrating an example of an intermittent signal;

FIG. 25 is a diagram illustrating an example of a continuous signal;

FIG. 28 is a diagram illustrating an example of table interpolation;

FIG. 29 is a diagram illustrating an example of table creating processing procedures;

FIG. 31 is a diagram illustrating an example of setting items of the interpolating processing;

FIG. 43 is a diagram illustrating an example of data amount and number of measurements;

FIG. 49 is a diagram illustrating an example of a setting value as to each level range;

FIG. 78 is a diagram illustrating an example of a relation between optical packet signal and monitor values;

FIG. 89 is a diagram illustrating an example of a DAC-ASE table;

FIG. 98 is a diagram illustrating an example of a table wherein a threshold is set;

FIG. 102 is a diagram illustrating an example of table correction;

FIG. 117 is a diagram illustrating an example of a level control system to a fourth comparative example;

FIG. 118 is a diagram illustrating an example of a table of the level control system relating to the fourth comparative example;

FIG. 120 is a diagram illustrating an example of an output signal of the first comparative example;

FIG. 121 is a diagram illustrating an example of an output signal of the third comparative example;

FIG. 122 is a diagram illustrating an example of an output signal of the fourth comparative example; and FIG. 123 is a diagram illustrating an example of an output signal relating to the embodiments.

DESCRIPTION OF EMBODIMENTS

First Embodiment

According to a first embodiment, control information corresponding to a signal level is stored, a first input signal is received, and control information corresponding to this signal level is output. The control information is then updated according to the signal level of a second input signal. Thus, the signal level is stabilized.

Figure 1:
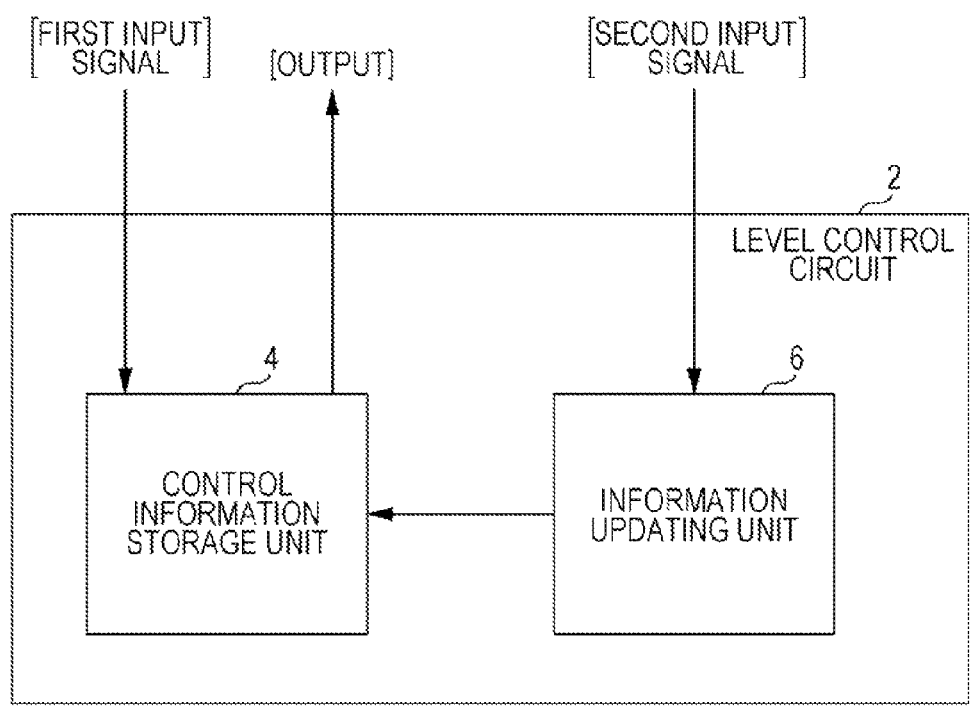
FIG. 1 is a diagram illustrating an example of a level control circuit relating to a first embodiment.
Figure 3:
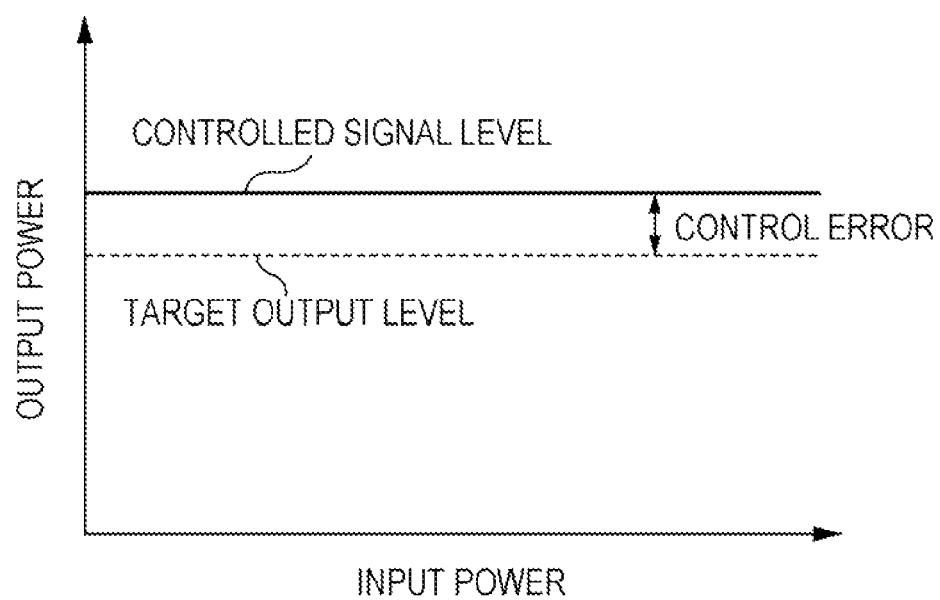
FIG. 3 is a diagram illustrating an example of control error.

FIGS. 1, 2, and 3 will be referenced to describe the first embodiment. FIG. 1 is a diagram illustrating an example of a level control circuit relating to the first embodiment, FIG. 2 is a diagram illustrating an example of control information, and FIG. 3 is a diagram illustrating an example of control error. Note that the configurations depicted in FIGS. 1, 2, and 3 are examples, and the present invention is not to be limited by such configurations.

A level control circuit 2 is an example of a level control circuit or level control system according to the present disclosure. According to the level control circuit 2, control information corresponding to a signal level is stored, a first input signal is received, and control information corresponding to this signal level is output. The control information is then updated according to the signal level of a second input signal. Now, the level control circuit 2 has a control information storage unit 4 and an information updating unit 6, as depicted in FIG. 1. The level control circuit 2 is, for example, a computer that performs output of the control information and updating of the control information by programming. The level control circuit 2 may include a control information circuit that outputs the output signal level control corresponding to the signal level of first input signal based on the control information stored in the control information storage unit 4.

The control information storage unit 4 is an example of means to store the control information. The control information storage unit 4 is made up of a register, RAM (random-access memory), or ROM (read-only memory) and the like, for example. According to the register and RAM, the access time for read-out is a short time as compared to the ROM, and the information stored by the control information storage unit 4 may be written and read at high speed. The control information storage unit 4 stores multiple signal levels and level control amounts corresponding to the signal levels, as depicted in FIG. 2.

The level control amount is an example of the control information, and for example is control information used for level control. The level control amount herein is stored so as to correspond to each of the multiple signal levels, as depicted in FIG. 2. In other words, with the control information storage unit 4, the signal level and level control amount of an input signal are correlated and stored. In the case that the signal level is a 12-bit digital value, a value from 0 to 4095 are stored in the control information storage unit 4. That is to say, a digital value from a minimal value to a maximal value that the signal level may take is stored in the control information storage unit 4. The level control amount depicts the amount of level control output used for level control. The level control amount is for example a digital value.

Upon receiving the first input signal, the control information storage unit 4 outputs the level control amount corresponding to the signal level thereof. Level control may be performed depending on the level control amount output by the control information storage unit 4.

The output processing performed by the control information storage unit 4 may be processed by hardware without the intermediate step of using firmware.

Upon processing by hardware being performed, for example, compared to a case of process with firmware, the time from receiving the signal level of the first input signal until generating the level control output is short, and the speed of level control may be increased.

For example, level control may be performed even if there is variation in the signal level having half the frequency of the operating frequency (clock frequency) of the level control circuit 2. In the case that the operating frequency of the level control circuit 2 is 133 MHz, a variation as great as 66 MHz may be handled.

The information updating unit 6 is an example of means to update information. The information updating unit 6 updates the control information that the control information storage unit 4 stores according to the signal level of the second input signal.

The updating processing for example is performed by preparing the level control amount to be used for updating beforehand, and updating using the prepared data herein. This is performed by generating and updating the data to be used for updating with a computing processing.

Also, this is performed by adding the computing processing to the prepared level control amount to be used for updating, and generating the data to be used for updating. Control information updating may be performed by using either of these processes.

The level control amount output by the control information storage unit 4 is used for level control. Upon changes occurring such as changes over time and transmission loss in the level control circuit or control system that performs the level control, control error occurs between the controlled signal level and the output target level, as depicted in FIG. 3.

The updating processing updates the control information of the control information storage unit 4 according to the signal level of the second input signal, and corrects the control error. As a result, the signal may be stabilized to an output target level of a long period of time. Note that the output target level is a target value of a signal level after level control, and is a target value of the signal level set beforehand.

Figure 4:
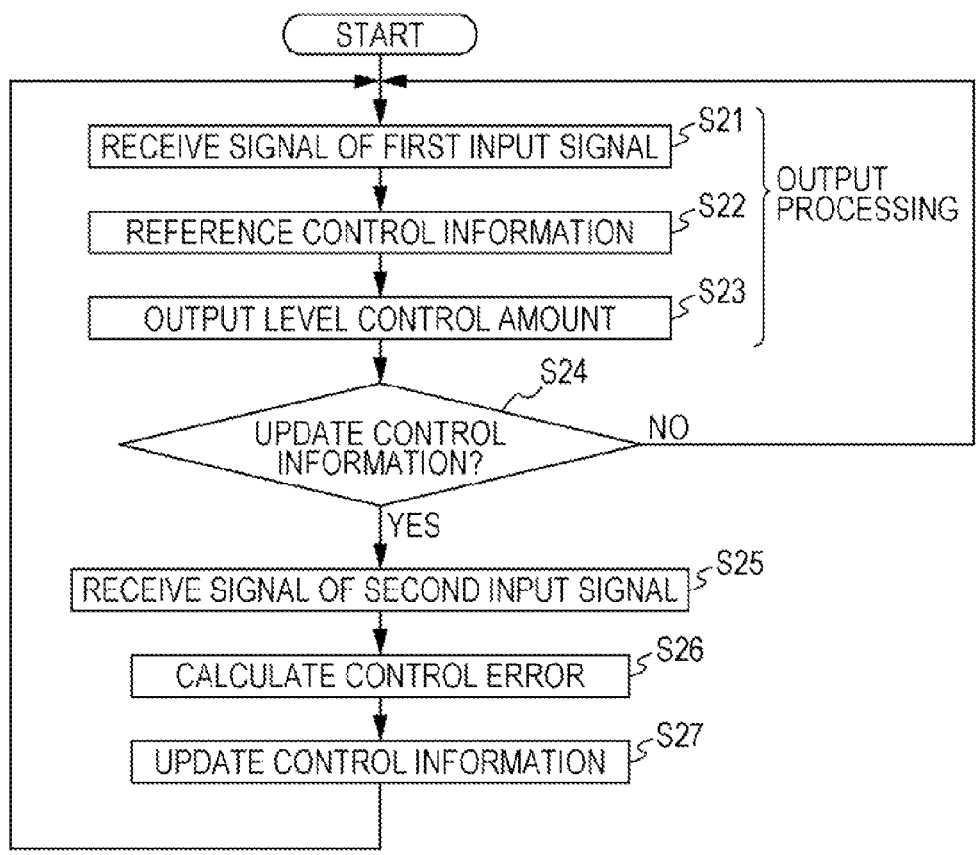
FIG. 4 is a flowchart describing an example of level control processing relating to the first embodiment.

Next, FIG. 4 will be referenced to describe input control of the first embodiment. FIG. 4 is a flowchart describing an example of level control processing relating to the first embodiment. Note that the processing depicted in FIG. 4 is an example, and the present invention is not to be limited by this arrangement.

The output processing is performed by the control information storage unit 4. Upon receiving the first input signal (step S21), the control information storage unit 4 references the stored control information (step S22). The control information storage unit 4 outputs the level control amount corresponding to the signal level of the first input signal (step S23).

With the output of the level control amount, determination is made as to whether or not to update the control information (step S24), and in the case of not updating the control information (NO in step S24), the output processing is repeated. The output processing of the level control amount to be performed having received the first input signal is repeatedly performed, whereby level control may be performed.

In the case of updating the control information (YES in step S24), updating processing is performed. The updating determining of the control information is performed periodically based on time, for example. Also, for example, the number of repetitions of the output processing is monitored, and updating is performed in the case of achieving the predetermined number of repetitions.

In the case of updating control information, the information updating unit 6 receives the second input signal (step S25), and computes the difference (control error) between the signal level of the second input signal and the output target level set beforehand (step S26).

The control information of the control information storage unit 4 is then updated so that the control error becomes 0 (step S27). Thus, the control information is updated by the information updating unit 6 and the control error is resolved, thereby enabling a stable level control over a long period of time.

According to the first embodiment, the control information corresponding to the control information level is output, and the control information is updated. As a result, the properties thereof may be maintained continually for a long period of time.

Also, if the processing to generate the level control output is caused to be hardware processing without going via firmware, the level control output may be generated at a high speed. As a result, the properties thereof may be maintained continually for a long period of time, while corresponding to high speed signal level variations.

Second Embodiment

Figure 5:
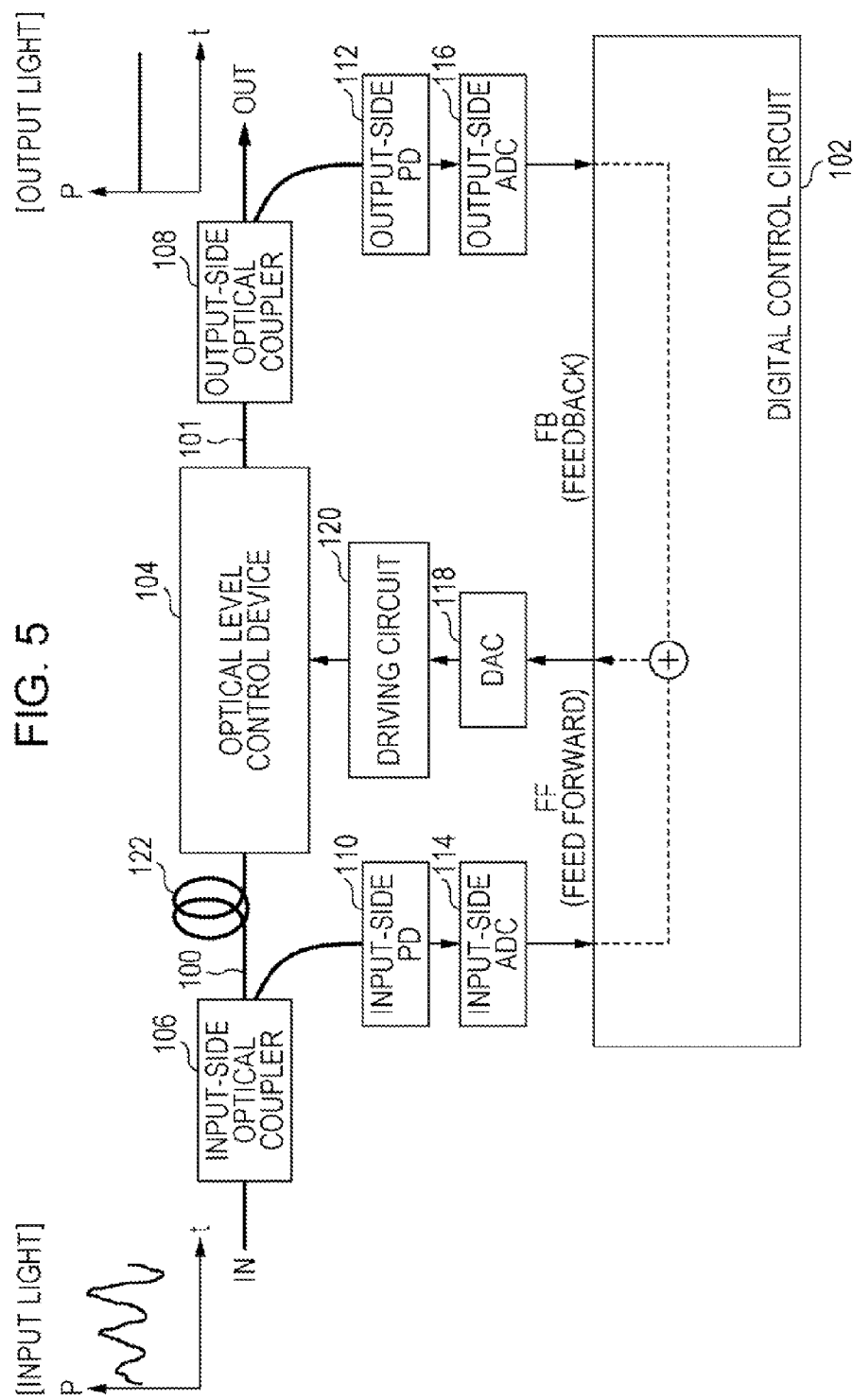
FIG. 5 is a diagram illustrating an example of a level control system relating to a second embodiment.
Figure 6:
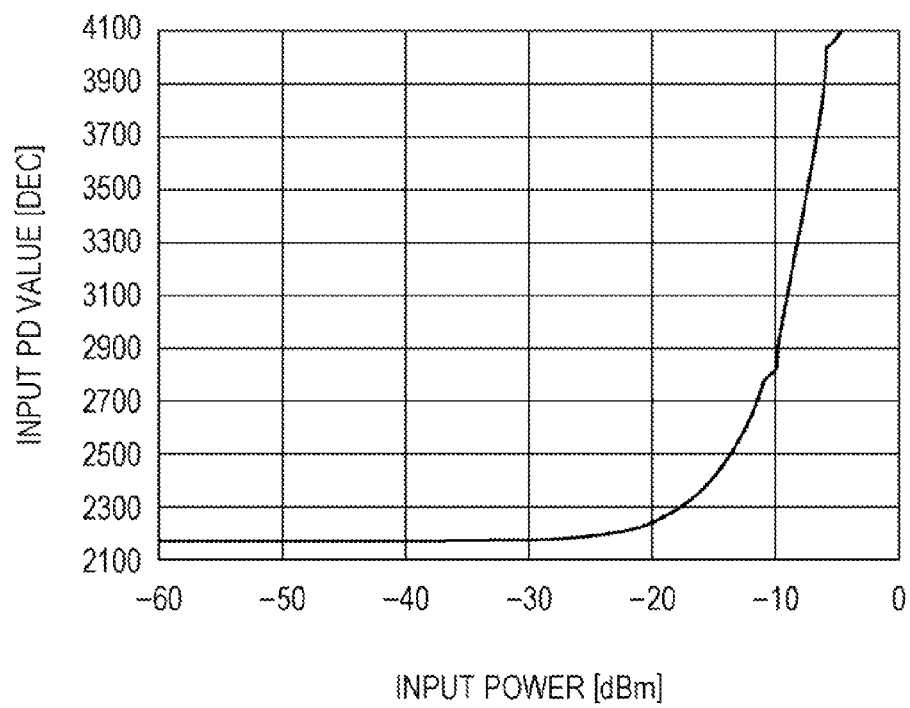
FIG. 6 is a diagram illustrating an example of monitor circuit property of a linear operational amplifier.
Figure 7:
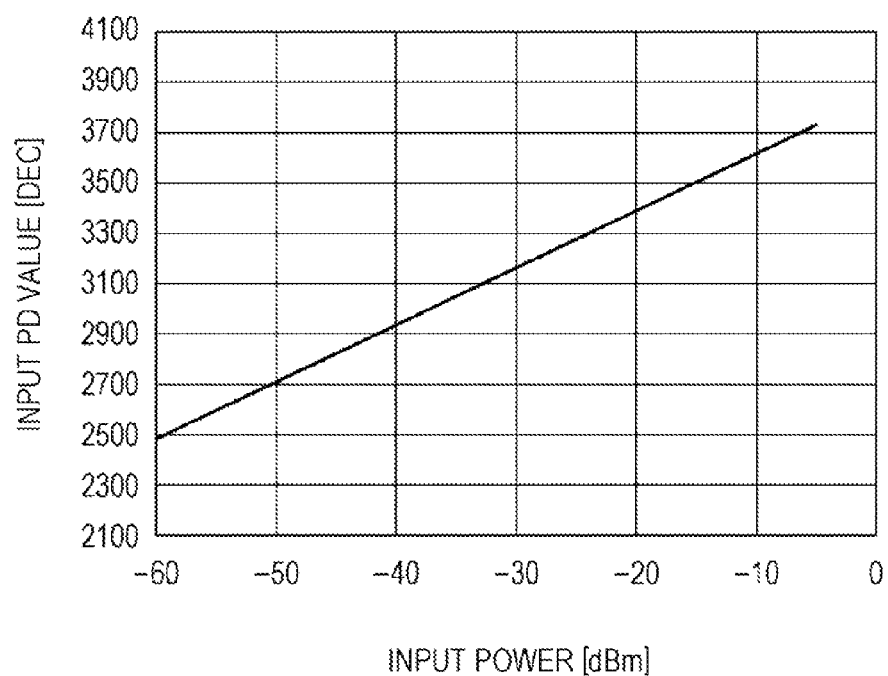
FIG. 7 is a diagram illustrating an example of the monitor circuit property of the log amplifier.
Figure 8:
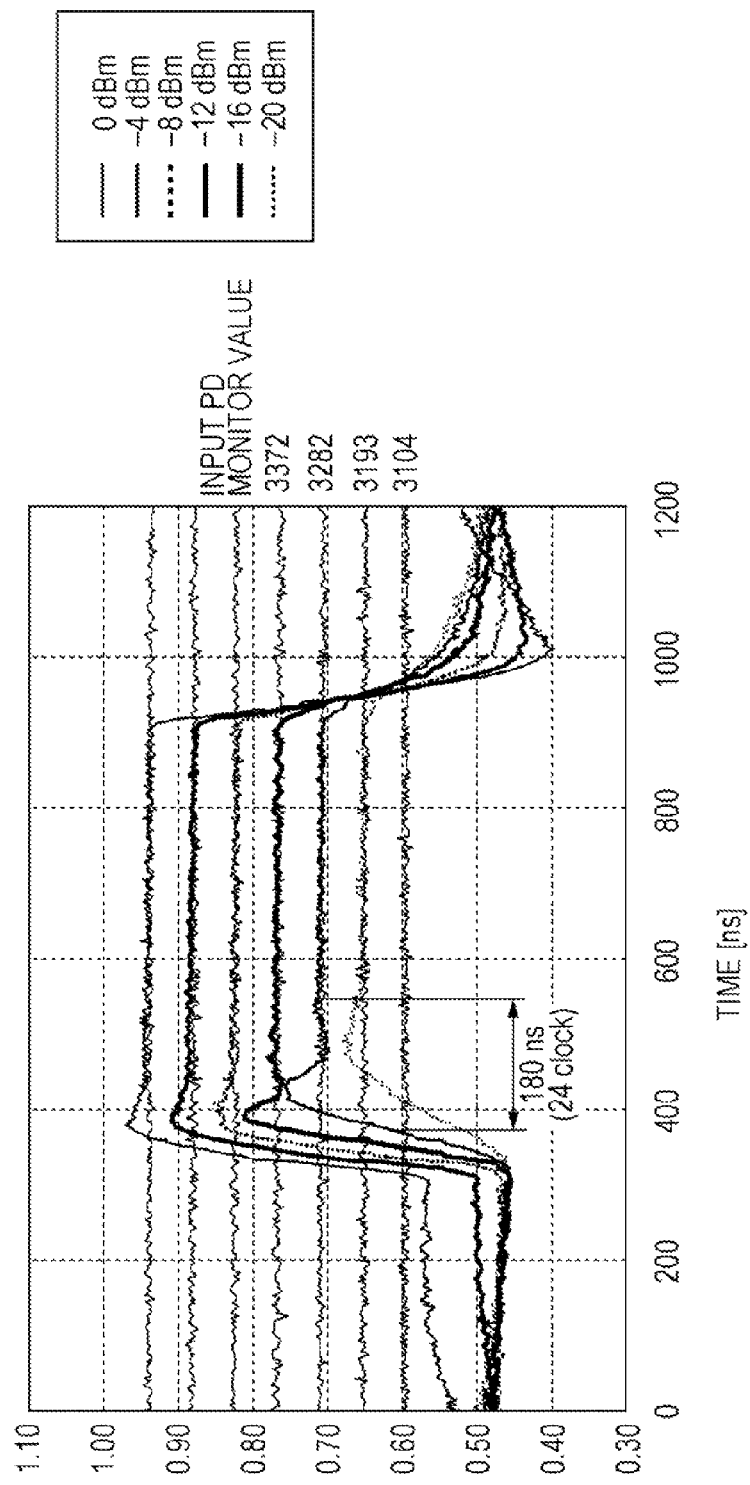
FIG. 8 is a diagram illustrating an example of the output property of a log amplifier at time of burst signal input.

FIGS. 5, 6, 7, 8, 9, 10, and 11 will be referenced for the second embodiment. FIG. 5 is a diagram depicting an example of the level control system relating to the second embodiment, FIG. 6 is a diagram depicting an example of the properties of a linear operational amplifier, FIG. 7 is a diagram illustrating an example of the properties of a log amplifier, and FIG. 8 is a diagram depicting an example of output properties of the log amplifier at time of burst signal input.

Figure 9:
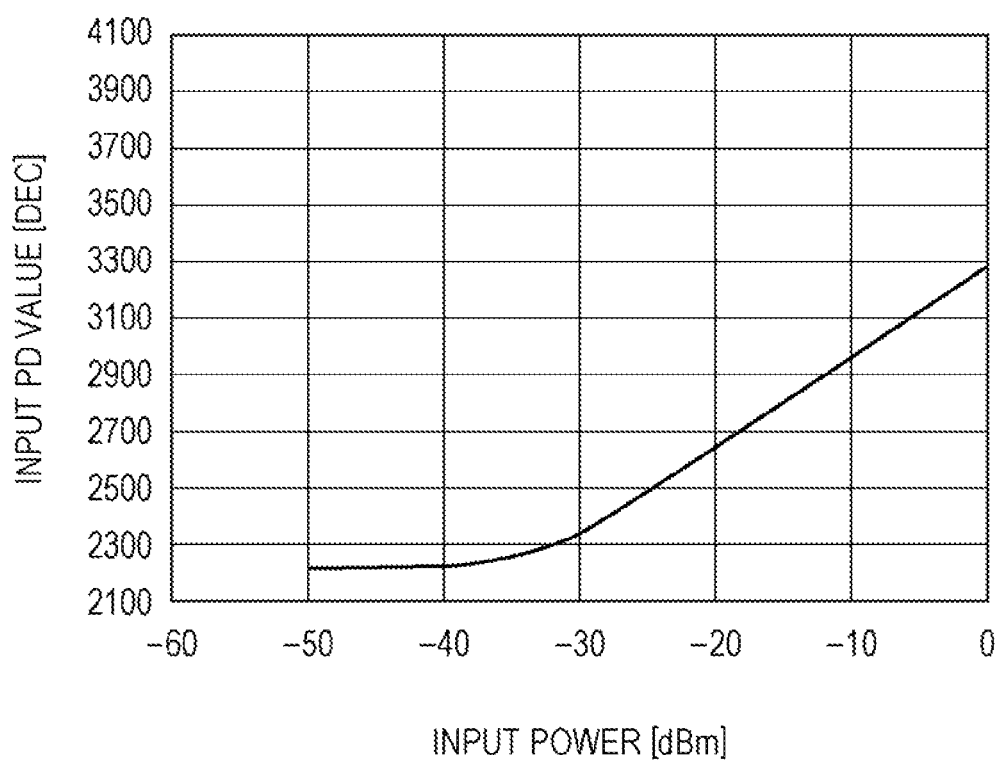
FIG. 9 is a diagram illustrating an example of the monitor circuit property of a log amplifier.
Figure 10:
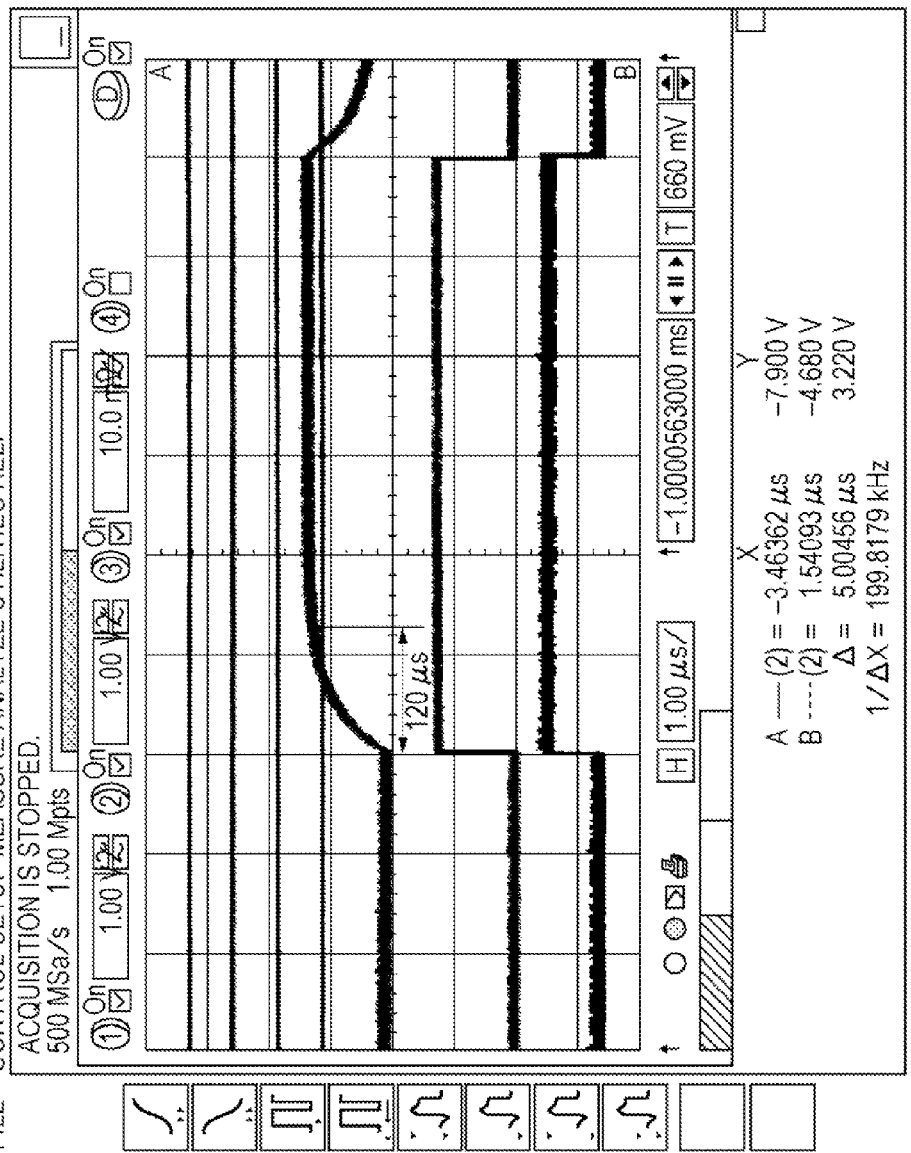
FIG. 10 is a diagram illustrating an example of the output property of the log amplifier at time of burst signal input.
Figure 11:
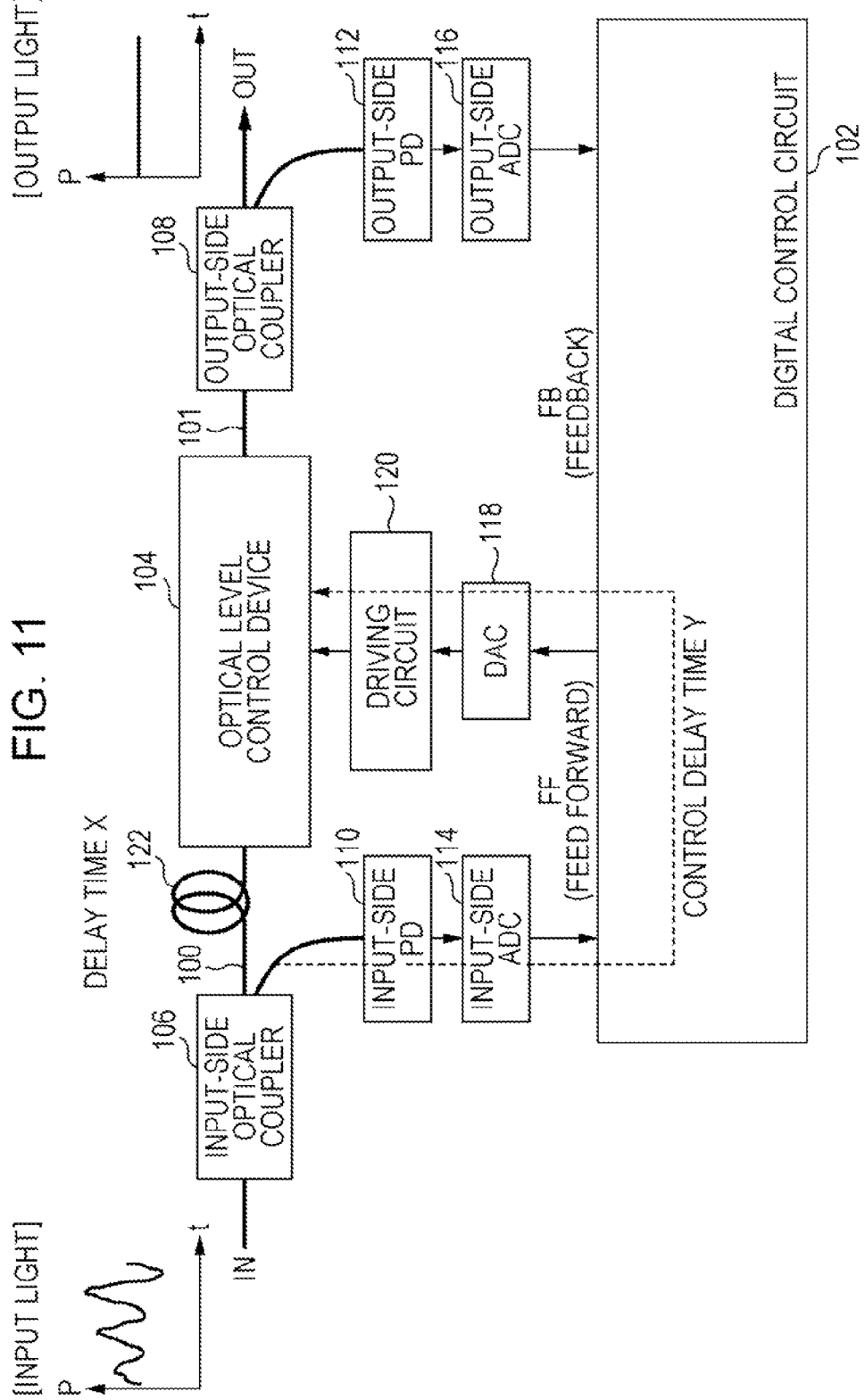
FIG. 11 is a diagram illustrating an example of signal arrival time.

FIG. 9 is a diagram depicting an example of the properties of a log amplifier, FIG. 10 is a diagram depicting an example of the output properties of the log amplifier at the time of burst signal input, and FIG. 11 is the diagram depicting an example of signal arrival time. Note that the arrangements depicted in FIGS. 5 through 11 are examples, and the present invention is not to be limited by these arrangements. Also, in FIGS. 6, 7, and 9, the input power represents the power of the input signal received by the amplifier, and the input PD value is the output value output from the amplifier, i.e., the input value input into the digital control circuit.

According to the second embodiment, the control information is obtained by the signal level of the first input signal before level control, the level control output is generated, and the control information is updated by the signal level of the second input signal after level control.

With the second embodiment, as depicted in FIG. 5, the digital control circuit 102 is connected to an optical level control device 104, an input-side transfer path 100 that is connected to the input side of the optical level control device 104, and an output-side transfer path 101 that is connected to the output side of the optical level control device 104. Between the input-side transfer path 100 and digital control circuit 102, an input-side optical coupler 106, input-side PD (photo detecting unit) 110, and input-side ADC (A/D converter) 114 are disposed. Between the output-side transfer path 101 and digital control circuit 102, an output-side optical coupler 108, output-side PD 112, and output-side ADC 116 are disposed. Between the digital control circuit 102 and optical level control device 104, a DAC (D/A converter) 118 and a driving circuit 120 of the optical level control device 104 are disposed.

The optical signal is input from the input-side transfer path 100 side to the optical level control device 104, and upon having been subjected to level control by the optical level control device 104, the optical signal is output from the optical level control device 104 to the output side transfer path 101 side. Light before level control flows to the input side transfer path 100 side, and light after level control flows to the output side transfer path 101 side. In FIG. 5, IN denotes the input side and OUT denotes the output side.

The light level P in the optical signal of the input side (input light) varies as to time t. Owing to the input light herein being controlled by the optical level control device 104, the output light of which the level does not vary as to the time t is obtained.

The input-side optical coupler 106 and output-side optical coupler 108 are examples of means to branch out a portion of the light within the transfer path. The input side optical coupler 106 is connected to the input-side transfer path 100, and branches out a portion of the input-side light and outputs this toward the digital control circuit 102. Also, the output-side optical coupler 108 is connected to the output-side transfer path 101, and branches out a portion of the output-side light and outputs this toward the digital control circuit 102. The input-side optical coupler 106 and output-side optical coupler 108 are tap couplers, for example, which branch out 1 to 10% of the light input into the light coupler.

The PD is an example of the means to convert light energy into current, and is a photo detecting unit. The PD has a semiconductor, for example, and generates an electrical signal by the light hitting the semiconductor thereof. The generated electrical signal has a strength to correspond to the strength of the input light. The generated electrical signal value denotes the input PD value, for example.

The input-side PD 110 receives the branched light of the input side that has been branched out by the input-side optical coupler 106, generates an electrical signal of the input PD value of the input side (input-side PD value), and outputs this electrical signal to the input-side ADC 114. That is to say, the input side PD 110 makes up a monitoring unit to monitor the light before level control. Note that the input-side PD value is an example of a signal level of the first input signal before level control.

The output side PD 112 receives the branched light of the output side that has been branched out by the output-side optical coupler 108, generates an electrical signal of the input PD value of the output side (output-side PD value), and outputs this electrical signal to the output-side ADC 116. That is to say, the output side PD 112 makes up a monitoring unit to monitor the light after level control. Note that the output-side PD value is an example of a signal level of the second input signal.

The electrical signals generated by the input-side PD 110 and output-side PD 112 are analog signals, and by converting these into digital signals using the ADC 114 and 116, processing within the digital control circuit 102 is enabled.

The ADC is an example of means to convert the analog signals into digital signals, and is an analog/digital conversion circuit. The input-side ADC 114 is disposed between the input-side PD 110 and digital control circuit 102, and converts the input-side PD values into digital values. The output-side ADC 116 is disposed between the output-side PD 112 and digital control circuit 102, and converts the output-side PD values into digital values.

The driving circuit 120 is an example of driving means of the optical level control device 104. The driving circuit 120 receives the driving control amount of the optical level control device 104, and drives the optical level control device 104 according to the received driving control amount. Note that the driving control amount is an example of the level control amount (FIG. 2).

The optical level control device 104 is an example of means to control the level, and for example is a level control unit. The optical level control device 104 has an optical amplifier and optical attenuator, for example. The optical amplifier is, for example, an Erbium Doped-Fiber Amplifier (EDFA) or a Semiconductor Optical Amplifier (SOA). The optical attenuator is, for example, a Variable Attenuator (VATT).

EDFA is an amplifier that amplifies when Erbium is excited by excitation light and energy rank falls.

SOA is an amplifier that uses a semiconductor, and excels in responsiveness as compared to an EDFA which takes several tens of microseconds for a response in an optical amplification.

In the case of controlling variations of an optical level that is less than a microsecond, SOA is used. Since SOA excels in responsiveness, even when a sudden optical pulse is input or the optical level abruptly changes, the occurrence of a transient response may be suppressed. Consequently, the generation of an optical surge and variations in great output light strength may be suppressed.

The optical signal advances approximately 2 km within an optical fiber in the space of approximately 10 microseconds. The timing of the level adjustment is adjusted, whereby, in the case of inserting a delay line 122, an SOA excelling in responsiveness is used, whereby the length of the delay line 122 may be shortened by 2 km. Thus, causes for signal variations that occurs due to fiber vibrations, and temperature or humidity changes, or changes to the adjustment time, are suppressed, whereby delay adjustments may be readily made.

The digital control circuit 102 is an example of a level control circuit 2. The digital control circuit 102 receives the input-side PD value that has been digitized via the input-side PD 110 and input-side ADC 114, and receives the output-side PD value that has been digitized via the output-side PD 112 and output-side ADC 116. Also, the digital control circuit 102 generates the driving control amount of the optical level control device 104 as level control output, and outputs this to the DAC 118. The driving control amount is converted to an analog value from a digital value with the DAC 118, and is output to the driving circuit 120. The DAC 118 is an example of means to convert a digital signal into an analog signal.

The digital control circuit 102 has an already-described control information storage unit 4 (FIG. 1) and an information updating unit 6 (FIG. 1). For the digital control circuit 102, for example an FPGA (Field Programmable Gate Arrays) or ASIC (Application Specific Integrated Circuit) or the like is used, and for example is a computer that performs output of the control information and updating of the control information by being programmed to that end. The control information storage unit 4 and information updating unit 6 are similar to the first embodiment, and the description thereof will be omitted.

As output processing, at the digital control circuit 102 the input-side PD value is received, the control information of the control information storage unit 4 is referenced, and the driving control amount for the optical level control device 104 to have the desired output power is output to the DAC 118. The driving control amount is transferred to the driving circuit 120 via the DAC 118, and the driving current of the optical level control device 104 changes. Consequently, the output power of the optical level control device 104 changes. The processing herein is a feed forward control (FF control) to change the output power based on the input-side optical signal. Also, with the digital control circuit 102, the output-side PD value is received as updating processing, and the control information of the control information storage unit 4 is updated. The updating processing is a feedback control (FB control).

In the case that the value of the current converted by the PD is small, the current is amplified by pairing the amplifier to the PD.

In the case of performing signal amplification together with the amplifier, for example a linear operational amplifier is paired with the input-side PD 110, and a log amplifier is paired with the output-side PD 112.

The linear operational amplifier has a property wherein the input PD value changes to linear as compared to input power, as depicted in FIG. 6, and the response is high speed as compared to a log amplifier. Thus, a linear operational amplifier is suitable for use on the FF control side to perform value conversions at this high speed that reference the control information storage unit 4. On the other hand, the log amplifier secures a wide input dynamic range as compared to the linear operational amplifier (FIG. 6), as depicted in FIGS. 7 and 9. By using this wide range, the log amplifier has a high accuracy of amplification. The log amplifier is an operational amplifier having a property wherein the amplitude of the output signal changes exponentially as compared to the amplitude of the input signal, and as depicted in FIGS. 8 and 10, and amount of overshooting or speed of the leading edge of the waveform changes according to the level of input light, taking approximately 120 microseconds until the response is stabilized. The control information of the control information storage unit 4 is updated at a time interval longer than the time for the log amplifier response to stabilize, thereby enabling waiting for the log amplifier response to stabilize, and processing of the signal. Precision of the level control may be improved by using a log amplifier having a high accuracy as compared to the output-side PD 112.

Next, FIGS. 5 and 11 will be referenced regarding the configuration of providing a delay line 122 for time adjustment.

The delay line 122 is an example of a delay device that adjusts the transmittance time of the signal, and makes up a transmittance time adjusting unit. The delay line 122 is made up of a delay device such as a long optical fiber, for example. In the case that the light passes through the delay line 122, the passing time according to the length of the delay line 122 is needed. Thus, by disposing the delay line 122 between the input side optical coupler 106 and the optical level control device 104, the elapsed time from the time the light reaches the optical level control device 104 from the input-side optical coupler 106 may be adjusted.

In the case of attempting to handle a high-speed level variation, the optical level is stabilized by matching the driving timing of the optical level control device 104 and the timing that the optical signal reaches the optical level control device 104 and generates an input signal variation. The greater the timing shift owing to the variations of the input signal not matching the driving timing of the optical level control device 104, the more stability of the light level is lost. Thus, in the case of controlling the input level of light wherein variations of a level of which the frequency is several tens of MHz is generated, the timing is adjusted that applies the driving control amount of the optical level control device 104 with even finer precision. In order to manage the variations of a level of which the frequency is several tens of MHz, the application timing of the driving voltage is adjusted at a frequency shorter than 20 nanoseconds. According to the second embodiment, as depicted in FIG. 5, the time it takes for the light to reach the optical level control device 104 from the optical coupler 106 is adjusted by a delay line 122 disposed between the optical level control device 104 and the input-side optical coupler 106.

The length of the transfer path from the input-side optical couple 106 to the delay line 122 and the length of the transfer path from the delay line 122 to the optical level control device 104 are sufficiently short as compared to the delay line 122, whereby the time taken to reach the optical level control device 104 from the input-side optical coupler 106 becomes approximately the same as the transit time for the light to pass through the delay line 122. Consequently, the time taken for the input-side optical coupler 106 to receive the branched light, generate the level control output, and control the optical level signal may be matched with the time taken for the optical signal flowing through the input-side transfer path 100 to reach the optical level control device 104 from the input-side optical coupler 106.

As depicted in FIG. 11, the control delay time from the input light to be converted into a driving control amount with the digital control circuit 102, based on the branched light that has been branched with the input-side coupler 106, until the output power is changed with the optical level control device 104 is called Y. In this case, by matching the delay time X due to the delay line 122 and control delay time Y, the timings of the driving of the optical level control device 104 and variations to the input signal may be matched. The delay time X due to the delay line 122 may be changed by adjusting the length of the delay line 122.

Adjustments to the length of the delay line 122 are performed by level-controlling the signal of which the input level varies, monitoring the output waveform, adjusting and adjusting the length of the delay line 122, so that the waveforms stabilize. Adjustments to the length of the delay line 122 are adjustments in units of several centimeters, for example.

Features, advantages, modifications or the like will be exemplified for the above-described second embodiment.

(1) As described above, level control of the light used for communication may be performed by disposing a PD, ADC, and DAC in the pathway between the input-side optical coupler 106 and the digital control circuit 102.

(2) By pairing up a linear operational amplifier or log amplifier with the PD, even with a weak signal level the signal may be amplified and processed. In this case, pairing the input-side PD 110 and linear operational amplifier to make up the input-side PD monitor circuit, and pairing the output-side PD 112 and log amplifier to make up the output-side PD monitor circuit provides a configuration suitable from either the point of speed or from the point of accuracy.

(3) The light level may be stabilized even in the case of corresponding to a high-speed level variation, wherein the delay line 122 is disposed to adjust the signal transmittance time, thereby matching the amplification timing from the optical level control device 104.

Third Embodiment

Figure 12:
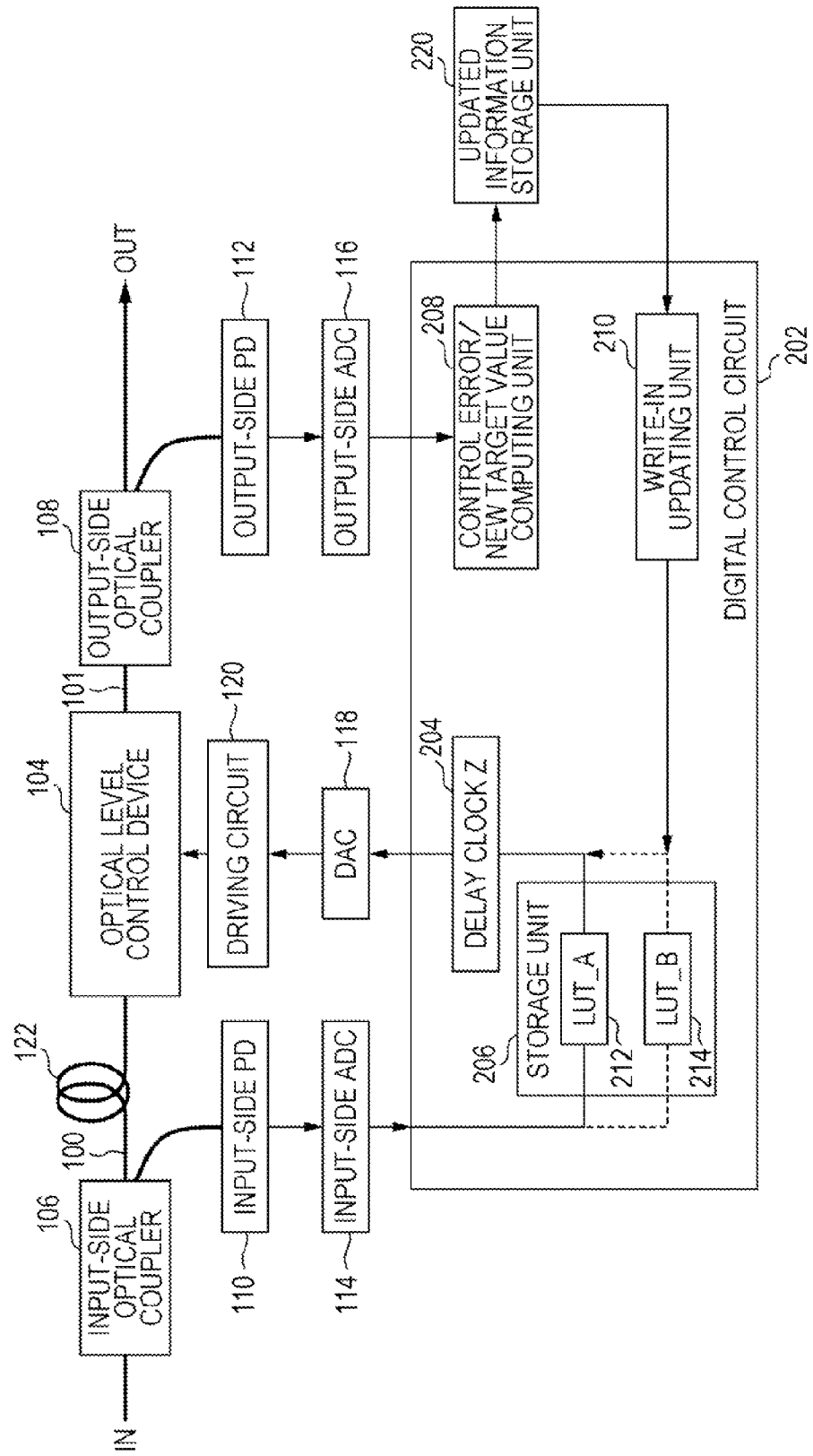
FIG. 12 is a diagram illustrating an example of a level control system relating to a third embodiment.

FIG. 12 will be referenced to describe a third embodiment. FIG. 12 is a diagram depicting an example of a level control system relating to the third embodiment. Note that the configuration depicted in FIG. 12 is an example, and the present invention is not to be limited to this configuration. The portions in FIG. 12 that are similar to those in FIGS. 5 and 11 are denoted by the same reference numerals.

The third embodiment performs time adjustments with the control circuit, and updates the control information of the storage unit 206 by switching between two look-up tables (LUT: Look Up Table).

According to the third embodiment, the digital control circuit 202 has a delay clock Z 204, storage unit 206, control error/new target value computing unit 208, and write-in updating unit 210. An updating information storage unit 220 is connected to the digital control circuit 202. Other configurations are similar to the second embodiment, so the description thereof will be omitted. Note that the control error/new target value computing unit 208 and the write-in updating unit 210 are examples of the information updating unit 6.

The storage unit 206 is an example of the control information storage unit 4 (FIG. 1). The storage unit 206 has a look-up table (LUT_A) 212 and look-up table (LUT_B) 214, as depicted in FIG. 12. The LUT_A 212 and LUT_B 214 are examples of means to store the control information, and as depicted in FIG. 2, the LUT_A 212 and LUT_B 214 have a table that stores the signal level and level control amount in a correlated manner. Generating the level control output is performed with reference to the control information stored in the LUT_A 212 and LUT_B 214. The LUT_A 212 and LUT_B 214 may be switched back and forth, whereby the LUT_A 212 or LUT_B 214 is referenced. Note that the LUT_A 212 is called a first table, and the LUT_B 214 is called a second table.

The delay clock Z 204 is an example of a time adjusting means to adjust the transmittance time of the signal, and is an example of the output time adjusting unit. The delay clock Z 204 is disposed between the storage unit 206 and the DAC 118. The delay clock Z 204 delays the transmittance of the generated level control output with a delay amount control function, and adjusts the time to output from the digital control circuit 202. Consequently, the time taken to receive the light branched out at the input-side optical coupler 106, generate the level control output, and control the optical signal level, may be matched with the time taken for the optical signal flowing through the input-side transfer path 100 to reach the optical level control device 104 from the input-side optical coupler 106.

As for the signal delay by the delay clock Z 204, a delay in clock units that is generated by the digital control circuit 202 performing computing processing is used. Therefore, the delay clock Z 204 may set the delay amount in clock units of the computing processing, and the delay amount may be set with an amount that is one clock, or a multiple of an integer of one clock. The delay amount may be controlled by changing the setting of the delay amount of the delay clock Z 204.

Adjustment to the delay amount may be performed by repeating the driving and stopping of the optical level control device 104 while changing the delay amount, and by confirming the output waveforms from the optical level control device 104, and is performed until the output waveforms stabilize. Variations to the delay amounts that occur from variations to temperature or the like are small, and shifts of the timing of the optical signal and electrical signal are small. Accordingly, the adjustment to the delay amount may be performed with one adjustment.

The control error/new target value computing unit 208 is an example of a computing unit that computes the difference between the input value and output target level. The control error/new target value computing unit 208 has a control error computing function and a new target value computing function. The control error/new target value computing unit 208 is made up of a computing processing function of the digital control circuit 202.

The control error/new target value computing unit 208 computes the control error between the output-side PD value and output target level, as a control error computation. The level of the signal flowing through the output-side transfer path 101 may be obtained from the output-side PD value. Thus, the difference from the target level set beforehand is computed to obtain the control error. For example, in the case that the output-side signal level (output-side PD value) is +0.2 dBm whereas the output target level is +0 dBm, the control error of 0.2 dBm is computed, and determination is made for the necessity to lower the output-side signal level.

The control error/new target value computing unit 208 computes an output target level for updating the LUT as a new target value computation. The output target level is computed based on the control error and the output level of the data stored in the LUT. Note that the output level is set as to the driving control amount, and depicts an output level that is output by the optical level control device 104. For example, even if the driving control amount corresponds to the same signal level, when a driving control amount having a low output level and a driving control amount having a high output level are compared, the driving control amount having a high output level has a greater value as the difference of the output level increases.

In the case that the output level of the driving control amount stored in the LUT is +0 dBm and the signal level is lowered by the control error of 0.2 dBm, the control error/new target value computing unit 208 subtracts 0.2 dBm from the output level +0 dBm, and computes −0.2 dBm. By updating the driving control amount of the output level +0 dBm set in the LUT to be the driving control amount of the output level −0.2 dBm, the output-side signal level may be corrected to the target level.

The updating information storage unit 220 is an example of means to store information. The updating information storage unit 220 stores the updated information to write in the data to the LUT_A 212 and LUT_B 214. The updating information storage unit 220 is made up of, for example, a ROM, magnetic medium, magneto-optical medium, or the like. The ROM may be an EEPROM (Electrically Erasable Programmable ROM), flash memory, or the like. When EEPROM is used, address-unit data may be written in.

The updating information storage unit 220 stores the original LUT data, and supplies the data as to the LUT-A 212 and LUT_B 214 of the storage unit 206. The original LUT data includes the input PD values 0 through 4095 and the driving control amounts corresponding thereto, as depicted in FIG.

16. An output level is set for the driving control amount. Thus, the driving control amount is stored in the updating information storage unit 220 as to the matrix of input PD values and output levels. For example, the updated information storage unit 220 stores the driving control amount corresponding to each input PD value for every 0.2 dBm, in the range of −10.0 dBm to 10.0 dBm. Note that the original data is an example of the updated information and updated control information.

In the case that the input PD value has 12-bit resolution, and the driving control amount has 14-bit resolution, the input PD value becomes a 12-bit value of 0 through 4,095, and a 14-bit value of driving control amount from 0 through 16,383 is stored as to each of those values. In this case, memory of 14-bits×4,096=57,344 bits of memory is needed. Also, in the case that the input PD value has 12-bit resolution, and the driving control amount has 16-bit resolution, the input PD value becomes a 12-bit value of 0 through 4,095, and a 16-bit value of driving control amount from 0 through 65,535 is stored as to each of those values. In this case, memory of 16-bits×4,096=65,536 bits of memory is needed. This memory amount is LUT memory as to one output level, and when the data of multiple output levels is maintained, memory of several times this is needed.

For example, in the case that 100 output levels are maintained in the range of −10 dBm to +10 dBm in the 0.2 dB step, in the case that the driving control amount is a 14-bit resolution, memory of 57,344×100=5,734,400 bits, i.e. 716.8 kilobytes (Kbyte) worth of memory is needed. Also, in the case that the driving control amount is a 16-bit resolution, memory of 65,536×100=6,553,600 bits, i.e. 819.2 kilobytes (Kbyte) worth of memory is needed. Thus, all of the data is saved in the updated information storage unit 220 which is connected to the digital control circuit 202, and in the event of rewriting the LUT_A 212 or LUT_B 214, the data is expanded to the storage unit 206 within the digital control circuit. Thus, for example the LUT_A 212 or LUT_B 214 need storage capacity of 57,344 bits or 65,536 bits, respectively, and hardware may be efficiently realized.

The write-in updating unit 210 is an example of the information updating unit 6 that performs data write-in and updating. The write-in updating unit 210 is set between the updated information storage unit 220 and storage unit 206, receives data from the updated information storage unit 220, and writes the data into the LUT_A 212 and LUT_B 214 of the storage unit 206, while notifying the LUT switchover. Thus, the LUT to be used in FF control is updated.

Adjustment of Delay Time

Next, FIG. 12 will be referenced regarding adjustments of delay time X and control delay time Y.

In a state wherein delay is not performed by the delay clock Z 204, a sufficiently long delay line 122 is inserted between the input-side optical coupler 106 and optical level control device 104, whereby the delay time X (FIG. 11) becomes longer than the control delay time Y (FIG. 11) (delay time X>control delay time Y). The delay time Z due to the delay clock Z 204 is then adjusted to the difference between the delay time X and control delay time Y (delay time X−control delay time Y). By setting the delay time Z with the delay clock Z 204, the time taken from branching the input-side light to driving the optical level control device 104 is adjusted to the time wherein the delay time Z is added to the control delay time Y, which may be made the same as the delay time X. Thus the error between the delay time of the delay line 122 and the actual control delay time is supplemented by the delay function that is provided in the control circuit.

Figure 13:
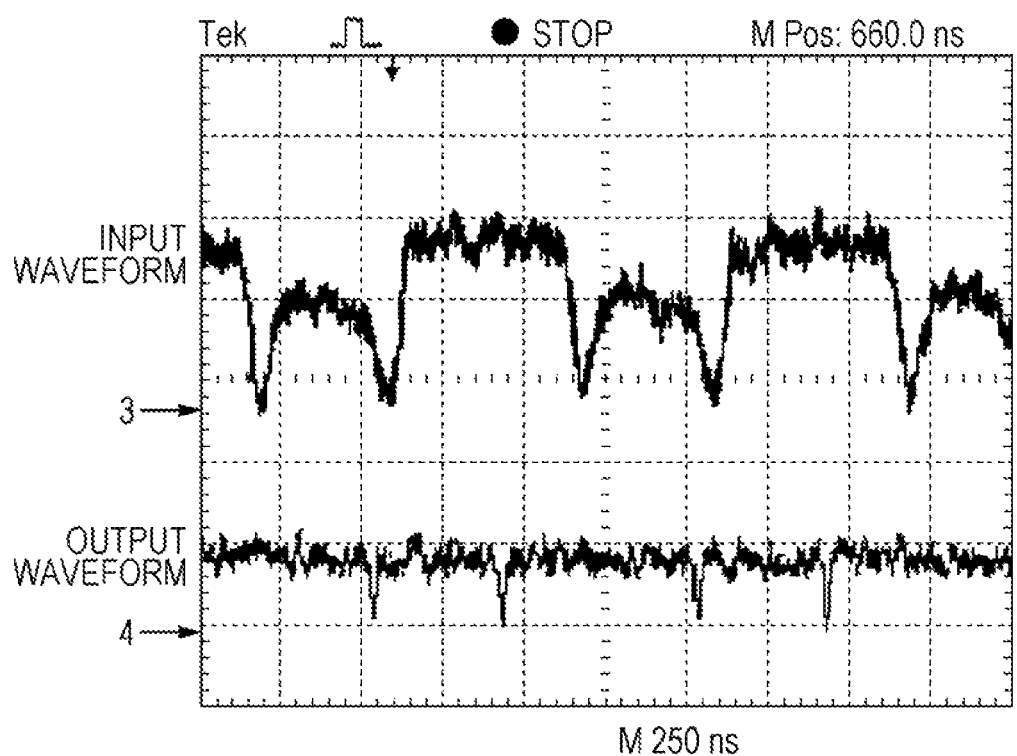
FIG. 13 is a diagram illustrating an example of an output waveform in the event that a time adjustment is suitable.
Figure 14:
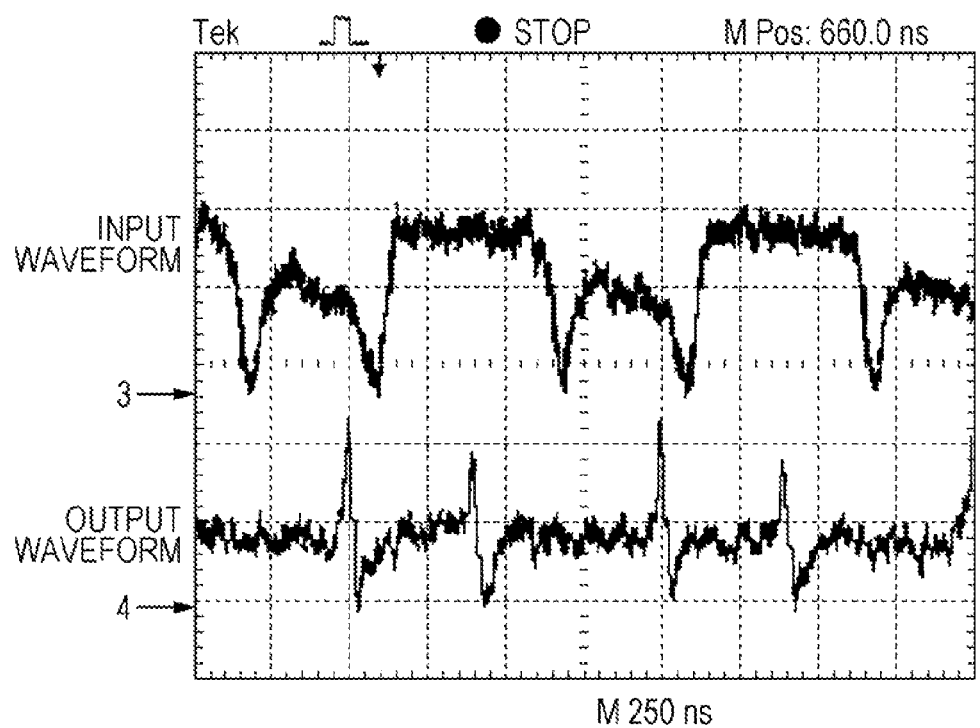
FIG. 14 is a diagram illustrating an example of an output waveform relation in the event that a time adjustment is not suitable.
Figure 15:
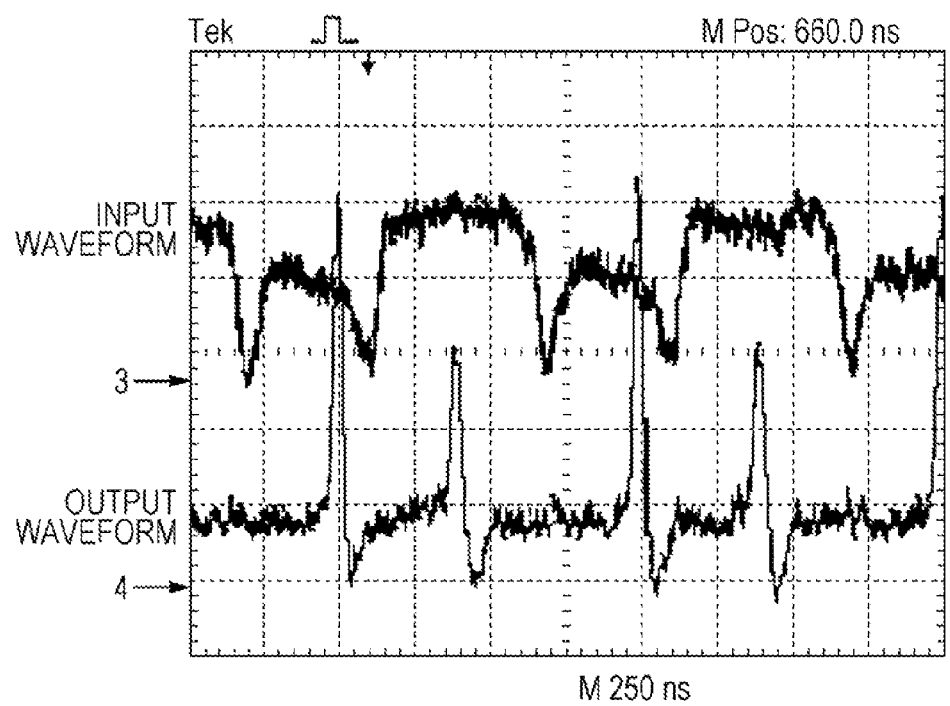
FIG. 15 is a diagram illustrating an example of an output waveform relation in the event that a time adjustment is not suitable.

Next, FIGS. 13, 14, and 15 will be referenced to describe the adjustment of difference between the delay time X and control delay time Y which use the delay clock Z 204. FIG. 13 is a diagram depicting an example of an output waveform in the event that the time adjustment is suitable, FIG. 14 is a diagram depicting an example of the relation of the output waveforms in the event that the time adjustment is not suitable, and FIG. 15 is a diagram depicting an example of the relation of the output waveforms in the event that the time adjustment is not suitable. Note that the arrangements depicted in FIGS. 13, 14, and 15 are examples, and the present invention is not limited by these arrangements.

In the examples depicted in FIGS. 13, 14, and 15, a signal that changes every 500 nanoseconds is input. Also, one clock of the digital control circuit 202 is approximately 7.5 nanoseconds, and when the clock count at the delay clock Z 204 is adjusted by one clock, a transmittance time of a 7.5 nanosecond signal is adjusted.

In the case that the delay time Z is adjusted, and the time resulting from adding the delay time Z to the control delay time Y is optimal as to the delay time X, the variation of the output waveform is suppressed and a stabilized output waveform is obtained, as depicted in FIG. 13. That is to say, the timing for changing the driving current of the optical level control device 104 and the timing for the input signal to pass through the delay device and reach the optical level control device 104 match one another, whereby the input variations are suppressed.

If the delay clock within the digital control circuit 202 is reduced by 2 clocks from the optimal case depicted in FIG. 13, the control delay time Y becomes approximately 15 nanoseconds shorter as compared to the delay time X. In this case, as depicted in FIG. 14, the variations of the output waveform becomes greater as compared to the optimal case. Also, if reduced by 5 clocks from the optimal case depicted in FIG. 13, the control delay time Y becomes approximately 37.5 nanoseconds shorter as compared to the delay time X. In this case, as depicted in FIG. 15, the variations of the output waveform become even greater.

This indicates that, if the delay clock within the digital control circuit 202 shifts from the optimal value, the timing for the input signal to arrive and the timing to change the driving current of the optical level control device 104 shift from one another, whereby the distortion of the output waveform increases as the shift from the optimal delay clock value increases. Accordingly, in the case that variations of the input signal are fast, the shift between the driving voltage application timing of the optical level control device 104 and the delay time of the optical delay device may be decreased by using the delay line 122 and delay clock Z 204, whereby the light level may be controlled.

Figure 17:
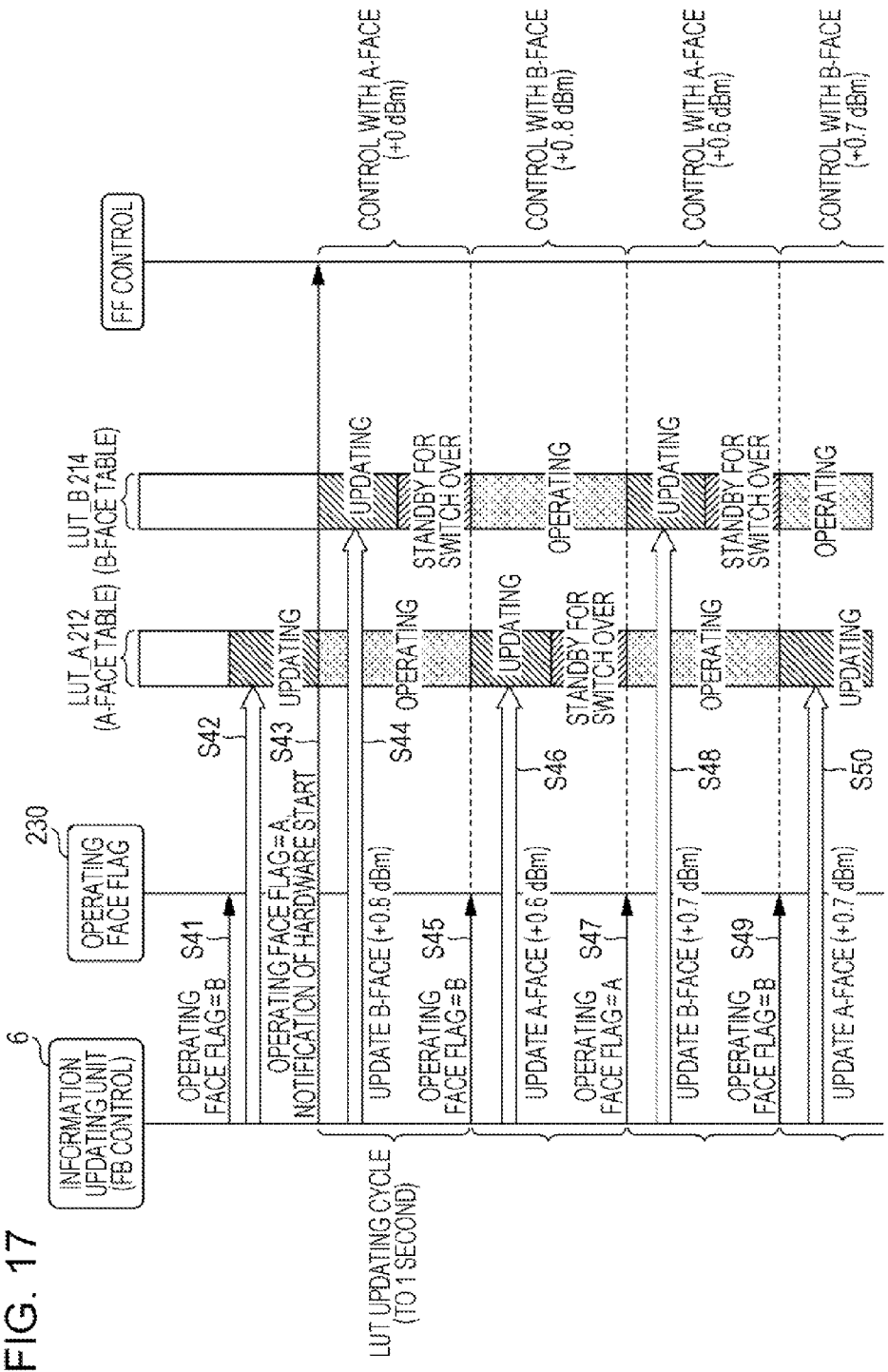
FIG. 17 is a sequence diagram illustrating an example of an LUT updating processing.
Figure 18:
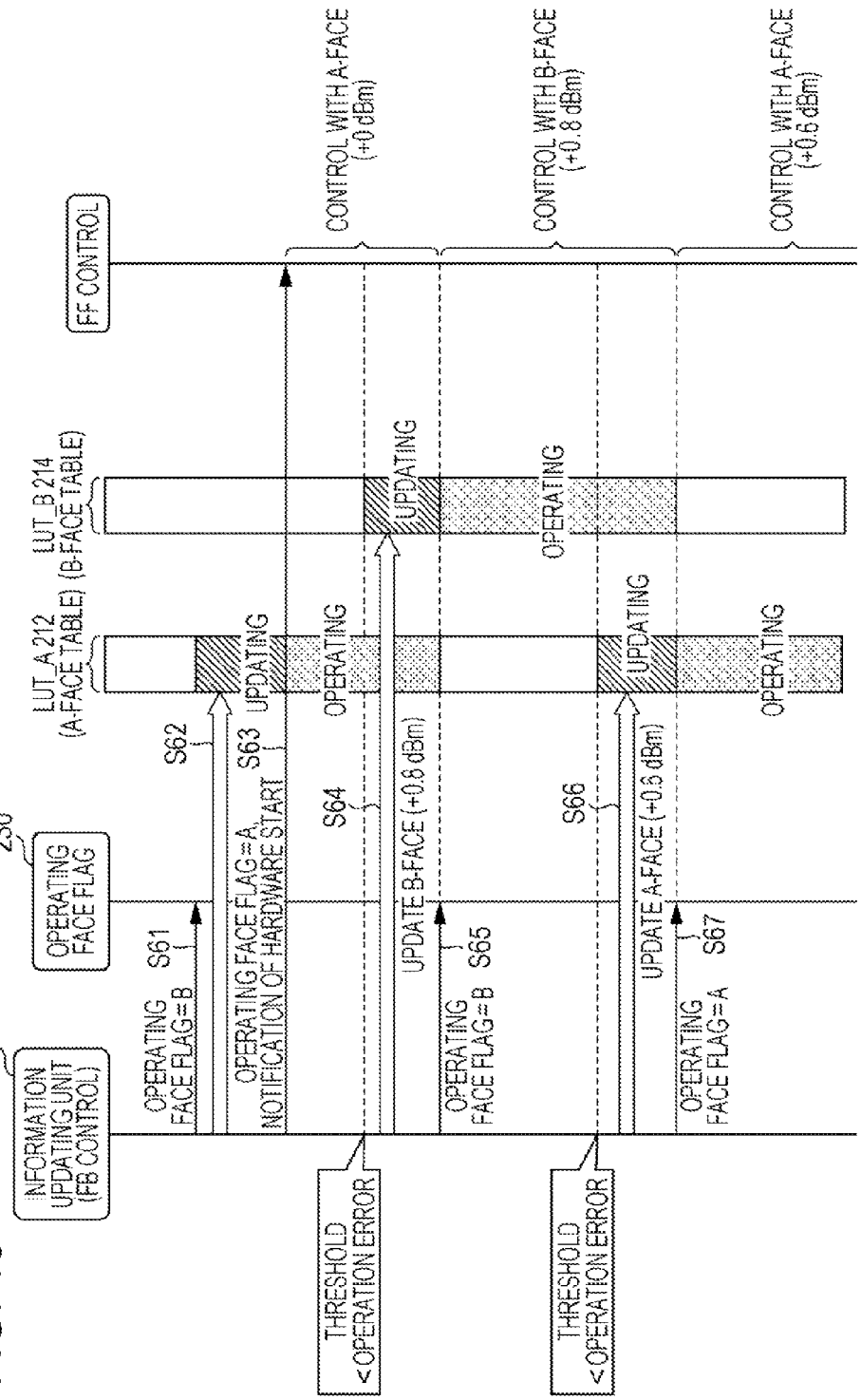
FIG. 18 is a sequence diagram illustrating an example of the LUT updating processing.

Next, FIGS. 17 and 18 will be referenced regarding the LUT switchover. FIG. 17 is a sequence diagram depicting an example of the LUT updating processing, and FIG. 18 is a sequence diagram depicting an example of LUT updating processing. Note that the arrangement depicted in FIGS. 17 and 18 is an example, and the present invention is not limited by this arrangement.

An operating face flag 230, for example, is used for LUT switching. The operating face flag 230 is an example of means to identify the LUT, and for example is set in the storage unit 206. The operating face flag 230 is used to determine which LUT to use in the event of referencing an LUT. Upon the operating face flag 230 having been set as to the LUT_A 212 (A-face table) or LUT_B 214 (B-face table), the set LUT is determined to be the LUT in operational state, and is referenced in the event of converting input-side PD values. A LUT regarding which the operating face flag 230 is not set is determined to be a LUT in standby state. Thus, the operating state is identified by the setting of the operating face flag 230, whereby the LUT state may be switched easily by modifying the operating face flag 230.

Switching between the operating state and standby state of the LUT may be a cycle executing model wherein the LUT updating cycle is set and the LUT is updated at each set cycle, or may be a conditional trigger model wherein the LUT is updated in the case that the difference between the output-side signal level and output target level exceed a preset threshold. If using the conditional trigger model, the LUT is updated only when the control error becomes greater, whereby the frequency of updating the LUT is less, and the rewriting life of the media such as a register or memory that accumulates the LUT data is extended, thereby decreasing the failure rate of the control circuit.

As depicted in FIG. 17, the switching of the cycle executing model LUT uses the two tables LUT_A 212 and LUT_B 214, and switches between the operating state and the updating or standby state.

As processing before starting the operation, the operating face flag is notified to the operating face flag 230 by the FB control. For example, as depicted in FIG. 17, operating face flag "B" is notified to the operating face flag 230 (step S41). After notification, the data is expanded to the LUT_A 212 and updated by the FB control (step S42). Updating of the table is performed as to a table wherein the operating face flag 230 has not been notified. In this case, notification is made to the LUT_B 214 which is the operating face flag "B", whereby updating of the LUT_A 212 is performed. Note that in the initial stage, the output-side signal level is not obtained, whereby for example an output level of +0 dBm is set in the table.

Upon the table updating having been completed, notification of the modification to the operating face flag 230 is performed, and notification of hardware start is made to the FF control side (step S43). With the notification of the operating face flag "A", the LUT_A 212 is switched to the operational state, and the FF control referencing the LUT_A 212 of the output level +0 dBm is started.

With the LUT_B 214 that has been switched to standby state by modification of the operating face flag, table updating is performed by the FB control (step S44). At this time, the output-side PD value is obtained by the start of the level control, the output target level is computed, and the table updating is performed. In the case that there is error between the value obtained by the monitor of the output-side PD 112 and the output target level, the output target level is decided at the FB control side in the direction of reducing the error thereof. For example, let us say that determination is made as +8 dBm, +0.6 dBm, +0.7 dBm, and so forth. The table wherein the relation of the input-side PD value and driving control amount of the determined output target level is recorded is expanded in the standby state table. The LUT_B 214 in a standby state is updated with the output level data of +0.8 dBm. Upon the updating ending, the table goes to a switch-standby state.

Upon the table expanding processing as to the LUT_B 214 ending and a fixed amount of time having passed from the start of operation with the LUT_A 212, notification of modification of the operating face flag is performed with the FB control (step S45). The operating state and standby state are switched by modification of the operating face flag. The operating face flag "B" is notified as to the operating face flag 230, and notification to the effect that the table may be switched is performed. Thus, the table for the FF control to reference is switched from LUT_A 212 to LUT_B 214, the LUT_A 212 is modified to be in the standby state, and LUT_B 214 is modified to be in the operating state. The FF control monitors the input-side PD value, and referencing the +0.8 dBm table of LUT_B 214, repeats the setting operation to the DAC 118 cyclically at a high speed.

Such table updating and switching is performed cyclically, once every second, for example. Table updating is performed with the +0.6 dBm output level data (step S46). Upon notification of the operating face flag "A" having been performed (step S47), the output level is switched from +0.8 dBm to +0.6 dBm, updating of LUT_B 214 is performed with the +0.7 dBm output level data (step S48), and upon notification of the operating face flag "B" having been performed (step S49), the output level is switched to +0.7 dBm, and the updating of LUT_A 212 is performed (step S50). Accuracy of the light level is maintained by table updating being performed cyclically based on the output-side PD values monitored by the FB control. Note that the processing performed cyclically is similar to the first embodiment, so the description thereof will be omitted.

Next, FIG. 18 will be referenced regarding a conditional trigger model of LUT switchover.

As depicted in FIG. 18, the two tables LUT_A 212 and LUT_B 214 are used, and switch between an operating state and an updating or standby state.

The processing until the FF control starts (step S61 through step S63) is similar to the already-described processing (step S41 through step S43), so the description thereof will be omitted.

Upon the FF control having started, FF control by the LUT_A 212 is performed, while the output-side PD value is monitored with the FB control and determined is made as to whether or not the control error has exceeded a preset threshold. In the case that the threshold is exceeded, updating of the table in the standby state is started by the FB control, i.e. the LUT_B 214 (step S64), and upon the updating ending, notification of the operating face flag modification is performed (step S65). By notifying the modification of the operating face flag, the operating state and standby state are switched. As described above, updating is performed with the +0.8 dBm output level data, for example, as to the LUT_B 214 in the standby state, and upon the updates ending, notification of the operating face flag "B" is performed. The LUT_A 212 is modified to the standby state, and the LUT_B 214 is switched to the operating state. The FF control performs control referencing the +0.8 dBm table of the LUT_B 214.

With a condition trigger model of LUT switchover, switching the table is performed in the case that the difference between the output side PD value and output target level have exceeded a preset threshold. Upon the control error exceeding the threshold, updating of the table, i.e. LUT_A 212, is performed with +0.6 dBm output level data (step S66). Upon performing notification to modify the operating face flag (step S67), the output level is switched from +0.8 dBm to +0.6 dBm. Accuracy of the light level is maintained by the updating of the table when the control error exceeds the threshold.

Features, advantages, modifications or the like will be exemplified with reference to the above-described third embodiment.

(1) Light level may be controlled by disposing a PD, ADC, and DAC in the pathway between the input-side optical coupler 106 and digital control circuit 202.

(2) With the FF control, the monitor value of the input-side PD is obtained, the LUT in operating state is referenced, and the driving control amount is set in the DAC 118. At this time, the setting is made in the DAC 118 after awaiting an amount equivalent to the delay clock Z. The driving control amount is supplied to the driving circuit via the DAC 118, and appropriate current or voltage is output to the optical level control device from the driving circuit in accordance with the driving control amount.

Signal variations monitored with the monitor values of the input-side PD occur at the timing that the optical level control device 104 amplifies the signal, whereby signal amplification is performed by the optical level control device 104. Consequently, the output from the optical level control device 104 does not change and is stabilized. Thus, FF control monitors the input-side PD, references the LUT, and cyclically repeats the operations to perform settings in the DAC 118 at a high speed.

(3) By the FF control updating the LUT in standby state and switching to the LUT in operating state every fixed time period or in the case that the control error exceeds a predetermined range, control may be made that is constantly in the newest state. Accordingly, even in the case that loss changes due to changes from the passing of time, or in the case that the relation of applied voltage to output power of the optical level control device 104 changes, optimal voltage may continually be applied. Consequently, the property thereof may continue to be maintained over a long period of time while responding to high speed level variations.

(4) By having a delay clock Z 204 within the digital control circuit 202, the control delay time Y may be adjusted, and the difference from the delay time X due to the delay line 122 may be supplemented by the delay function of the delay clock Z 204. By having the delay line 122 and delay clock Z 204, freedom of the time adjustment is increased, and labor and time for adjustment is reduced.

(5) The delay clock Z 204 may also delay the signal prior to inputting into the storage unit 206. In this case, the delay clock Z is disposed between the input-side ADC 114 and storage unit 206.

(6) The delay time X of the delay line 122 is set so as to be greater than the control delay time Y which is not using the delay clock function, and the digital control circuit 202 delays the control delay time Y with the delay clock Z 204 in clock increments, thereby adjusting the difference with the delay time X. Accordingly, time adjustment may be performed by adjusting the delayed clock count of the delay clock Z 204, whereby corrections in the case that the adjustment fails may be readily and easily performed as compared to making adjustments to the length of the delay line 122.

(7) in the case of controlling the optical level variations of a micro-second or less (1 MHz or greater), the control cycle of the FF control continues to access the register in a cycle of several tens of nanoseconds (20 MHz), and the driving voltage continues to be updated. On the other hand, the FB control focuses on accuracy, whereby control is performed with a cycles that is slower than the FF control by a thousand times. That is to say, in the case of updating the register that continues to be accessed at a high speed or the LUT in the memory with the FB control, if the FF control side address reference processing and the FB control write-in processing occur at the same time, there is the possibility that the FF-side address reference is not performed correctly. There is the possibility that an abnormal control voltage is output from the DAC 118, which becomes erroneous output power, whereby control error that is erroneous is recognized at the FB side.

Thus, an LUT with two or more faces is provided, which is an operating state LUT or a standby state LUT, table expanding processing is performed as to the standby state LUT, and upon expansion ending the operating state and standby state of the LUT are switched. The LUT switchover processing is performed in a short time, so whereby table updating processing of the LUT in the standby state may be performed while the FFP control is performed using an operating state LUT, and corrections of the LUT control error may also be performed by the FB control while maintaining value changes to the LUT at a high speed by the FF control, whereby level accuracy may also be secured. Securing level accuracy by the FB control and high speed by the FF control may both be achieved.

(8) All of the LUT data is stored in the updated information storage unit 220, and requested items are expanded in the LUT_A 212 or LUT_B 214 of the storage unit 206 in accordance with the computation results of the control error/new target computing unit 208, whereby the storage capacity of the storage unit 206 may be smaller.

(9) In the event of storing all the LUT data in the updated information storage unit 220, a threshold is set in the input PD values of the original data table, as depicted in FIG. 19, and for input PD values below the threshold, for example the driving current may be set as 0 or a fixed amount. The threshold is set, for example, to the detection level of the leading edge or trailing edge of the input-side PD 110. By setting in this manner, when in the state that the signal is less than the detection level, the driving current is set to 0 and power saving is performed, or for example the signal may be set to a pre-heating level, and driving in the case of an input PD value becoming greater than the threshold value again may be stabilized. Note that the driving current is an example of the driving control amount.

(10) With the present embodiment, the two LUTs of LUT_A 212 and LUT_B 214 are provided, but two or more LUTs may be provided and switched. By having multiple LUTs in standby state as to one LUT in operating state, updating may be performed with higher precision. Also, by providing two or more LUTs, the LUTs may be referenced as to two or more signals simultaneously.

Fourth Embodiment

Figure 20:
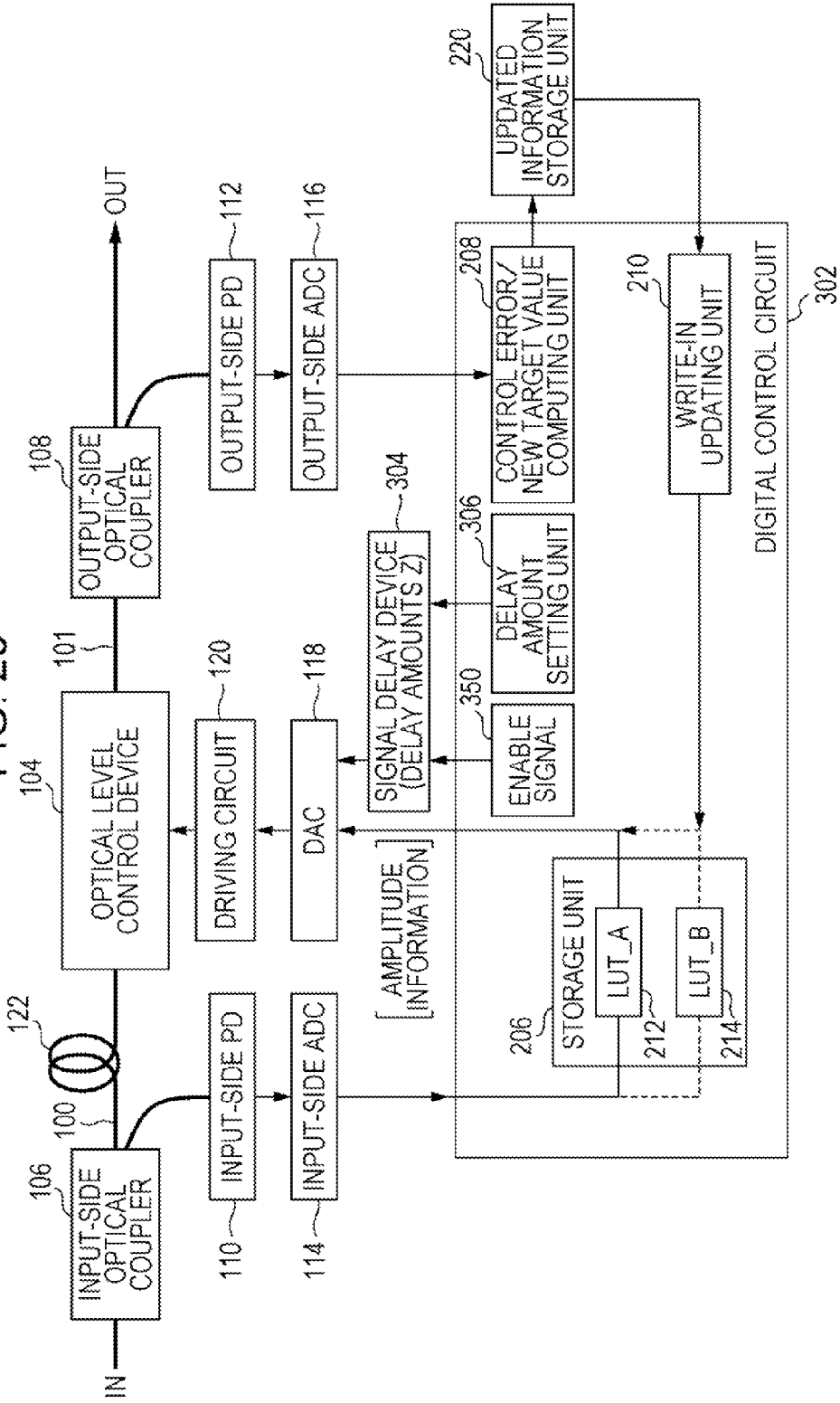
FIG. 20 is a diagram illustrating an example of a level control system relating to a fourth embodiment.
Figure 21:
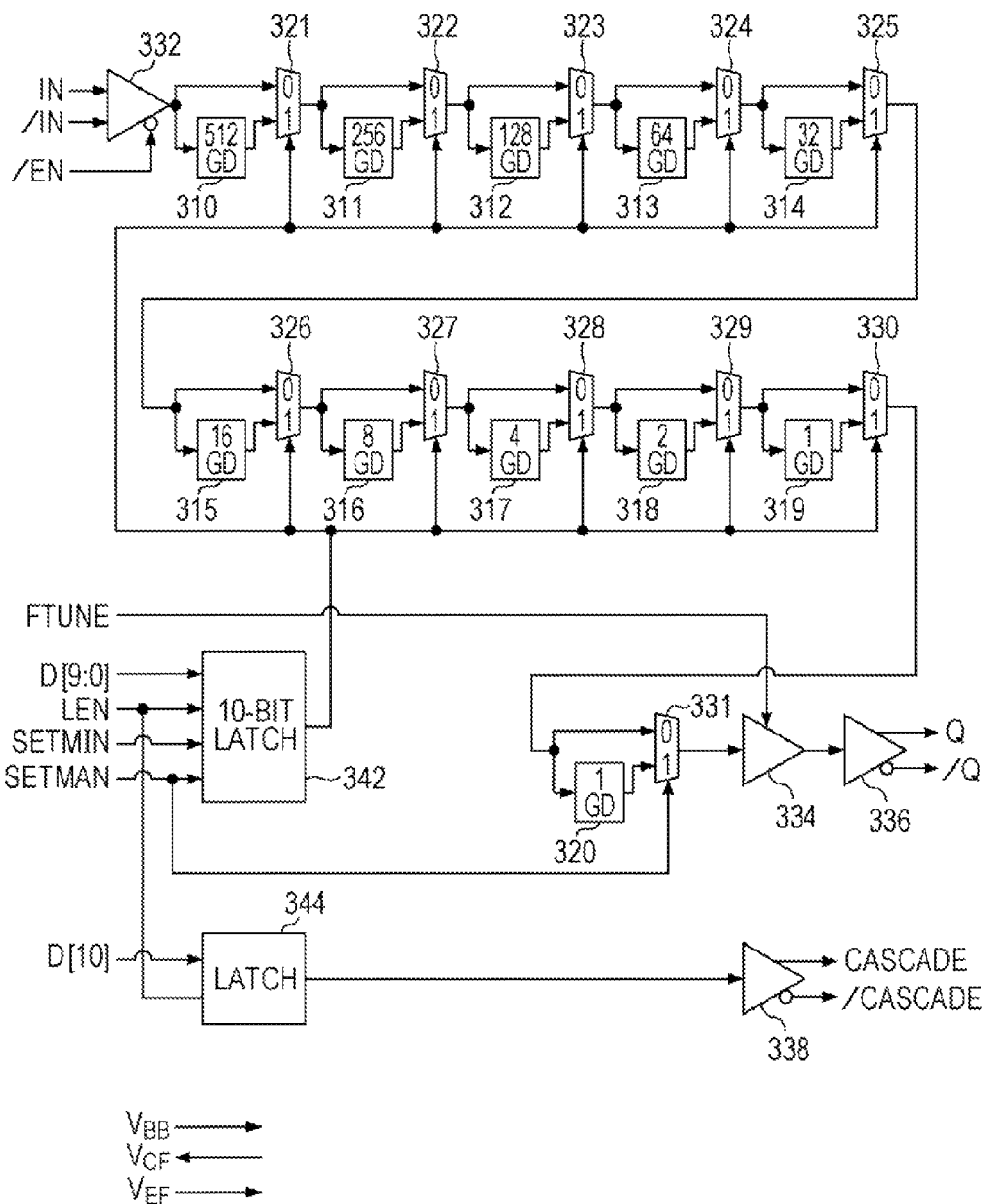
FIG. 21 is a diagram illustrating an example of a signal delay device.
Figure 22:
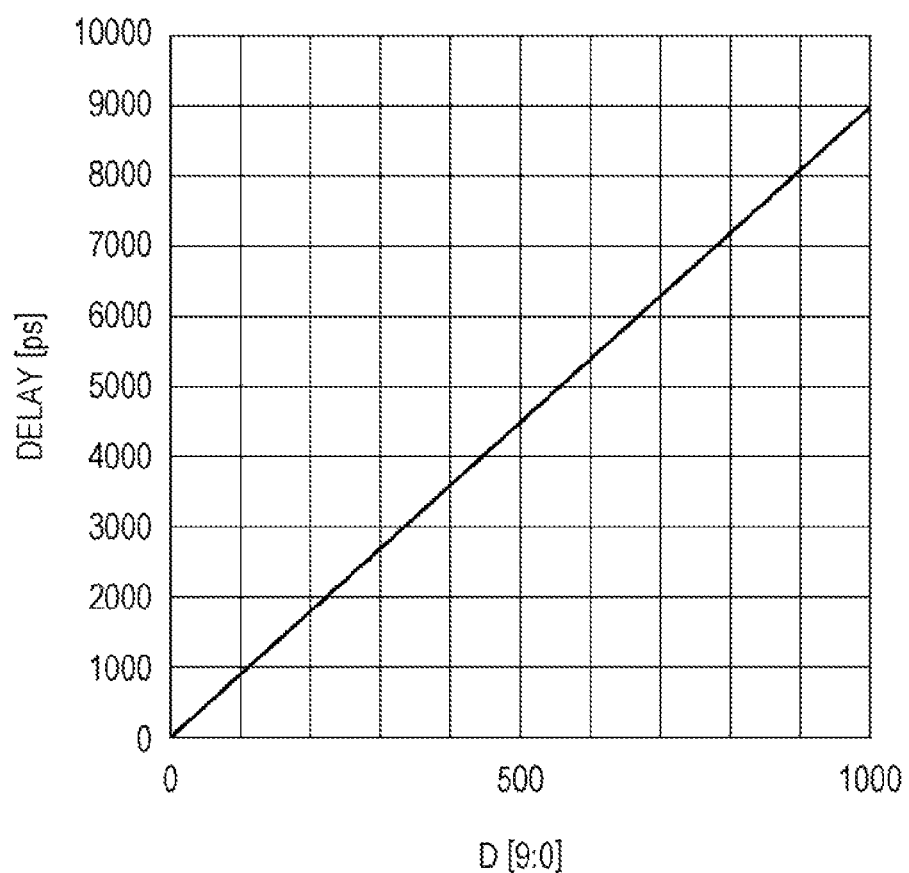
FIG. 22 is a diagram illustrating an example of the delay amount property of the signal delay device.

FIGS. 20, 21, and 22 will be referenced to describe a fourth embodiment. FIG. 20 is a diagram illustrating an example of a level control system relating to the fourth embodiment, FIG. 21 is the diagram illustrating an example of the signal delay device, and FIG. 22 is a diagram illustrating an example of the delay amount property of the signal delay device. Note that the arrangement depicted in FIGS. 20, 21, and 22 is an example, and the present invention is not limited by such an arrangement. In FIG. 20, the portions that are similar to FIGS. 5, 11, and 12 are denoted with the same reference numerals.

The fourth embodiment has a signal delay device 304 serving as time adjusting means.

The signal delay device 304 is an example of time adjusting means to adjust the transmittance time of the signal, and makes up the output time adjusting unit. For example, as depicted in FIG. 21, the signal delay device 304 has multiple flip-flops 310 through 320. Also, the signal delay device 304 has selectors 321 through 331. Also, the signal delay device 304 has, for example, inverters 332, 334, 336, and 338, and latches 342 and 344. Each of the flip-flops 310 through 320 have a different delay amount set therein, and the flip-flops are tandem-connected via selectors. Delay amounts are adjusted by adjusting on/off of the flip-flops with the latch 342 and selectors 321 through 331. That is to say, the delay amount is adjusted at the number of stages of the flip-flop to be selected, and the signal input to the inverter 332 is delayed and output from the inverter 336. Consequently, the delay amounts Z between the digital input electronic signal and output electronic signal may be adjusted, and the time taken to control the optical signal level may be matched to the time taken for the optical signal flowing through the input-side transfer path 100 to reach the optical level control device 104 from the input-side optical coupler 106. Compared to adjusting the length of the delay line 122, corrections may readily be made in the case of adjustment failure.

Adjustments to the delay amount by the signal delay device 304 may be made in the range of 3.2 nanoseconds to 14.8 nanoseconds. Also, as depicted in FIG. 21, the signal delay device 304 has an inverter 338 and latch 344, and the delay amount may be increased by collaborative operations of the multiple signal delay devices 304. Also, as depicted in FIG. 22, the delay has a property to linearly increase as to increase of D[9:0] (CMOS, ECL, or TTL Control Bits). Accordingly, further details delay amount settings may be made as compared to adjustments by the delay clock Z 204 that delays in operational clock units of the control circuit. Note that the delay amount is set by a delay amount setting unit 306, with the delay amount setting unit 306 (FIG. 20) disposed in the digital control circuit 302, for example.

The signal delay device 304 is disposed between the digital control circuit 302 and DAC 118 in order to delay the transmittance of the digital signal. For example the signal delay device 304 is disposed on the signal line of an enable signal 350 (enable bit) transmitted from the digital control circuit 302 to the DAC 118 (FIG. 20), and delays the transmittance of the enable signal 350. The transmittance of the enable signal 350 is delayed with the signal delay device 304, whereby the output timing of the DAC 118 may be delayed. In this case, the amplification setting information of the optical level control device 104 that the DAC 118 outputs does not have to be delayed, and the timing of the DAC 118 output may be delayed by delaying the enable signal 350 effective for the amplification setting information thereof.

Other configurations are similar to those in the third embodiment, so the descriptions thereof will be omitted.

Fifth Embodiment

Figure 23:
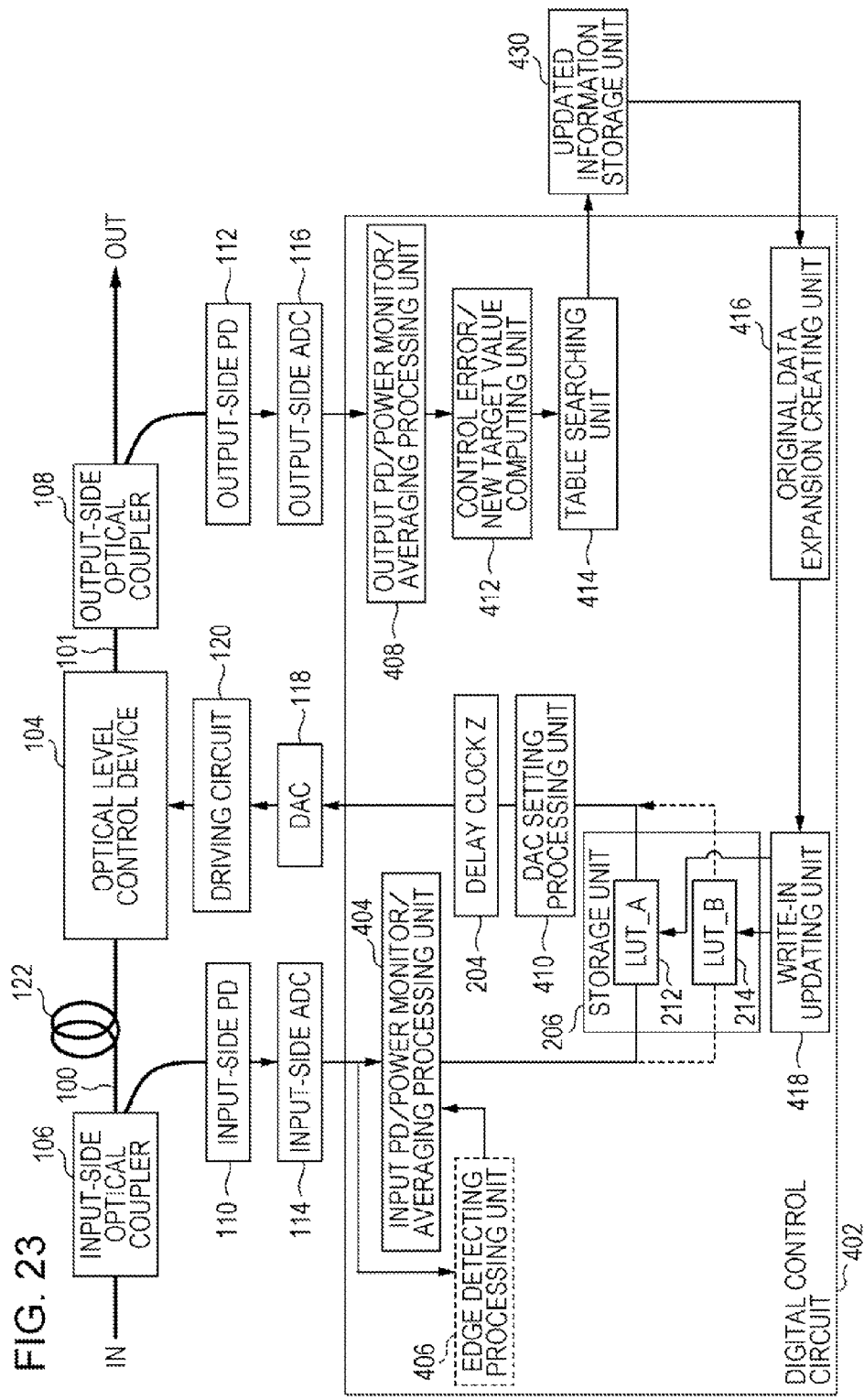
FIG. 23 is a diagram illustrating an example of a level control system relating to a fifth embodiment.

FIGS. 23, 24, and 25 will be referenced to describe a fifth embodiment. FIG. 23 is a diagram depicting an example of a level control system relating to the fifth embodiment, FIG. 24 is a diagram depicting an example of an intermittent signal, and FIG. 25 is a diagram depicting an example of a continuous signal. Note that the arrangement depicted in FIGS. 23, 24, and 25 is an example, and the present invention is not limited by this arrangement. In FIG. 23, the portions similar to FIGS. 5, 11, 12, and 20 are denoted with the same reference numerals.

According to the present embodiment, averaging processing of the values detected by the PDs, limiting processing of the driving control amount, and data expansion creating processing are performed. Relating to the averaging processing of the values detected by the PDs, the digital control circuit 402 has an input PD/power monitor/averaging processing unit 404, an edge detecting processing unit 406, and an output PD/power monitor/averaging processing unit 408. Relating to the limiting processing of the driving control amount, the digital control circuit 402 has a DAC setting processing unit 410. Also, relating to the data expansion creating processing, the digital control circuit 402 has a control error/new target computing unit 412, table searching unit 414, original data expansion creating unit 416, and write-in updating unit 418. Also, the digital control circuit 402 is connected to the updated information storage unit 430. Other configurations are similar to the third embodiment, so the descriptions thereof will be omitted. Note that the output PD/power monitor/averaging processing unit 408, control error/new target value computing unit 412, table searching unit 414, original data expansion creating unit 416, and write-in updating unit 418 are examples of the information updating unit 6 (FIG. 1).

The input PD/power monitor/averaging processing unit 404 is an example of means to average multiple signal values. The input PD/power monitor/averaging processing unit 404 is installed between the input-side ADC 114 and storage unit 206, and averages the multiple signals monitored from the input-side PD 110.

The edge detecting processing unit 406 is an example of means to detect the signal edges. With the edge detecting processing unit 406, the branched signals of the signals input into the input PD/power monitor/averaging processing unit 404 are monitored and the signal edges are detected. The edge detecting processing unit 406 detects a trailing edge moving from a burst signal region 432 (FIG. 24) of the burst optical signal to the guard time region 434 (FIG. 24), and a leading edge moving from the guard time region 434 to the burst signal region 432. Upon detecting the edge, a trigger signal is output to the input PD/power monitor/averaging processing unit 404.

The output PD/power monitor/averaging processing unit 408 is an example of means to average multiple signal values. The output PD/power monitor/averaging processing unit 408 is installed between the output-side ADC 116 and control error/new target value computing unit 412, and averages the multiple signals monitored by the output-side PD 112 to output to the control error/new target value computing unit 412.

The DAC setting processing unit 410 is an example of means to limit the value ranges. The DAC setting processing unit 410 performs limiting processing to limit the output signal to a threshold range. The DAC setting processing unit 410 is installed between the storage unit 206 and delay clock Z 204. The DAC setting processing unit 410 receives the driving control amount output from the storage unit 206, and in the case that the driving control amount is not within the threshold range, modifies the driving control amount to the threshold, and outputs this to the delay clock Z 204. In the case of setting both lower threshold and upper threshold as to the driving control amount, the DAC setting processing unit 410 modifies the driving control amount that is lower than the lower-limit threshold to be the lower-limit threshold and outputs this, and modifies the driving control amount that is higher than the upper-limit threshold to be the upper-limit threshold and outputs this.

The control error/new target computing unit 412 is an example of means to compute the difference between the input value and target value. The control error/new target computing unit 412 is connected to the output PD/power monitor/average processing unit 408, receives the output PD values or the average value thereof, computes the difference between these and the target output level, and performs a new target output level computation. The control error/new target computing unit 412 outputs the computation results.

The table searching unit 414 is an example of means to search the data. The table searching unit 414 is installed between the control error/new target value computing unit 412 and the updated information storage unit 430, receives computation results of the control error/new target value computing unit 412, searches the updated information storage unit 430, and confirms data of the output level matching the computation results or the data of the two output levels in proximity of the computation results. Note that in the case of confirming the data of the two output levels in proximity of the computation results, one piece of each of the output level data having a value greater than the computation results and output level data having a value smaller than the computation results is confirmed.

The updated information storage unit 430 stores the original LUT data. The updated information storage unit 430 transmits the original data confirmed by the search by the table searching unit 414 to an original data expansion creating unit 416. Note that the original LUT data is an example of updated information.

The original data expansion creating unit 416 is an example of means to expand the received data. The original data expansion creating unit 416 is installed between the updated information storage unit 430 and write-in updating unit 418, and creates data to be expanded to the storage unit 206 from the original LUT data transmitted from the updated information storage unit 430. Note that the data created by the original data expansion creating unit 416 is an example of updated control information.

The write-in updating unit 418 is an example of means to perform write-in and updating of data. The write-in updating unit 418 is installed between the original data expansion creating unit 416 and the storage unit 206, receives creation data from the original data expansion creating unit 416, and writes this into the standby LUT while notifying a switchover of the LUTs. By switching the standby LUT to information write-in operational state, the LUT operated under FF control is updated.

Next, FIGS. 24 and 25 will be referenced to describe the averaging processing for the PD detection values.

The signals flowing through the transfer path are identified as intermittent signals (burst optical signal) and continuous signal (CW light signal: continuous wave light signal).

The intermittent signal is a signal obtained by bursting light, for example, and as depicted in FIG. 24, is a signal alternately repeating a burst signal region 432 having a signal and a guard time region 434 not having a signal. In the case of performing intermittent signal level control, level control is not performed with the guard time region 434, and the level is matched by controlling the signal level of the burst signal region 432. By not performing level control with the guard time region 434, the detections of amplified naturally emitted light (ASE: amplified spontaneous emission) becomes certain, and may prevent system trouble and may further prevent an increase in power consumption.

In the case that the burst length of the burst signal is shorter than a millisecond, variations to the power within the burst signal is small. The difference in levels (ΔL) between the burst signal regions 432 is then controlled. ΔL occurs at a size of several tens of decibels, such as 15 dB for example. Upon the signal edge being detected by the edge detection processing unit 406, the input PD/power monitor/averaging processing unit 404 receives a trigger signal. The signal level at each edge is output to the storage unit 206. With the input PD/power monitor/averaging processing unit 404, control of the signal level wherein the edge portion serves as the control point may be performed by maintaining and outputting the signal level of the control point until the next edge is detected. The signal level of each edge is output, and thereby may be instantly responded and controlled.

In the case that the burst length is in the order of milliseconds or longer, not only is instant response needed, but also continuity within the burst signal is also needed. Thus, level control by the edge signals is performed, and control points within the burst signal are increased, thereby performing control. With this control, irregularity of power within the burst signal may also be controlled.

With a continuous signal, as depicted in FIG. 25, the signal level changes continuously. A signal 436 is an example of a case wherein variations of the level are small. In the case that the level variations are small, the speed of polarization fluctuation becomes approximately 10 microseconds. Signal 438 is an example of a sudden level change. Upon a sudden level change occurring, the level variation becomes approximately 20 dB, and the rise time Tr of the signal and the fall time Tf of the signal become approximately 50 microseconds. Thus, with the input PD/power monitor/averaging processing unit 404, the control point value is output according to the response speed of the input PD monitor circuit or the average value of the multiple control points is output. Unlike an intermittent signal, a continuous signal constantly has a signal, and there is no break in the signal variations. Also, continuity to the signal after control is requested with the continuous signal level control, whereby the control cycle is caused to be shorter, and accuracy after control is requested. However, since the signal power variations are slow as compared to intermittent signals, control is performed with greater focus on precision than on speed. Note that the rise time Tr and fall time Tf depict the amount of time to express the output response corresponding to the input, and the rise time depicts the time at time of rising while the fall time depicts the time at time of falling.

In order to improve measurement accuracy, the input PD/power monitor/averaging processing unit 404 outputs the average value of the control point values. In the case of outputting the average value, the number of times averaging is performed is set as an initial setting. With the input PD/power monitor/averaging processing unit 404, the control point values for the set number of times is averaged, and the average values there is output. The number of times of averaging is determined based on the relation of the time needed for obtaining the values and the speed requested by the control, and for example sets the count as approximately 2 to 16 times.

By performing averaging processing of numerical values, the monitor values change from sudden noise and control becoming unstable due to the influence thereof may be prevented. Also, in the case that the response speed of the PD monitor circuit is a higher speed than the optical signal bit rate, the monitor speed may be caused to be slower than the optical signal bit rate, thereby enabling monitoring of the average levels of signals, and the waveforms wherein the optical levels are changing from the bit 1 or 0 may be prevented from being measured without change.

Figure 26A:
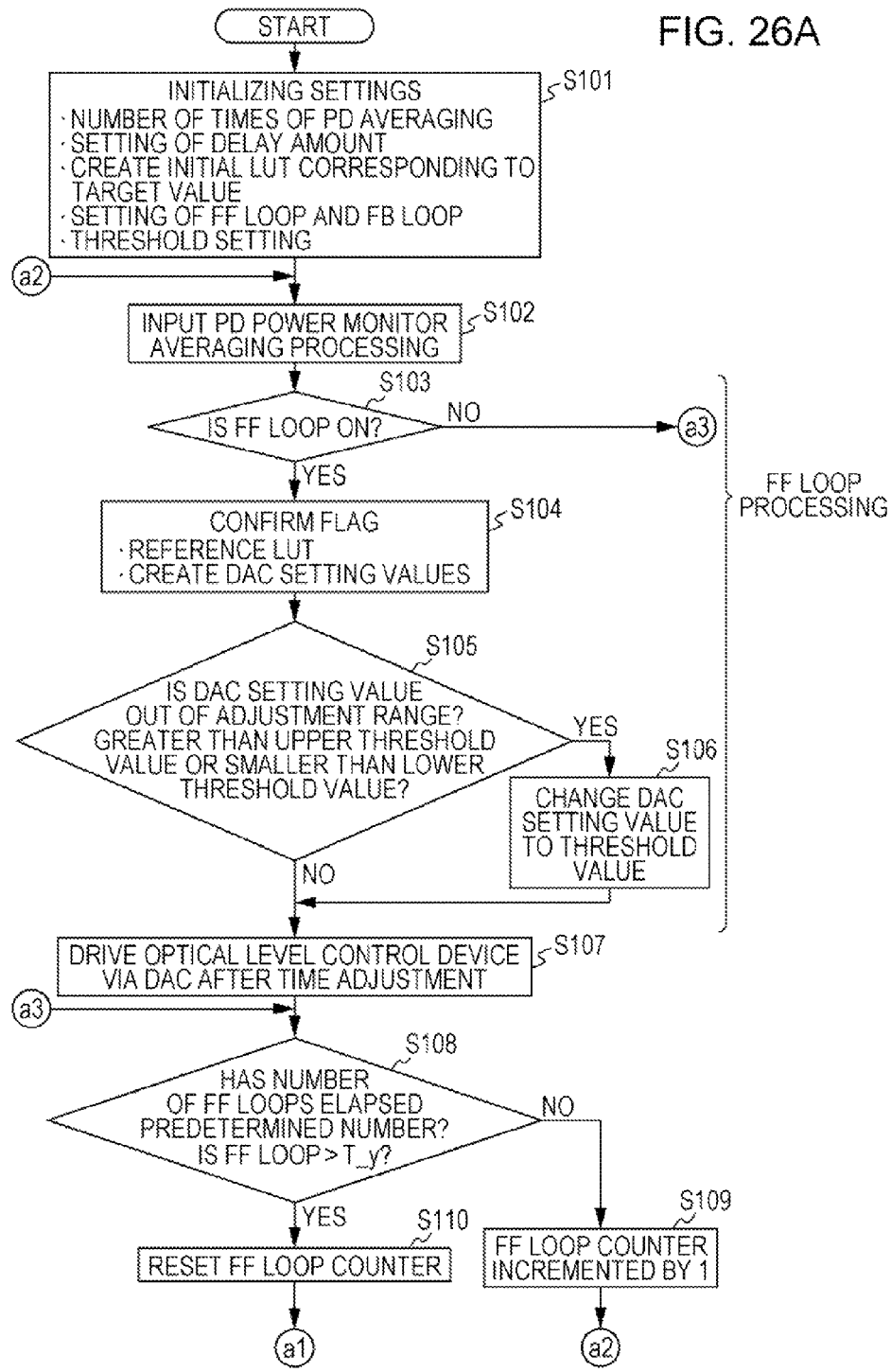
FIGS. 26A, 26B illustrate a flowchart illustrating an example of level control processing relating to the fifth embodiment.
Figure 26B:
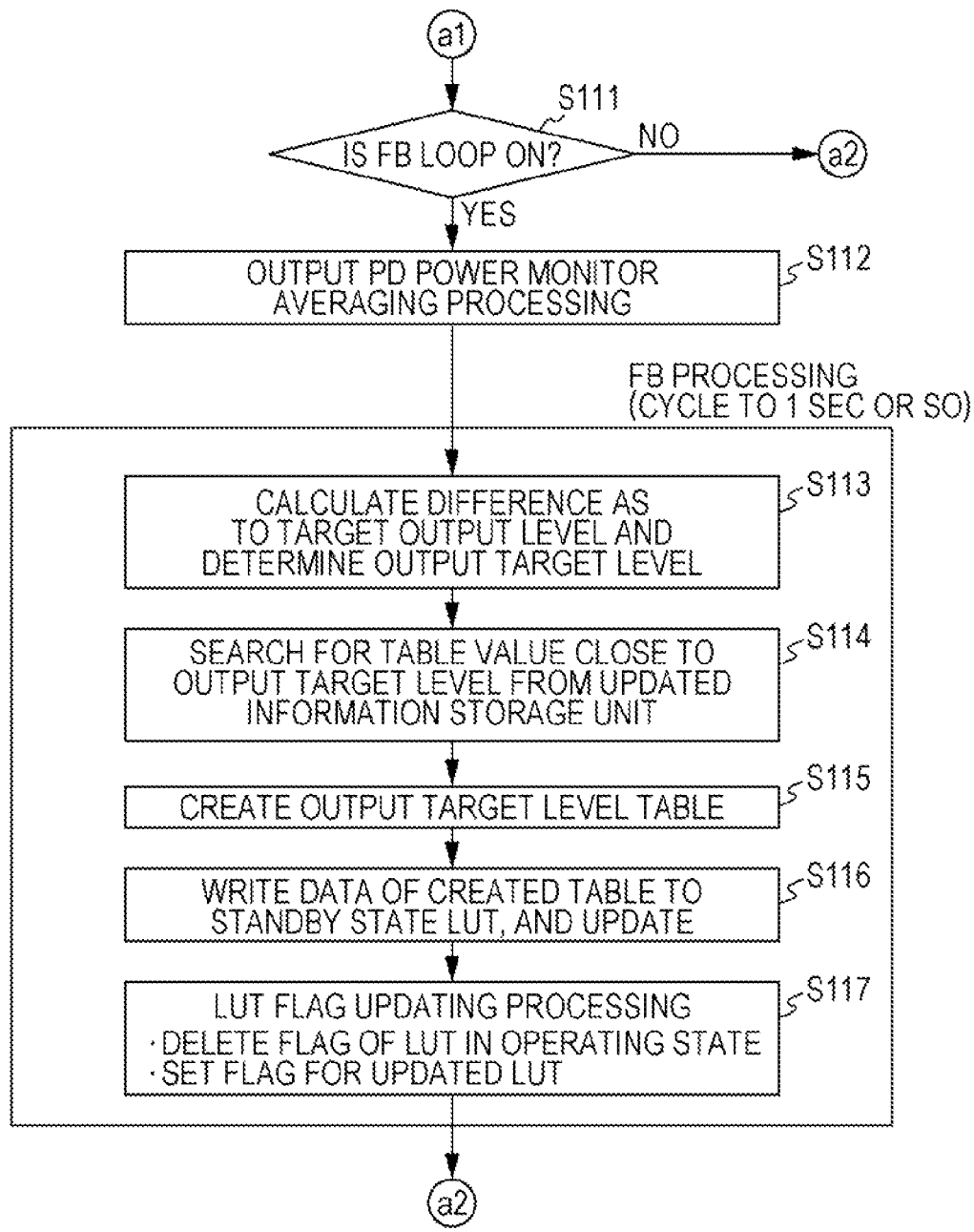

Next, FIGS. 26A, 26B will be referenced to describe the processing of the control circuit according to the fifth embodiment. FIGS. 26A, 26B illustrate a flowchart depicting an example of level control processing relating to the fifth embodiment. Note that the processing depicted in FIGS. 26A, 26B are an example, and the present invention is not limited by this example. In FIGS. 26A, 26B, a1 and a2 depict the connection portions of the flowchart.

The control processing herein is a flowchart in the case of updating the LUT with a fixed cycle. In order to increase control freedom, the processing is enabled so as to optionally select FF control (FF loop processing) and FB control (FB loop processing). That is to say, control operated only with the FF loop processing, control operated only with the FB loop processing, and control operated with both thereof may be modified. To select the FF loop processing and FB loop processing, for example one bit is assigned to the settings of each of the FF loop processing and FB loop processing, and control is performed with the two values of ON and OFF. In the case of performing both the FF loop processing and FB loop processing, each setting is turned ON. This setting is made in the initial settings.

First, initializing settings are performed (step S101). With the initializing settings, the settings from (1) to (5) are performed.

(1) Setting of Number of Times of PD Averaging

With these settings, in the case of controlling with the average level value of multiple times, the number of times thereof is set. Also, in the case of not performing averaging, "1" is set as the number of times of averaging.

(2) Setting of Delay Amount

With this setting, the delay amount is set by the delay clock Z 204.

(3) Initial LUT Settings Corresponding to Target Value

With this setting, the output level of the data written into the LUT is set in the processing before starting the operation.

(4) Setting of Use of FF Loop Processing and FB Loop Processing (5) Threshold Setting The setting herein is a setting for thresholds used by the DAC setting processing unit 410.

Upon ending the initializing settings, the signal level prior to control is received, and averaging processing of the values is performed (step S102). With the averaging processing herein, averaging of the input PD/power monitor is performed. In the case of not performing averaging processing in the initializing settings, the signal level received prior to control is processed without change as the average value. Upon ending the processing, the value is output as the input-side PD value.

Next, determination is made as to whether or not FF loop processing is performed (step S103), and in the case of not performing (NO in step S103), the processing proceeds to a determination of whether or not the number of times of FF loop processing has exceeded a fixed number of times (step S108).

In the case of performing FF loop processing (YES in step S103), conversion to driving control amounts is performed with the input-side PD value. At this time, confirmation of the LUT operating flag is performed, and DAC setting value is created with reference to the LUT in the operating state (step S104). Determination is made as to whether the created DAC setting value is outside the adjustment range, i.e. whether the DAC setting value is greater than the upper level threshold or lower than the lower level threshold (step S105), and in the case of being outside the adjustment range (YES in step S105), the DAC setting value is modified to be the threshold (step S106), and driving of the optical level control device 104 is performed via the DAC 118 after the time adjustment (step S107). In the case of not being outside the adjustment range (NO in step S105), driving of the optical level control device 104 is performed via the DAC 118 after the time adjustment (step S107). Note that the DAC setting value is an example of a level control amount or driving control amount.

With the input-side PD 110 the signal is continuously received, whereby the processing in step S102 through step S107 is also continued as to the received signal level.

Next, determination is made as to whether the FF loop processing has been performed a predetermined number of times (step S108). In the case that the number of times of processing has not exceeded the predetermined number of times (NO in step S108), the number times of the FF loop is added one time (step S109). Confirmation of the number of times of the FF loop processing is repeated until the number of times of processing has exceeded the predetermined number of times.

In the case that the number of times of loops has exceeded the predetermined number of times (YES in step S108), the number of times of processing in the FF loop is reset (step S110), and confirmation is made as to whether the FB loop processing has been set (ON) (step S111). If the FB loop processing has not been set (NO in step S111), the processing proceeds to step S102, and the FB loop processing is not performed.

If the FB loop processing is set (YES in step S111), the output-side signal level is received, and the averaging processing thereof is performed (step S112). This averaging processing is performed with the output PD/power monitor/averaging processing unit 408. Note that in the case of not performing averaging with the initializing settings, the received output-side signal level is processed without change to an average value. Upon the processing being ended, the value is output as an output-side PD value.

Next, the difference between the output-side PD value and output target level is computed, and a target value to be updated is determined (step S113). For example, in the case wherein the output power target value is +0 dBm, and in a state wherein FF control is performed using the LUT in order for the output power target value to be +0 dBm, the result monitored with the FB control side is higher than the 0.2-dBm output power target value, the difference 0.2 dBm between the average values of the output-side level value (after control) and the target level value is computed, and the +0-dBm LUT is determined to be modified to the −0.2-dBm LUT.

A search is performed of a table near the updated target value (output target level) from the updated information storage unit 430 (step S114), an output target level table is created from the searched table (step S115), and data from the created table is written into the standby state LUT (step S116). LUT updating is processed with this processing.

Next, updating processing of the LUT flag is performed (step S117). With this processing, the flag of the LUT in operating state that has been used to up this point is turned off, and a flag is turned on regarding the newly updated LUT. The LUT wherein the flag has been turned off is identified as moving from operating state to standby state, and the LUT wherein the flag has been turned on is identified as moving from standby state to operating state. Consequently, the LUTs are switched, and the data of the LUT in operating state is updated. Steps S102 through S117 are repeated, and the LUT updating is executed in the case that the number of times of the FF loop reaches the predetermined number of times. The time relating to one FF loop is approximately fixed, whereby updating is are set to a predetermined number of times so as to be performed approximately every second. Therefore, table updating is performed at in approximately fixed cycle.

Figure 27A:
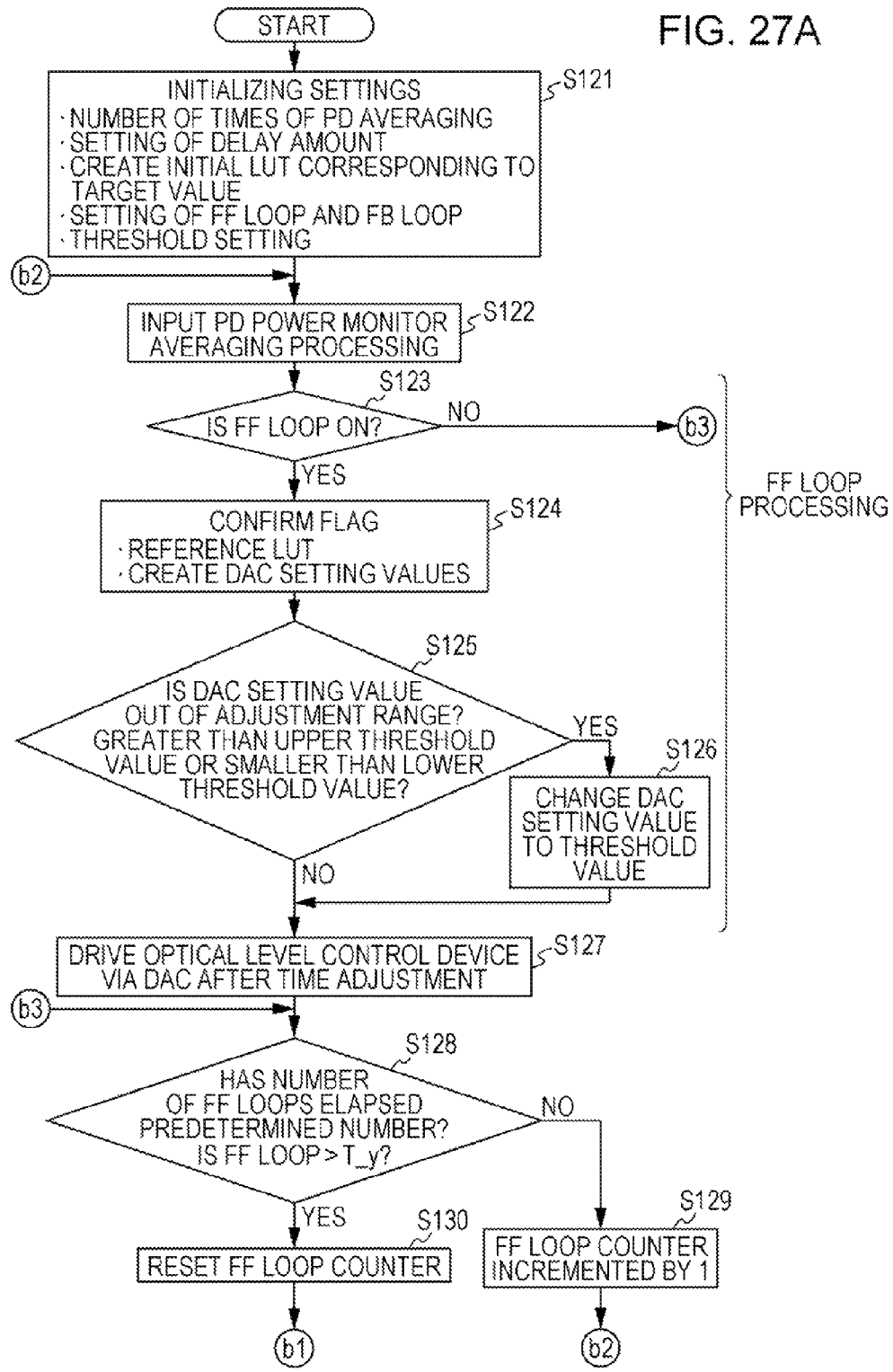
FIGS. 27A, 27B illustrate a flowchart illustrating an example of level control processing relating to the fifth embodiment.
Figure 27B:
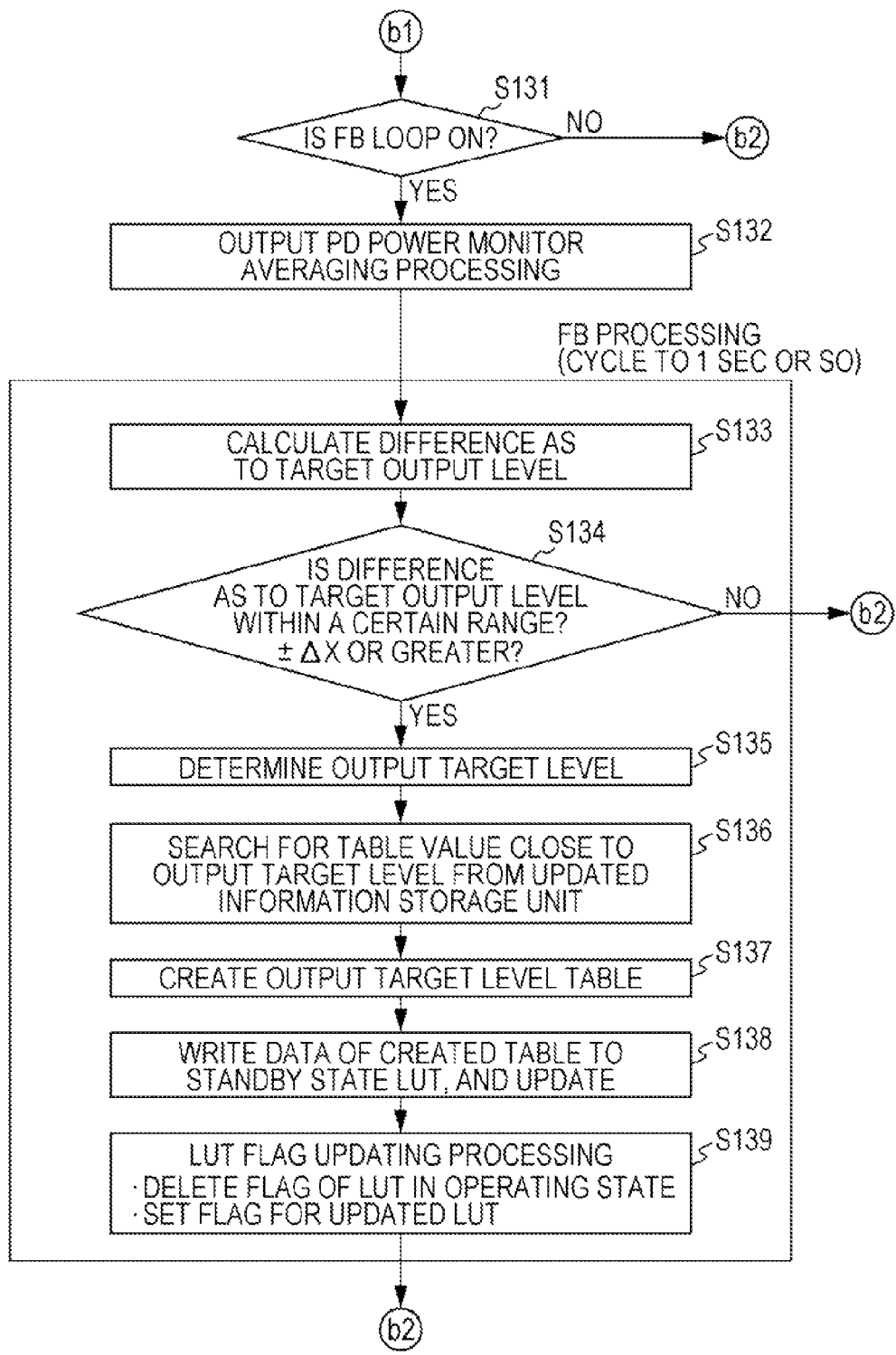

Next, FIGS. 27A, 27B will be referenced to describe processing in the case that control error exceeds a fixed range. FIGS. 27A, 27B illustrate a flowchart depicting an example of level control processing relating to the fifth embodiment. Note that the processing depicted in FIGS. 27A, 27B is an example, and the present invention is not limited to this processing. In FIGS. 27A, 27B, b1 and b2 depict connecting portions of the flowchart.

Steps S121 through S132 correspond to the already-described steps S101 through S112 (FIGS. 26A, 26B), and accordingly, description will be omitted.

Upon performing the averaging processing in step S132, computation of the difference from the output target level is performed (step S133). With this processing, control error is obtained. Determination is made as to whether a fixed range is more than $\pm \Delta X$, for example, as compared to the obtained control error (step S134). In the case of being within the fixed range (NO in step S134), the processing from step S122 is repeated from the state wherein the count is reset to 0.

In the case of being outside a fixed range (YES in step S134), the output target level is determined (step S135), and processing from searching a table close to the output target level (step s136) to updating processing of the LUT flag (step S139) is performed. Steps S136 through S139 correspond to the already-described steps S114 through S117 (FIGS. 26A, 26B) so the description thereof will be omitted.

LUT Data Expansion Creating

Figure 30:
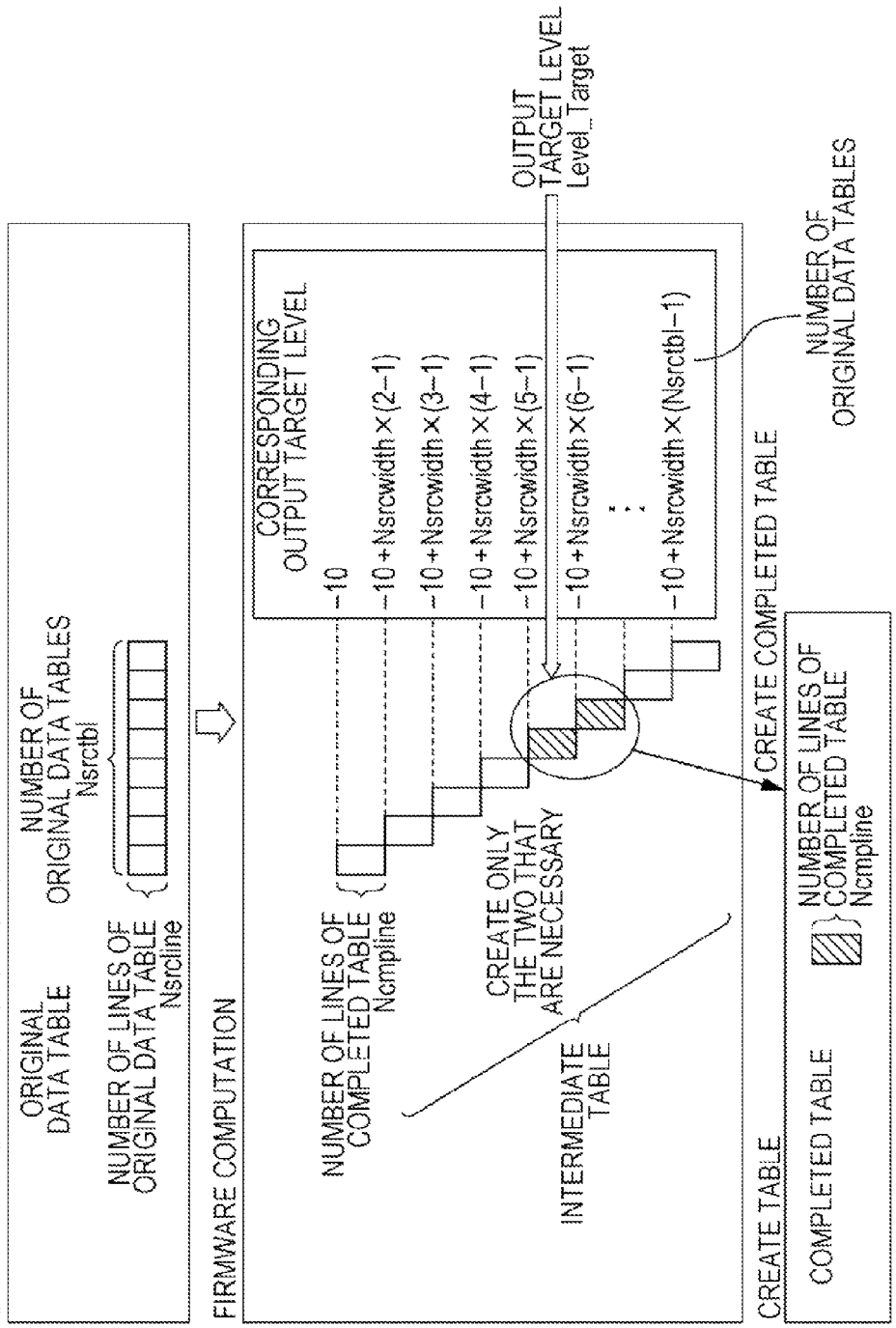
FIG. 30 is a diagram illustrating an example of table interpolating processing.

Next, FIGS. 28, 29, and 30 will be referenced to describe the expansion creating processing of the LUT data. FIG. 28 is a diagram which depicts an example of table interpolation, FIG. 29 is a diagram depicting an example of table creasing processing procedures, and FIG. 30 is a diagram depicting an example of table interpolating processing. Note that the arrangement depicted in FIGS. 28, 29, and 30 is an example, and the present invention is not limited to this arrangement.

The expansion and creation of LUT data expands the original data stored in the updated information storage unit 430 with the computing processing of the LUT original data expanding unit and creates the LUT updated data. By storing a portion of updated data in the updated information storage unit 430, the updated information storage unit 430 may be handled, whereby, for example, even a case of updating the control error at a spacing from 0.2 dBm to a spacing of 0.1 dBm may be handled without increasing memory capacity of the updated information storage unit 430. Note that the updated data of the LUT is an example of updated control information.

A table is provided to the updated information storage unit 430 for every several points in the range of output level values that may be taken. For example, as depicted in FIG. 28, data of five output levels is stored, which are the output levels of data 442 of −10 dBm, data 444 of −5 dBm, data 446 of 0 dBm, data 448 of +5 dBm, and data 450 of +10 dBm. The LUT data 452 is created from the original data by performing interpolating processing with original data expansion creating unit 416. The number of rows of the original data is smaller and simplified as compared to the number of rows of an LUT. For example, in the case that the LUT is 1,024 rows, the original data of each output level is 256 rows, and data is stored every four rows.

The interpolating processing to create the updated LUT data from the original data is performed with the following process, as depicted in FIGS. 29 and 30.

Procedure (1): The original data of multiple output levels is set in the updated information storage unit 430. That is to say, the original data is prepared for multiple levels, and set in the updated information storage unit 430 beforehand.

Procedure (2): Two pieces of original data that is closest to the output level to be set as a target (output target level) are each drawn out.

In the case of reducing the number of rows of the original data table to be less than the number of rows of the LUT in order to suppress the storage capacity of the updated information storage unit 430, the various pieces of original data are interpolated, and data of the number of rows of the LUT is created. The created data becomes, for example, an intermediate table.

Procedure (3): A table (complete table) equivalent to the target level is created from the drawn out table (intermediate table).

In the case that there is no original data of the output level to be set as a target, the output level data to be set as a target is computed from the data drawn out from the computing processing.

By performing procedure (1) through procedure (3), the original data stored in the updated information storage unit 430 is expanded, and a complete table is created. Updating of the LUT data may be made with the data of this table. Note that in the case of causing the number of rows in the original data table to be the same as the number of LUT rows, in procedure (2) just extraction of the two pieces of original data closest to the output level to be set is performed. Also, in the case that original data matching the target level to be updated is stored in the updated information storage unit 430, the closest two pieces of original data are searched, and the matching original data may be expanded instead of the expanding procedures. In this case, procedure (3) is to be omitted.

Setting of Original Data

FIG. 31 will be referenced to describe the setting of the original data. FIG. 31 is a diagram depicting an example of setting items of interpolating processing. Note that the arrangement depicted in FIG. 31 is an example, and the present invention is not limited to this arrangement.

As depicted in FIG. 29, the original data settings are performed by setting the original data (original data tables 462, 464, 466, 468, 470) of the output level E (Level E) from the output level (Level A) within the updated information storage unit 430, for example. The original data tables 462, 464, 466, 468, 470 are made up of two rows of tables, an input PD value is stored in one of the rows, and a driving control amount indicating the value to output to the DAC 118 is stored in the other row. The original data tables 462, 464, 466, 468, 470 are obtained by measuring the relation of the driving control amount in order to set each output level.

In the event of setting the original data tables 462, 464, 466, 468, 470 in the updated information storage unit 430, the number of rows of a complete table (Ncmpline), the number of original data tables (Nsrctbl), the number of rows of the original data table (Nsrcline), the maximum value of the target set level (Level_Max), the minimum value of the target set level (Level_Min), and the target setting level (Level_target) are set, as depicted in FIG. 31. Note that the setting depicted in FIG. 31 is an example in the case of setting the input-side signal level to be 11 bits.

The number of rows in the complete table matches the number of rows in the LUT, and is 2,048 in the case of 11 bits.

With the settings of the number of original data tables, the number of original data tables stored in the updated information storage unit 430 is set in the updated information storage unit 430. The numbers allowed are only the discrete values of 3, 6, 12, 22, 43, and 85, and values other than these are rounded down and modified to a discrete value. In the case that the value is smaller than 3, the number is set to be 3.

The number of rows in the original data table is set in the range of 64 to 2,048. A value expressed as 2 to the Nth power (N=6 through 11) is set as the number of rows of the original data table. In the case that the value of N is not in the range of 6 through 11, 64 is set, with N=6.

The maximum value of the target setting level means the maximum value of the output level. For example, 10 dBm is set.

The minimum value of the target level means the minimum value of the output level. For example, −11 dBm is set.

The target setting level is determined within a range of the maximum value to the minimum value of the target setting level. This target setting level is set before starting the operation, and is a level that is set in the LUT first, in the event of starting an operation.

Upon setting the number of original data tables, the maximum value of the target setting level, and the minimum value of the target setting level, a level-step width (Nsrcwidth) of the original data table stored in the updated information storage unit 430 is determined, and becomes Expression (1).

$$Nsrcwidth=(Level\_Max-Level\_Min)/(Nsrctbl-1) \quad (1)$$

The output level of the data stored in the updated information storage unit 430 is set to Level_Min, Level_Min+Nsrcwidth×(2−1), Level_Min+Nsrcwidth×(3−1), . . . , Level_Min+Nsrcwidth×(Nsrctbl−1), as depicted in FIG. 30.

Creation of Intermediate Table

Figure 32B:
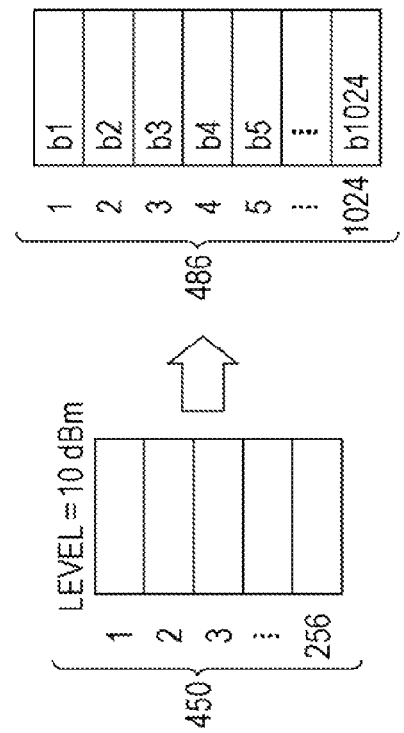
FIGS. 32A, 32B are diagrams illustrating an example of processing to draw out the original data.
Figure 32A:
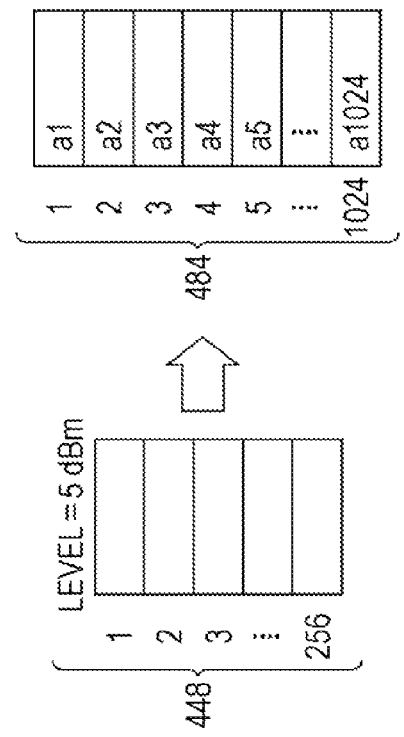
Figure 33B:
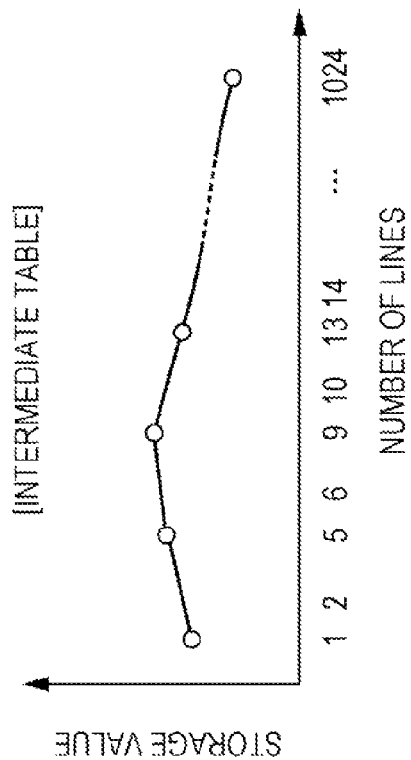
FIGS. 33A, 33B are diagrams illustrating an example of processing to drawing out data.
Figure 33A:
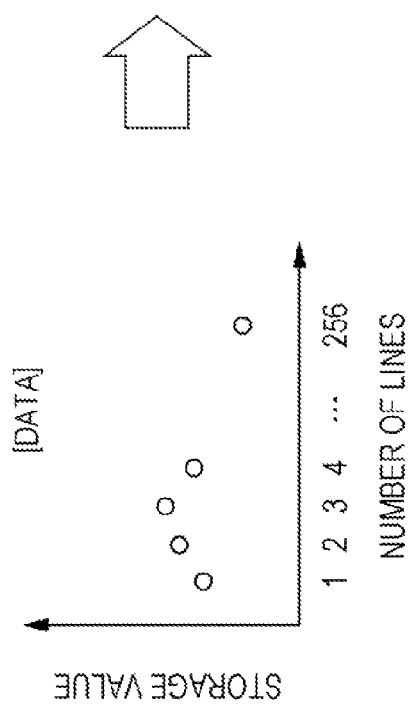

FIGS. 32 and 33 will be referenced to describe the creation of the intermediate table. FIGS. 32A, 32B are diagrams depicting an example of processing to draw out original data, and FIGS. 33A, 33B is a diagram depicting an example of processing to draw out the data. Note that the arrangement depicted in FIGS. 32 and 33 is an example, and the present invention is not limited to the arrangement. FIGS. 32 and 33 are examples of a table having 8-bit row numbers.

The intermediate table is created by drawing out the data rows of the original data. The updated information storage unit 430 stores the data 442, data 444, data 446, data 448, and data 450 (FIG. 28), and in the case that each data set has 256 rows, pieces of data of the original data are interpolated and the LUT data is created. In the case that the LUT data is 1,024, the original data is drawn out from 256 rows to 1,024 rows.

For example, in the case of creating a 7-dBm output level table, as depicted in FIGS. 32A, 32B the 5-dBm data 448 which is near the 7 dBm is drawn out and an intermediate table 484 is created, and the 10-dBm data 450 is drawn out and an intermediate table 486 is created.

With drawing out of the data, as depicted in FIGS. 33A, 33B the data in the data rows 1, 2, 3, 4, . . . , 256 are caused to correspond to the rows 1, 5, 9, 13, . . . , 1,024 in the intermediate table. The values in the rows 2 through 4, 6 through 8, 10 through 12, . . . 1,014 through 1,016, and 1,018 through 1,023 in the intermediate table are created by the adjacent data in rows 1, 5, 9, 13, . . . , 1,013, 1,017, and 1,024 connecting using a linear function. Note that row 255 and row 256 in the original data correspond to row 1,017 and row 1,024 in the intermediate table, and are wider as compared to other segments. Thus, only the last segment is connected at uneven intervals. By setting in this way, the original data may be set to be 8 bits (1,024 rows).

Creation of Complete Table

Figure 34:
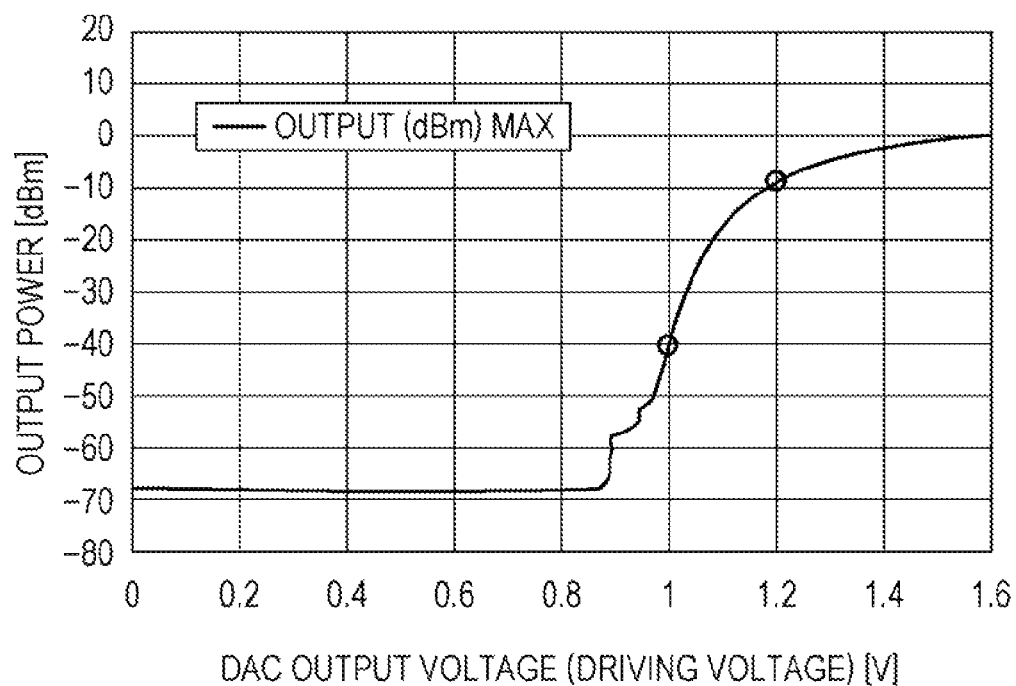
FIG. 34 is a diagram illustrating an example of output power property as to the driving voltage of a level control device.
Figure 35:
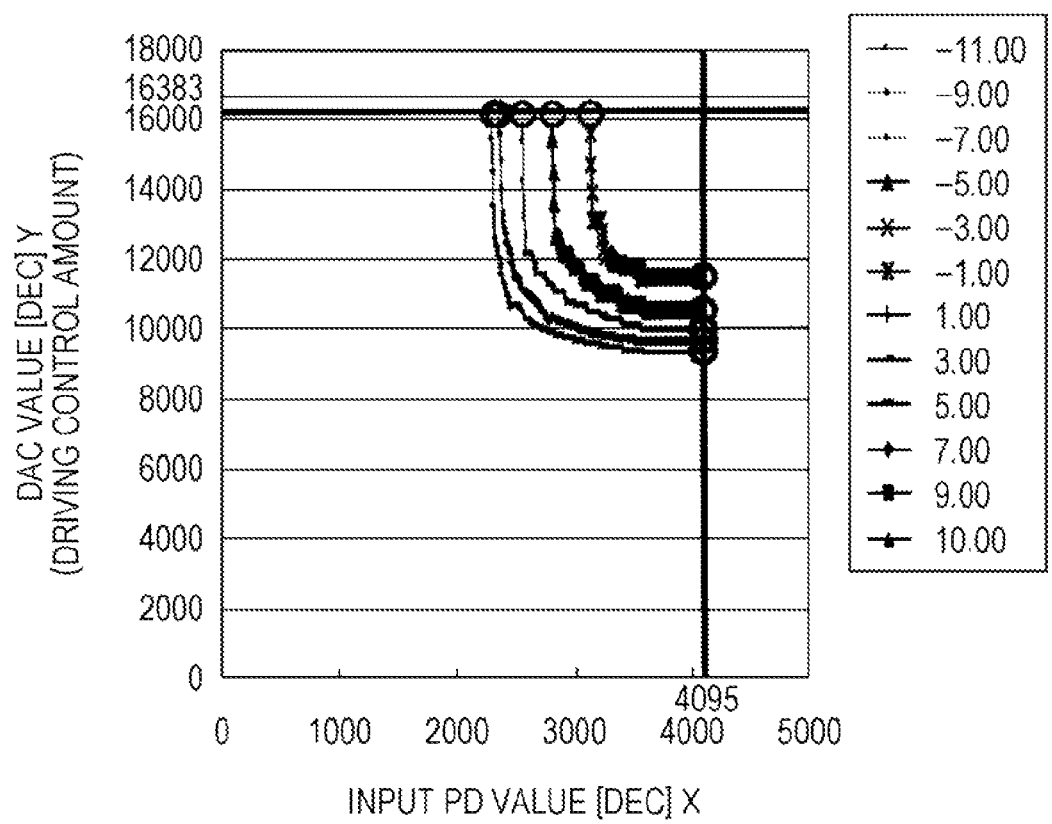
FIG. 35 is a diagram illustrating an example of the relation of a drive control amount as to an input PD value.
Figure 36:
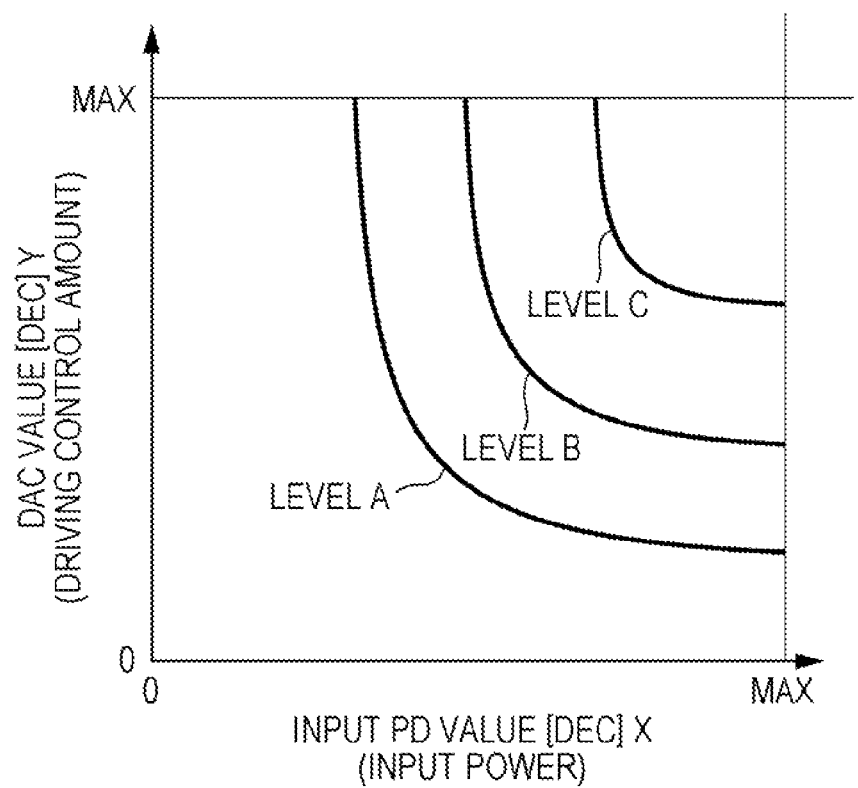
FIG. 36 is a diagram illustrating an example wherein the relation of the driving control amount as to an input PD value has been graphed.
Figure 37:
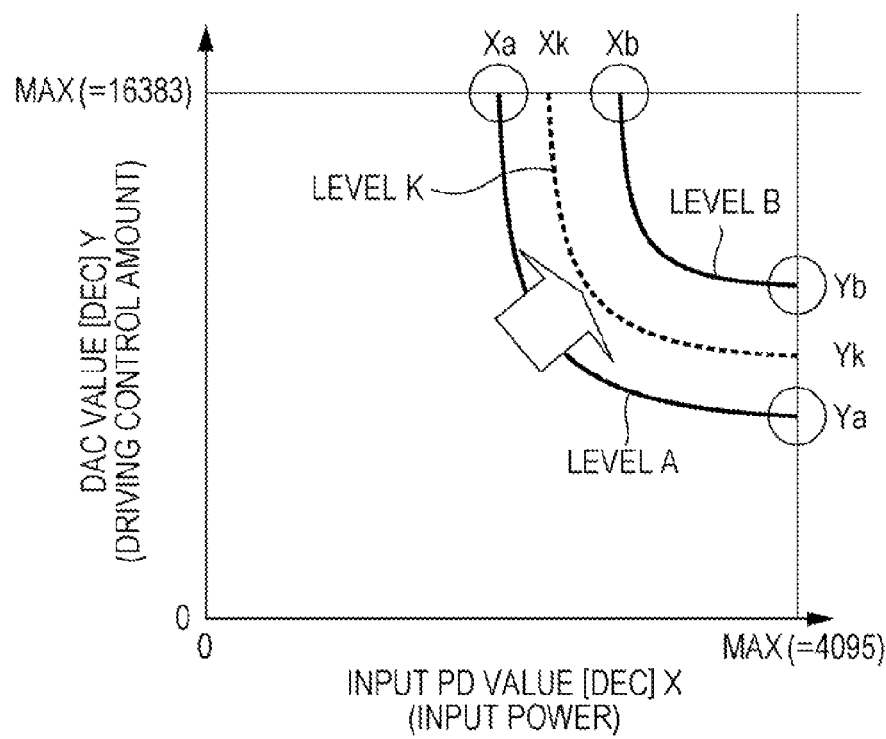
FIG. 37 is a diagram illustrating an example of values and lines used to create a table.
Figure 38:
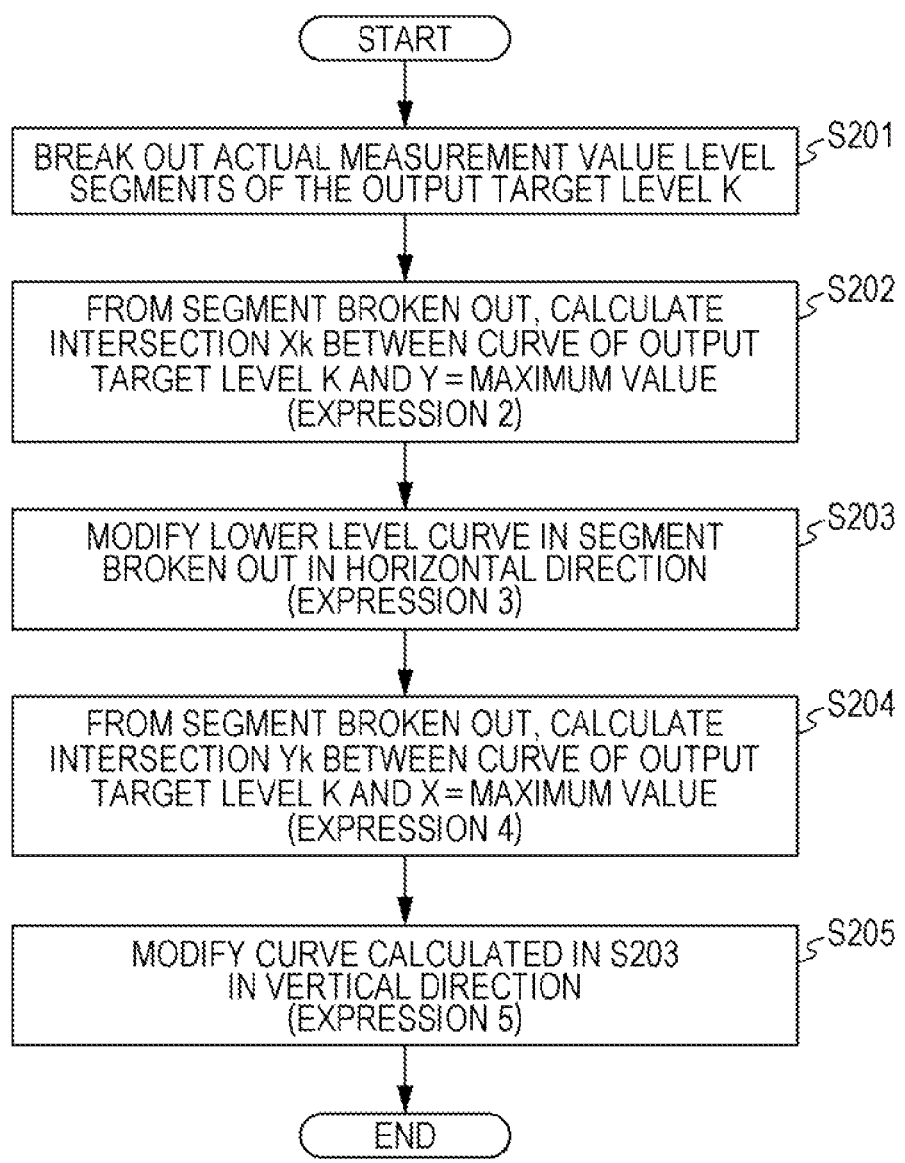
FIG. 38 is a flowchart describing an example of table creating processing.
Figure 39:
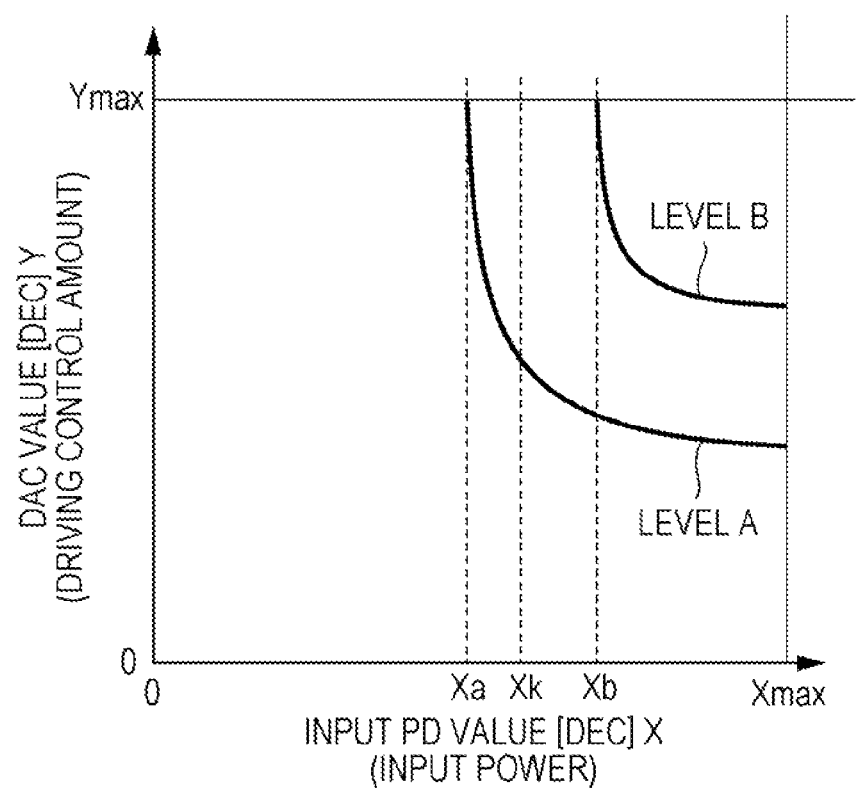
FIG. 39 is a diagram illustrating an example of curves for level A and level B.
Figure 40:
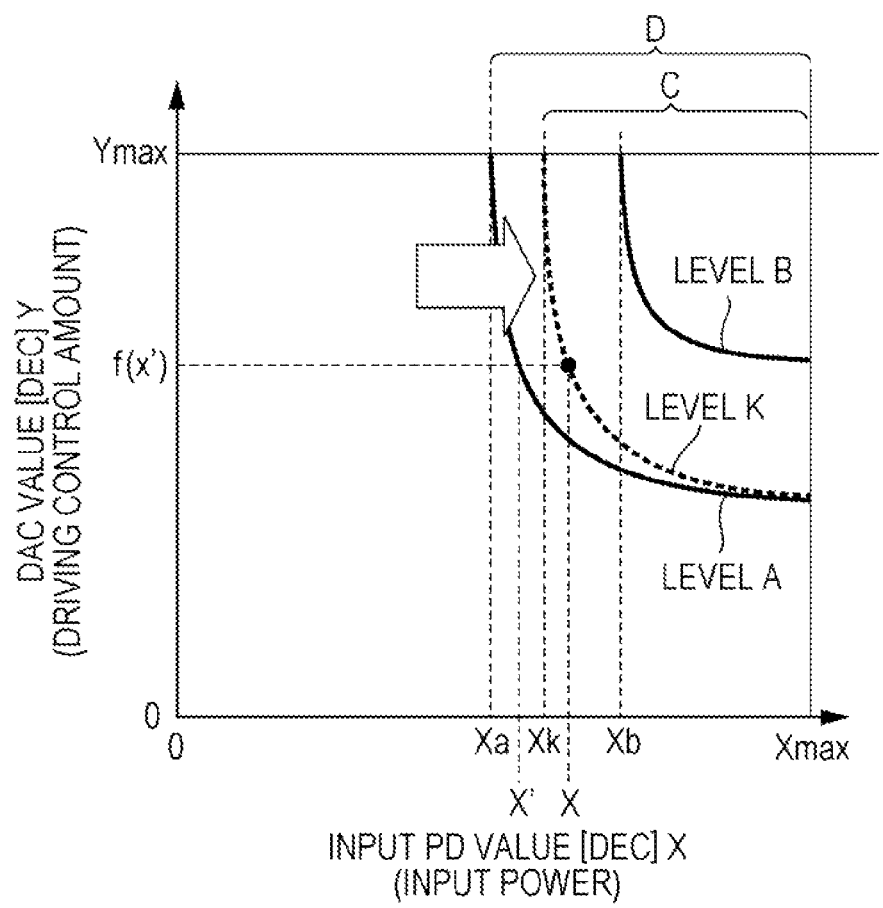
FIG. 40 is a diagram illustrating an example of deforming the curves in the horizontal direction.
Figure 41:
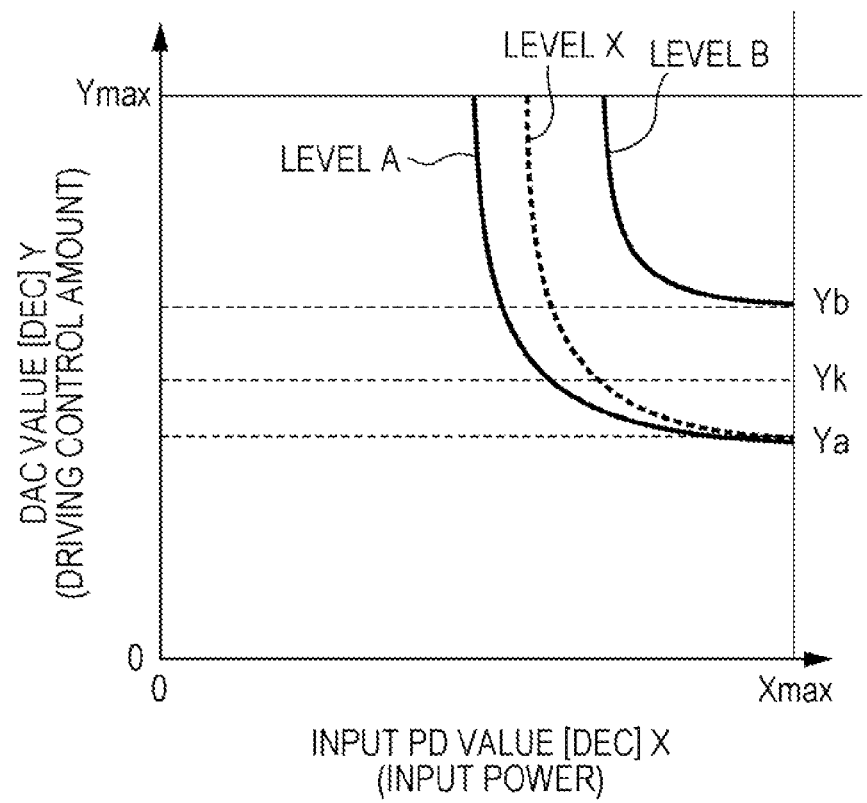
FIG. 41 is a diagram illustrating an example of the deformed curves.
Figure 42:
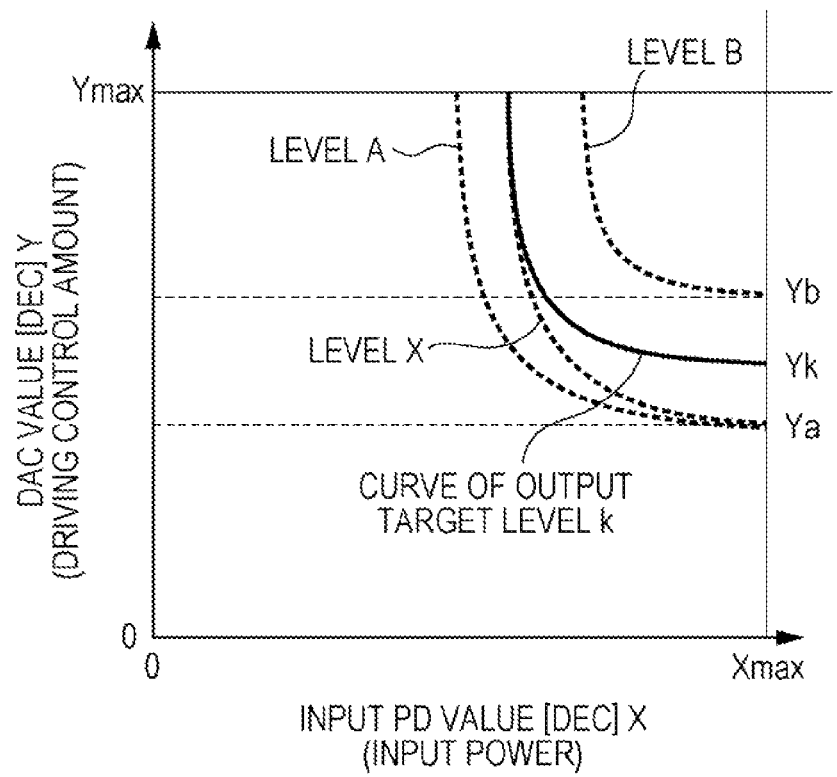
FIG. 42 is a diagram illustrating an example of deforming the curves in the vertical direction.

Next, FIGS. 34 through 43 are referenced to describe the creation of complete tables. FIG. 34 is a diagram depicting an example of an output power property as to the driving voltage of the level control device, FIG. 35 is a diagram depicting an example of the relation of driving control amount as to the input PD value, FIG. 36 is a diagram depicting an example of graphing the relation of the driving control amount as to the input PD value. FIG. 37 is a diagram depicting an example of the values and lines used for table creation, FIG. 38 is a flowchart depicting an example of table creating processing, FIG. 39 is a diagram depicting an example of level A and level B curves, FIG. 40 is a diagram depicting an example of modifying the curves in the horizontal direction, FIG. 41 is a diagram illustrating an example of the deformed curves, FIG. 42 is a diagram illustrating an example of deforming the curves in the vertical direction, and FIG. 43 is a diagram depicting an example of data amounts and the number of times measurement is performed. Note that FIGS. 34 through 43 are examples, and the present invention is not limited to these examples. Also, the DAC values depicted in FIGS. 35, 36, 37, 39, 40, 41, and 42 are values that are set as to the DAC 118, and are examples of driving control amounts. Also, the input PD value depicted in FIGS. 36, 37, 39, 40, 41, and 42 are examples of input power received by the LUT.

The semiconductor level control device is manufactured with the same compound semiconductor as the laser, and output power increases when a voltage threshold is suddenly exceeded. Upon a fixed output level being reached, the output power does not increase even when the voltage is increased, and a curve is maintained which saturates with an identified output power value. As depicted in FIG. 34, when the driving voltage is approximately 0 through 0.9 V, the output power becomes minimal, i.e. 0, and when between approximately 0.9 V and 1.6 V, the output power increases. Also, while the output power increase width is great when 0.9 V is exceeded, the increase width becomes smaller as 1.6 V is neared.

Thus, since the relation between the output power change amount and the driving voltage change amount is not linear, the voltage amount corresponding to the control error may not be determined uniformly. The change amount of driving voltage needed to change the output power differs, depending on which voltage is currently used for driving.

For example, let us consider the case wherein, as a result of monitoring with the FB control, the actual output level is 10 dB smaller than the output target level and is increased 10 dB. In order to change the output by +10 dB in the state wherein 1.0V is applied to the semiconductor level control device, the voltage is increased by approximately 35 mV. However, in order to change the output by +10 dB in the state wherein 1.2V is applied to the semiconductor level control device herein, the voltage has to be increased by approximately 460 mV. That is to say, as a result of monitoring with FB control, the need to increase by 10 dB may be recognized, but the voltage amount corresponding to the 10 dB may change to 35 mV or 460 mV, depending on the SOA driving state. Therefore, in the case that the relation of the output power change amount and driving voltage change amount is a curve, when adding a fixed value to the LUT on the FF control side, the optical level control device 104 is driven by a deviated value, and may not be controlled. This means that information obtained with FB control may not be uniformly reflected in the LUT.

In the case of performing optical level control using such semiconductor level control device, the data stored in the LUT becomes as plotted in FIGS. 35 and 36 in which the input side PD value is the horizontal axis and the DAC value is the vertical axis. Note that the input-side PD value is a value indicating the input-side signal level, and relates to the input-side power (input power) flowing through the transfer path. Also, the DAC value is a value that is output as to the DAC 118, and depicts the driving control amount of the driving circuit 120. The DAC value corresponds to the driving voltage depicted in FIG. 34.

The relation between the input-side PD value and driving control amount becomes linear wherein, in a region that the input-side PD value is small, the driving control amount is the maximum value, and becomes a curve wherein the driving control amount decreases when the input power value exceeds a border point, as depicted in FIG. 35. Also, while the shape of the various target level curves are similar, even if the data level differences are the same as 2-dBm spacing, the spacing of the curves is not a fixed spacing. Thus, the computed output level data is increased by performing multiple computing processes. Note that in the case of using 14-bit digital values for setting the driving control amount, the maximum value (Ymax) of the driving control amount becomes 16,383. Also, in the case of using a 12-bit digital value for setting of the input-side PD value, the maximum value (Xmax) of the input-side PD value becomes 4,095

The relation of the driving control amount and input power of the data at the target level, i.e., a level K data curve is created from the level A and level B data curves, using the values Xa, Xb, Ya, and Yb, as depicted in FIG. 37. That is to say, level K data which has no actual measurement value is created from the level A and level B data which have actual measurement values. As depicted in FIG. 38, data expansion and creation are performed to create a complete table, obtained by the processing described below, based on the obtained results.

(1) The actual measurement value level segments of the output target level K are broken out (step S201).

(2) From the broken out segment, the intersection Xk with the output target level K curve and Y=maximum value is computed (step S202). In other words, the input power value Xk at the intersection of the curved line of the output target level K with the straight line wherein the driving control amount is the maximum value is computed.

(3) The curve of the lower level of the broken out segment is modified in the direction of increasing the input level (horizontal direction) (step S203).

(4) The intersection Yk of the curve portion of the output target level K and the X=maximum value is computed from the broken out segment (step S204). That is to say, the intersection Yk of the curve portion of the output target level K and the straight line wherein the input-side PD value is the maximum value is computed.

(5) The curved line computed in step S203 is modified to the direction of the driving control amount increasing (vertical direction) (step S205).

With the breakout of the actual measurement value level segments of level K which is an output target level (step S201), the level A data curve and the level B data curve (FIG. 37) are set. Level A and level B indicate the two levels of original data closest to the output target level with procedure (2) (FIG. 29). Also, of the two original data levels, the lower is set as level A. For example, in the case of creating a 7-dBm output target level (level K) table from a +5-dBm intermediate table 484 wherein the number of rows is drawn out to 1,024 rows (FIGS. 32A, 32B) and a +10-dBm intermediate table 486 (FIGS. 32A, 32B), then +5 dBm is set as level A, and +10 dBm is set as level B.

With the computation of the intersection Xk (step S202), the intersections Xa, Xb, and Xk of the respective level A, level B, and level K (FIG. 37) are computed so as to have the same relation as level A, level B, and level K. Xk is computed with Expression (2).

$$Xk = Xa + (Xb - Xa) \times (LevelX - LevelA)/(LevelB - LevelA) \quad (2)$$

For example, in the case of obtaining Xk of the +7 dBm table from the +5 dBm (level A) and +10 dBm (level B), the levels A, B, and X from the Expression (2) becomes 5, 10, and 7, respectively. Also, the intersection Xa is determined by the +5-dBm table, and the intersection Xb is determined by the +10-dBm table, whereby Xk is obtained.

With modifying of the level A curve (step S203), a curve where the level A curve has been deformed is found from the Xk obtained in Expression (2) and the level A curve. If we say that the level A curve is y=f(x), a point on level A (x', f(x')) is modified in the horizontal direction so as to become near the MAX side of the input power value, as depicted in FIG. 40. The value of x when modified becomes (Xmax−x')/(Xmax−x)=(Xmax−Xa)/(Xmax−Xk). At this time, the curve which is a modified level A curve becomes Expression (3).

$$y = f(X') \quad$$

$$X' = Xmax - (Xmax - x) \times (Xmax - Xa)/(Xmax - Xk) \quad (3)$$

With computation of the driving control amount (Yk) in Xmax (step S204) computation is performed such that the input power value Ya in level A, input power value Yb in level B, and input power value Yk in level K in Xmax (FIG. 41) have the same relation as level A, level B, and level K, respectively. Yk is computed with Expression (4).

$$Yk = Ya + (Yb - Ya) \times (LevelX - LevelA)/(LevelB - LevelA) \quad (4)$$

In the case of obtaining Xk of +7 dBm from the +5 dBm (level A) and +10 dBm (level B), Xk is obtained by setting the values of level A, level B, and level X in Expression (4) as 5, 10, and 7, respectively.

The modified curve computed in step S203 (step S205) is obtained from Yk obtained in Expression (4) and the curve obtained in Expression (3). The level K curve is modified in the vertical direction so as to become near the MAX side of the driving control value, as depicted in FIG. 42. In this case, the curve is modified so that the value of y becomes (Ymax−Ya)/(Ymax−Yk) times as to y of the curve wherein level A is modified. If we say that the curve wherein the level A curve is modified, which is obtained in Expression (3), is y=g(x), the level K curve is obtained as Expression (5).

$$y = g(x) \times (Ymax - Ya)/(Ymax - Yk) \quad (5)$$

Examples of the data requested for creating this table are as follows. The values below may be used to create a table.

(1) Curves of levels A, B, C, D (curves or the data thereof expressing the relation between the input-side PD values and driving control amount in the levels A, B, C, D)

(2) End points Xa, Xb, Xc, Xd (end points on the Ymax side of the curve of each level)

(3) End points Ya, Yb, Yc, Yd (end points on the Xmax side of the curve of each level)

(4) Actually Measured Levels A, B, C, D

In order to perform level control with high accuracy, table accuracy has to be improved. However, in order to measure and maintain the relation of the input power and the driving control amount of the optical level control device in large amounts, a large amount of storage memory is needed, and a large-capacity updated information storage unit 430 is needed. Also, since there are individual differences in the level control device, the relation between the input power and driving control amounts is confirmed for each device, and measurement takes a great amount of time.

For example, in the case that updating of the LUT that stores a 12-bit input level and 16-bit driving control amount with the precision level of 0.1 dBm as to the level range of 20 dB wide, 200 types of data are needed. In the case of storing all of these types of data in the updated information storage unit 430, the data amount thereof becomes 38,400 k-bits, as depicted in FIG. 43. Also, in order to store the data, measurement has to take place 200 times.

According to the present embodiment, a table of several points of output levels are measured and held, and a table of non-measured output levels is created by the original data expansion creating unit 416, whereby memory capacity may be reduced and the time and cost for measurement may be reduced. For example, if there are five types of levels of the data to be stored in the updated information storage unit 430, only 960 k bits of data amount is needed, and measurement only has to occur 5 times. That is to say, the updated information storage unit 430 only has to have ¼₀th of the memory size, and only ¼₀th of the time is taken for measurement to end. Even if the LUT creating unit creates the table for non-measured output levels, control may be performed corresponding to variations in the input power.

Creation of Complete Table Using a Correction Value

Figure 44:
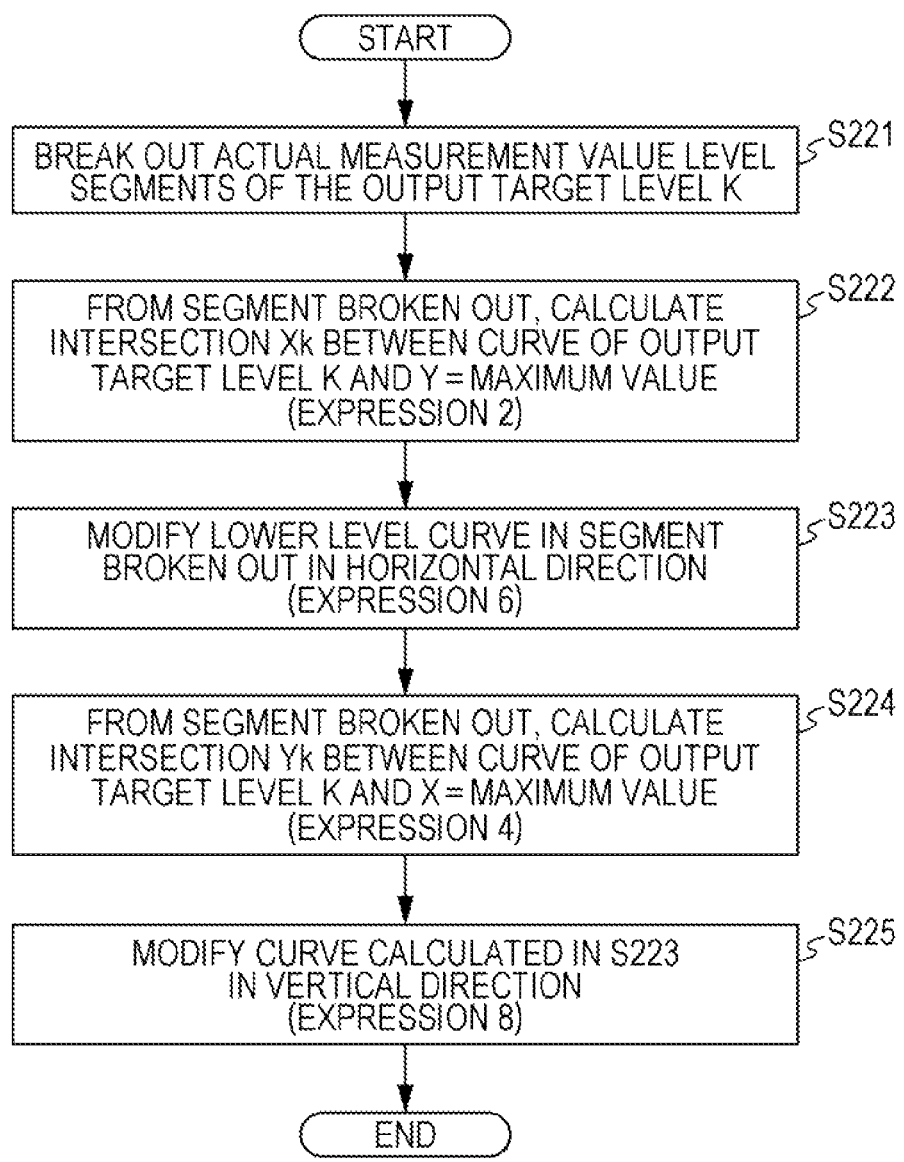
FIG. 44 is a flowchart describing an example of table creating processing.
Figure 45:
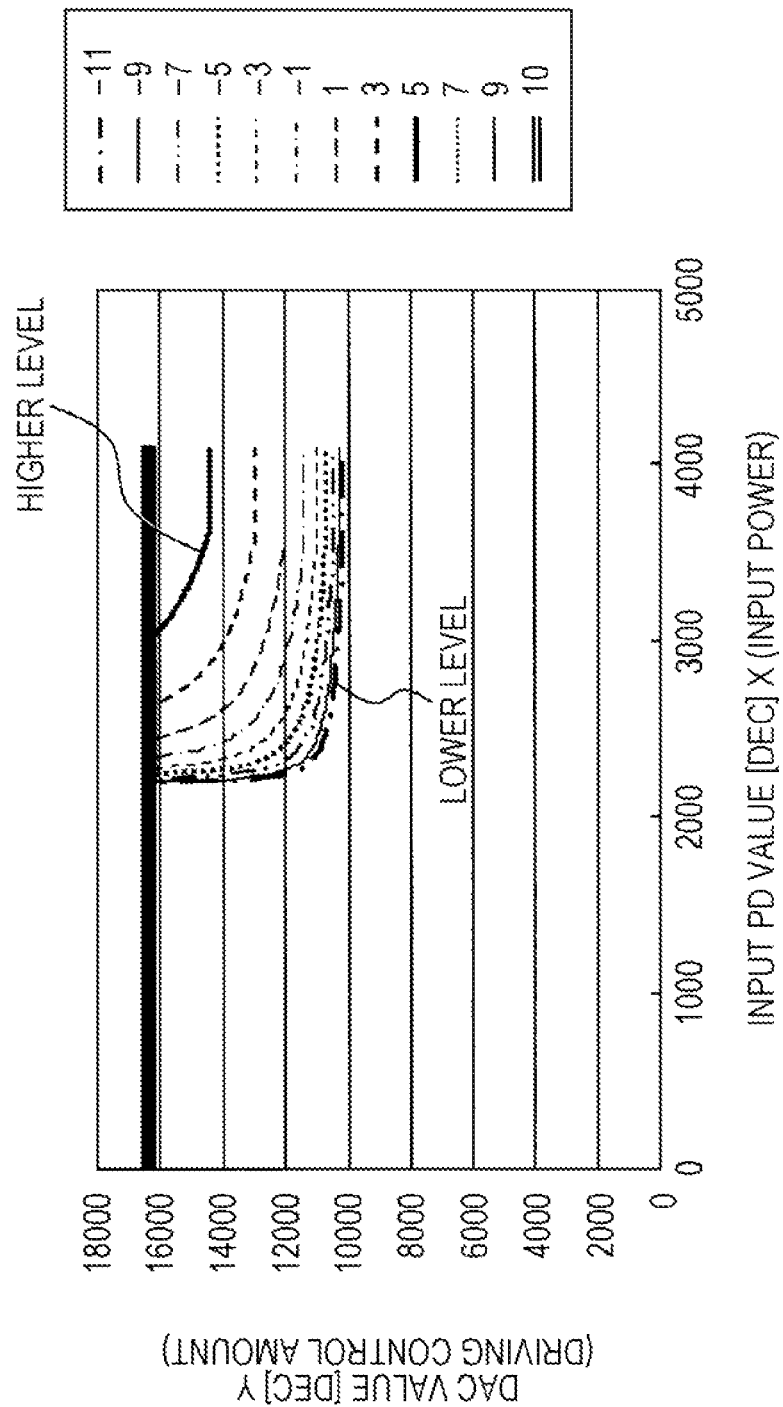
FIG. 45 is a diagram illustrating an example of the drive control amount as to an input side PD value.
Figure 46:
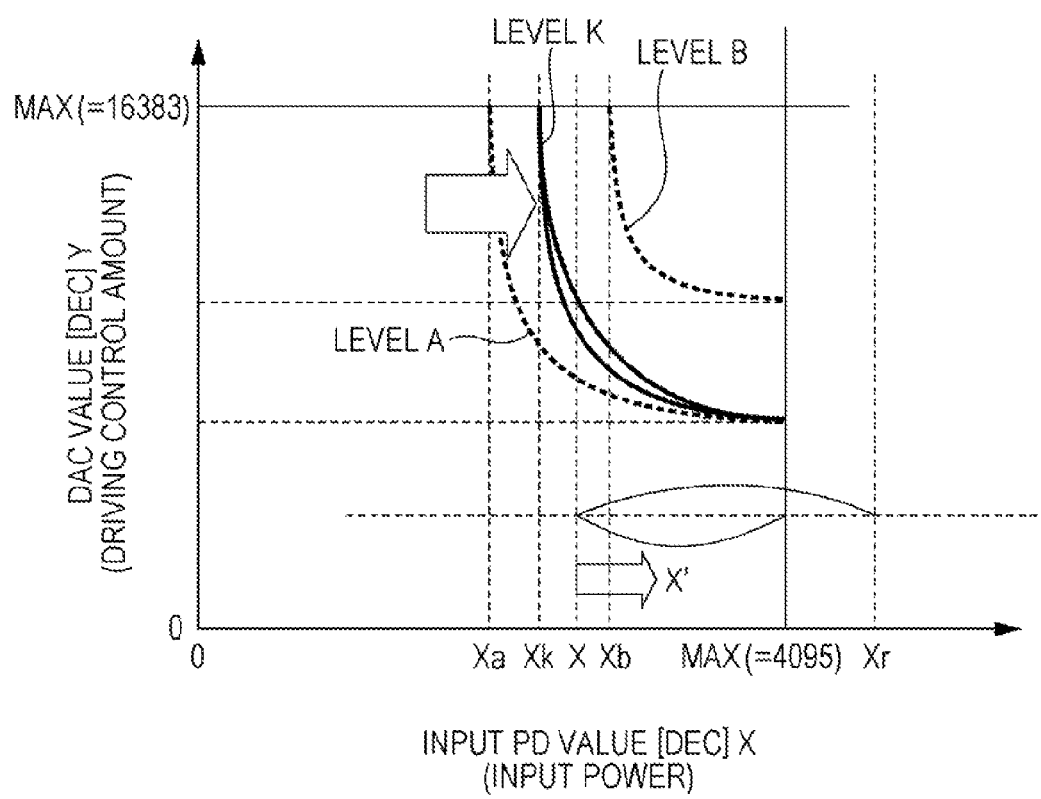
FIG. 46 is a diagram illustrating an example of deforming the curves in the horizontal direction.
Figure 47:
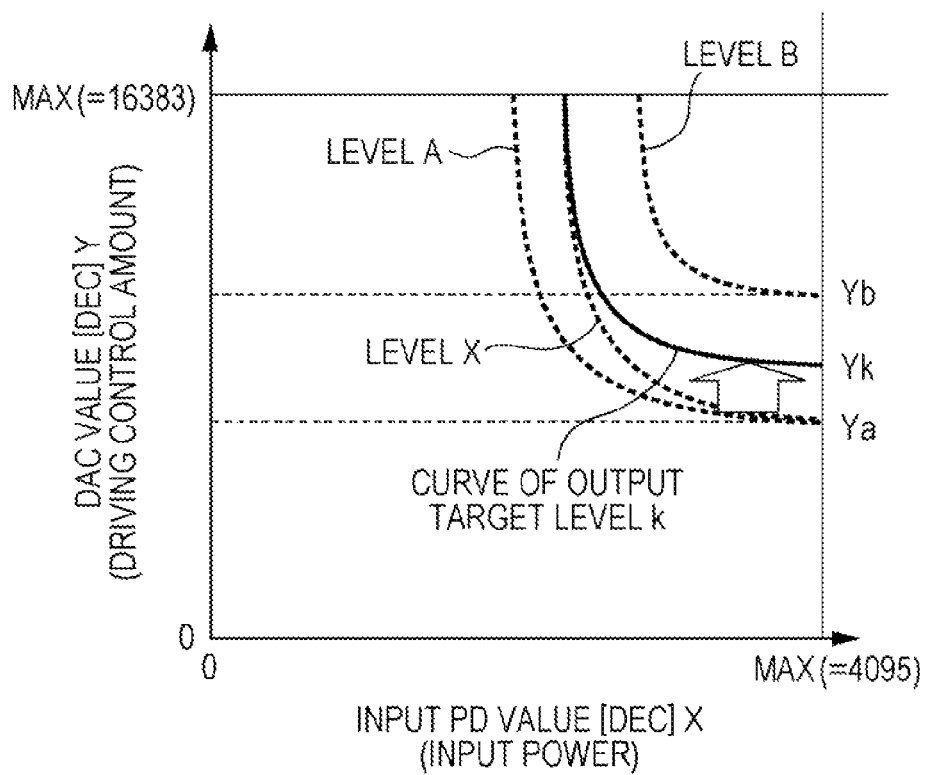
FIG. 47 is a diagram illustrating an example of deforming the curves in the vertical direction.
Figure 48:
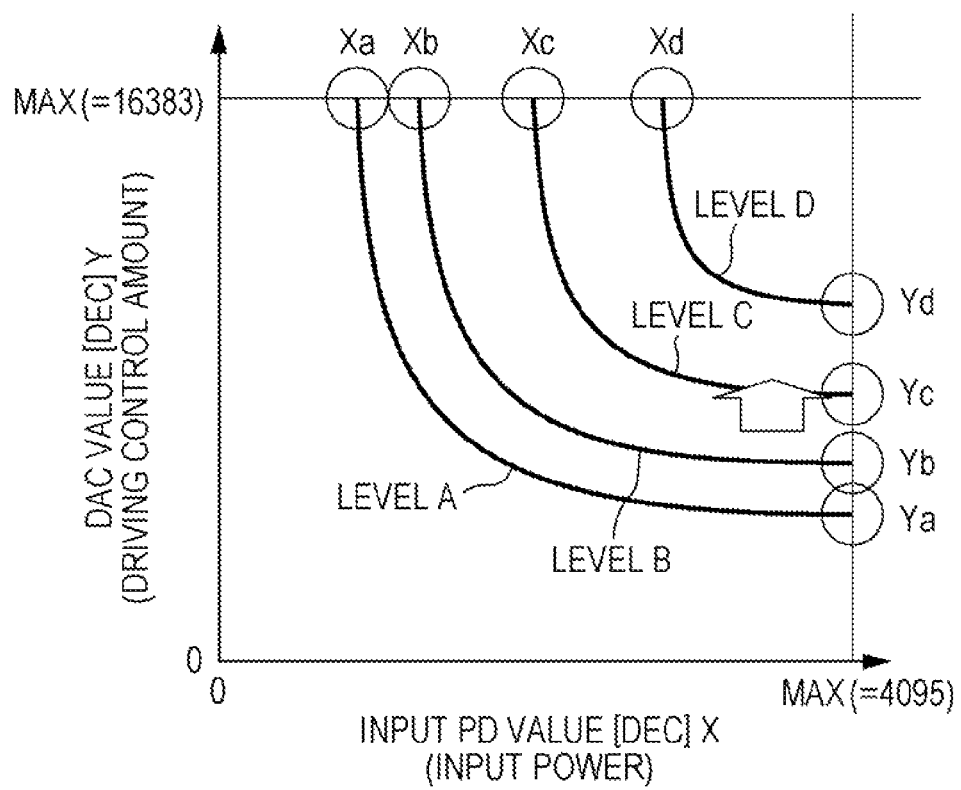
FIG. 48 is a diagram illustrating an example of values and lines used for table creation.

Next, FIGS. 44 through 49 will be referenced to describe the creation of a complete table using a correction value. FIG. 44 is a flowchart depicting an example of table creating processing, FIG. 45 is a diagram depicting an example of a driving control amount as to an input-side PD value, FIG. 46 is a diagram depicting an example of modifying a curve in the horizontal direction, and FIG. 47 is a diagram depicting an example of modifying a curve in the vertical direction. FIG. 48 is a diagram depicting an example of values and lines used to create the table, and FIG. 49 is a diagram depicting an example of setting values as to each level range. Note that the arrangements depicted in FIGS. 44 through 49 are examples, and the present invention is not limited to such arrangements. Also, the DAC values depicted in FIGS. 45 through 48 are values set as to the DAC 118, and are examples of the driving control amount. Also, the input PD values depicted in FIGS. 46 through 48 are examples of input power received by the LUT.

The level K curve is created from the level A curve (FIG. 37), using the values Xa, Xb, Ya, Yb (FIG. 37) and value Xr (FIG. 46). As depicted in FIG. 44, data expansion and creation are performed, obtained by the processing described below, based on the obtained results. Note that processing which is the same as the example of the complete table creation has the same reference numerals appended thereto.

(1) The actual measurement value level segments of the output target level K are broken out (step S221).

(2) From the broken out segments, the intersection Xk of the output target level K curve and Y=maximum value is computed (step S222). That is to say, the input power value Xk of the intersection of the curve portion of the output target level K and straight line wherein the driving control amount is the maximum value is computed.

(3) The level curve of the lower broken-out segment is modified in the direction of increasing the input level (horizontal direction) (step S223).

(4) From the broken out segments, the intersection Yk of the output target level K curve and X=maximum value is computed (step S224). That is to say, the intersection Yk of the curve portion of the output target level K and straight line wherein the input-side PD value is the maximum value is computed.

(5) The curve computed in step S223 is modified in the direction of increasing the driving control amount (vertical direction) (step S225).

The breakout of the actual measurement value level segments of level K (step S221), the computing of the input-side PD value Xk (step S222), and the computing of the intersection Yk (step S224) are similar to the steps S201, S202, and S204 (FIG. 38) of the complete table creation example, so the description thereof will be omitted.

The modified level A curve (step S223) is obtained from the Xk obtained in Expression (2) and the level A curve. As depicted in FIG. 45, the nature of a level control device is to have a strong curve and small curvature the lower the level, and a weak curve and large curvature the higher the level. In this case, the correction value is set according to the target level value.

Since the curve is weaker as the level is higher, in order to modify the level A curve, the curve is made flatter as compared to the case of setting a correction value and modifying with Expression (3). As depicted in FIG. 46, the value of X of the curve after modification is shifted to a comparatively large value (Xmax side) as compared to the case in Expression (3), by changing the Xmax in Expression (3) to a value Xr that is greater than Xmax. In this case, the driving control amount corresponding to the same X-coordinate is great as compared to the value of computing with Expression (3), and nears the direction of converging early to Ymax, whereby the obtained curve nears a flat state.

The modification of the level A curve is performed using Expression (6), with the level A curve as y=f(x). x' in Expression (6) is a value corresponding to x in Expression (2), and x in Expression (6) is a value greater than x' in Expression (6).

$$y = f(X'')$$

$$X'' = X\max - (X\max - x')*(X\max - Xa)/(X\max - Xk)$$

$$X' = Xa + (x - Xa) \times (Xr - Xa)/(X\max - Xa) \quad (6)$$

In the case that Xmax is 4,095, Expression (6) becomes Expression (7).

$$y = f(X'')$$

$$X'' = 4{,}095 - (4{,}095 - x')*(4{,}095 - Xa)/(4{,}095 - Xk)$$

$$X' = Xa + (x - Xa)*(Xr - Xa)/(4{,}095 - Xa) \quad (7)$$

The modified curve computed in step S223 (step S225) is obtained from Yk obtained in Expression (4) and the curve obtained in Expression (6). The level K curve, as depicted in FIG. 47, is modified in the vertical direction so as to be near the MAX side of the driving control amount. In this case, if the curve wherein the value of y modifies level A is y=h(x), then the curve is modified as (Ymax−y)/(Ymax−h(x))= (Ymax−Yk)/(Ymax−Ya). That is to say, the level K curve is obtained as Expression (8).

$$y = Y\max - (Y\max - h(x)) \times (Y\max - Yk)/(Y\max - Ya) \quad (8)$$

In the case that Ymax is 16,383, Expression (8) becomes Expression (9).

$$y = 16{,}383 - (16{,}383 - h(x)) \times (16{,}383 - Yk)/(16{,}383 - Ya) \quad (9)$$

The curve in Expression (9) and the Y=Ymax straight line express the relation between the input PD value and the driving control amount. Thus, the complete table is created based on the curve in Expression (9) and the Y=Ymax straight line, by reading the values thereof.

In creating the complete table, table creation is performed using a correction value Xr besides the data used to create the complete table.

The value Xr is a value greater than Xmax, and is set by adjusting so that the level K curve obtained in Expression (8) matches the curve actually desired. Also, as depicted in FIGS. 48 and 49, Xr may be set as Xr1, Xr2, Xr3, Xr4 respectively as to between levels A and B, between levels B and C, between levels C and D, and level D and above, in the original data table. In the case that the value of Xr differs between adjacent level spaces, the level K curve having greater precision may be obtained.

In the table creation example herein also, memory capacity may be reduced, and time and cost relating to measurement may be reduced.

Features, advantages, modifications or the like will be exemplified for the above-described fifth embodiment.

(1) According to the fifth embodiment, analog-digital conversion, digital-analog conversion, and LUT reference, as well as input signal averaging processing and AC setting value generation and limiter processing are performed. Thus, latency of the FF loop processing becomes as follows, for example. Note that latency is the time from when the ADC received the signal until the DAC setting processing unit 410 outputs the signal.

(Latency Other than Digital Control Circuit 402)
1) Analog-digital conversion: 6 CLK
2) Digital-analog conversion: approximately 1 CLK
(Latency within digital control circuit 402)
1) Input unit flip-flop: 1 CLK
2) Input signal averaging processing: 6 to 7 CLK
3) LUT referencing: 2 CLK
4) DAC setting value generating and limiter processing: 2 CLK
5) Output unit flip-flop: 1 CLK If we say that the operating clock of the digital control circuit 402 is 132 MHz, 1 CLK corresponds to 7.58 nanoseconds. With latency other than the digital control circuit 402, this takes a total of approximately 7 CLK (53 nanoseconds), and with latency within the digital control circuit 402, this takes 12 to 13 CLK (91 to 99 nanoseconds). The overall processing time is 19 to 20 CLK, and takes approximately 144 to 152 nanoseconds. If we rewrite this as the length of the delay line 122, this becomes 28.8 to 30.4 m. The length of the delay line 122 shortens the time of FF loop processing by speeding up the operating clock of the digital control circuit 402, and may shorten the length of the delay line 122.

(2) The output light of the optical level control device is monitored with the output-side PD, and is taken in by the output-side ADC. The monitor values of the output-side PD is used by FB control, whereby a configuration may be used that takes to for multiple samplings performs averaging processing, and focuses on accuracy.

(3) By performing the PD monitor value sampling by taking time for multiple samples and averaging these, conforming to modulation components of the input signal may be avoided.

(4) In creating the complete table, the level curve having the lower broken-out segment is modified in the horizontal direction (FIG. 38, step S203), and the intersection Yk of the output target level K curve and X=maximum value is computed from the broken-out segments (FIG. 38, step S204). However, after computing the intersection Yk of the output target level K curve and X=maximum value from the broken-out segments, the level curve of the lower broken-out segment may be modified in the horizontal direction.

(5) In creating the complete table using the correction value, the level curve of the lower broken-out segment is modified in the horizontal direction (FIG. 44, step S223), and the intersection Yk of the output target level K curve and X=maximum value is computed from the broken-out segments (FIG. 44, step S224). However, after computing the intersection Yk of the output target level K curve and X=maximum value from the broken-out segments, the level curve of the lower broken-out segment may be modified in the horizontal direction.

According to the present embodiment, the two original pieces of data nearest the output target value level are each drawn out to create an intermediate table (procedure (2): FIG. 29), and a table corresponding to the output target levels are created from the intermediate table (procedure (3): FIG. 29). However, after first creating a table equivalent to the output target levels from the two original pieces of data nearest the output target value level, the table equivalent to the output target level may also be drawn out to create a complete table.

Sixth Embodiment

Figure 50:
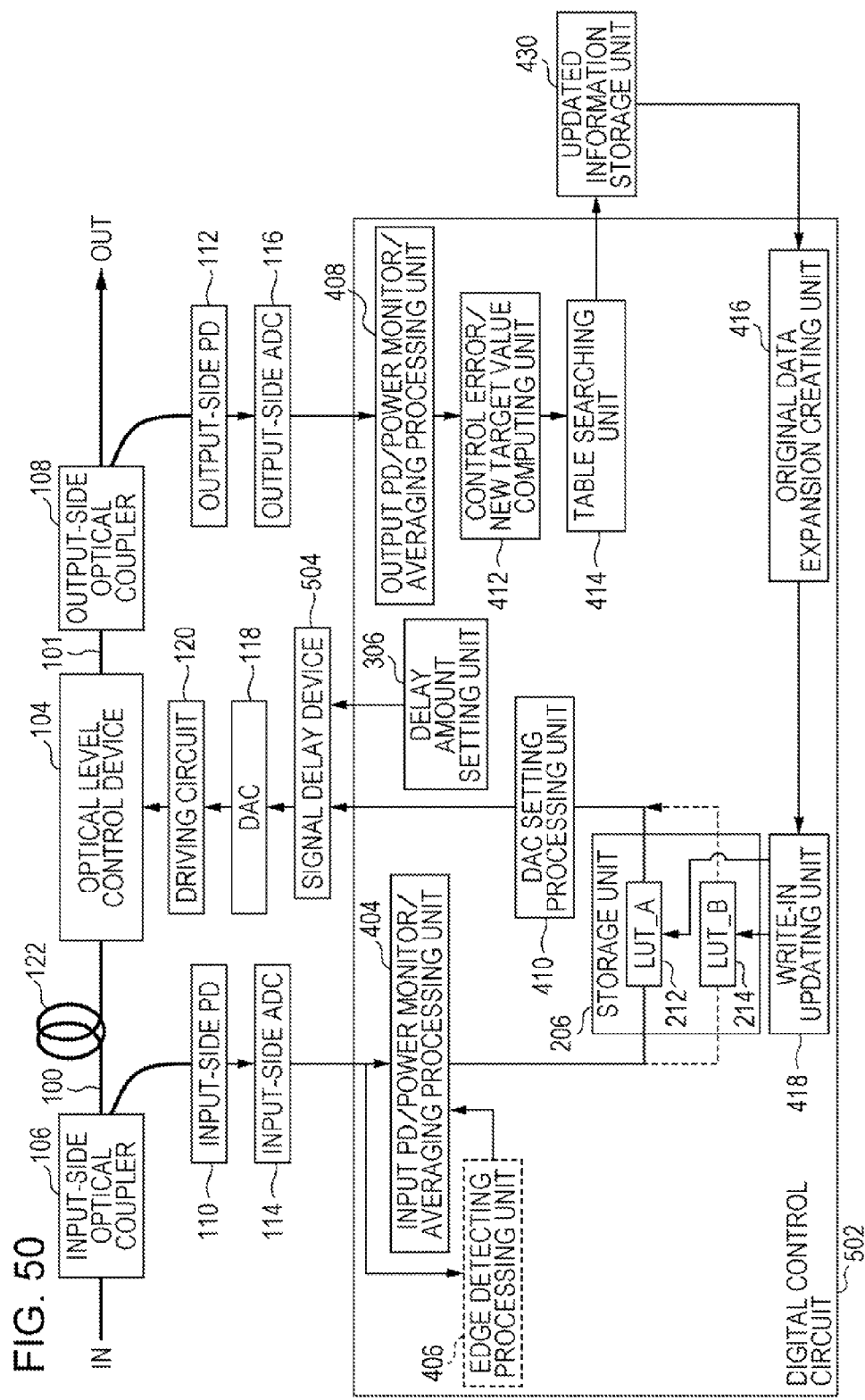
FIG. 50 is a diagram illustrating an example of a level control system relating to a sixth embodiment.

FIG. 50 is referenced to describe the sixth embodiment. FIG. 50 is a diagram depicting an example of the level control system relating to the sixth embodiment. Note that the configuration depicted in FIG. 50 is an example, and the present invention is not limited to this configuration. The portions in FIG. 50 that are the same as in FIGS. 5, 11, 12, 20, and 23 have the same reference numerals appended thereto.

According to the present embodiment, instead of the delay clock Z 204 in the fifth embodiment, a signal delay device 504 is provided.

The signal delay device 504 is an example of time adjusting means to adjust the transmittance time of a signal, and makes up an output time period adjusting unit. The signal delay device 504 is the same as in the fourth embodiment so the description thereof will be omitted.

According to the present embodiment, the signal delay device 504 delays the transmittance of a digital signal, and is thereby disposed between the DAC 118 and DAC setting processing unit 410. The driving control amount is received from the DAC setting processing unit 410, and the signal of the driving control amount is delayed based on the settings of the delay amount setting unit 306, and is output towards the DAC 118.

Other configurations thereof are similar to the fifth embodiment, so the description thereof will be omitted.

Seventh Embodiment

Figure 51:
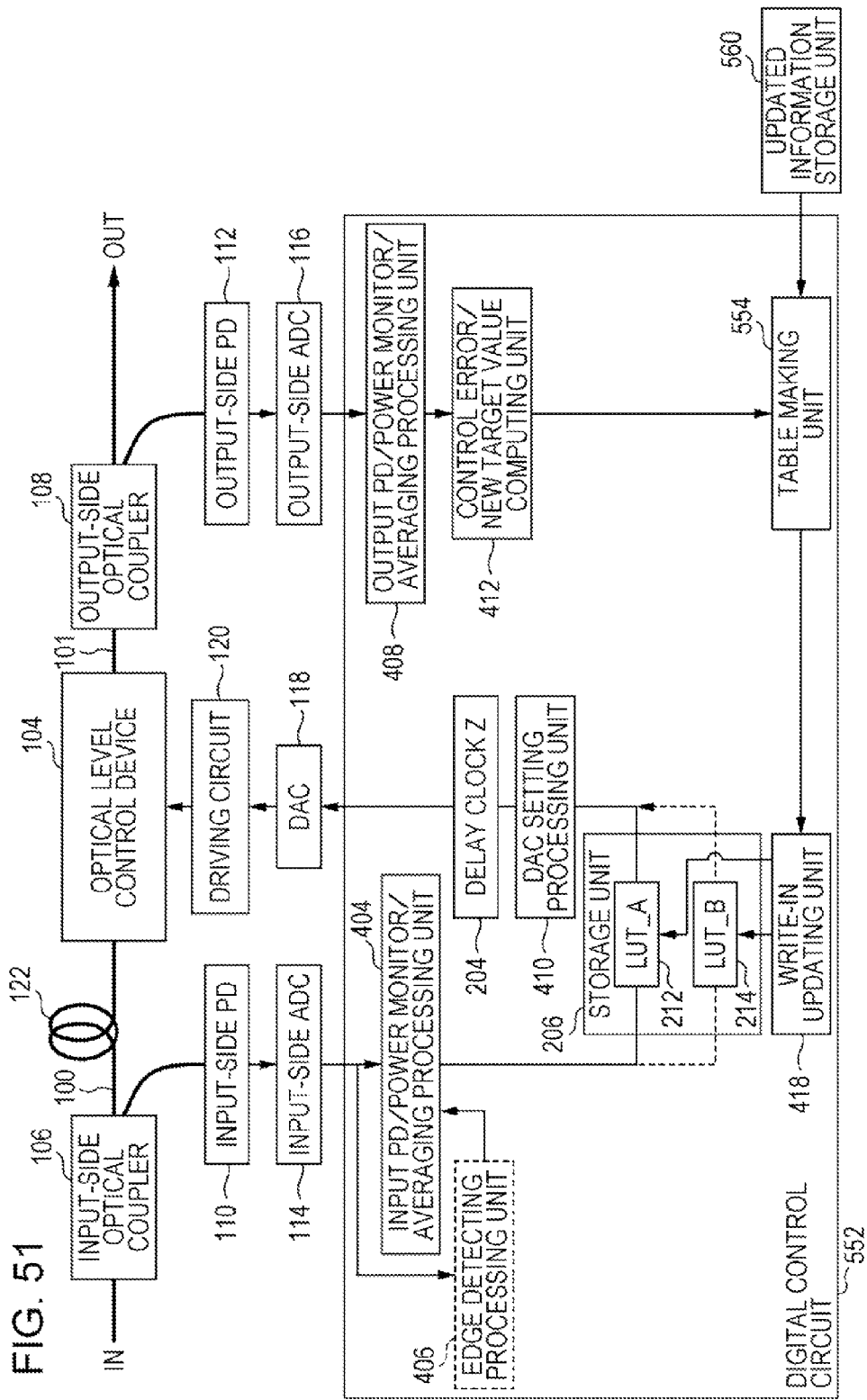
FIG. 51 is a diagram illustrating an example of a level control system relating to a seventh embodiment.
Figure 52:
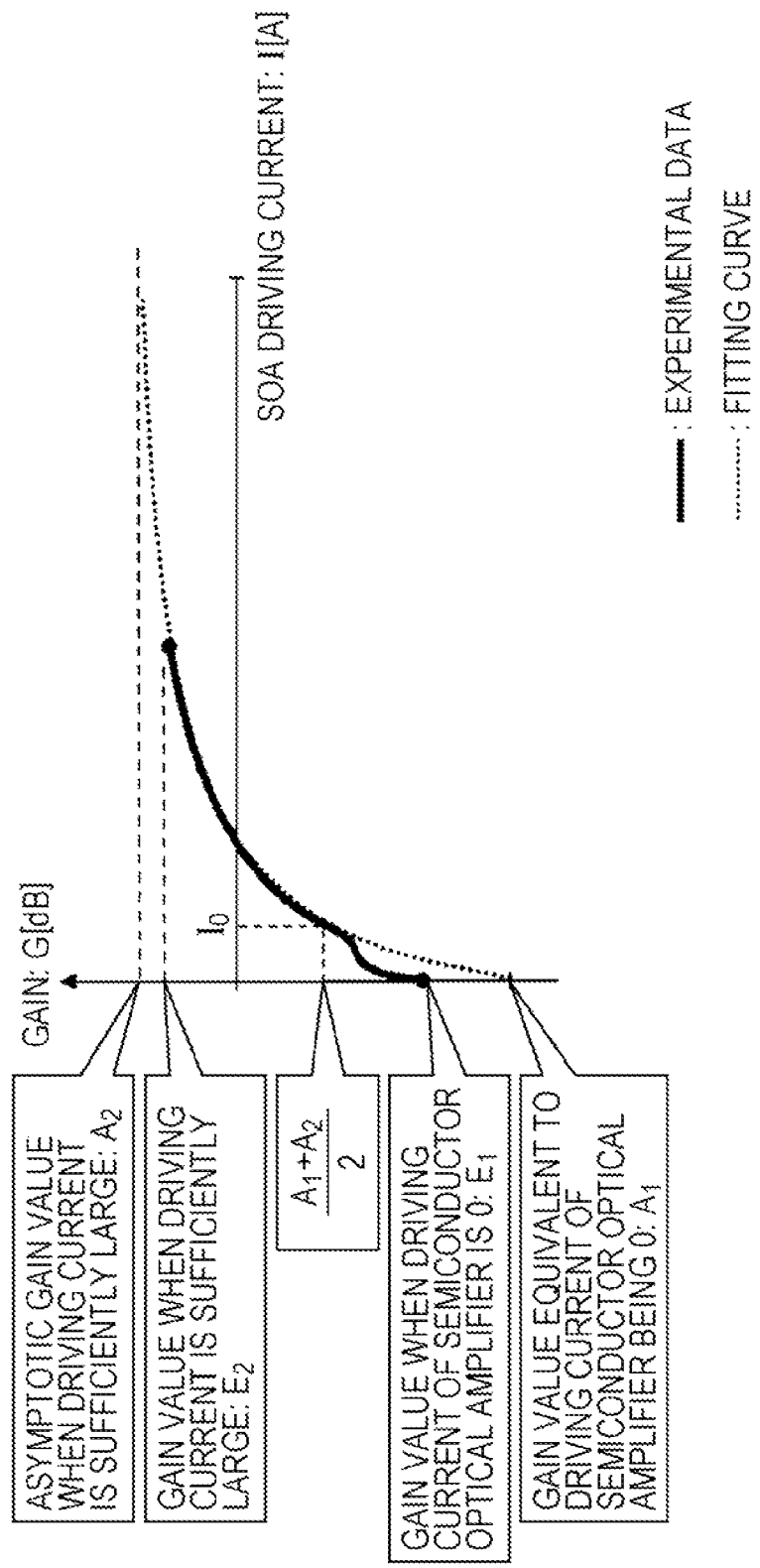
FIG. 52 is a diagram illustrating an example of a level control device property.
Figure 53:
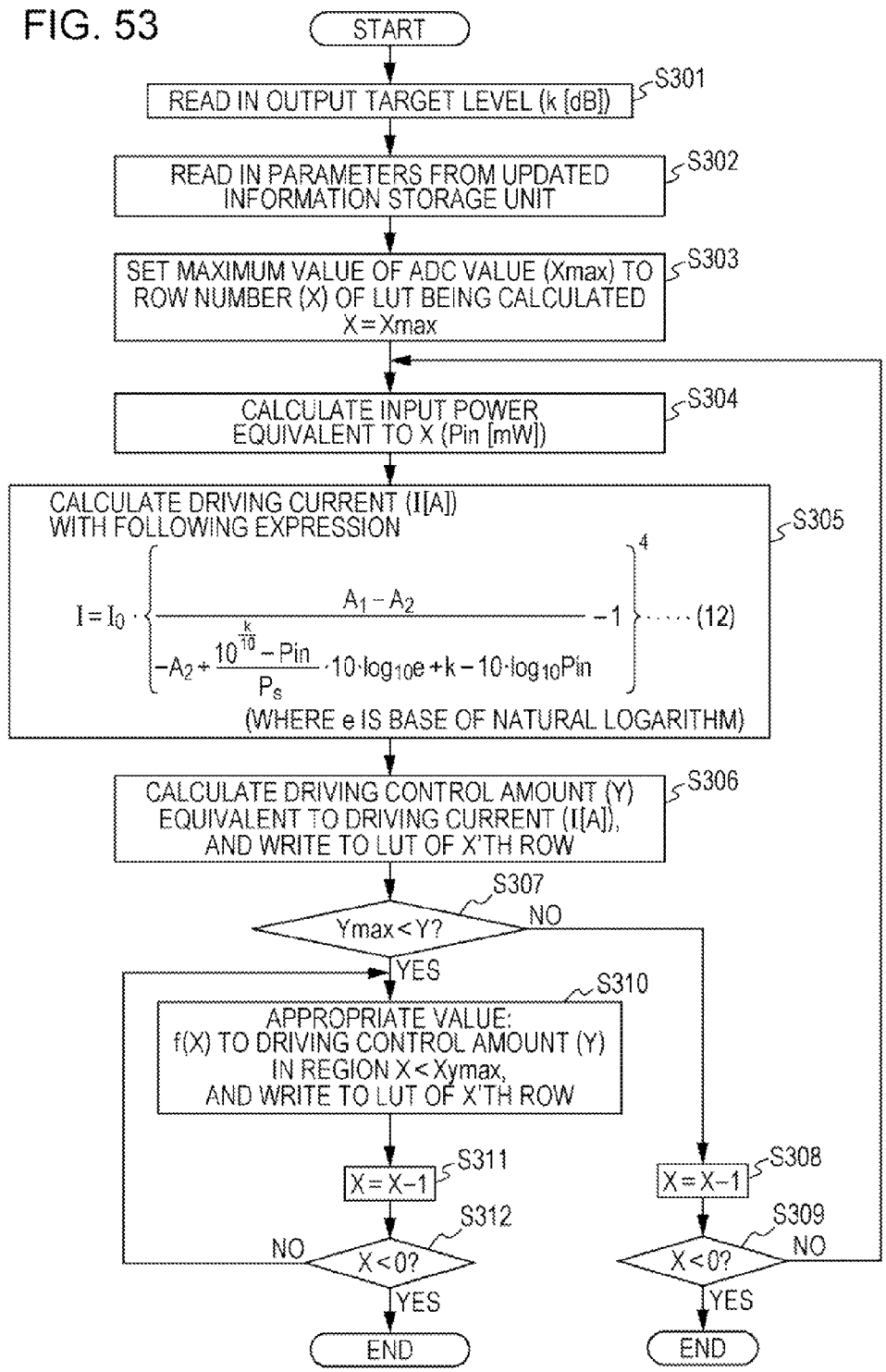
FIG. 53 is a flowchart illustrating an example of table creating processing.
Figure 54A:
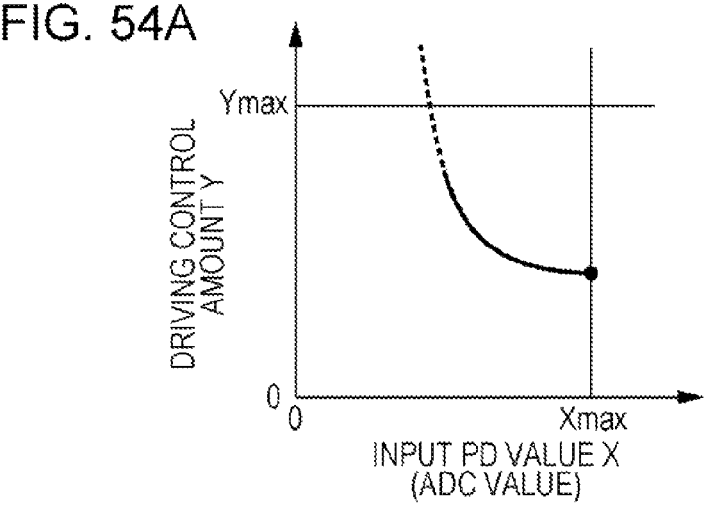
FIGS. 54A, 54B, and 54C are diagrams illustrating an example of a driving control amount as to an input PD value.
Figure 54B:
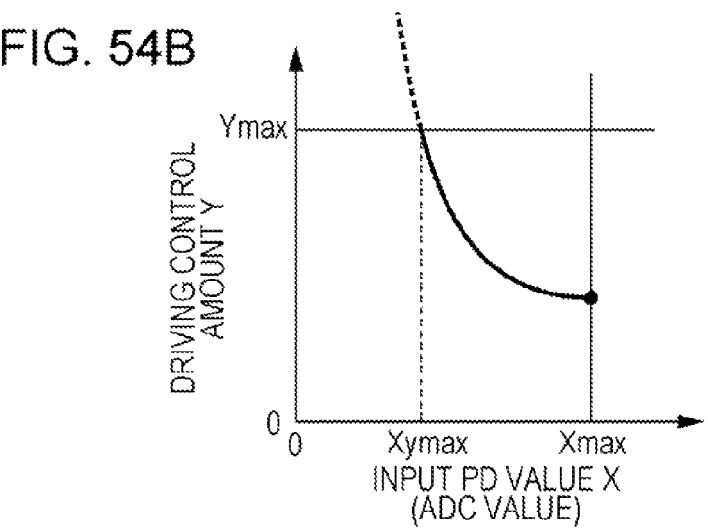
Figure 54C:
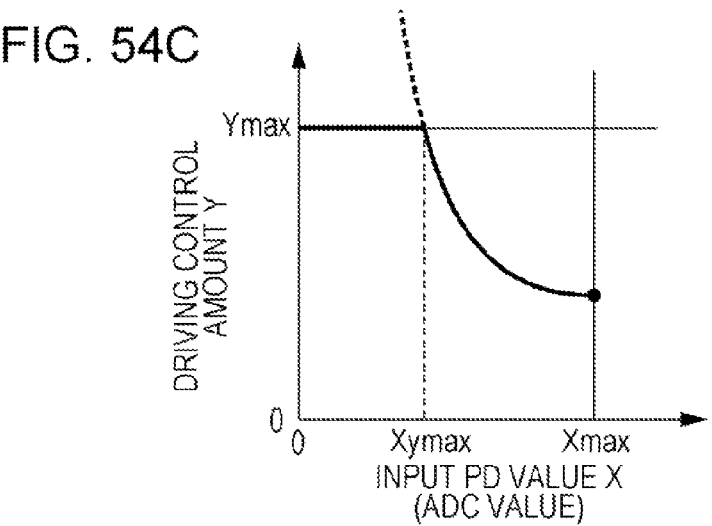
Figure 55:
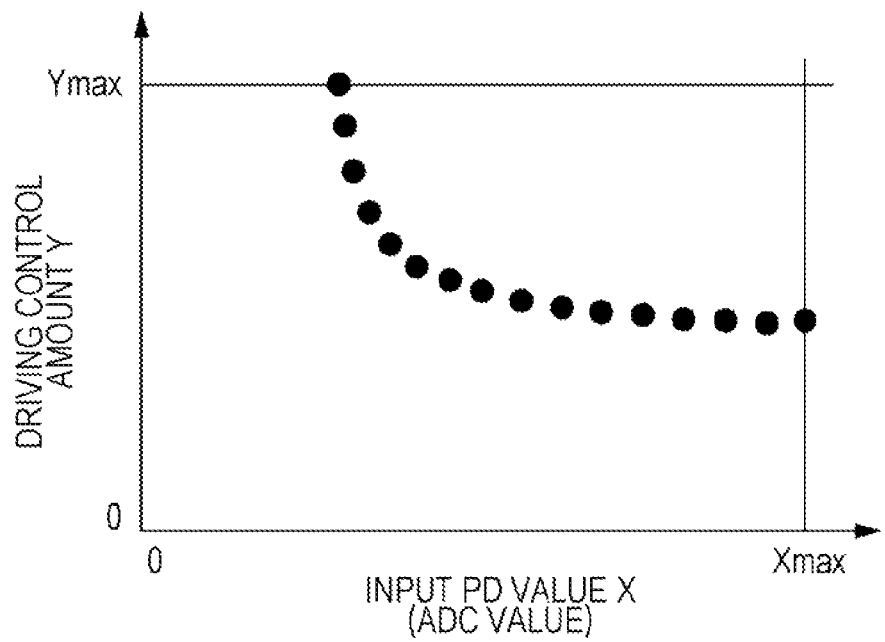
FIG. 55 is a diagram illustrating an example of points for creating values.
Figure 56:
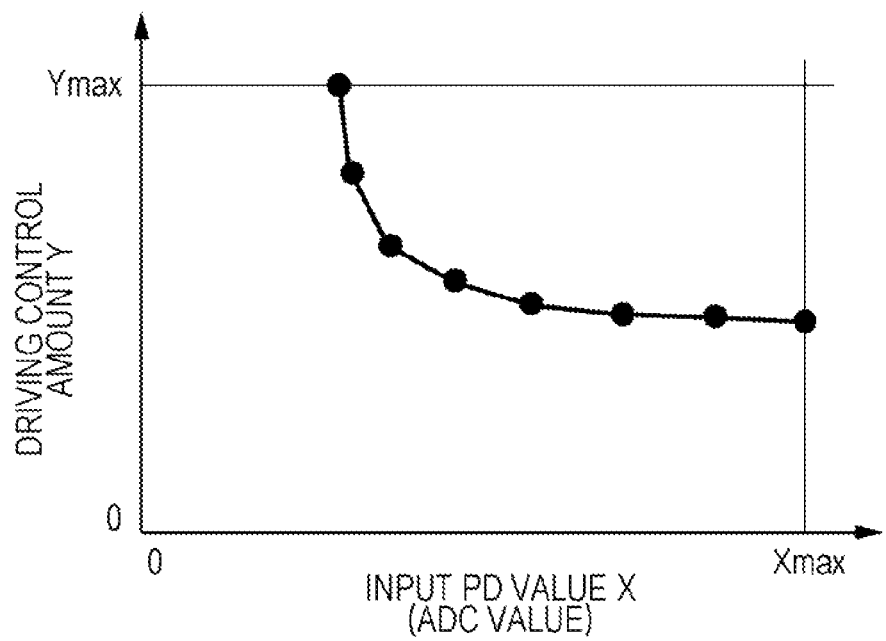
FIG. 56 is a diagram illustrating an example in the case of reducing the number of value creations.
Figure 57:
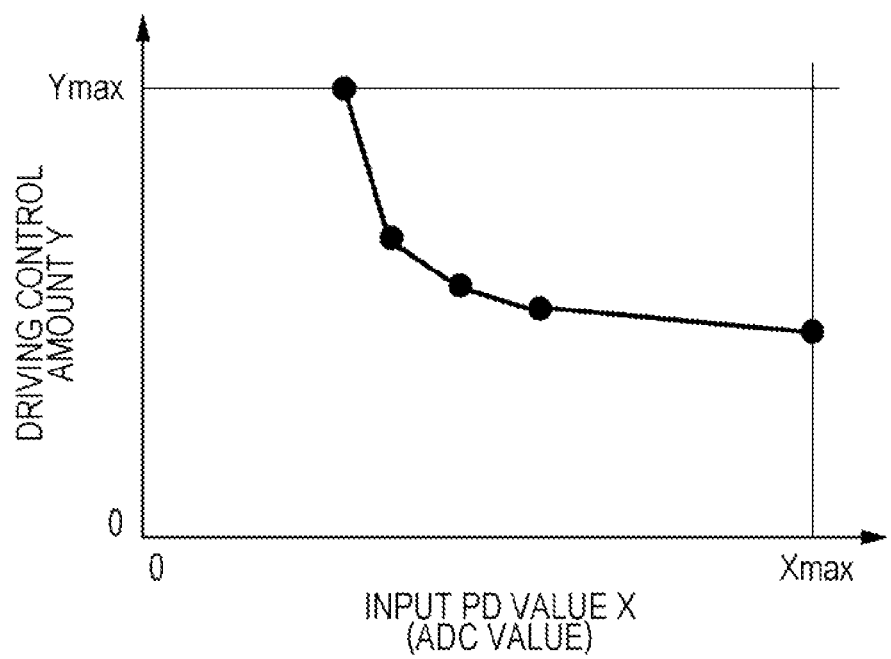
FIG. 57 is a diagram illustrating an example in the case of reducing the number of value creations.

FIGS. 51 through 59 will be referenced to describe the seventh embodiment. FIG. 51 is a diagram depicting an example of the level control system relating to the seventh embodiment, FIG. 52 is a diagram depicting an example of a property of a level control device, FIG. 53 is a flowchart depicting an example of table creating processing, and FIGS. 54A, 54B, 54C are diagrams depicting an example of the driving control amount as to the input PD value. FIG. 55 is a diagram depicting an example of a point for creating a value, FIG. 56 is a diagram depicting an example in the case of reducing the number of created values, FIG. 57 is a diagram depicting an example in the case of reducing the number of created values, FIGS. 58A, 58B are diagrams depicting an example of settings of the driving control amount as to the input PD value, and FIGS. 59A, 59B are diagrams depicting an example of setting the driving control amount as to the input PD value. The arrangement depicted in FIGS. 51 through 59 is an example, and the present invention is not limited to the arrangement. The portions in FIG. 51 that are the same as those in FIGS. 5, 11, 12, 20, 23, and 50 have the same reference numerals appended thereto. Note that the ADC values in FIGS. 54 through 59 indicate values received from the ADC, and are examples of an input PD value.

According to the present embodiment, a complete table is created using the property values of the optical level control device. Thus, as depicted in FIG. 51, the digital control circuit 552 has a control error/new target value computing unit 412, table creating unit 554, and write-in updating unit 418. Also, the digital control circuit 552 has an updated information storage unit 560 which is connected to the digital control circuit 552. The other configurations are similar to those in the third embodiment, so the descriptions thereof will be omitted. Note that the control error/new target value computing unit 412, table creating unit 554, and write-in updating unit 418 are examples of the information updating unit 6 (FIG. 1).

The control error/new target value computing unit 412 is an example of means to compute the difference between input values and output target levels, and is an example of a computing unit. The control error/new target value computing unit 412 has a control error computing function and a new target value computing function, and computes the output target levels.

The updated information storage unit 560 is an example of means to store information, and is made up of a ROM, magnetic medium, magneto-optical medium, or the like, for example. An EEPROM (Electrically Erasable Programmable ROM), flash memory, or the like may be used for the ROM.

The updated information storage unit 560 stores updated information used for the creation of the complete table. The updated information includes property values of the optical level control device, constants, coefficients and the like. The updated information is supplied to the table creating unit 554.

The table creating unit 554 is an example of means to create a table. The table creating unit 554 is installed between the updated information storage unit 560 and the write-in updating unit 418, receives the output target level from the control error/new target value computing unit 412, and creates a table using the updated information from the updated information storage unit 560. Note that the table created by the table creating unit 554 is used for updating the control information. In other words, the table created by the table creating unit 554 is an example of updated control information.

The write-in updating unit 418 is an example of means to write in data and perform updating. The write-in updating unit 418 is installed between the table creating unit 554 and storage unit 206, receives data from the table creating unit 554, and writes into the LUT_A 212 and LUT_B 214 of the storage unit 206 as well as notifies the switchover between the LUTs.

The relation between the input PD values and driving control amounts depends on the output property of the level control device and driving control amounts. Thus, the LUT data is created from the property of the level control device and so forth. Thus, the table is created using property data without using the data stored in the LUT and the original data thereof, whereby storage capacity may be suppressed.

In the case of controlling a semiconductor optical amplifier (SOA) with the current output circuit, the SOA driving current is obtained by using the next five constants of (value a) through (value e), an output target level value, and input PD value, and the driving control amount is obtained by multiplying a proportional constant α and proportional constant β by the driving current. The obtained driving control amount and input side PD value are correlated, and output as an LUT table. Note that the five constants of (value a) through (value e), proportional constant α, and proportional constant β are stored in the updated information storage unit 560 as updated information, and are read out in the event of creating a complete table to create a table. Also, the SOA is an example of an optical level control device.

(Value a) Gain value equivalent to when the SOA driving current is 0: $A_1$ (unit: dB)

(Value b) Asymptotic gain value when SOA driving current is sufficiently large: $A_2$ (unit: dB)

(Value c) Driving current value corresponding to gain wherein gain value $A_1$ and gain value $A_2$ are averaged with a decibel value (dB value): $I_0$ (unit: A)

$I_0$ is the SOA driving current value when the gain is $(A_1+A_2)/2$.

(Value d) Parameter q indicating the non-linear nature of the relation between current and gain.

Parameter q is a parameter that originates from the SOA gain property as to the driving current. Parameter q is a numerical value of 0.5 or greater and 2 or less, and has no unit.

(Value e) Saturation light output: Ps (unit: mW)

The saturation light output is determined by the output property of the light of the SOA. As an example of a typical value, $P_S$ is 10 mW.

The proportional constant α (unit: mW/LSB) is a constant for converting ADC values into input power, and is obtained by dividing the input power by the maximum ADC value (Xmax). For example, in the case that the input power is 0.25 mW and the maximum ADC value is 4,095, the proportional constant α is computed as input power/Xmax=0.25/4,095=6.11×10$^{-5}$ (mW/LSB).

The proportional constant β (unit: LSB/A) is a constant for converting the driving current into the driving control amount of the SOA, and is obtained by dividing the maximum driving control amount (Ymax) by the driving current. For example, in the case that the driving current is 0.3 A and the driving control amount of the maximum level control device is 16,383, the proportional constant β is computed as Ymax/driving current=16,383/0.3=54,610 (LSB/A).

In the case of controlling the level control device with the voltage output circuit, the next four constants of value (f) through value (i) are further stored, and the driving control amount is obtained based on these constants and the SOA driving current that has been obtained. In this case, the SOA driving voltage is obtained using an expression that indicates the SOA current-voltage property and the driving control amount is obtained by multiplying a proportional constant by the driving voltage herein. The input PD value and the driving control amount that has been obtained are correlated and output as an LUT table.

These constants are stored in the storage unit 206, and read out in the event of creating a complete table, and table creating processing is performed.

(Value f) SOA saturation current: $I_S$ [unit: A]

For example, $I_S$ is $10^{-13}$ A.

(Value g) Coefficient: n

A coefficient n is a coefficient that depends on the physical phenomenon that is a primary cause of a diode current. An ideal diode is the primary cause of a diffusion phenomenon diode current of a minority carrier, whereby n=1, but since current is added by a recombination phenomenon with the actual diode, the coefficient becomes greater than 1 and smaller than 2. Note that the coefficient n has no unit.

The coefficient n is set by adjusting the current-voltage property of the SOA obtained by calculation so as to match the SOA feature used for level control.

(Value h) Threshold voltage: $V_t$

The threshold voltage is obtained by (Boltzmann constant (unit: J/K))×(absolute temperature of SOA (unit: K))/(elementary charge=1.6021773 (unit: C)). Here, the Boltzmann constant is 1.380658×10$^{-23}$ J/K, the elementary charge is 1.6021773, and the absolute temperature of SOA is obtained by measuring the temperature of SOA.

(Value i) SOA internal resistance: $R_S$ (unit: Ω)

A proportional constant γ (unit: LSB/V) is a constant for converting the driving voltage to a driving control amount of the level control device. For example, in the case of corresponding the 1.6V driving voltage to the driving control amount of the maximum level control device, i.e. to 16,383, the proportional constant γ is computed as Ymax/driving voltage=16,383/1.6=10,239 (LSB/V).

Next, FIG. 52 is referenced regarding the relations of gain value $A_1$, gain value $A_2$, driving current value: $I_0$ and parameter q. FIG. 52 is a diagram depicting an example of features of the SOA. The property depicted in FIG. 52 is an example, and the present invention is not limited to this property.

The gain value is used for the LUT computation at a time that the gain value when the driving current is 0 and the gain value when the driving current is sufficiently large, i.e. the state of the gain is saturated. The relation of the gain G and driving current A of the SOA is obtained as experimental data by measuring the SOA property thereof. However, as depicted in FIG. 52, in the vicinity of the driving current value being 0 ($E_1$), the gain is small, whereby an accurate value may not be obtained due to measurement error and so forth. Also, in the case of increasing the driving current in an experiment ($E_2$), a saturated state of the gain may not be obtained. Thus, of the data obtained by measurement experiments, a fitting curve that matches the data excluding the data in the vicinity of the driving current value being 0 is obtained, and a gain value wherein the driving current on the fitting curve is 0 and a gain value in the case that the driving current is infinitely large are obtained. That is to say, the value $A_1$, which is equivalent to the time that the driving current is 0, indicates the gain value at the time that the driving current is 0 on the driving current fitting curve, and the asymptotic gain value $A_2$, when the driving current is sufficiently large, indicates the gain value at the time the fitting curve driving current is infinitely large. Note that the value $E_1$ is at the gain value when the driving current of the semiconductor light amplifier is 0, and the value $E_2$ is the gain value when the driving current is sufficiently large.

The fitting curve is set as having a gain value G of $A_1$ when the driving current value I=0, a gain value G of $A_2$ when the driving current value I=infinitely large, and the current value is $I_0$ when the gain value is $(A_1+A_2)/2$, which is expressed in Expression (10). Expression (10) is a relational expression of the gain G and driving current I.

$$G = \frac{A_1 - A_2}{1 + \left(\frac{I}{I_0}\right)^{\frac{1}{q}}} + A_2 \quad (10)$$

The nonlinear degree of Expression (10) changes as the parameter q in Expression (10) is changed. In the fitting processing, by changing $A_1$, $A_2$, $I_0$, and q, the lines in Expression (10) and the experiment data are fit together, and the $A_1$, $A_2$, $I_0$, and q at this time are obtained. These values become, for example, −95 dB for $A_1$, 25 dB for $A_2$, $8\times10^{-3.4}$ for $I_0$, and 0.85 for q.

Next, FIG. 53 is referenced to describe the processing procedures to compute the LUT using the constants (value a) through (value i).

First, the output target level k (unit: dB) is read in from the control error/new target computing unit 412 (step S301), and the parameters used to create the table is read in from the updated information storage unit 560 (step S302). In this case, for example, parameters (value a) through (value i) and proportional constants α, β, and γ may be read in.

Next, the maximum value (Xmax) of the ADC value is set for the LUT row number X during calculation, and this is set in X=Xmax (step S303).

Next, input power (Pin (unit: mW)) equivalent to X is computed (step S304). Pin is a number that changes according to the value of X, and in the case that the input-side PD 110 current is amplified with a linear amplifier and is input in the input-side ADC 114, the ADC value becomes proportional to the input power with a milliwatt (mW) unit. In this case, Pin is expressed as in Expression (11).

$$Pin = \alpha \cdot X \quad (11)$$

Next, driving current I (unit: A) is computed (step S305). The driving current I is obtained by using k which has been read-in in step S301, the parameters read-in in step S302, the Pin read-in in Expression (11), and Expression (12). Pin is a number that changes according to the value of X, whereby the value of I corresponding to X may be obtained.

$$I = I_0 \cdot \left\{ \frac{A_1 - A_2}{-A_2 + \frac{10^{\frac{k}{10}} - P_{in}}{P_S} \cdot 10 \cdot \log_{10} e + k - 10 \cdot \log_{10} P_{in}} - 1 \right\}^q \quad (12)$$

Expression (12) depicts the relation between the driving current I and input power Pin, and for example is obtained from Expressions (10) and (13). Expression (10) depicts the relation between the SOA gain G and driving current I, and Expression (13) depicts the relation between the SOA optical input power and gain G.

$$G = \frac{10^{\frac{k}{10}} - P_{in}}{P_S} \cdot 10 \cdot \log_{10} e + k - 10 \cdot \log_{10} P_{in} \quad (13)$$

Using the computed driving current I, the driving control amount Y of the level control device equivalent to driving current I is computed, and is written in the X'th row of the LUT (step S306). In the case that the circuit controlling the level control device is a current output circuit, the current value of the current output circuit is computed using Expression (14). Also, in the case that the circuit controlling the level control device is a voltage output circuit, the voltage value of the voltage output circuit is computed using Expression (15). Which expression is used to compute the driving control amount of the level control device is determined by the configuration of the driving circuit, and the expression to use is selected according to the driving circuit. Note that in Expressions (14) and (15), "Round( )" is a function which rounds the decimal points of the value within the parentheses, and changes this to an integer value.

$$Y = \text{Round}(\beta \cdot I) \quad (14)$$

$$Y = \text{Round}\left(\gamma \cdot \left\{I \cdot R_S + n \cdot V_t \cdot \log_e\left(\frac{I}{I_S} + 1\right)\right\}\right) \quad (15)$$

Note that Expression (16) depicts the relation between the SOA current and voltage properties, and Expression (15) is a Round value wherein the SOA voltage value is multiplied by the proportional constant γ.

$$V = I \cdot R_S + n \cdot V_t \cdot \log_e\left(\frac{I}{I_S} + 1\right) \quad (16)$$

In the relation between current and voltage properties in Expression (16), the relational expression of an ideal diode depicted in Expression (17) is corrected using the coefficient n. By performing this correction, an expression may be written which applies the relation between the current and voltage properties to an actual device. Note that the coefficient n is an emission coefficient, for example.

$$V'_D = \underbrace{\frac{kT}{q}\ln\left(1 + \frac{I_D}{I_S}\right) + \frac{r_S I_D}{V_n}}_{V_D} \quad (17)$$

The OSA property is, as depicted in FIG. 52, the curve wherein the gain G increases along with an increase in driving current, whereby the driving control amount of the level control device as to the ADC value of the LUT increases as the ADC value decreases from Xmax, as depicted in FIGS. 54A, 54B, 54C. However, in the case that the maximum value of the driving control amount has been reached, a higher numerical value may not be set. Expression (12) is a monotonically decreasing function, whereby following the driving control amount of the level control device becoming Ymax, the ADC value has to be fixed at value Ymax or set at a value smaller than Ymax. Thus, determination is made as to whether or not Y obtained in Expressions (14) or (15) is greater than Ymax (step S307). In the case that Y is smaller than Ymax (NO in step S307), the value of X is decreased by 1 (step S308), and in the case that the decreased X is 0 or greater than 0 (NO in step S309), steps S304 through S307 are repeated, the value of Y corresponding to the value of X is computed, and written in the LUT. In the case that the decreased X is smaller than 0 (YES in step S309), i.e., in the case that the computations of the driving control amount of the level control device corresponding to Xmax from 0 in the LUT have ended, the processing is ended.

As depicted in FIG. 54B, if we define X when the driving control amount of the level control device has reached Ymax as Xymax, the value of I as to X may not be computed in a region wherein the value of X is smaller than Xymax (X<Xymax). This is because Expression (12) is a monotonically increasing function and Expression (16) is a monotonically decreasing function, so the driving control amount (Y) will be a monotonically decreasing function as to the ADC value (X).

Thus, in the case that Y is greater than Ymax (YES in step S307), i.e. in a region wherein X is smaller than Xymax (X<Xymax), a predetermined value f(x) is allocated as the driving control amount Y, which becomes Y=f(x), and f(x) is written in the X'th row of the LUT (step S310).

In the case of setting the constant Ymax in f(x), in a region wherein the value of X is from 0 to Xymax, the value of Y becomes Ymax, as depicted in FIG. 54C. By setting the constant Ymax, even if the input power is weak and the driving control amount of the level control device is set as the maximum permitted value the target level optical output may not be output, SOA driving may be performed with the maximum permitted driving control amount of the level control device.

Processing to allocate f(x) to Y is repeated while decreasing the value of X by 1 (step S311) until the value of X becomes smaller than 0 (X<0) (NO in step S312), then determination is made as to whether or not the value of X is smaller than 0 (step S312), and in the case of being smaller than 0 (YES in step S312), the processing is ended.

Thus, all of the values of the driving control amount Y of the level control device corresponding to the ADC value X are obtained and may be written in to the LUT.

Features, advantages, or modifications or the like will be exemplified for the above-described seventh embodiment.

(1) As described above, the data stored in the LUT is created from properties and so forth. The data stored in the LUT or the data of the original data thereof is not needed since property data is stored, so storage capacity may be suppressed. Also, in the case of computing a driving control amount from the original data stored in the updated information storage unit 560, a threshold or the like may be set for control so that the driving control amount does not exceed the maximum permitted value. If created from a property or the like, in the case that the created driving amount of the level control device exceeds the value permitted as the maximum value of the control device driving amount, a desired value that is at or less than the maximum value of the driving control amount may be allocated in the processing of creating.

(2) As to the proportional constants α, β, and γ, an expression may summarize these proportional constants and a constant made up of the product thereof into one. That is to say, transition may be made to a unit system so that proportional constant α=1, proportional constant β=1, and proportional constant γ=1.

The proportional constants α, β, and γ may be summarized with other constants making up a product in an expression along with these proportional constants, whereby in the case that the driving circuit is the current driving circuit, the five constants (value a) through (value e) are to be stored in the updated information storage unit 560. Also, in the case that the driving circuit is the voltage driving circuit, the nine constants (value a) through (value i) are to be stored in the updated information storage unit 560. Also, in the case of the voltage driving circuit, (value g) and (value h) are summarized as value n·Vt, and (value c) and (value f) are summarized as value $I_0/I_S$, whereby seven constants is be stored in the updated information storage unit 560.

(3) Since there is not much updated information requested for the creation of a table, data may be stored in a secured storage region within the digital control circuit 552. For example, the updated information may be stored in the storage unit 206, and the table creating unit 554 may read out the updated information from the storage unit 206.

(4) If we obtain the value of Y while reducing X from Xmax one at a time, Expression (12) is used to compute all of X until the driving control amount Y of the level control device becomes Ymax, as depicted in FIG. 55. Thus, in order to shorten the LUT computing time, the number of times that the driving control amount Y is obtained may be reduced. When the number of times to compute Y is reduced, the number of calculations of Expression (12) which includes computations such as logarithms or exponents may also be reduced, and time may be shortened.

For example, as depicted in FIG. 56, computations with Expression (12) may be performed once for every two points, once for every three points, or once for every n points, and the points not performing computation with Expression (12) are computed with interpolation.

In the case of performing computations with Expression (12) once for every two points, once for every three points, or once for every n points, in steps S308 and S311, the value of X may be set so as to be reduced by 2, 3, or n.

The interpolation of points not computed by Expression (12) is created by linking the data of points with a linear function wherein adjacent Ys are computed. The processing to link adjacent data points with a linear function is similar to the procedures of drawing out the data of the original data according to the fifth embodiment, so the description thereof will be omitted. Interpolation by straight lines is superior from the perspective of shortening calculation time. Also, in the case of prioritizing precision, a highly precision interpolation method may be used, such as polynomial interpolation (Lagrange interpolation) or section polynomial interpolation (spline interpolation).

(5) In order to further reduce the points for computing the value of Y, in a region having a greater slope of Y the points for computing Y have smaller spacing therebetween, and in a region having a smaller change in the slope of Y the points for computing Y have greater spacing therebetween, as depicted in FIG. 57. Thus, LUT computing time may be efficiently shortened. Note that in regions having a greater Y slope or smaller Y slope, the region may be set beforehand for each output level, for example, and in steps S308 and S311 determination may be made as to whether to decrease by 1 according to the value of X, or to decrease by a number greater than 1.

(6) In the case that the input power of the signal performing amplification is weak, and the target level of output light may not be output even when the driving control amount of the level control device is at the maximum permitted value, the value of the driving control amount Y is defined. Consequently, Y is calculated using Expression (12), and the value of Y may be prevented from becoming undefined.

Figure 58A:
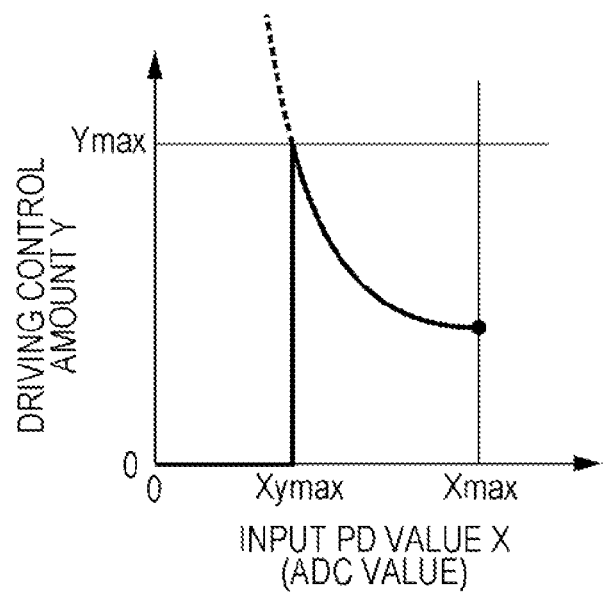
FIGS. 58A, 58B are diagrams illustrating an example of a setting for a driving control amount as to an input PD value.

(7) For a region wherein the value of the ADC value (X) having weak input power is in a region ranging from 0 to Xymax, for example as depicted in FIG. 58A, the value of Y may be set to 0 and the level control device output may be controlled to be 0. If the input power is weak and the target power output may not performed even if the power is amplified by the level control device, power may be suppressed by not performing driving of the level control device. In this case, in step S310, f(x)=0 will suffice.

Figure 58B:
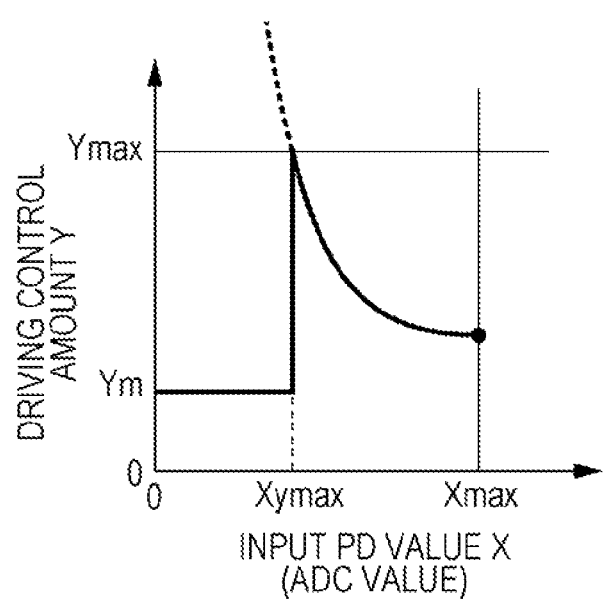

(8) For a region wherein the value of the ADC value (X) having weak input power is in a region ranging from 0 to Xymax, for example as depicted in FIG. 58B, the value of Y may be set to a constant Ym, and the control device may be weakly driven so as to be controlled in an idling state. By causing the level control device to idle, the output property stabilizes early on in the case that the ADC value (X) reverts to the normal operation which is Xymax<x<Xmax. In this case, in step S310, f(x)=Ym(constant) will suffice.

Figure 59A:
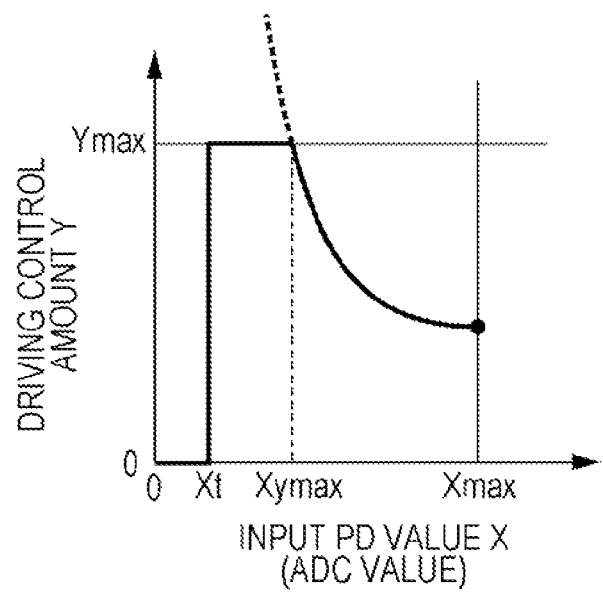
FIGS. 59A, 59B are diagrams illustrating an example of a setting for a driving control amount as to an input PD value.

(9) For a region wherein the value of the ADC value (X) having weak input power is in a region ranging from 0 to Xymax, for example as depicting in FIG. 59A, the threshold Xt is set. In a region wherein Xt<x<Xymax or Xt=X, output of the target power may not be performed, but the level control device may be driven with the maximal power available. In the X<Xt region, the input signal is deemed to be a noise level and so driving of the level control device is not performed. In the X<Xt region, power may be suppressed by not driving the level control device. In this case, in step S310, f(x)=Ymax(Xt<X, Xt=X), f(x)=0(Xt>X) will suffice.

Figure 59B:
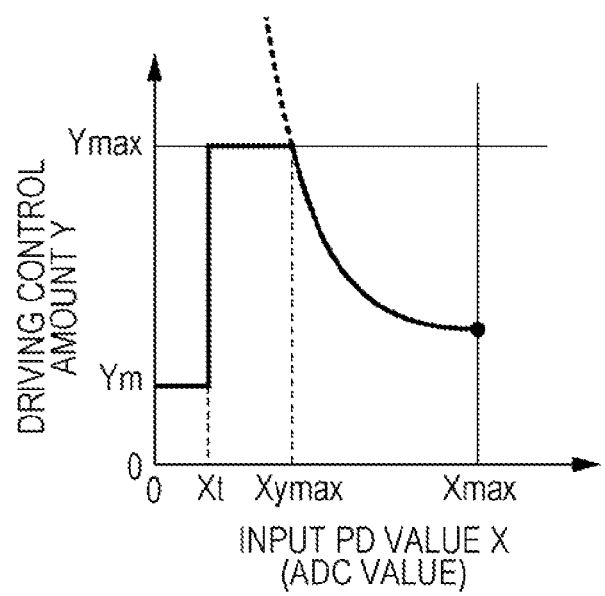

(10) For a region wherein the value of the ADC value (X) having weak input power is in a region ranging from 0 to Xymax, for example as depicted in FIG. 59B, the threshold Xt is set. In a region wherein Xt<x<Xymax or Xt=X, output of the target power may not be performed, but the level control device may be driven with the maximal power available. In the X<Xt region, the input signal is deemed to be a noise level, whereby the level control device is weakly driven so as to be in an idling state. By causing the level control device to idle, the output property stabilizes early on in the case that the ADC value (X) reverts to the normal operation which is Xt or greater. In this case, in step S310, f(x)=Ymax(Xt<X, Xt=X), f(x)=Ym(Xt>X) will suffice.

Eighth Embodiment

Figure 60:
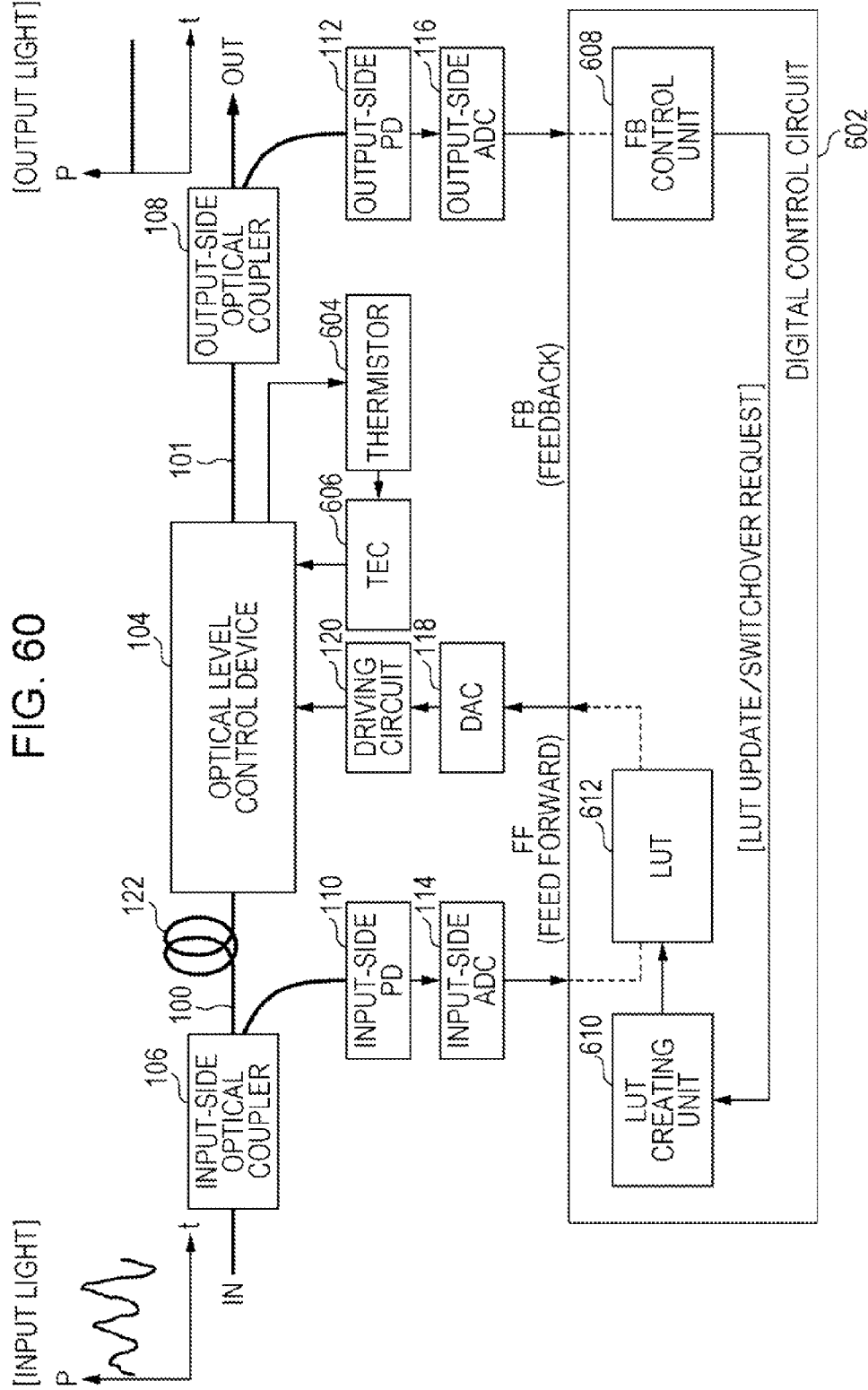
FIG. 60 is a diagram illustrating an example of a level control system relating to an eighth embodiment.

FIG. 60 is referenced to describe the eighth embodiment. FIG. 60 is a diagram depicting a configuration example of the control circuit according to the eight embodiment. Note that the configuration depicted in FIG. 60 is an example, and the present invention is not limited to such configuration. The portions in FIG. 60 similar to those in FIGS. 5, 11, 12, 20, 23, 50, and 51 have the same reference numerals appended thereto.

According to the present embodiment, the optical level control device 104 is maintained at a constant temperature. The output of the optical level control device 104 is thus stabilized. Thus, according to the present embodiment, a thermistor 604 and TEC (thermo-electric cooler) 606 are provided. Also, the digital control circuit 602 has an FB control unit 608 and LUT creating units 610 and 612. Note that the FB control unit 608 and LUT creating unit 610 are examples of the information updating unit 6 (FIG. 1).

The thermistor 604 is an example of means to measure temperature. The thermistor 604 has a semiconductor device wherein electrical resistance changes according to the temperature difference, for example, and the temperature changes may be exchanged for electrical signals. The thermistor 604 monitors the temperature of the optical level control device 104, and also generates temperature control information and controls the TEC 606.

The TEC 606 is an example of means to perform temperature adjustment. With the TEC 606, for example by DC current flowing through the TEC 606, heat is transmitted from the surface on one side of the TEC 606 to the surface on the other side. Consequently, a function is provided to cool the surface on one side and heat the surface on the other side. With control by the thermistor 604, the TEC 606 heats or cools the optical level control device 104 and maintains the optical level control device 104 at a constant temperature. The temperature of the optical level control device 104 is maintained at 25° C., for example.

The FB control unit 608 receives the output-side PD value, and requests updating the control information stored by the LUT 612 and switching of the control information as to the LUT creating unit 610.

The LUT creating unit 610 is an example of means to create data expanded in the LUT 612. The creating unit 610 receives the request from the FB control unit 608, creates the control information, and performs updating and switching of the control information of the LUT 612.

The LUT 612 is an example of means to store control information, and is an example of a storage unit. The LUT 612 stores the level control amount as control information, as depicted in FIG. 2.

The other configurations herein are similar to those of the second embodiment, so the descriptions thereof will be omitted.

Ninth Embodiment

Figure 61:
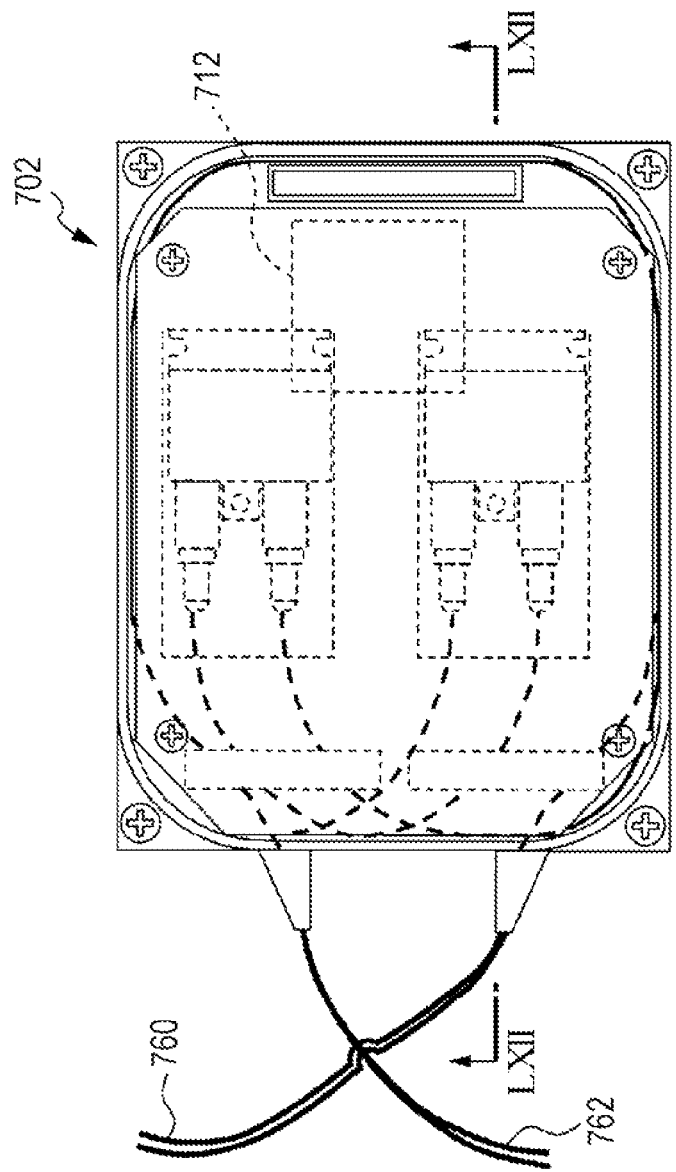
FIG. 61 is a diagram illustrating an example of a front view of a level control system relating to a ninth embodiment.
Figure 62:
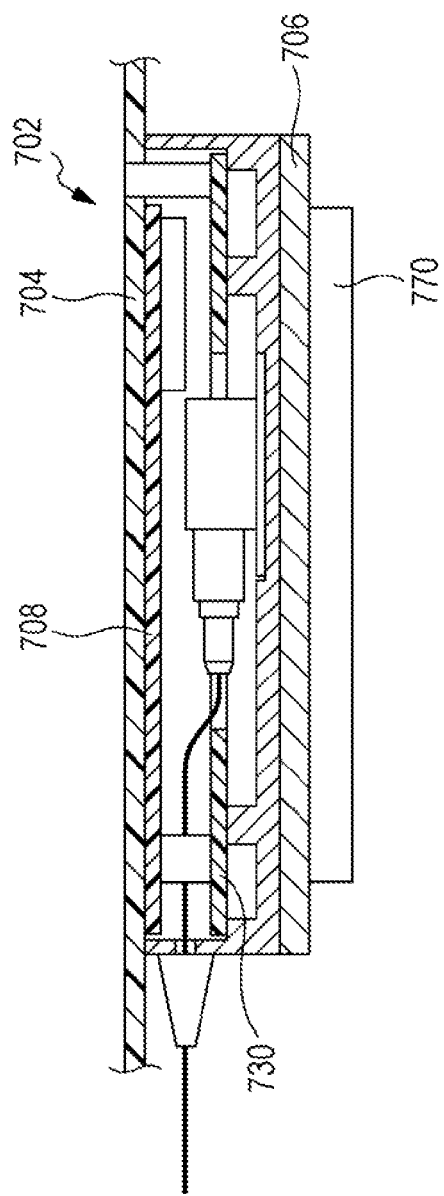
FIG. 62 is a diagram illustrating a cross-sectional view along the line LXI-LXI in FIG. 61.
Figure 63:
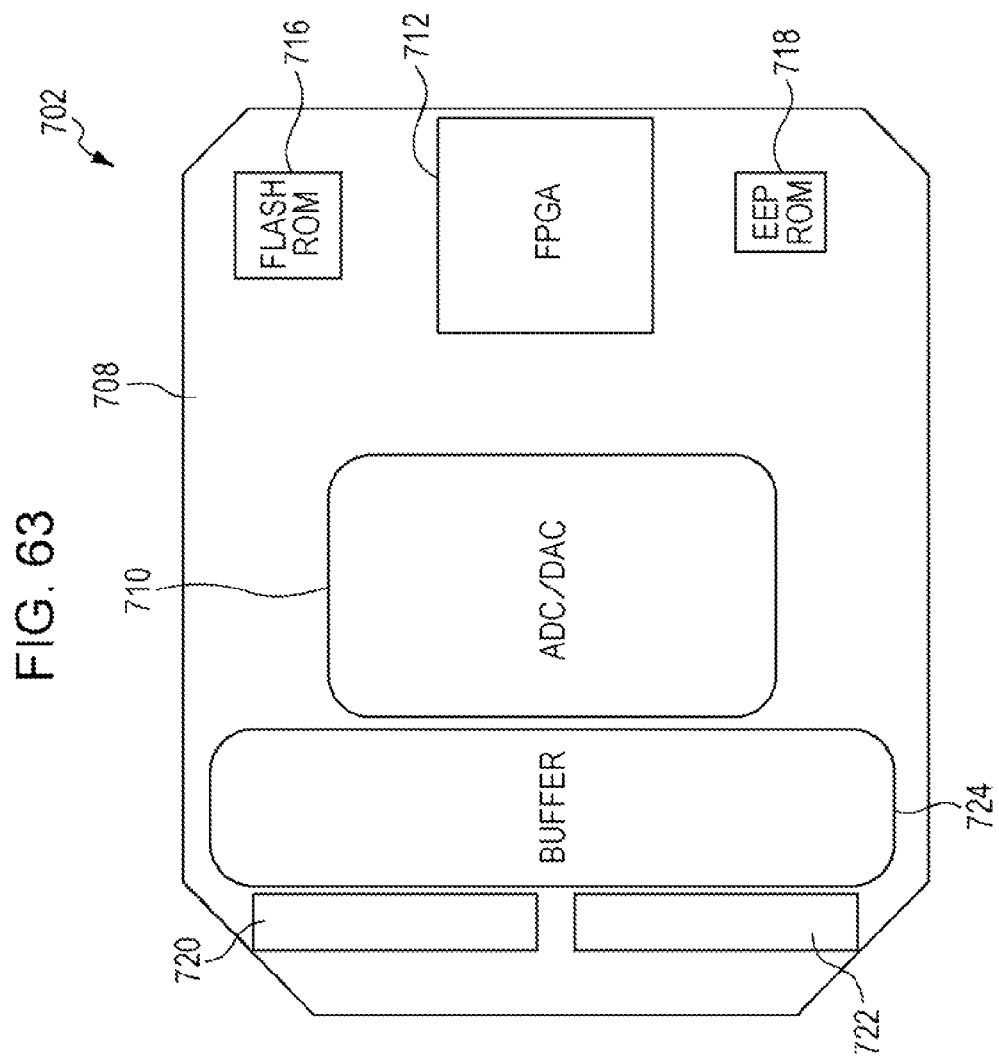
FIG. 63 is a diagram illustrating an example of an upper side substrate.
Figure 64:
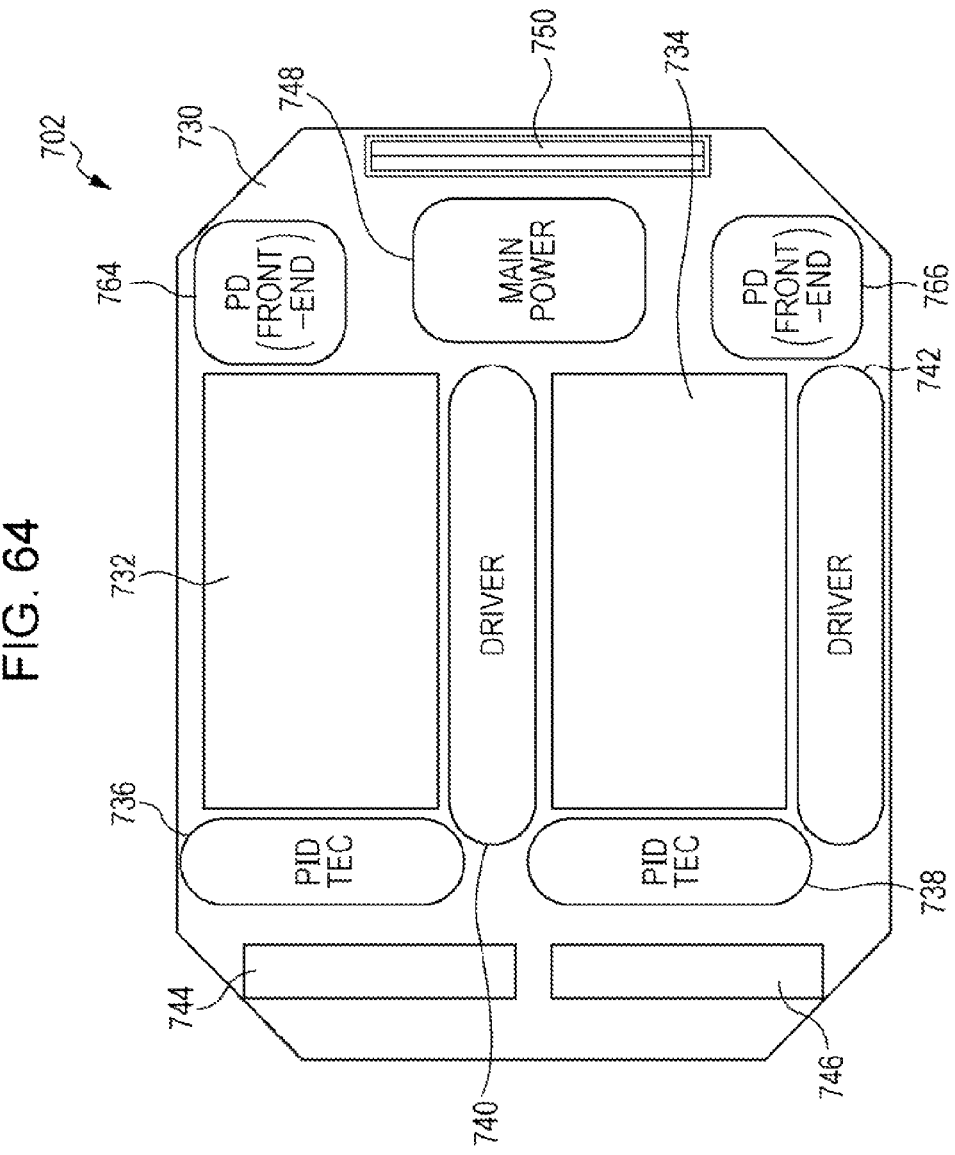
FIG. 64 is a diagram illustrating an example of a lower side substrate.

FIGS. 61 through 64 will be referenced to describe a ninth embodiment. FIG. 61 is a diagram depicting an example of a front view of a level control system relating to the ninth embodiment, FIG. 62 is a diagram depicting the line LXI-LXI cross-sectional view in FIG. 61, FIG. 63 is a diagram depicting an example of an upper-side substrate, and FIG. 64 is a diagram depicting an example of a lower-side substrate. The configurations depicted in FIGS. 61 through 64 are examples, and the present invention is not limited to such configurations.

According to the present embodiment, two level control circuits are disposed within a casing to configure one unit. By providing two control circuits, level control may be performed for a signal within two different transfer paths. For example, of a signal flowing in two directions within the transfer path, levels of both of these may be controlled with one unit. Thus, a level control unit 702 has an upper-side casing 704 and a lower-side casing 706.

As depicted in FIG. 62, an upper-side substrate 708 is disposed in the upper-side casing 704. The upper-side substrate 708 is a control circuit substrate for example, and as depicted in FIG. 63, has a digital-analog converter (ADC/DAC) 710, FPGA 712, flash ROM 716, EEPROM 718, connectors 720 and 722, and buffer 724 installed thereupon. Also, as depicted in FIG. 62, the lower-side casing 706 has a lower-side substrate 730. The lower-side substrate 730 is a driving circuit and thermo-regulatory circuit substrate, as depicted in FIG. 64, has level control devices 732 and 734, thermo-regulatory circuits 736 and 738, drivers 740 and 742, connectors 744 and 746, power source unit 748, connector 750, PD 764, and PD 766 installed thereupon. Also, on the outer side of the floor portion of the lower-side casing 706, a heat sink 770 is attached, whereby heat exchange may be performed between the inside of the casing and the outside.

The digital-analog converter 710 has an ADC and DAC, and converts analog signals to digital signals and converts digital signals to analog signals. The ADC and DAC are examples of the entrance side ADC, exit side ADC, and DAC.

The FPGA 712 is an example of a digital control circuit. The FPGA has two signal level control functions, and controls two signal levels.

The flash ROM 716 is an example of storage means, and for example is a storage unit, and is a program storage unit of the FPGA 712. The flash ROM 716 stores the configurations and parameters of the FPGA 712. By expanding the program of the ROM 716 in the FPGA, firmware processing is performed with the FPGA.

The EEPROM 718 is an example of storage means, and is an example of the updated information storage unit.

The connectors 720 and 722 are examples of connecting means. By connecting to the connectors 744 and 746 disposed on the lower-side substrate 730, the signals between the upper-side substrate 708 and lower-side substrate 730 are connected.

The buffer 724 is an example of means to use in the case of suppressing waveform deterioration of the digital signal due to noise, or adjusting timing. Thus, the buffer 724 is installed in the case of use in an environment wherein waveform deterioration due to noise is likely to occur.

The level control devices 732 and 734 are examples of means to control the signal levels, and for example are optical level control devices.

The thermo-regulatory circuits 736 and 738 are examples of temperature control means, and for example are temperature adjusting units. The thermo-regulatory circuits 736 and 738 have a TEC, whereby the TEC is controlled with PID control (Proportional Integrated Derivative Control), and the temperature of the level control devices 732 and 734 is adjusted. Note that the heat occurring between the thermo-regulatory circuits 736 and 738 and the lower-side casing 706 is exhausted to the outside via the heat sink 770. The heat sink 770 is an example of heat dissipation means, and for example is a heat dissipater.

The drivers 740 and 742 are examples of control means, and for example are driving circuits. The drivers 740 and 742 drive the level control device 732 and 734.

The power source unit 748 is an example of power supply means, and supplies electricity to the control circuit, driving circuit, and thermo-regulatory circuits.

The connector 750 is an example of connecting means. The supply of electricity to the power source unit 748 and the transmission and reception of data are performed by connecting with outside devices via the connector 750.

PD 764 and PD 766 are examples of the input-side PD and output-side PD.

The level control devices 732 and 734 each have a pair of fibers 760 and 762 connected thereto, and control the level of the optical signals flowing through the fibers 760 and 762.

According to the present embodiment, the FPGA 712 controls two levels. Also, the EEPROM 718 stores updated information of two levels of level control circuits. By unitizing two level controls, the control circuits and memory may be reduced.

Tenth Embodiment

Figure 65:
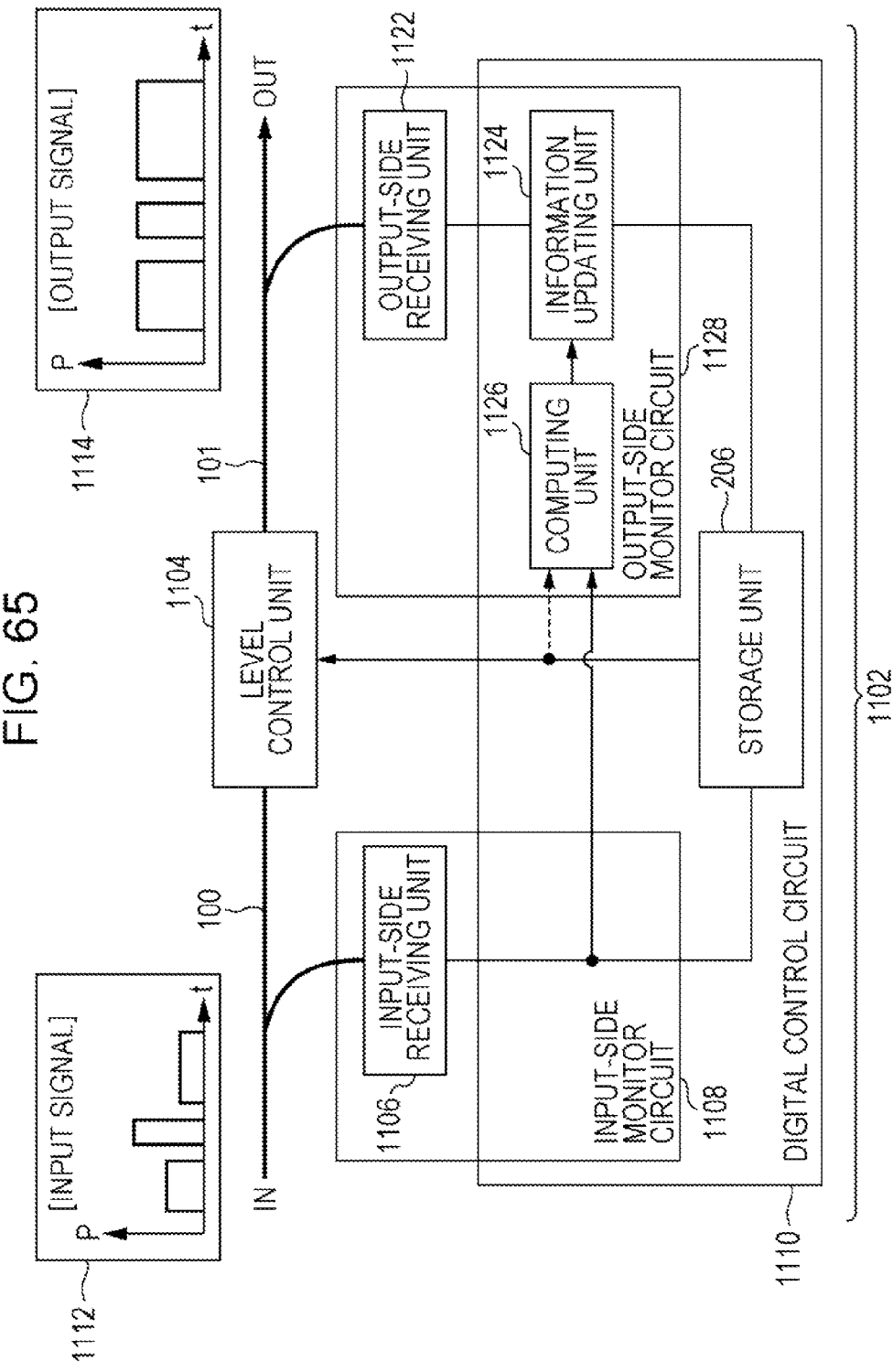
FIG. 65 is a diagram illustrating an example of a level control system relating to a tenth embodiment.

FIG. 65 will be referenced to describe a tenth embodiment. FIG. 65 is a diagram depicting an example of a level control system relating to the tenth embodiment. Note that the configuration depicted in FIG. 65 is an example, and the present invention is not limited to such configuration. The portions in FIG. 65 similar to those in FIGS. 5, 11, 12, 20, 23, 50, 51, and 60 have the same reference numerals appended thereto.

The level control system 1102 according to the tenth embodiment controls the level of an intermittent signal, for example. Note that the level control system 1102 herein corresponds to the level control of various intermittent signals, and for example performs level control of optical burst signals or optical packet signals.

A level control unit 1104 is an example of means to adjust the signal levels. For example, a level control device and a driving circuit for this level control device are included. As a level control device, for example an amplifier or an attenuator may be used. The level control unit 1104 receives the driving control amount output from the storage unit 206 with the driving circuit and drives the level control device. With the driving herein, the level of signal input from the input-side transfer path 100 is adjusted and output to the output-side transfer path 101.

An input-side receiving unit 1106 is an example of means to receive a signal before level control, and makes up an input-side monitoring unit. The input-side receiving unit 1106 makes up an input-side monitor circuit 1108. The input-side receiving unit 1106 monitors input-side intermittent signals, and as a result of monitoring, outputs the level of the signal before level control towards the storage unit 206 of a digital control circuit 1110.

Upon receiving the level of the signal before level control from the input-side receiving unit 1106, the storage unit 206 references the storage unit 206 to generate a driving control amount, and outputs the generated driving control amount to the level control unit 1104.

The level control unit 1104, input-side receiving unit 1106, and storage unit 206 operate at a higher speed than the cycle of intermittent signal variations, and subjects the signal level of the intermittent signal to FF control. Even if the input signal 1112 flowing through the input-side transfer path 100 includes intermittent signals having different levels, with an output signal 1114 flowing through the output-side transfer path 101 with the control of the level control unit 1104, each level may be a fixed intermittent signal. Note that the cycles of intermittent signal variations is the repeat cycle of the burst signal region 432 (FIG. 24) of the intermittent signal.

An output-side receiving unit 1122 is an example of means to receive the signal after level control, and makes up an output-side monitoring unit. The output-side receiving unit 1122 monitors the output-side intermittent signal, and as a result of monitoring, outputs the level of the signal after level control towards an information updating unit 1124.

A computing unit 1126 is an example of means to generate the signal state of the intermittent signal with computations. The computing unit 1126 is disposed within the digital control circuit 1110, and has a function to count the clock of the digital control circuit 1110. The computing unit 1126 receives the level of signals before level control output from the input-side receiving unit 1106, for example, and determines whether the intermittent signal is of the burst signal region 432 or the guard time region 434 (FIG. 24). In the case of the burst signal region 432, the time of the burst signal region 432 is counted based on the clock of the digital control circuit 1110. From the count results of the computing unit 1126, the ratio that the burst signal region 432 occupies within the intermittent signal may be computed as signal state information to indicate the state of the intermittent signal. As the ratio that the burst signal region 432 occupies within the intermittent signal increases, the information amount that the intermittent signal is transporting increases, and as the ratio decreases, the information amount transported by the intermittent signal decreases. That is to say, the signal state information indicates the information amount transported by the intermittent signal.

Also, in the case that the driving signal input in the level control unit 1104 is turned ON ("ON signal"), the computing unit 1126 counts the time of the ON signal based on the clock of the digital control circuit 1110. From the count results of the computing unit 1126, the ratio that the ON signal occupies in the driving signal, for example, may be computed as signal state information indicating the state of the intermittent signal. Note that the driving signal is an example of instruction information to instruct the driving or stopping of the level control device. The driving signal includes an ON signal indicating the driving of the level control device and an OFF signal indicating stopping the driving. The ON signal or OFF signal is identifying information that indicates instruction content, and is output from the storage unit 206 according to the signal before level control.

For example, in the case that the intermittent signal is in the guard time region 434 and the level of the signal before level control is low, an OFF signal is output to indicate stopping of the driving, and in the case that the intermittent signal is in the burst signal region 432 and the level of the signal before level control is high, an ON signal is output to indicate driving. Upon the ON signal driving signal having been input into the level control unit 1104, the level control unit 1104 starts driving after driving preparations are completed, or maintains the driving state. Alternatively, upon the OFF signal driving signal having been input into the level control unit 1104, the level control unit 1104 stops the driving or maintains the stopped state.

The computing unit 1126 may be arranged so as to obtain one or the other signals of the intermittent signal or driving signal, or may be arranged so as to obtain both signals. The signal state information computed by the computation unit 1126 is appended to an information updating unit 1124.

The information updating unit 1124 is an example of means to update the information. The information updating unit 1124 receives the signal level after level control from the output-side receiving unit 1122, while receiving signal state information from the computing unit 1126. Signal state information and the peak level (wave height value) of the signal after level control are computed based on the level of the signal after level control. The information updating unit 1124 updates the control information that the storage unit 206 stores according to the peak level of the signal herein.

The output-side receiving unit 1122, information updating unit 1124, and computing unit 1126 make up an output-side monitor circuit 1128. The output-side monitor circuit 1128 makes up the monitor circuit of the level control system 1102 along with the input-side monitor circuit 1108.

Figure 66A:
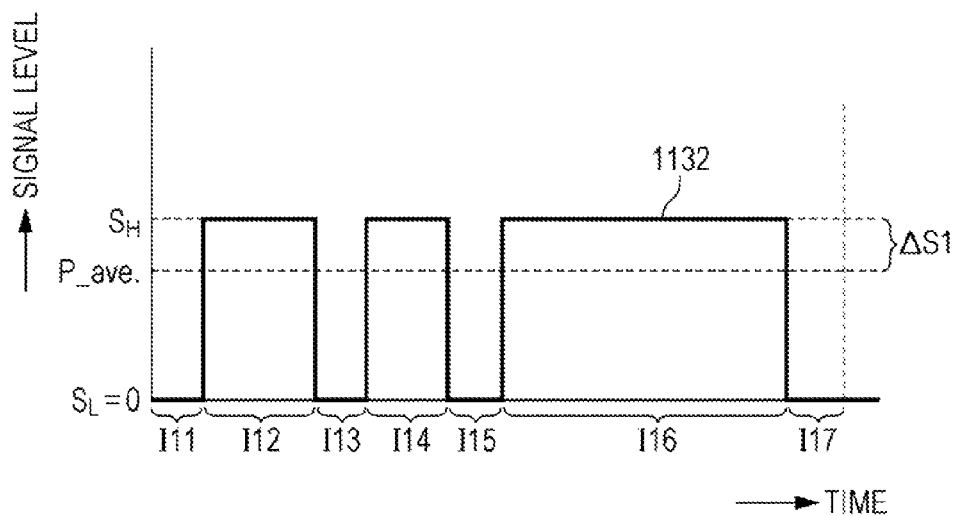
FIGS. 66A, 66B are diagrams illustrating an example of an intermittent signal.
Figure 66B:
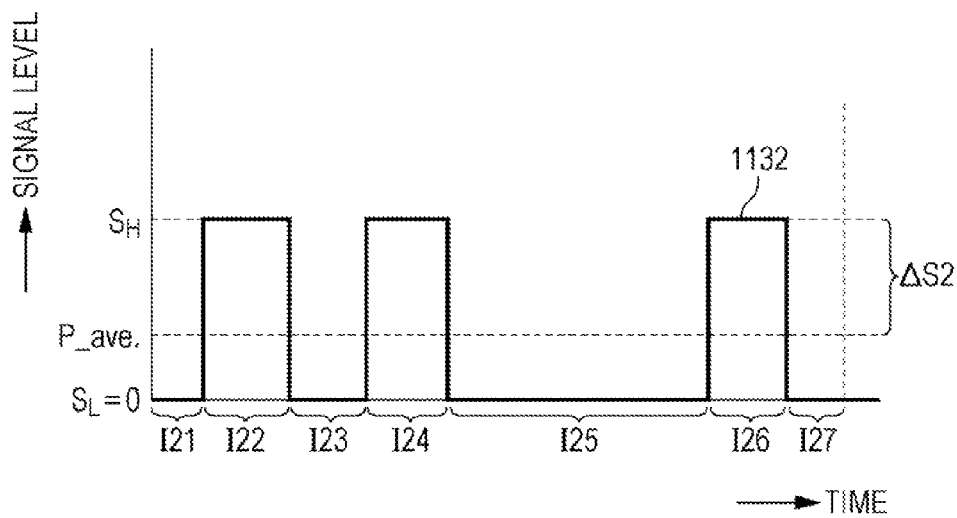

Next, FIGS. 66A, 66B will be referenced to describe the signal state information and peak level. FIGS. 66A, 66B are diagrams depicting an example of the intermittent signal. Note that FIGS. 66A, 66B are examples, and the present invention is not limited to such example.

An intermittent signal 1132 after level control changes between a high signal level ($S_H$) and low signal level ($S_L$=0), for example, in accordance with the passage of time. To monitor the intermittent signal 1132 with the output-side receiving unit 1122, the control precision of the signal level after the output-side level control is focused upon, whereby the output-side monitor circuit 1128 updates the information of the storage unit 206 with the average value (P_ave.) of the signal level during a fixed time. The signal level average value P_ave. has a value lower than the high signal level $S_H$, and the difference of the high signal level $S_H$ and the signal level average value P_ave. ($\Delta S$) changes according to the rate (ratio) that the signal level $S_H$ occupies within a fixed time. As depicted in FIG. 66A, in the case that the rate of time period that the signal level is $S_H$ (I12, I14, I16) is great as to the entire time (the time from I11 through I17), the signal level average value P_ave. is great, and the difference between the signal level $S_H$ and the signal level average value P_ave. ($\Delta S1$) becomes small. On the other hand, as depicted in FIG. 66B, in the case that the rate of time period that the signal level is $S_H$ (I22, I24, I26) is small as to the entire time (the time from I21 through I27), the signal level average value P_ave. is small, and the difference between the signal level $S_H$ and the signal level average value P_ave. ($\Delta S2$) becomes great. Thus, the signal level average value P_ave. is corrected by taking into consideration the signal state information, whereby the signal peak level is obtained. Note that the peak level indicates the level average value of the signal level that is high within a fixed time period, and in the case that the level of the high signal level is a fixed value $S_H$, the peak level becomes $S_H$.

The correction value to correct the signal level average value P_ave. is computed with the information updating unit 1124. The information updating unit 1124 divides the count results of the time of the burst signal region 432 sent from the computing unit 1126 by the count amount of the overall fixed time to obtain the ratio of the burst signal region 432 as to the fixed time, and uses the ratio herein as a correction value. In the case of the intermittent signal 1132 depicted in FIGS. 66A and 66B, the time ratios are obtained as in Expression (18) and Expression (19), respectively. Note that the fixed time periods are (I11+I12+I13+I14+I15+I16+I17), (I21+I22+I23+I24+I25+I26+I27), respectively. Also, ratio $R_1$ and ratio $R_2$ are examples of a duty ratio (expressed as duty ratio D=τ/T. τ indicates a time period wherein the value in one cycle is not 0, T indicates the cycle).

$$\text{Ratio } R_1 = (I12+I14+I16)/(I11+I12+I13+I14+I15+I16+I17) \quad (18)$$

$$\text{Ratio } R_2 = (I22+I24+I26)/(I21+I22+I23+I24+I25+I26+I27) \quad (19)$$

Also, in the case of obtaining the correction value from the driving signal, the time ratio of the ON signal within a predetermined time may be calculated. The driving signal becomes the intermittent signal which repeats an ON signal and OFF signal, whereby the ratio may be obtained.

The inverse of ratio R1 or R2 is multiplied by the signal level average value P_ave., whereby the signal peak level is obtained. The information updating unit 1124 updates the control information stored in the storage unit 206 according to the peak level herein, whereby even if the guard time region 434 during the intermittent signal changes the peak level of the intermittent signal may be stabilized and maintained at the target output level. Also, level adjusting with the intermittent signal unit may be performed with FF control and FB control. Consequently, intermittent signals having different strengths may be maintained at a fixed strength, and a flexible network may be built.

Features, advantages, modifications or the like will be exemplified for the above-described tenth embodiment.

(1) As described above, with the present embodiment, time count is performed with the computing unit 1126, and a correction value is computed with the information updating unit 1124, but the embodiment is not limited to these. For example, the time ratio may be computed with the computing unit 1126 and output to the information updating unit 1124 as signal state information. Thus, the information updating unit 1124 may receive the correction value from the computing unit 1126.

(2) Relating to the intermittent signal level control, the present embodiment may be applied also to level control of optical burst signals and optical packet signals, as well as level control of electrical intermittent signals. In this case, the input-side receiving unit 1106 and output-side receiving unit 1122 may be arranged to receive electrical intermittent signals.

(3) For example, an intermittent signal such as the packet signal or burst signal, or a cycle having high speed level changes such as a microsecond or less through several tens of nanoseconds to several hundred nanoseconds may be followed, and the signal level may be controlled by accurately monitoring the peak level of the output signal. Also, by using the monitor value, level control that is high speed and highly precise may be realized over a long period of time.

(4) Even in the case that the packet density is low or in the case that signal density changes, level adjustments may be made at the packet unit or burst signal unit. Consequently, packet signal and burst signal having different strengths may be maintained at a fixed strength. Thus, a flexible network may be built. Even in the case of an intermittent signal wherein the input signal is a packet signal or burst signal, in additional to a continuous signal, highly precise level control may be performed. Also, level adjustments may be made at the packet unit, and the entire packet network may be operated in a stable manner by adjusting the output signal peak level so as to be constant. Further, even in the case that the packet signal levels arriving from each node are different, the packet receiver input level may be held at a predetermined peak level value. Therefore, the dynamic range of the packet receiver may be permitted even if narrow, and consequently costs of the packet receiver and so forth may be reduced.

(5) A monitor function which may accurately monitor the peak level of the intermittent signal may be realized, and the correct target output level (peak value) may be controlled. As an intermittent signal, an optical packet signal or optical burst signal or the like may be used to realize a monitor function (optical packet monitor function, optical burst monitor function) which may monitor the peak levels of these signals.

(6) The level control system 1102 includes the monitor circuits 1108 and 1128, and may be applied to an optical burst switching network or an optical packet switching network which intermittently transmits/receives signals in the optical communication network.

(7) For example, when using for the optical packet transmission/reception, the output level permitted value of the optical transmitter and the input level permitted value of the receiver may be eased, whereby the cost of the optical packet transmitter/receiver may be reduced.

(8) In the case that a strict optical level schedule design of the optical packets and optical burst network is not needed, the network design costs and operating costs may be reduced.

Eleventh Embodiment

Figure 67:
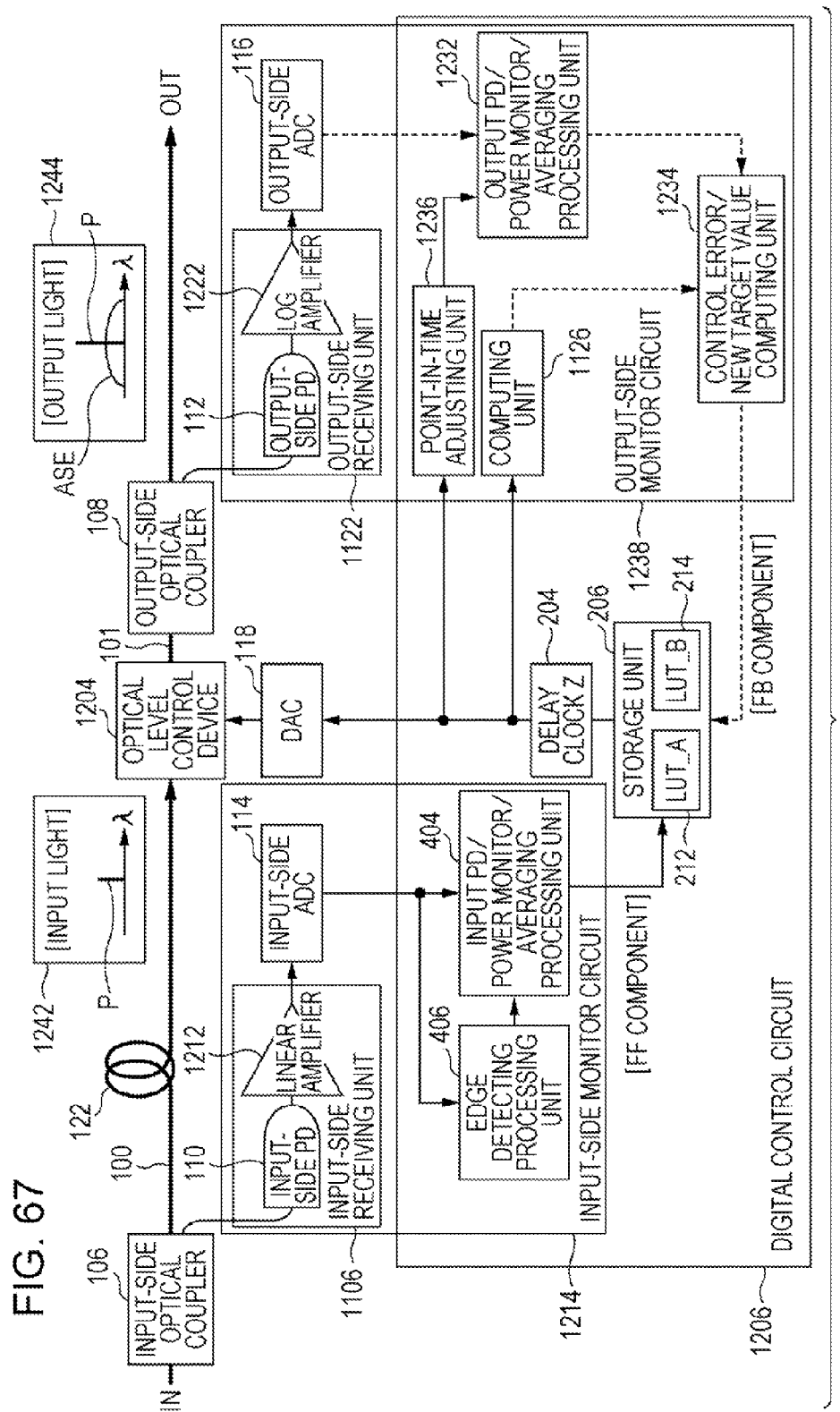
FIG. 67 is a diagram illustrating an example of a level control system relating to an eleventh embodiment.
Figure 68:
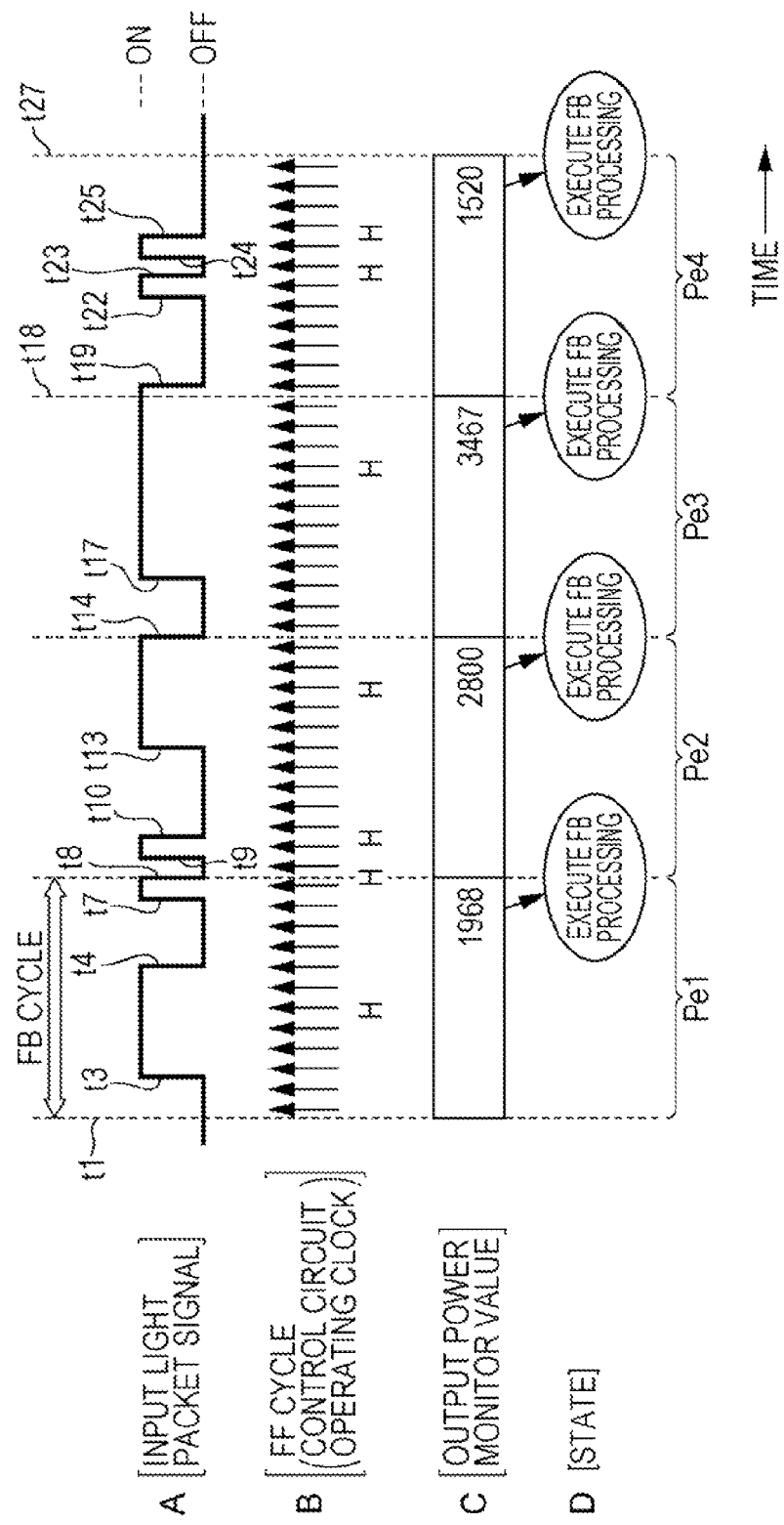
FIG. 68 is a diagram illustrating an example of the relation between an optical packet signal and monitor values.

FIGS. 67 and 68 will be referenced to describe an eleventh embodiment. FIG. 67 is a diagram depicting an example of a level control system according to the eleventh embodiment, and FIG. 68 is a diagram illustrating an example of the relation between an optical packet signals and monitor values. Note that the arrangement depicted in FIGS. 67 and 68 is an example, and the present invention is not limited to this arrangement. The portions in FIG. 67 similar to those in FIGS. 5, 11, 12, 20, 23, 50, 51, 60, and 65 have the same reference numerals appended thereto. Also, of the signal paths within the digital control circuit 1206 in FIG. 67, the signal path depicted with a solid line indicates a path operated by the speed of the FF control, and the signal path depicted with a broken line indicates a path operated by the speed of the FB control.

With the level control system 1202, the delay line 122 is disposed on the input side of the optical level control unit 1204 which may change the light strength, and delays the input light to the optical level control unit 1204 to a time sufficiently longer than the control delay time. Also, the delay clock Z 204 is disposed in the digital control circuit 1206, and the electrical control signal on the digital control circuit 1206 side is delayed, and also the delay amount thereof is controlled.

The input side PD 110 receives the optical packet signal (input light) on the input side and converts the optical packet signal into an electrical signal, for example. A linear amplifier 1212 receives and amplifies this electrical signal. The input-side ADC 114 then receives the electrical signal amplified by the linear amplifier 1212, converts the analog values into digital values, and outputs these as input-side PD values to the input PD/power monitor/averaging processing unit 404. Note that the input-side PD 110 and linear amplifier 1212 make up the input-side receiving unit 1106.

The linear amplifier 1212 is an example of means to amplify the signal output from the input-side PD 110, and for example is an input-side amplifier. A linear operational amplifier may be used, as example, for the linear amplifier. The linear amplifier 1212 outputs the amplified signal toward the input-side ADC 114. As depicted in FIG. 6, the linear amplifier 1212 is an amplifier which has a property wherein the input PD value changes linearly as to the input power, and wherein the response is high speed as compared to a log amplifier. Therefore, the electrical signal input from the input-side PD 110 is amplified at high speed. Thus, the electrical signal may be amplified in packet units.

The optical packet signal processing executed by the input PD/power monitor/averaging processing unit 404 and edge detecting processing unit 406 are similar to the fifth embodiment (FIG. 23 and so forth), so the description thereof will be omitted. The input PD/power monitor/averaging processing unit 404 outputs the signal level of each edge toward the storage unit 206, and holds and outputs the signal level of the control point until the next edge is detected. Note that the optical packet signal is an example of an intermittent signal.

The output-side PD 112 receives the output-side optical packet signal (output light) and converts the optical packet signal into an electrical signal. A log amplifier 1222 receives and amplifies the electrical signal. The output side ADC 116 receives the electrical signal amplified with the log amplifier 1222, converts the analog value into digital value, and outputs this as an output-side PD value to an output PD/power monitor/averaging processing unit 1232. Note that the output-side PD 112 and log amplifier 1222 make up the output-side receiving unit 1122.

The log amplifier 1222 is an example of means to amplify the signal output from the output-side PD 112, and for example is an output-side amplifier. The log amplifier 1222 outputs the amplified signal toward the output-side ADC 116. With the output-side receiving unit 1122, the output signal level is monitored with high precision, whereby resolution is prioritized over speed. Therefore, the log amplifier which has the advantage of greater amplification accuracy is used for a front-end circuit.

The output PD/power monitor/averaging processing unit 1232 is an example of means to generate an average value of multiple signal values. The output PD/power monitor/averaging processing unit 1232 is installed between the output-side ADC 116 and a control error/new target value computing unit 1234, receives the signal values monitored by the output-side receiving unit 1122, and generates an average value of the multiple signal values received during a defined time. The number of signal values for averaging and the number of times of averaging may be set optionally, for example, by providing setting values. Thus, the averaging processing speed may be freely set without relying on the sampling speed of the output-side ADC 116, processing cycle of the level control, optical packet length, or optical guard time length.

The output PD/power monitor/averaging processing unit 1232 receives a wait signal indicating a break in the defined time from a point-in-time adjusting unit 1236. The output PD/power monitor/averaging processing unit 1232 averages multiple signal values with the time between each wait signal as a defined time, and outputs the result thereof to the control error/new target value computing unit 1234. Note that the output PD/power monitor/averaging processing unit 1232 and the control error/new target value computing unit 1234 are examples of the information updating unit 1124 (FIG. 65).

The point-in-time adjusting unit 1236 is an example of means to adjust the time difference occurring from signal transmittance. After the driving signal is applied to the optical level control unit 1204, a time delay occurs until the optical signal changed by the level control reaches the output-side PD 112, is sampled by the output-side ADC 116, is subjected to digital conversion, and the converted electrical waveform finishes responding. The point-in-time adjusting unit 1236 has a function to adjust this time delay (wait function), and matches the timing that the driving signal is applied and the timing that the electrical waveform has finished responding after the changed light signal has been subjected to digital conversion. With the wait function of the point-in-time adjusting unit 1236, the signal state information based on a defined segment of input light is obtained with the computing unit 1126, and with the output PD/power monitor/averaging processing unit 1232, the signal level average value after level control of the predetermined segment of input light is obtained. That is to say, the predetermined segment of signal state information and the predetermined period of the signal level average value both may have referenced the same predetermined segment of input light.

The computing unit 1126 is similar to the tenth embodiment (FIG. 65), so the description thereof will be omitted. According to the present embodiment, the computing unit 1126 counts the time of the ON signal based on the clock of the digital control circuit 1206, and outputs the count results thereof as signal state information towards the control error/new target value computing unit 1234.

The control error/new target value computing unit 1234 is an example of means to compute the difference between the peak level of the output-side optical packet signal and the output target level, and is an example of a computing unit. The control error/new target value computing unit 1234 receives an average value of the monitored signals from the output PD/power monitor/averaging processing unit 1232, while receiving signal state information from the computing unit 1126. The average value of signals is corrected based on the signal state information, and the peak level of the output side optical signal is obtained. Also, the difference between the peak level of the output-side optical signal and the output target level are computed as control error (FIG. 3).

The configurations and processing described with the first through eighth embodiments may be used for the configurations and processing to update the control information using control error, so the descriptions and diagrams thereof will be omitted. For example, the updated information storage unit 220 (FIGS. 12 and 20) and the write-in updating unit 210 (FIGS. 12 and 20) may be disposed to update the control information, similar to the third and fourth embodiments. The updated information storage unit 430 (FIGS. 23 and 50), table searching unit 414 (FIGS. 23 and 50), and original data expansion creating unit 416 (FIGS. 23 and 50) may be disposed to update the control information, similar to the fifth and sixth embodiments. The updated information storage unit 560 (FIG. 51), table creating unit 554 (FIG. 51), and write-in updating unit 418 (FIG. 51) may be disposed to update the control information, similar to the seventh embodiment. Also, the control information may be updated via the LUT creating unit 610 (FIG. 60), similar to the eighth embodiment.

The input-side receiving unit 1106, input-side ADC 114, input PD/power monitor/averaging processing unit 404, and edge detecting processing unit 406 make up the input-side monitor circuit 1214. The input-side monitor circuit 1214 monitors the optical packet signal on the input-side. The input-side monitor circuit 1214 has a bandwidth below the bit rate of the packet signal, and has a bandwidth of a response speed that may capture the input or output of the optical packet signals, or both. The response speed that may capture the input or output of the optical packet signals, or both, is expressed as the inverse of packet continuous time or the inverse of the guard time region or the shorter time of either of these two. The input-side monitor circuit 1214 may control the levels for each input-side optical packet by having such a bandwidth.

The output-side receiving unit 1122, output-side ADC 116, output PD/power monitor/averaging processing unit 1232, control error/new target value computing unit 1234, point-in-time adjusting unit 1236, and computing unit 1126 make up an output-side monitor circuit 1238. The output-side monitor circuit 1238 monitors the optical packet signals on the output side. The output-side monitor circuit 1238 has a bandwidth greater than the response speed that captures the peak level of the packet signal. A bandwidth greater than the response speed that captures the peak level of the packet signal is expressed, for example, as the inverse of the shortest packet continuous time, the inverse of the packet guard time, or the shorter time of either of these two. The output-side monitor circuit 1238 may capture the peak level of the output-side optical packet by having such a bandwidth.

The other configurations are similar to the fifth embodiment (FIG. 23 and so forth), so similar reference numerals will be appended and the description thereof omitted.

An FF control cycle (FF cycle) is operated with the same cycle or similar cycle as the operating clock of the digital control circuit 1206. Therefore, level control may be performed even when the signal level, which has half the frequency of the operating clock of the digital control circuit 1206, changes. In the case that the input-side optical packet signal varies as depicted in FIG. 68A for example, and the operating clock has the cycle depicted in FIG. 68B, the optical packet signal may be subjected to FF control. The arrows depicted in FIG. 68B indicate the operating clocks of the digital control circuit 1206, and the spacing between adjacent arrows indicates one clock. The operating clocks of the digital control circuit 1206 are of a speed sufficiently faster than the continuous ON or OFF time of the optical packet signal.

On the other hand, the variations in the optical packet signal vary sooner than the FP control cycle (FB cycle), so the average value of the optical packet signals below a microsecond is monitored. In each FB cycle Pe1, Pe2, Pe3, and Pe4, the output-side power monitor values obtained from monitoring of the output-side PD 112 are 1968, 2800, 3467, and 1520, as depicted in FIG. 68C. The output-side power monitor value herein is used for the FB processing which is performed every FB cycle. Note that FIG. 68D indicates the activity state of the FB processing.

Driving the Level Control Unit

Figure 69:
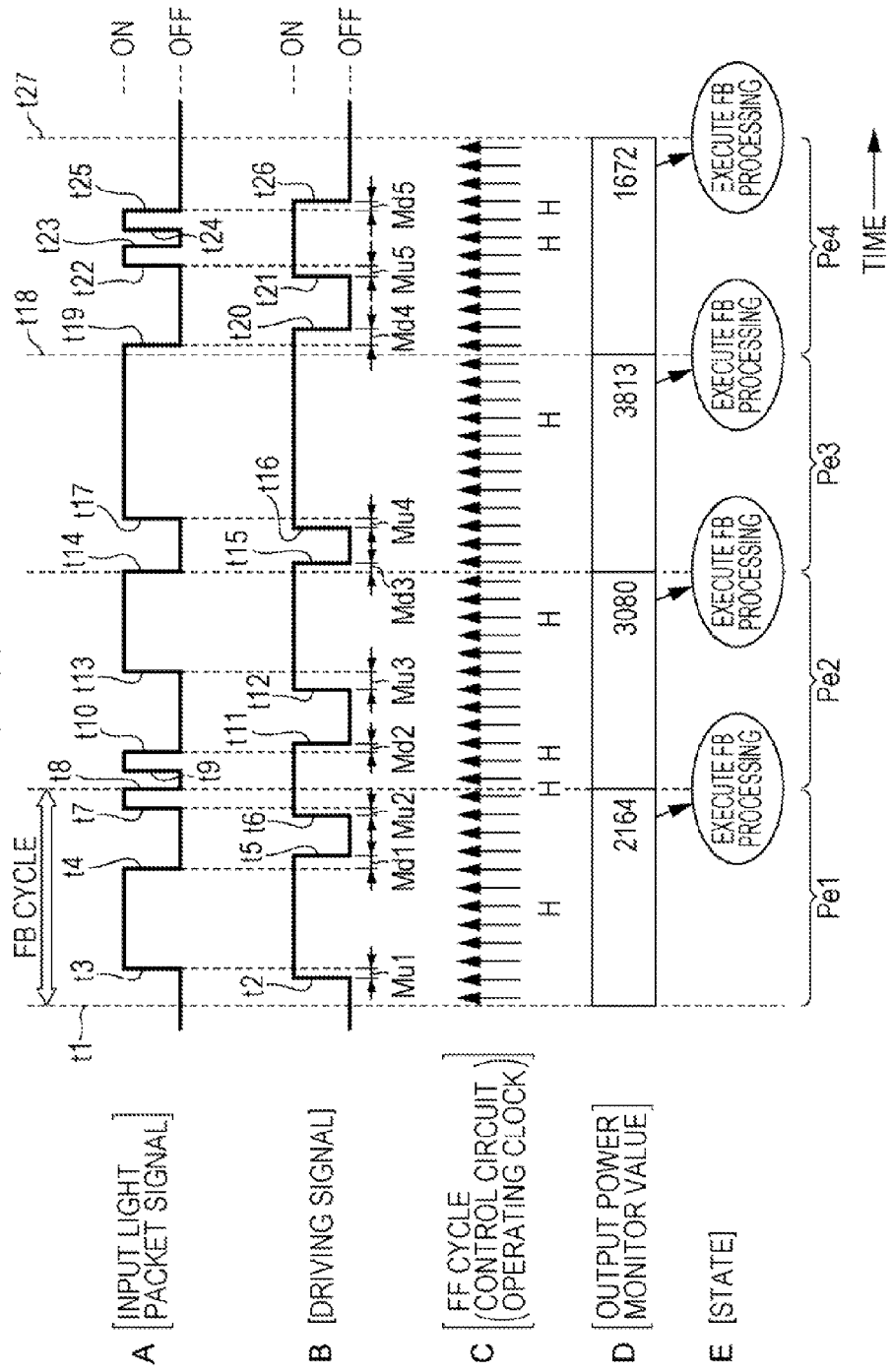
FIG. 69 is a diagram illustrating an example of the relation between an optical packet signal, driving signal, and monitor values.
Figure 70:
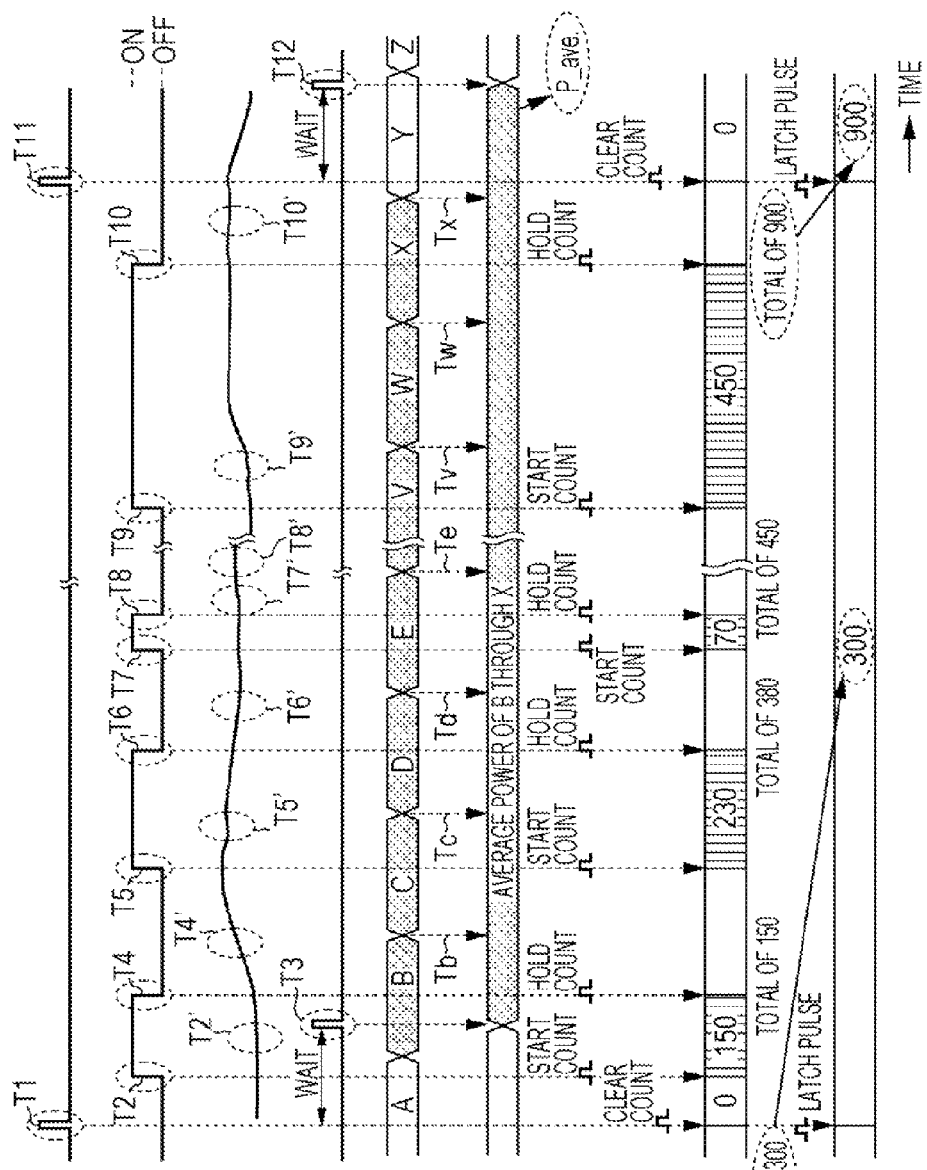
FIG. 70 is a diagram illustrating an example of an operating timing of the level control system relating to the eleventh embodiment.
Figure 71:
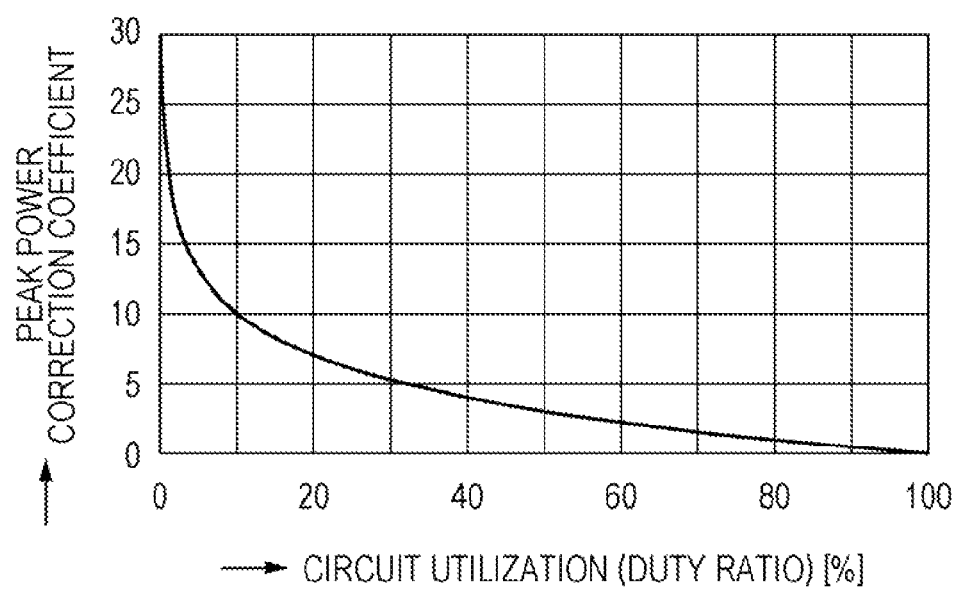
FIG. 71 is a diagram illustrating an example wherein the relation of peak power interpolating coefficients as to the line usage rates is graphed.

Next, FIGS. 69 through 71 will be referenced to describe the driving of the level control unit. FIG. 69 is a diagram depicting an example of the relation between the optical packet signals and driving signals and monitor values, FIG. 70 is a diagram depicting an example of the operating timing of the level control system relating to the eleventh embodiment, and FIG. 71 is a diagram depicting a graphed example of the relation of peak power correction coefficients as to a line usage rate. Note that the relations depicted in FIG. 69, the timings depicted in FIG. 70, and the graph depicted in FIG. 71 are examples, and the present invention is not limited to such relations. Also, in FIG. 70, the driving signal from point-in-time T8 to point-in-time T9 is presumed to be OFF, and therefore this portion is omitted from the diagram.

In the case of controlling the continuous signal (FIG. 25), the signal constantly exists and there is no break in the variations of the signal. Therefore, the optical level control unit 1204 controls the signal level constantly. In this case, the timing adjustment by the delay clock Z 204 is so as to match the delay time due to the delay line 122 X and control delay time Y, as depicted in FIG. 11.

However, the optical packet signal has a region wherein the signal level is zero, which is different from the consecutive signal. In the case that an optical packet signal is controlled using the SOA for example for the optical level control unit 1204, the SOA may emit ASE (naturally emitted light noise), and the ASE may mix into the optical packet signal. Thus, in order to suppress the ASE from mixing in, in the case that the state wherein the signal level is zero continues for a long period of time, the SOA driving is stopped (turned OFF).

Further, when the SOA is driven from a stopped state, there are cases wherein the SOA amplifying function becomes unstable. In these cases, in the case that the delay time X and control delay time Y are matched and the leading edge or trailing edge of the packet signal match the driving timing, the output level may become unstable in the leading bit or final trailing bit of the optical packet row. Also, smooth communication of the packet signals may be inhibited due to jitters or the like. Thus, a fixed time margin is set and the lead and end of the optical packet signal and the SOA is driven, so that the leading and trailing ends of the optical packet signal to be output are not erased. That is to say, the guard time of the light step (optical packet signal) and the guard time of the electrical step (SOA driving signal) are caused to be different.

The input-side optical packet signal varies as depicted in FIG. 69A, for example. In this case, the driving signal that is output from the storage unit 206 is switched from an OFF signal to an ON signal at a point in time (t2, t6, t12, t16, t21) that is sooner than the rising point in time of the optical packet signal (t3, t7, t9, t13, t17, t22, t24), as depicted in FIG. 69B. Thus, prior to the optical packet signal rising, rising margins Mu1 (between t2 and t3), Mu2 (between t6 and t7), Mu3 (between t12 and t13), Mu4 (between t16 and t17), and Mu5 (between t21 and t22) are provided. Also, the driving signal is switched from an ON signal to an OFF signal (t5, t11, t15, t20, t26) later than the falling point in time (t4, t8, t10, t14, t19, t23, t25) of the optical packet signal. Thus, after the falling of the optical packet signal, falling margins Md1 (between t4 and t5), Md2 (between t10 and t11), Md3 (between t14 and t15), Md4 (between t19 and t20), and Md5 (between t25 and t26) are provided.

Note that in the case that the optical packet density is high in density and spacing is narrow (between t8 and t9, and between t23 and t24), the rising margin Mu and the falling margin Md overlap, thereby maintaining the ON signal of the driving signal. By providing the margins before rising and after falling of the optical packet signal, the instability of the output level and inhibition of smooth communication of the packet signal may be suppressed. Note that the margin indicates the time difference between the rising and falling of the optical packet signal and driving signal, and there are cases wherein the values differ between each rising margin and falling margin. Thus, in the case that a particular rising margin is not specified, this is called rising margin Mu, and in the case of specifying a particular rising margin, a number is appended after Mu. Also, in the case that a particular falling margin is not specified, this is called falling margin Md, and in the case of specifying a particular falling margin, a number is appended after Md. With these margins, spare time in the level control may be secured.

The margin may be separately set regarding the settings of the delay clock Z in the case that a rising in the optical packet signal is detected and the settings of the delay clock Z in the case that a falling in the optical packet signal is detected. For example, in the case that the optical packet signal is rising, for example a setting is made so that the delay amount of the control delay time Y is one clock less than the clock wherein the delay time X and the control delay time Y match. Also, in the case that the optical packet signal is falling, for example a setting is made so that the delay amount of the control delay time Y is one clock greater than the clock wherein the delay time X and the control delay time Y match. By thus setting the delay amount of the delay clock Z 204, one clock worth of rising margin and falling margin of the digital control circuit 1206 may be set. Note that since the margin is an adjustment in clock units, there are cases wherein a difference is generated in the values of each rising margin and falling margin of approximately one clock worth.

Obtaining Control Error

In order to perform LUT updating with the FR processing, the control error (FIG. 3) is computed from the controlled signal level and target output level. With the optical packet signal control, the peak level of the optical packet signal is used as a controlled signal level. Therefore, the correction value of the signal level average value (P_ave.) monitored with the output-side receiving unit 1122 is obtained, and the peak level is obtained.

For example, if using the SOA for the optical level control unit 1204, there are cases wherein an ASE is emitted by the driving, and the ASE is mixed in with the optical packet signal in the region of a rising margin Mu and falling margin Md before and after the optical packet signal. In the case that many ASEs are mixed in with the optical packet signal, an input light 1242 is a signal of the packet signal P whereas an output light 1244 is a signal including the ASE before and after the packet signal P, as depicted in FIG. 67. With the output-side receiving unit 1122, the average value of the signal level increases which is detected within a predetermined time period due to the ASE mixing in, while the time period wherein the value in one cycle is not zero becomes longer. With the output-side receiving unit 1122, the ratio that the optical packet signal occupies in the optical signal, i.e. the packet density, is measured as if the ratio has increased. That is to say, as a result of the output range of the driving signal ON signal being wider than the leading and trailing edges of the input-side optical packet signal, with the output side PD 112 a signal having a higher density than the input-side optical packet signal is monitored.

In the case that the ASE is not mixed in, the output-side power monitor values of the optical packet signal depicted in FIG. 68A respectively become 1968, 2800, 3467, and 1520, for example, as depicted in FIG. 68C. Conversely, if the ASE is mixed in, the values respectively becomes 2164, 3080, 3813, and 1672, for example, as depicted in FIG. 69D, and the value is increased by the amount of the ASE mixing in. In order to increase the apparent density of the packet signal, a correction value for obtaining the peak level is computed based on the driving signal. The correction value is computed from the count of signal state information within a defined time and from computation of the signal ratio.

(1) Adjustment of Defined Time Period

The peak level may be obtained from the signal level average value (P_ave.) and the correction value herein. In this case, so as to obtain the average value and correction value in reference to the same input light, adjustments of the obtaining time for each are made. The adjustments herein are performed based on the FB cycle segmentation.

In the case that the input timing of the duty ratio calculated from the driving signal and the input timing of the average value of the signals subjected to level control by the driving signal are shifted from one another, the point-in-time adjusting unit 1236 stands by for the output of the average value from the signals output from the output PD/power monitor/averaging processing unit 1232 based on the time difference between detection of the driving signal and monitoring of the output-side signal, whereby the driving signal segments counted by the computing unit 1126 and the time region monitored by the output-side receiving unit 1122 are matched. The average value of the signals of the matched time regions are corrected based on the count value by the computing unit 1126, whereby the peak level of the segment thereof is computed.

In the case that the segment of the FB circuit is between point-in-time T1 and point-in-time T11 as depicted in FIG. 70A, the FB cycle from point-in-time T1 to point-in-time T11 is one cycle. During this one cycle, multiple optical packet signals pass through the optical level control unit 1204.

The driving signal confirmed with the computing unit 1126 repeats the ON signals (between T2 and T4, between T5 an T6, between T7 and T8, and between T9 and T10) and the OFF signals (between T1 and T2, between T4 and T5, between T6 and T7, between T8 and T9, and between T10 and T11). The optical level control unit 1204 is driven based on the driving signal herein, and the optical packet signal level is controlled based on the driving control amount output from the storage unit 206. Note that T1, T2, . . . T12 represent each time period.

The output-side optical packet signals measured by the output-side receiving unit 1122 are measured as an average value of the time of the optical packet signals, and as depicted in FIG. 70C, the signal levels vary greatly. A time difference (ΔTr) which results from signal transmittance occurs between the SOA driving signals and the monitor signals measured by the output-side receiving unit 1122. The driving signal measured by the computing unit 1126 at point in time T2 is later transmitted to the optical level control unit 1204. Level control of the optical packet signal is then performed, and is measured by the output-side receiving unit 1122 at point in time T2'. That is to say, the point in time T2 corresponds to point in time T2', the monitor signal variations are measured with the output-side receiving unit 1122, using the time difference (ΔTr) between point in time T2 and point in time T2'. Similarly the points in time T4, T5, T6, T7, T8, T9, and T10 correspond to T4', T5', T6', T7', T8', T9', and T10', respectively. The time differences between these points in time are the same length as the time difference between points in time T2 and T2'.

Thus, the variations of the driving signal precede the signals measured by the output-side receiving unit 1122. Therefore, as depicted in FIG. 70D, a wait signal occurs at points in time T3 and T12, delayed from the signals indicating the end of the FB cycle occurring at points in time T1 and T11. The time difference between the signals indicating the end of the FB cycle and the wait signals (T3-T11), (T12-T11) is the adjustment time for computing the correction values and the signal level average values, using the input light of the same predetermined segments, and the length of time thereof is the same. The wait signals are generated by the point in time adjusting unit 1236.

(2) Computing the Signal Level Average Value (P_ave.)

FIG. 70E represents the monitor cycle with the output-side receiving unit 1122. The monitor cycles A, B, C, . . . , X, Y, Z are set optionally. The average value of the monitor signals measured during the period of each cycle is output to the output PD/power monitor/averaging processing unit 1232 at the end point of each cycle. That is to say, the average value of the monitor cycle B is output to the output PD/power monitor/averaging processing unit 1232 at the point in time Tb. Similarly, the average value of monitor cycles C, D, E, . . . V, W, X are output to the output PD/power monitor/averaging processing unit 1232 at the points in time Tc, Td, Te, . . . Tv, Tw, Tx.

FIG. 70F depicts the averaging processing of the monitor values of the output-side PD 112. In the case that the wait signal occurs as points in time T3 and T12, as depicted in FIG. 70D, the signal level average value (P_ave.) is calculated as the average value (average power) of the monitor cycles B through X which are output between the points in time T3 and T12. By computing in this way, the signal level average value (P_ave.) may be obtained which corresponds to the FB cycle between points in time T1 and T11.

Count of Signal State Information

The signal level average value (P_ave.) changes according to the ratio that the optical packet occupies within the FB cycle (packet density). Therefore, the correction value relates to the state of the driving signal output from the delay clock Z 204. ON signals and OFF signals are output as the driving signals of the optical level control unit 1204, whereby the correction value may be obtained from the output time of the ON signal. With the driving signal in FIG. 70B, the ON time becomes between points in time T2 and T4, between T5 and T6, between T7 and T8, and between T9 and T10, and otherwise is OFF.

FIG. 70G expresses the timing of the count start and count holding in the event of counting the ON signals of the driving signal. Count start occurs at the points in time (points in time T2, T5, T7, T9) that the driving signal changes from an OFF signal to an ON signal, and count holding occurs at the points in time (points in time T4, T6, T8, T10) that the driving signal changes from an ON signal to an OFF signal. Based on these signals, the number of clocks of the digital control circuit 1206 from the count start to the count holding is counted.

FIG. 70H indicates the timing to clear (reset) the count of the number of clocks, i.e. indicates the timing to return the count value to zero. Count clearing is performed according to the times T1 and T11 at which a signal occurs indicating the end of the FB cycle.

FIG. 70I indicates the count state of the ON signal of the driving signal. Upon the count clear signal occurring at point in time T1, the value of the ON signal count is returned to 0. From the count clear at point in time T1 to the point in time T11 when the next count clear occurs, count start and count holding are repeated. With the count of the clock numbers, the numbers thereof are accumulated until the count is cleared. Note that with the count of FIG. 70I, 150 clocks are counted between the points in time T2 and T4, 230 clocks are counted between points in time T5 and T6, 70 clocks are counted between points in time T7 and T8, and 450 clocks are counted between points in time T9 and T10. Accordingly, under the premise that the driving signal between points in time T8 and T9 is an OFF signal, this indicates a total of 900 counts within one FB cycle corresponding to points in time T1 and T11. The accumulated 900 counts are returned to 0 by the count clear occurring at point in time T11, and after point in time T11 a new count is started. This count is performed by the computing unit 1126.

FIG. 70K indicates the count value of the ON signal of the driving signal. As depicted in FIG. 70J, upon a latch pulse occurring, the count immediately prior to the pulse occurring is held. The latch pulse occurs at the points in time T1 and T11 wherein a signal occurs which indicates the end of an FB cycle. Thus, the count in the FB cycle immediately prior is held. At point in time T1 the latch pulse is received, and the count immediately prior to the point in time T1, i.e. 300 counts, is held as the count value. Also, the next latch pulse is received at point in time T11, and the count immediately prior to point in time T11, i.e. 900 counts, is held as the count value. Note that the count value depicted in FIG. 70K is the count value of the ON signal in the FB cycle, and indicates the signal state information. This is a duty ratio count used for calculation of a duty ratio.

(4) Packet Density Computation

The packet density is expressed by ON time/(ON time+ OFF time) as a packet signal duty ratio. The ratio herein may be rewritten as (count of ON signals)/(total count between FB cycles). The driving signal is output by the digital control circuit 1206 itself, whereby the computing unit 1126 of the digital control circuit 1206 may readily confirm the ON signals and OFF signals, and these may be counted to compute the duty ratio. Note that ON time is the time that the ON signal is output, and OFF time is the time that the OFF signal is output. In a given segment, if the ON and OFF counts are the same number, the duty ratio of the segment thereof is ½, i.e. 50%.

When the FB processing is performed with a defined cycle, the total count within the FB cycle which becomes the denominator of the packet density becomes fixed. In this case, if counting in the case that the driving signal is ON, the packet density is obtained. For example, in the case that the FB cycle is 1 ms with the digital control circuit 1206 of a 150 MHz clock, the total count within the FB cycle is 150,000 times. If the ON signal count value is 900, the duty ratio is a value that is 900 divided by 150,000, and the ratio is 0.6%.

(5) Peak Level Computation

For signal amplification of the output-side PD 112, in the case of using the log amplifier 1222 as the output-side receiving unit 1122, the average value P_ave. of the signal output from the log amplifier 1222 indicates logarithmic change, as depicted in FIG. 7 for example, rather than a linear change. The unit of the signal average value P_ave. is dBm, and the duty ratio computed from the SOA driving output signal becomes a linear value indicating how much the SOA is turned ON during one FB cycle. In order to compute the peak level from the P_ave. (unit: dBm) and duty ratio (unit: %), the duty ratio is converted to a logarithm and added to the output-side monitor average value P_ave., as depicted in Expression (20). Note that the unit for the peak level of the optional segment and the output-side monitor average value of the optional segment is dBm. Also, a graph indicating the values of 10·log (1/duty ratio) is depicted in FIG. 71. The 10·log (1/duty ratio) is a logarithmic function which uses the correction coefficient of the peak power as the vertical axis and the line usage rate (packet density) as the horizontal axis. Note that the signal peak power is an example of a peak level. Peak level has a broader sense than peak power, and in the case that the level expressed by the peak level is a power level, this is called peak power. Note that the optional segment is a fixed time period corresponding to each FB cycle, for example.

Optional segment peak level=output-side monitor value average of optional segment+10·log(1/duty ratio of optional segment) (20)

In the case that the duty ratio is 10%, then 10·log (1/duty ratio)=10·log (1/0·1)=10 dBm. Thus, by adding 10 dBm to the output-side monitor average value of the optional segment, the peak level of the optional segment may be obtained.

In the case that the duty ratio is 20%, then 10·log (1/duty ratio)=10·log (1/0·2)=6.98 dBm. Thus, by adding 6.98 dBm to the output-side monitor average value of the optional segment, the peak level of the optional segment may be obtained.

In the case that the duty ratio is 50%, then 10·log (1/duty ratio)=10·log (1/0·5)=3.01 dBm. Thus, by adding 3.01 dBm to the output-side monitor average value of the optional segment, the peak level of the optional segment may be obtained.

Computation of Control Error and Setting of Target Output Level

Control error (FIG. 3) is computed with Expression (21) below by comparing the computed peak level (dBm) of the optional segment and the target output peak level (target output level) (dBm).

Control error (dB) of optional segment=target output peak level (dBm)−peak level of optional segment (dBm) (21)

If the control error is a positive value, the output level is increased, and if a negative value, the output value is reduced. The peak level serving as a new target output is computed with Expression (22) below.

New target output peak level (dBm)=current target output peak level (dBm)+control error (dB) of optional segment (22)

If the new target output peak level is determined, the input PD values and a table applicable to the determined new target output peak level is read from the driving control amount table (FIG. 16) corresponding to the input PD value, and of the LUT_A 212 and LUT_B 214, data is expanded in the LUT that is in a standby state. Note that the input PD value is the output value of the input-side receiving unit 1106 for example, and the driving control amount is an output value to the DAC 118 of the driving current, for example.

The configurations and processing described with the first through eighth embodiments may be used for the configuration and processing to update the control information using control error, so the descriptions and diagrams thereof are omitted. For example, similar to the third and fourth embodiments, the updated information storage unit 220 (FIGS. 12 and 20) and the write-in updating unit 210 (FIGS. 12 and 20) are disposed to update the control information. Similar to the fifth and sixth embodiments, the updated information storage unit 430 (FIGS. 23 and 50), the table searching unit 414 (FIGS. 23 and 50), and the original data expansion creating unit 416 (FIGS. 23 and 50) are disposed to update the control information. Similar to the seventh embodiment, the updated information storage unit 560 (FIG. 51), the table creating unit 554 (FIG. 51), and the write-in updating unit 418 (FIG. 51) are disposed to update the control information. Also, similar to the eighth embodiment, the control information may be updated via the LUT creating unit 610 (FIG. 60). Note that the target output peak level is an example of a target output level (step S113 in FIGS. 26A, 26B). The current target output peak level is an example of a table output level value set in the LUT performing FF control. Also, the new target output peak level is an example of an output target level (step S113 in FIGS. 26A, 26B).

Figure 72:
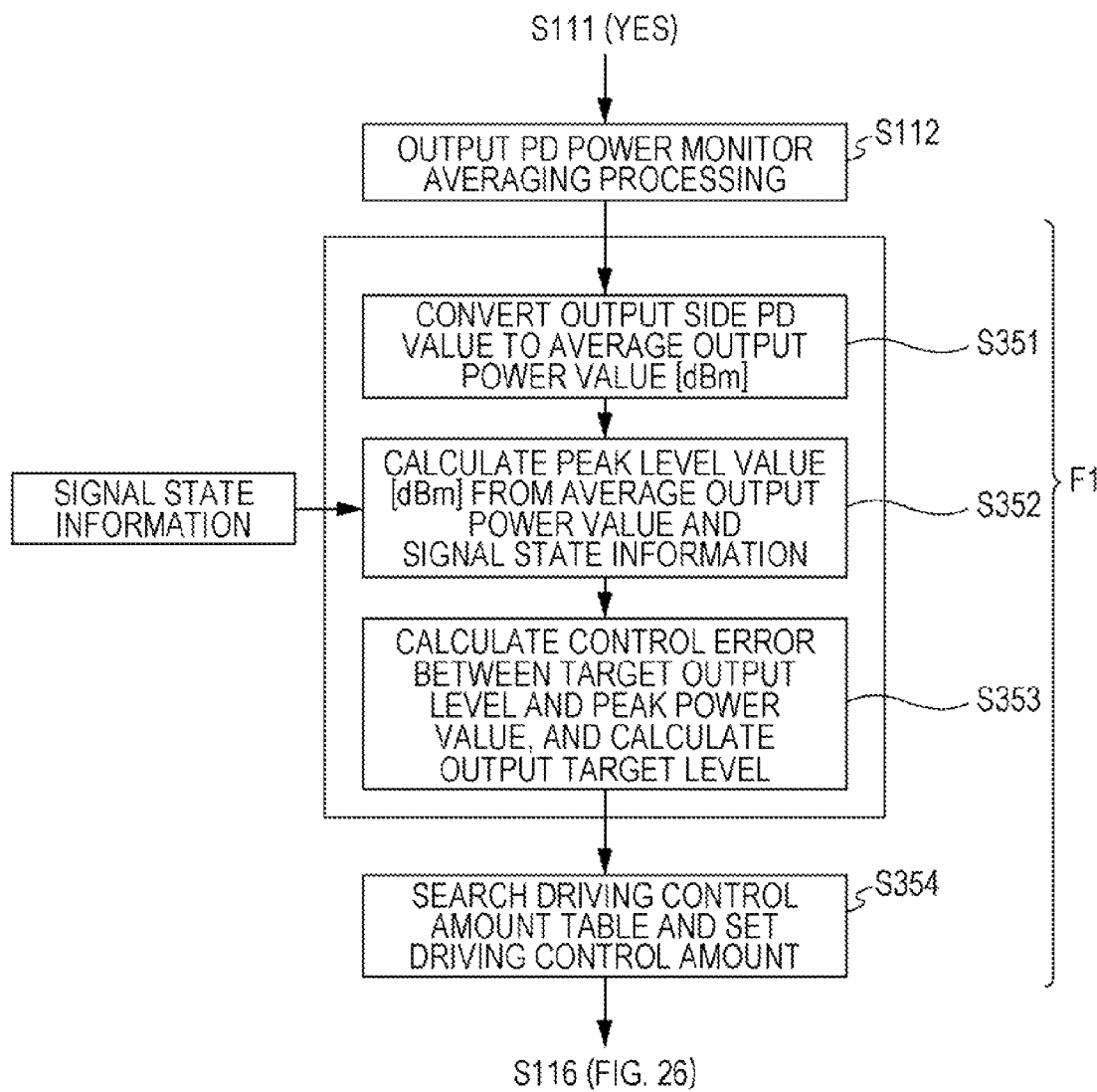
FIG. 72 is a flowchart describing an example of output target level determining processing relating to the eleventh embodiment.

Next, FIG. 72 will be referenced to discuss the level control processing according to the eleventh embodiment. FIG. 72 is a flowchart describing an example of output target level determining processing relating to the eleventh embodiment. In the flowchart depicted in FIG. 72, the processing F1 is processing to be performed instead of steps S113 through S115 in the flowchart depicted in FIGS. 26A, 26B. Also, steps S351 through S353 indicate the processing to compute the control error and new target value. With the level control processing relating to the embodiment herein, the processing from the initial settings to the FB loop ON/OFF determination (steps S101 through S111 in FIGS. 26A, 26B) is similar to that of the fifth embodiment, so the descriptions and diagrams thereof will be omitted. Also, the processing from the data write-in updating of a table to the LUT flag updating (steps S116 and S117 in FIGS. 26A, 26B) is also similar to that of the fifth embodiment, so the descriptions and diagrams thereof will be omitted. The processing depicted in FIG. 72 is an example, and the present invention is not limited to such processing.

Upon receiving the output-side optical packet signal, averaging processing of the received signal is performed (step S112). With this processing, the average value of the signal that the output-side PD 112 received with the monitor cycle of the output-side receiving unit 1122 is output. The average value is amplified with the log amplifier 1222, and converted to a digital value with the output-side ADC 116. The output PD/power monitor/averaging processing unit 1232 averages the digital values output with the output-side ADC 116 further toward an average FB cycle. The average value of the received light signal is thus obtained.

The average value output by the output PD/power monitor/averaging processing unit 1232 is a PD value, whereby conversion to a power value is performed with the control error/new target value computing unit 1234 (step S351). The output power average value (unit: dBm) is obtained from the output-side PD value by conversion. Note that the average value of the output power is an example of the signal level average value (P_ave.), and the signal level indicates a value that expresses the output-side power.

The control error/new target value computing unit 1234 receives signal state information, and computes the peak level value (unit: dBm) from the output power average value and signal state information (step S352). The signal state information received by the control error/new target value computing unit 1234 is, for example, a duty ratio count that expresses the count of the ON signals in the FB cycle. The control error/new target value computing unit 1234 obtains a duty ratio from the duty ratio count and the total clock numbers of the FB cycle, and computes the correction value of the peak level with the duty ratio here as a logarithm. A peak power value is then computed from the correction value and the output power average value, by matching the timing of the averaged signal levels and the count timing of the driving signal ON signal together.

The control error/new target value computing unit 1234 computes the difference (control error) between the target output level and peak power value, adds the amount equivalent to the control error thereof to the current target output level, and computes a new target output level (step S353). Table searching of the driving control amount to be set, and setting of the found driving control amount (step S354) are then performed. Except for computing the control error using the peak power value instead of the output-side PD value, this is similar to the fifth embodiment so the description thereof will be omitted. The average value and signal state information of the output signals may be used thus to update the LUT.

Features, advantages, modifications or the like will be exemplified for the above-described eleventh embodiment.

(1) The monitor cycle of the output-side receiving unit 1122 in FIG. 70E may be roughly the same length as to the length of a packet of the optical packet signal, since the values are averaged by the averaging processing thereafter, and may be long or short according to the response speed of the PD front end circuit.

(2) An example has been described using the function device that outputs ASE such as an SOA as the optical level control device, but is not be limited to this. In the case of using a function device that does not output ASE as a variable attenuator does, the margins Mu and Md may be set to 0 or to a time short enough so that the leading edge and trailing edge of the optical packet signal are not cut off, and the duty ratio may be computed based on the driving signal. Since the margin is small, the difference between the duty ratio obtained from the optical packet signal and the duty ratio obtained from the driving signal becomes small, and an approximate value to the actual peak level may be obtained.

(3) In the case of using an SOA for the level control device, for example, upon outputting a driving signal with a temporal margin, ASE is output in the additional amount of the temporal margin thereof, whereby the duty ratio changes when viewed with the signal levels of the input-side optical signal and output-side optical signal. Therefore, by using a duty ratio obtained from the driving signal instead of using a duty ratio obtained from the input-side optical signal in the FB processing, whereby control may be performed with less error.

(4) Even in a case wherein the response speed of the output-side PD 112 is slowed, and a value wherein the detected signal times are averaged is output to the output-side ADC 116 in order to improve control of detection, the level of the intermittent signals such as optical packet signals may be controlled. In the case that the optical packet signal density is low or in the case that the density of the signal changes, the average value of the signal level is suppressed from being influenced by the guard time from between the optical packet signals. Even if the optical packet signal is detected as having a lower value than the strength of the FB control optical signal, by obtaining the peak level from this value, the signal value subjected to level control by the optical level control device is suppressed from having a value higher than the target level.

(5) In the case that the cycle of the optical packet signal is several tens of nanoseconds to several hundreds of nanoseconds, the signal peak level may be obtained even if a log amplifier is used for the output-side PD monitor circuit. Therefore, with the output-side monitor circuit 1238, monitoring with the same high-speed type amplifier as the input-side monitor circuit 1214 is not needed. Therefore, the output level may be stabilized at a fixed level with high precision over a long period while securing monitoring precision of the output-side signal.

(6) In the case of using an SOA or the like for the optical level control unit 1204, the packet density of the packet signal measured by the input-side receiving unit 1106 and the packet density of the packet signal measured by the output-side receiving unit 1122 differ in density. Thus, the packet density is calculated by capturing that of the driving signals measured by the output-side monitor circuit 1238. This is to be matched with the signal density of the optical packet signal measured by the output-side receiving unit 1122, whereby the influence from differences in packet density which occurs between the input signal is suppressed, and FB processing with high precision may be performed.

(7) On the FB processing side, processing to compute the peak level from the later-stage PD monitor averaging value is repeated every FB cycle using the duty ratio of the driving signal, and an unused LUT is updated every fixed amount of time, whereby level control may be performed in the newest state. Therefore, in the case that loss amounts change due to change in the passage of time, in the case that the relation of the SOA application voltage and output power changes, or in the case that the line density of the packet signals or burst signals change, a peak level may be computed. Also, based on the error obtained with the FB processing, optimal voltage may continue to be applied with the FF processing. Consequently, high-speed level control may be realized with the property thereof being maintained over a long period of time, while handling high-speed level variations.

(8) The LUT updating work in the FB processing may be performed only in the case that the difference with the target output level (control error) is determined and the control error has exceeded a certain value (YES in step S134 in FIGS. 27A, 27B). If the LUT is updated only in the case wherein the control error is determined to have increased, the frequency of the LUT decreases, and since the rewriting life of the medium on which the LUT is stored (in this case, a register or memory) may be extended, the rate of malfunction of the level control circuit may be reduced.

Twelfth Embodiment

Figure 73:
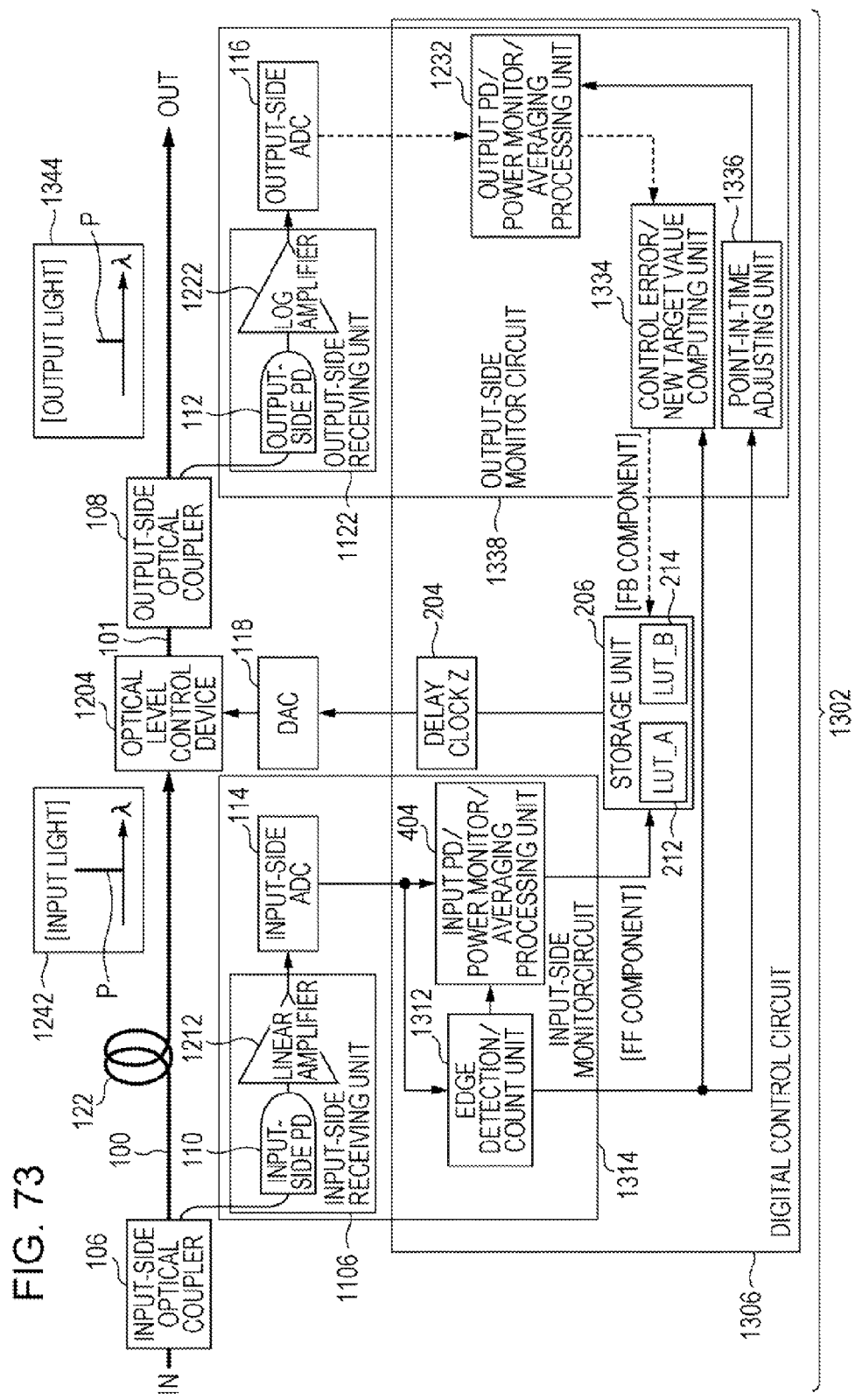
FIG. 73 is a diagram illustrating an example of the level control system relating to a twelfth embodiment.

FIG. 73 will be referenced to describe the twelfth embodiment. FIG. 73 is a diagram depicting an example of the level control system relating to the twelfth embodiment. Note that the configuration depicted in FIG. 73 is an example, and the present invention is not limited to this configuration. The portions that are the same as in FIG. 67 have the same reference numerals appended thereto.

The optical level control unit 1204 controls the level of the input light 1242, whereby a function device that does not output ASE even after performing driving (noiseless device). Therefore, in the case of controlling the level of the input light 1242 which includes the packet signal P, an output light 1344 which suppresses ASE is obtained. In this case, signal state information of the input-side optical packet signal is used in the event of obtaining a peak level from the signal level average values.

An edge detecting/counting unit 1312 is an example of means to detect the edges of the intermittent signal, and to determine the existence of a packet and compute the signal state. The edge detecting/counting unit 1312 has an intermittent signal edge detecting function and a signal state computing function.

Upon receiving the monitor value of the optical packet signal, the edge detecting/counting unit 1312 detects the leading edge and trailing edge of the optical packet signal. Upon detecting these edges, a trigger signal is output to the input PD/power monitor/averaging processing unit 404. Note that processing that the input PD/power monitor/averaging processing unit 404 performs after receiving the trigger signal is similar to the fifth embodiment, so the description thereof will be omitted.

The edge detecting/counting unit 1312 detects the time from the leading edge to the trailing edge of the optical packet signal as a state wherein there is an optical packet (optical packet exists) and the time from the trailing edge to the leading edge as a state wherein there is no optical packet (optical packet does not exist). The state wherein an optical packet exists is counted every clock of the digital control circuit 1306, and the count thereof is output to the control error/new target value computing unit 1334.

If the state wherein an optical packet exists is expressed as an ON state and the state wherein an optical packet does not exist is expressed as an OFF state, the signal state of the packet signal is computed as the ratio $R_3$ that the ON state occupies in the optical packet signal, as depicted in Expression (23) for example. Note that the ratio $R_3$ is an example of signal state information expressing the signal state, and is the ON/OFF duty ratio expressing the ratio of ON state and OFF state. Note that the ON state and OFF state are identifying information expressing the optical packet signal state.

$$\text{Ratio } R_3 = (\text{time of ON state within predetermined time})/(\text{predetermined time}) \quad (23)$$

The ON state time and the predetermined time may be rewritten as the clock count of the digital control circuit 1306, and this ratio may be taken as (count of ON state)/(total count between FB cycles).

The signal state information computed by the edge detecting/counting unit 1312 is output to the control error/new target value computing unit 1334, and a peak level is computed based on the signal state information herein.

The input-side receiving unit 1106, input-side ADC 114, input PD/power monitor/averaging processing unit 404, and edge detecting/counting unit 1312 make up the input-side monitor circuit 1314. Except for having an edge detecting/counting unit 1312 instead of the edge detecting processing unit 406, the input-side monitor circuit 1314 is similar to the input-side monitor circuit 1214 according to the eleventh embodiment (FIG. 67) so the description thereof will be omitted.

The control error/new target value computing unit 1334 receives the average value of the monitored signals from the output PD/power monitor/averaging processing unit 1232, and receives the signal state information from the edge detecting/counting unit 1312.

A point-in-time adjusting unit 1336 is an example of means to adjust the time difference that occurs from signal transmittance. Time difference occurs between the timing until the input-side PD 110 detects the edges of the received optical packet signal and the timing wherein the optical packet signal of a timing received by the input-side PD 110 reaches the output-side PD 112 and the electrical waveform completes responding via the digital conversion. The point-in-time adjusting unit 1336 has a function to adjust the time delay (wait function), and adjusts the time difference herein. With the wait function of the point-in-time adjusting unit 1336, signal state information based on the input light of the predetermined segment is obtained with the edge detecting/counting unit 1312, and the signal level average value after level control of the input light of the predetermined segment is obtained with the output PD/power monitor/averaging processing unit 1232. That is to say, the predetermined segment of the signal state information and the predetermined time period of the signal level average value may be made to correspond to the input light of the same predetermined segment.

The output-side receiving unit 1122, output-side ADC 116, output PD/power monitor/averaging processing unit 1232, control error/new target value computing unit 1334, and point-in-time adjusting unit 1336 make up an output-side monitor circuit 1338. Signal state information is received from the edge detecting/counting unit 1312 instead of the computing unit 1126, point-in-time adjustments are made from the input-side optical packet signal, and the signal state information is obtained; other than these is similar to the output-side monitor circuit 1238 (FIG. 67) of the eleventh embodiment, and the description thereof will be omitted.

Other configurations are similar to the eleventh embodiment so the same reference numerals will be appended thereto and the description thereof will be omitted.

Figure 74:
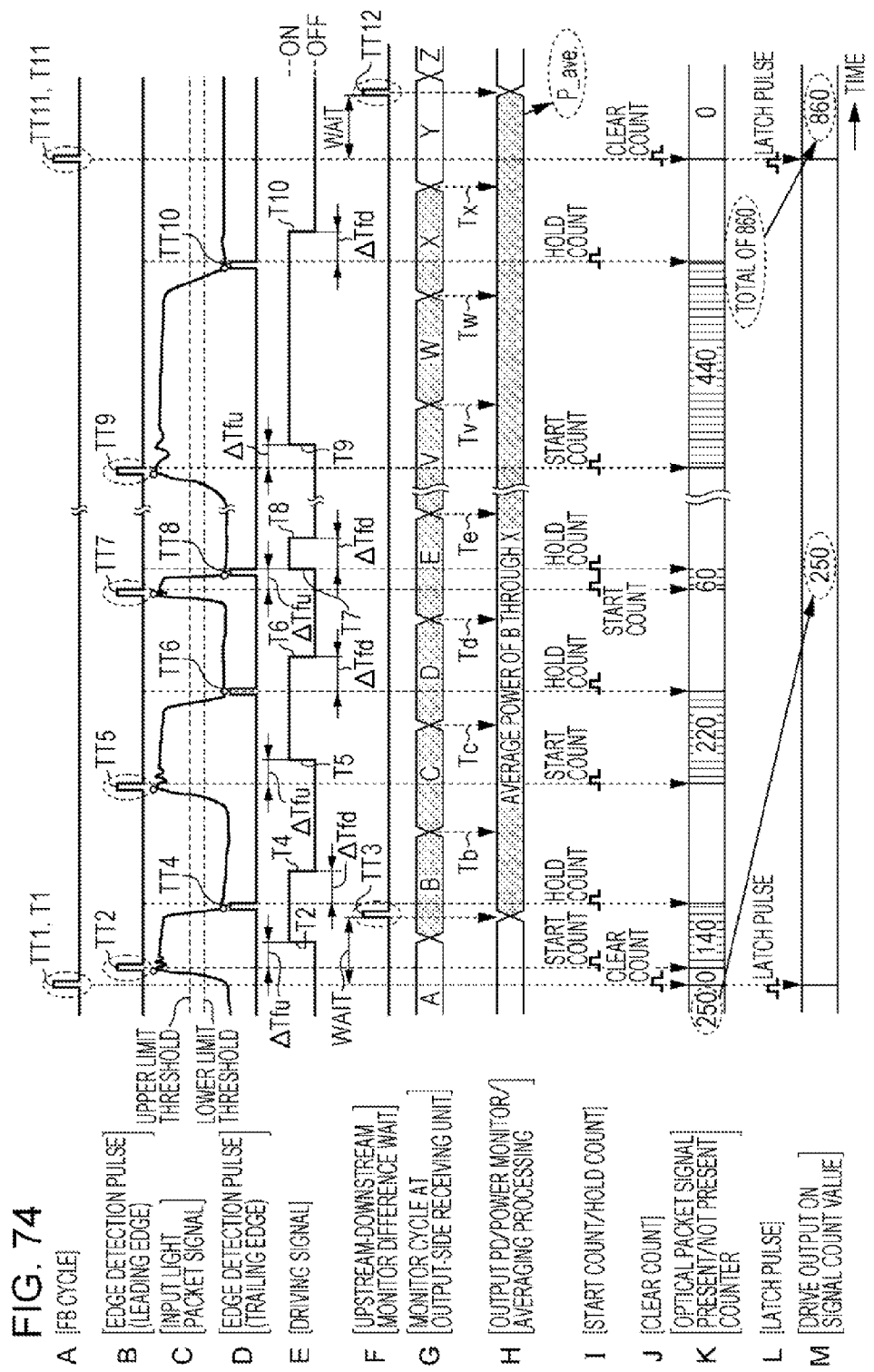
FIG. 74 is a diagram illustrating an example of operating timing of the level control system relating to the twelfth embodiment.

Next, FIG. 74 will be referenced to describe the edge detecting of the input-side optical packet signal. FIG. 74 is a diagram depicting an example of the operating timing of the level control system relating to the twelfth embodiment. Note that the timing depicted in FIG. 74 is an example, and the present invention is not limited to such timing. The portions similar to FIG. 70 have the same reference numerals appended thereto. Also, in FIG. 74, the optical packet signal between points in time T8 and T9 is presumed to be OFF, and thereby is omitted.

As for the leading edge detecting and trailing edge detecting of the input-side optical packet signal, a signal that is monitored by the input-side receiving unit 1106 is used.

Upon an optical packet signal having been input in the input-side transfer path 100, the input-side monitor circuit 1314 may process at high speed and so responds following the ON and OFF of the optical packet signal. With the edge detecting/counting unit 1312, packet input is captured with the leading edge of the optical packet signals, and the passing through of the packets is captured with the trailing edges thereof. By capturing the edges of the optical packet signals, ON or OFF of the packet signals may be identified, and by counting the ON level segments, the packet density (packet duty ratio) within a fixed time period (worth one FB cycle) is computed. For example, upon setting one cycle of FB processing as a fixed time period, the packet density may be computed for every FB cycle.

Obtaining Control Error

Unlike a function device that outputs ASE such as an SOA, a function device that does not output ASE (noiseless device) is used as the optical level control device, for example. In this case, even if the rising of the input-side optical packet signal is given a temporal margin Mu and the driving signal turned ON, and the falling of the input-side optical packet signal is given a temporal margin Md and the driving signal turned OFF, extra light is not output. Therefore, the input light 1242 of the input side of the optical level control device and the output light 1344 of the output side match the ON/OFF duty ratio of the optical packet signal, and do not change. Thus, the duty ratio of the ON and OFF obtained from the input-side optical packet signal is used to compute the peak level. The duty ratio herein is obtained by detecting the optical packet signal edge with the edge detecting function of the edge detecting/counting unit 1312, for example, and by computing the ratio $R_3$ which the ON state of the optical packet signal occupies with the signal state computing function.

(1) Adjustment of Fixed Time

There are cases wherein the input timing of the duty ratio computed from the input-side optical packet signal and the input timing of the average value of the signals subjected to level control by the optical packet signals. In such a case, the point-in-time adjusting unit 1336 awaits output of the average value of the signals output from the output PD/power monitor/averaging processing unit 1232, based on the time difference between detection of the optical packet signal and the monitoring of the output-side signal. The segments of the optical packet signals counted by the edge detecting/counting unit 1312 and the time region monitored by the output-side receiving unit 1122 are then matched. The average value of the signal of the matched time region is corrected based on the count value of the edge detecting/counting unit 1312, whereby the peak level of the segment thereof is computed.

In the case that the end of the FB cycle is at point in time TT1 (point in time T1) and point in time TT11 (point in time T11) as depicted in FIG. 74A, the FB cycle is one cycle from the point in time TT1 to the point in time TT11. During this one cycle, multiple optical packet signals pass through the optical level control unit 1204.

The input-side optical packet signal confirmed with the edge detecting/counting unit 1312 repeats the ON state and OFF state as depicted in FIG. 74C. Detecting the leading edge is performed by the optical packet signal outputting an edge detecting pulse in the event of moving from a signal level lower than an upper-limit threshold to a higher signal level, as depicted in FIG. 74. In FIG. 74B, a leading edge detecting pulse is output at points in time TT2, TT5, TT7, and TT9. Trailing edge detecting is performed by outputting an edge detecting pulse in the event that the optical packet signal moves from a signal level higher than a lower-limit threshold to a lower signal level. In FIG. 74D, a trailing edge pulse is output at points in time TT4, TT6, TT8, and TT10. Thus, by performing edge detecting, the ON state of the optical packet signal (between TT2 and TT4, between TT5 and TT6, between TT7 and TT8, and between TT9 and TT10) and OFF state (between TT1 and TT2, between TT4 and TT5, between TT6 and TT7, between TT8 and TT9, and between TT10 and TT11) may be confirmed. Note that TT1, TT2, . . . TT12 indicate each point in time.

A time difference ($\Delta Tf$) resulting from signal transmittance occurs between the input-side packet signal variations depicted in FIG. 74B and the driving signals depicted in FIG. 74E. Also, since a margin is set before/after the packet, the time difference on the rising side of the signal ($\Delta Tfu$) becomes shorter than ($\Delta Tf$), and the time difference on the falling side of the signal ($\Delta Tfd$) becomes longer than the time difference ($\Delta Tf$). If we say that the rising margin time is Mu and the falling margin time is Md, then the time difference $\Delta Tfu$ and $\Delta Tfd$ are as in the following Expression (24) and Expression (25), and $\Delta Tfu < \Delta Tfd$ holds. Note that the time differences between TT2 and T2, between TT5 and T5, between TT7 and T7, and between TT9 and T9 indicate $\Delta Tfu$, and the time differences between TT4 and T4, between TT6 and T6, between TT8 and T8, and between TT10 and T10 indicate ΔTfd.

$$\Delta Tfu = \Delta Tf - Mu \quad (24)$$

$$\Delta Tfd = \Delta Tf + Md \quad (25)$$

Variations to the input-side optical packet signal happen before variations to the driving signal. Also, variations to the driving signal happen before the signal measured with the output-side receiving unit 1122 (FIGS. 70B and 70C). Therefore, as depicted in FIG. 74F, a wait signal occurs at points in time TT3 and TT12, delayed from the signal expressing the end of the FB cycle occurs at points in time TT1 and TT11. The time difference of the signals expressing the end of the FB cycle and the wait signals (T3-T1) and (T12-T11) is an adjusted time for computing the average value of the duty ratios and signal levels, referencing the input light of the same predetermined segment, and the lengths of time thereof are the same. The wait signal is generated by the point in time adjusting unit 1336.

(2) Computing the Signal Level Average Value (P_ave.)

FIG. 74G indicates a monitoring cycle by the output-side receiving unit 1122. The setting of the monitoring cycle and the output of the monitoring signals average value are similar to the eleventh embodiment so the description thereof will be omitted.

FIG. 74H indicates averaging processing of the monitoring values of the output-side PD 112. Except for computing the average power of the monitoring cycle X from the monitoring cycle B output between points in time TT3 and TT12, the processing is the same as in the eleventh embodiment so the description thereof will be omitted.

(3) Count of Signal State Information

FIG. 74I indicates the timing of count starting and count holding in the event of counting the ON state of the optical packet signal. Count starting occurs at the points in time that the optical packet signal changes from an OFF state to an ON state (points in time TT2, TT5, TT7, TT9), and count holding occurs at the points in time that the optical packet signal changes from an ON state to an OFF state (points in time TT4, TT6, TT8, TT10). Based on these signals, the number of clocks of the digital control circuit 1306 from count starting until count holding is counted.

FIG. 74J indicates the timing of clearing (resetting) the count of clocks, i.e. the timing to return the count value to zero. Count clearing is performed to match the times TT1 and TT11 at which a signal occurs to indicate the end of the FB cycle.

FIG. 74K indicates the count state of the optical packet signal duty ratio. The count is returned to 0 at points in time TT1 and TT11, and during the time from the count clearing at point in time TT1 to the point in time TT11 wherein the next count clearing occurs, the count starting and count holding are repeated. Processes other that these are similar to the eleventh embodiment so the descriptions thereof will be omitted. Note that with the count in FIG. 74K, 140 clocks are counted between points in time TT2 and TT4, 220 clocks are counted between points in time TT5 and TT6, 60 clocks are counted between point in time TT7 and TT8, and 440 clocks are counted between points in time TT9 and TT10. Accordingly, this indicates that, under the premise that the optical packet signal during the points in time TT8 and TT9 is in the OFF state, a total of 860 are counted during one FB cycle. This count does not include margins, and so is smaller as compared to a count of intermittent signals (FIG. 70I). The accumulated count of 860 is returned to 0 with the count clearing that occurs at point in time TT11, and a new count is started after point in time TT11. This count is performed with the edge detecting/counting unit 1312.

FIG. 74M indicates the count value of the ON state of the optical packet signals. As depicted in FIG. 74L, upon a latch pulse occurring, count immediately prior to the pulse occurring is held. The latch pulses occur to match the points in time TT1 and TT11 wherein signals indicating the end of the FB cycle occur. Thus, the count in the immediately prior FB cycle is held. At point in time TT1 the latch pulse is received, and the count immediately prior to the point in time TT1, i.e. the count of 250, is held as the count value. Also, at point in time TT11 the next latch pulse is received, and the count immediately prior to the point in time TT11, i.e. the count of 860, is held as the count value. Note that the count value depicted in FIG. 74M is the count value of an ON state in the FB cycle, and expresses the signal state information. This is the duty ratio count used for computing the duty ratio.

Computing the packet density, computing the peak level, computing the control error, setting the target output level, and updating the LUT are similar to the eleventh embodiment so the description thereof will be omitted. Based on the signal state information of the intermediate signal, the average value of the signal levels received with the output-side receiving unit 1122 is corrected and a peak level obtained, whereby updating the LUT in the case of performing level control of the intermittent signal is more correct. Thus, level adjusting at the optical packet unit or optical burst signal unit may be performed as to the optical packets and optical burst signals, whereby packet signals and burst signals having different strength may be maintained at a fixed strength, and a flexible network may be made. Further, easing the permitted values of the output level of the optical transmitter and the degree of allowing the input level of the receiver is enabled, and the cost of the optical packet transmitter/receiver may also be reduced. Also, strict optical level diagram design costs and reduction in operating costs of the optical packet and optical burst network may be expected.

Features, advantages, modifications or the like will be exemplified for the above-described twelfth embodiment.

An example of using a function device that does not output ASE for an optical level control device has been described, but the present invention is not limited to this. For example, in the case of using a function device wherein the ASE occurring amount is small as compared to the packet signal output, even if the peak level is computed based on the input-side optical packet signals, the error is small. Also, in the case of using a device having a short time for the operations to stabilize from the start of driving, and setting the margin to be short, the error amount will be small even if the peak level is computed based on the input-side optical packet signal.

Thirteenth Embodiment

I. Background of the Thirteenth Embodiment

The thirteenth embodiment realizes a level control circuit which accurately controls an output level (peak value) to be in a constant manner, without depending on the density state of the optical packet signals and even if the input level of the optical packet signal has been changed, so as to be capable of controlling to an accurate target level (peak value). That is to say, this level control circuit constantly maintains output signal components to be a constant target value even in an environment where the density and strength of the signals in the form of packets may change, and further not only maintains the target value to be constant but also realizes control to draw into the target value.

Problems to be solved by the level control circuit according to this thirteenth embodiment will be exemplified below.

(1) In the event that the optical packet signal of which an input power and packet length are various is input, constant control of the optical output peak level is significant.

(2) To achieve high speed o with FF control by ROM table and high precision of the FB control to decrease the difference between target value and actual output level.

(3) Noise such as ASE or the like, besides primary signal power, are mixed into the output power, and accordingly, performing ALC (automatic output level constant control) where the primary signal power value of which noise components such as ASE or the like have been removed is constantly controlled, rather than performing simple APC (Automatic Power Control: automatic total output power constant control), is necessary and important, but control thereof is difficult.

(4) In the event that the input signal is consecutive light which is not in the state of packets, the ASE power value is proportional to the control amount of the optical amplification device, and accordingly, with FB control, the ASE power is calculated using the driving current value (average value) per predetermined time. Accurate ASE power cannot be calculated with this of the input light is a high speed packet signal, due to the following reasons.

(5) In the event of obtaining ASE power amount in the input packet signal light from the driving current value, the relation between the driving current value and the ASE value is nonlinear, so that accurate ASE power amount cannot be obtained from the driving current average value over a predetermined time.

(6) The density state of the input packet signal (ON level state or OFF level state) changes, so even if the ASE power value of each burst signal may be obtained, accurate ASE power amount cannot be obtained even if these are averaged by the number thereof.

(7) Thus, higher precision ASE power calculating means is needed to the ALC control of the optical packet signal.

Figure 75:
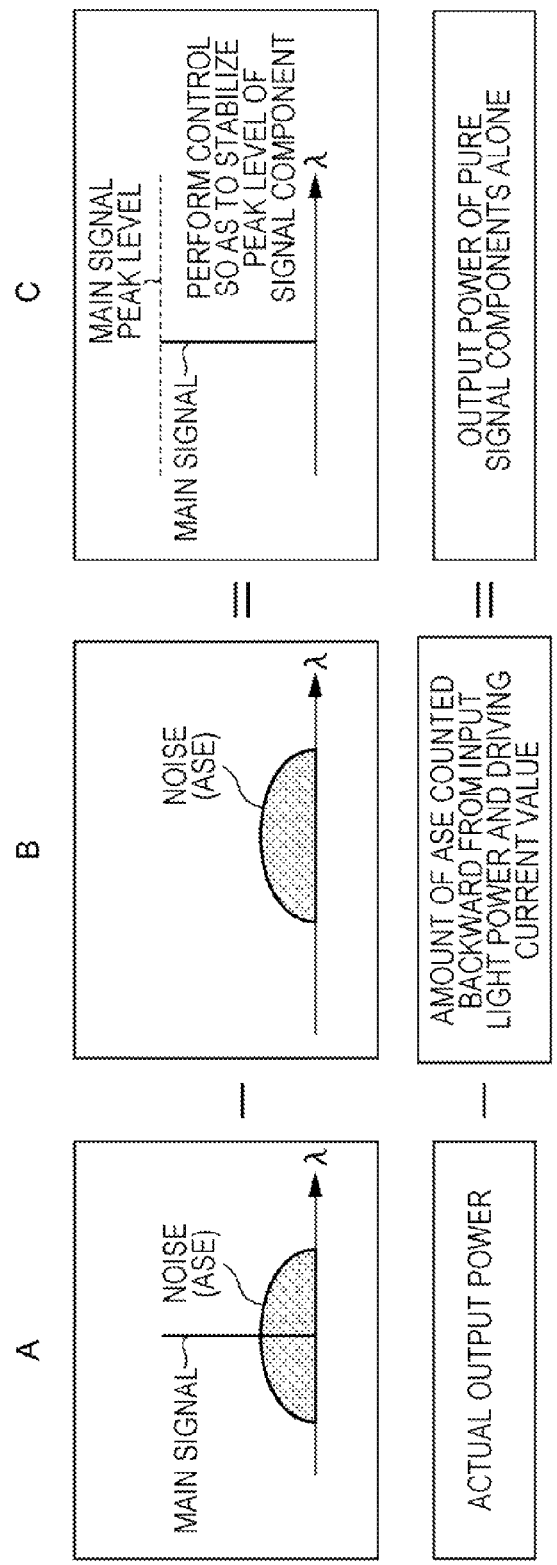
FIG. 75 is a diagram illustrating a relation between output power and ASE amount.

FIG. 75 will be referenced to describe the peak level control of signal components regarding these problems. FIG. 75 indicates the peak level control of signal components.

As shown in FIG. 75, the ASE amount (FIG. 75B) calculated backward from the input light power and driving current is obtained along with the actual output power (FIG. 75A). The peak level of the signal components are controlled so as to be constant, by subtracting this ASE amount from the actual output power and obtaining the output power with only pure signal components (FIG. 75C).

Figure 76:
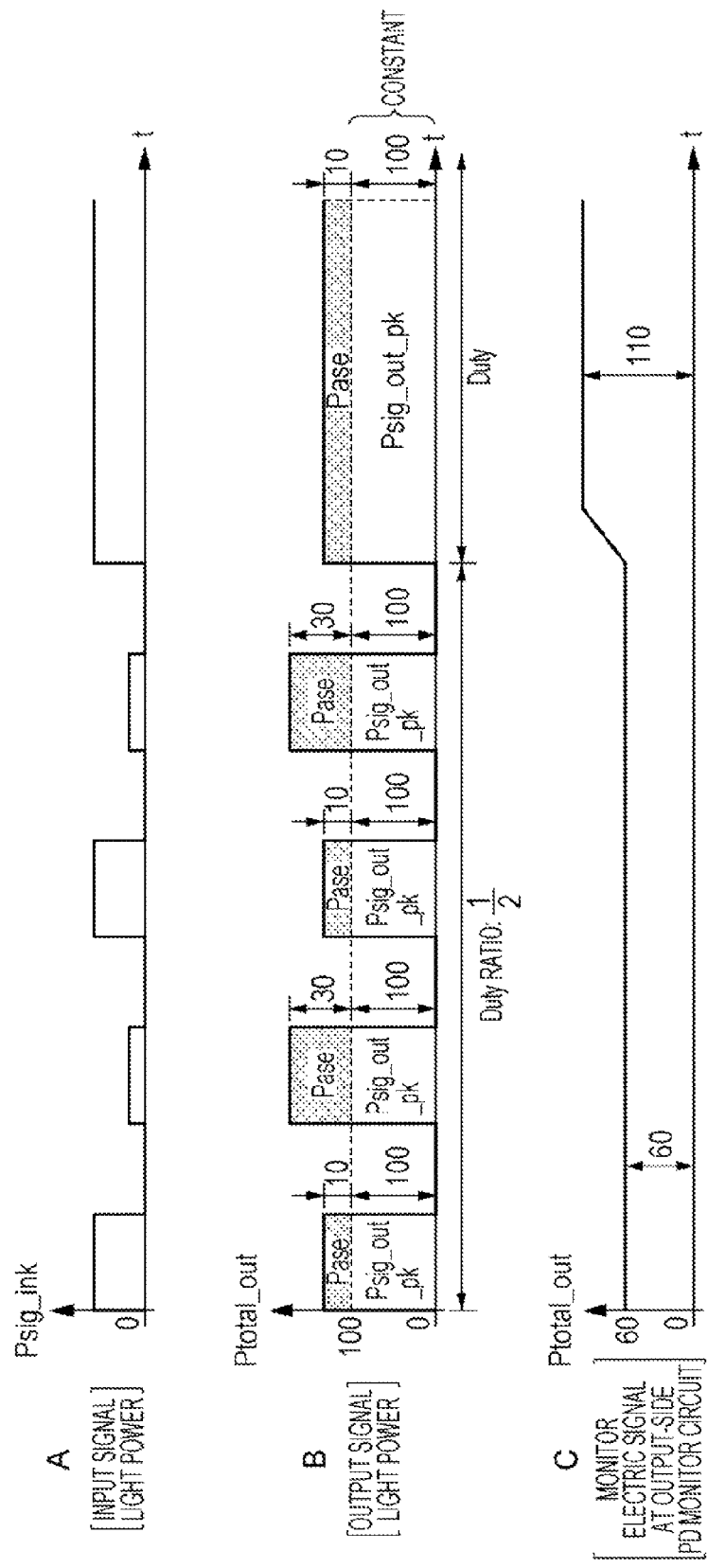
FIG. 76 is a diagram illustrating an example of input signal optical power, output signal optical power, and monitor electrical signal.

Next, FIG. 76 will be referenced to describe control for constantly maintaining output signal components to be a constant target value and drawing in the constant value. FIG. 76 illustrates input signal optical power, output signal optical power, and monitor electrical signal.

The input signal optical power shown in FIG. 76A is a signal before performing level control, so the level of the signal varies for each packet signal. With regard to this, a level control circuit is realized wherein the output signal optical power, as shown in FIG. 76B, can be accurately controlled to an output level (output level from which is removed the ASE component Pase; peak value) Psig_out_pk to be constant, without depending on the density state of the optical packet signal, and even if the input level of the optical packet signal has been changed, so as to be controlled to an accurate target level (peak value).

The signal repeats variations at a high speed, and accordingly the monitor electrical signal monitored at the PD monitor circuit of the output side is monitored as the temporally averaged value as shown in FIG. 76C. Thus, performing control of the Psig_out_pk to be a constant value, for example 100 or the like, is realized, using this averaged value.

These signal processing constantly maintain output signal components at a constant target value and further not only maintain the target value to be constant, but also realize control for drawing in to the target value, even in an environment where the density and strength of the signal in the packet state changes.

Figure 77:
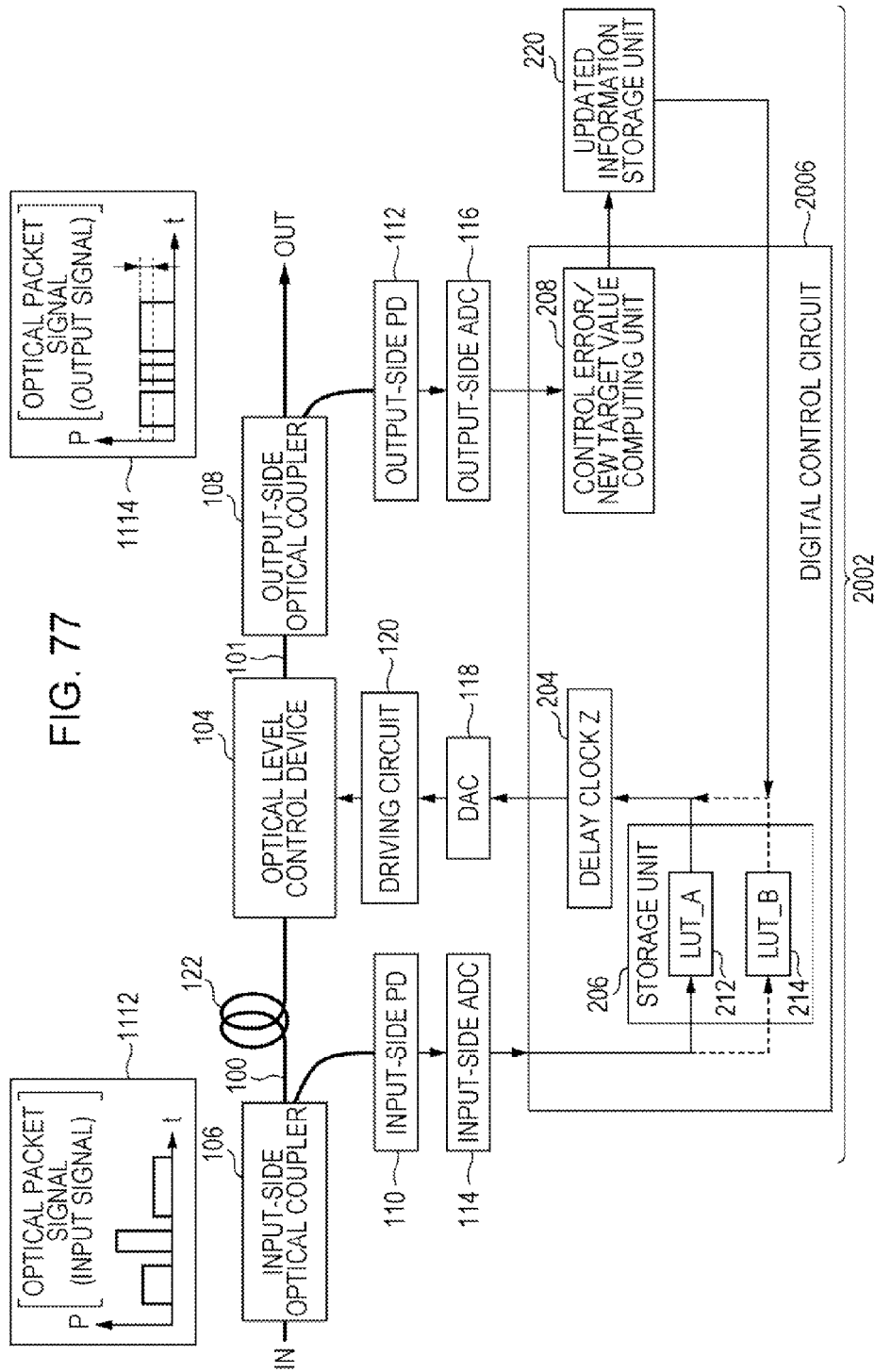
FIG. 77 is a diagram illustrating an example of the basic configuration of a level control system.

Next, FIG. 77 will be referenced to describe level control. FIG. 77 illustrates an example of a basic configuration of a level control system. The portions in FIG. 77 that are similar to those in FIGS. 12 and 65 are denoted by the same reference numerals.

With the input side PD 110, high speed response may be performed, and so the optical packet signal may be identified. On the other hand, with the output side PD 112, there is a need for widely securing dynamic range in order to respond wide target setting, and accordingly a log amplifier is disposed, for example. With the log amplifier, frequency response is slow so the peak power (peak value) is not monitored, only temporally averaged optical strength is monitored. Therefore, the peak power (peak value) varies under the influence of the guard time between the optical packet signals. That is to say, the PD monitor value varies in accordance with the line usage rate (packet density).

Therefore, with the control error/new target value calculating unit 208, the monitor signal obtained at the output side PD 112 which takes charge of the feedback control is influenced in accordance with the optical packet density, and accordingly, may be set to an erroneous target value.

Next, FIG. 78 will be referenced to describe variation of the monitor value by duty ratio (the ON/OFF ratio of the packet). The portions in FIG. 78 that are similar to those in FIG. 68 are denoted by the same reference numerals.

In the event that the optical packet signal on the input side varies as shown in FIG. 78A and the operation clock is a cycle such as shown in FIG. 78B for example, the optical packet signal can be subjected to FF control. On the other hand, the variations in the optical packet signal vary quicker than the FB control cycle (FB cycle), so the average value of the optical packet signals below a microsecond is monitored. In each FB cycle Pe1, Pe2, Pe3, and Pe4, the output-side power monitor values obtained from monitoring of the output-side PD 112 are 1968, 2800, 3467, and 1520, as depicted in FIG. 78C. In this way, regardless of the peak level (peak value) of the optical packet signal being constant, the monitor values vary due to the packet density, and accordingly, if the level control of the monitor value is used as it is control will be performed with an erroneous target value.

Next, FIG. 79 will be referenced regarding a case of the PD front end being configured with a log amplifier. FIG. 79 illustrates output waveforms in the event of the PD front end being configured with a log amplifier.

Figure 79A:
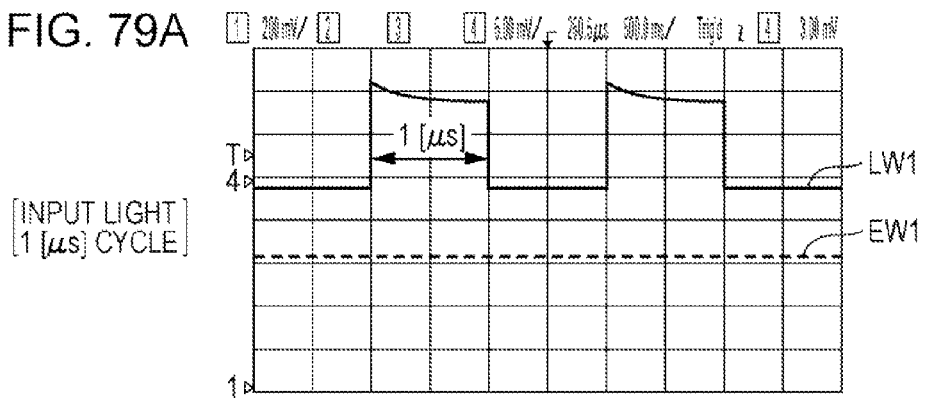
FIGS. 79A, 79B, and 79C are diagrams illustrating an example of power output waveforms in the event of configuring PD front end with a log amplifier.
Figure 79B:
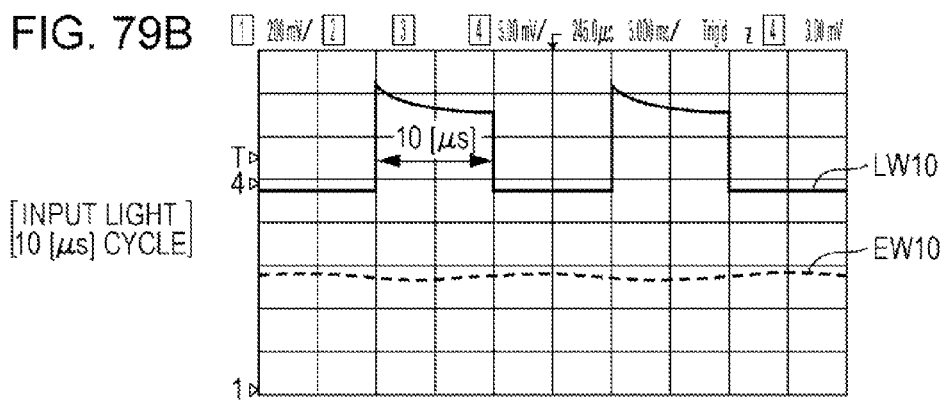
Figure 79C:
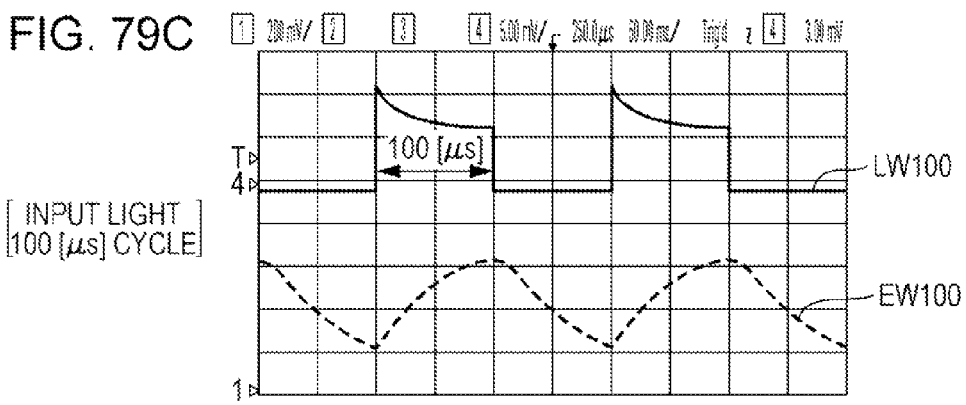

FIG. 79A represents the input light waveform LW1 of input in 1 microsecond cycles and the output electrical waveform EW1 in this case. FIG. 79B represents the input light waveform LW10 of input in 10 microsecond cycles and the output electrical waveform EW10 in this case. FIG. 79C represents the input light waveform LW100 of input in 100 microseconds cycles and the output electrical waveform EW100 in this case.

In this way, the higher the speed of the optical packet signal becomes, the more the output electrical waveform is temporally averaged, and accordingly monitoring of the peak power (peak value) on the output side becomes difficult.

Packet length and guard time regarding actual optical packet signals for optical communication are as follows.

(a) Packet length: tens of nanoseconds through 1 microseconds (b) Guard time: several nanoseconds through tens of nanoseconds Therefore, peak power cannot be observed accurately in the event that the long amplifier is used for the output-side PD 112.

Figure 80:
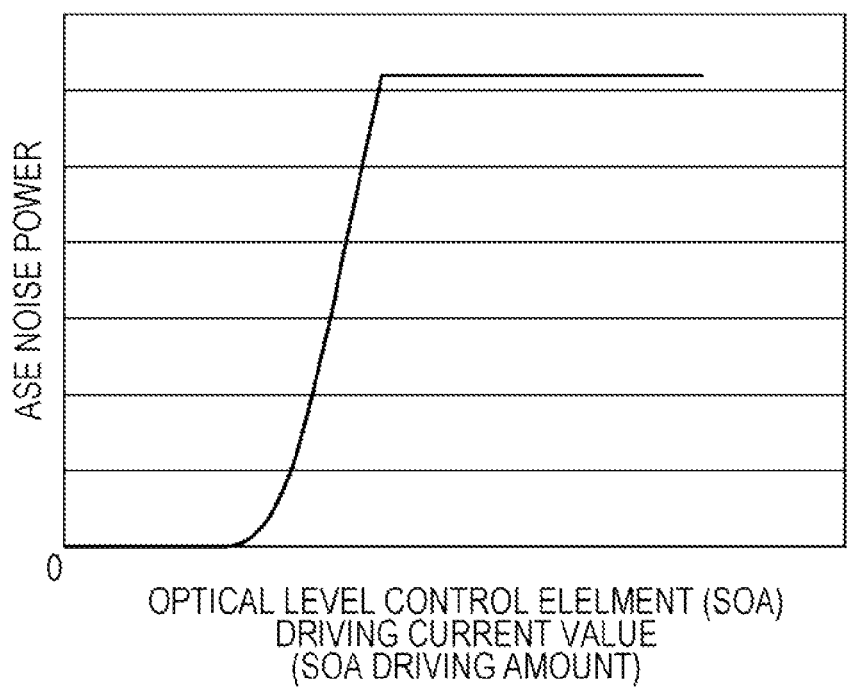
FIG. 80 is a diagram illustrating an example of ASE noise power as to the driving current value of a SOA.

Next, FIG. 80 will be referenced to describe nonlinearity between the optical level control device (SOA) and ASE noise power. FIG. 80 illustrates ASE noise power as to the driving current value of an optical level control device (SOA).

As can be seen here, ASE noise power has nonlinearity as to the driving amount of the optical level control device (SOA). Therefore, in all regions, if an optical level control device (SOA) driving current value is increased N times, the ASE noise power is not increased N/K times as well. Besides, there is no linear (proportionate) relation, and so upon the average value of the ASE noise power from the average value of the optical amplifier device driving amount (driving current value) obtained, so error may occur in the average values of the ASE noise power.

Figure 81:
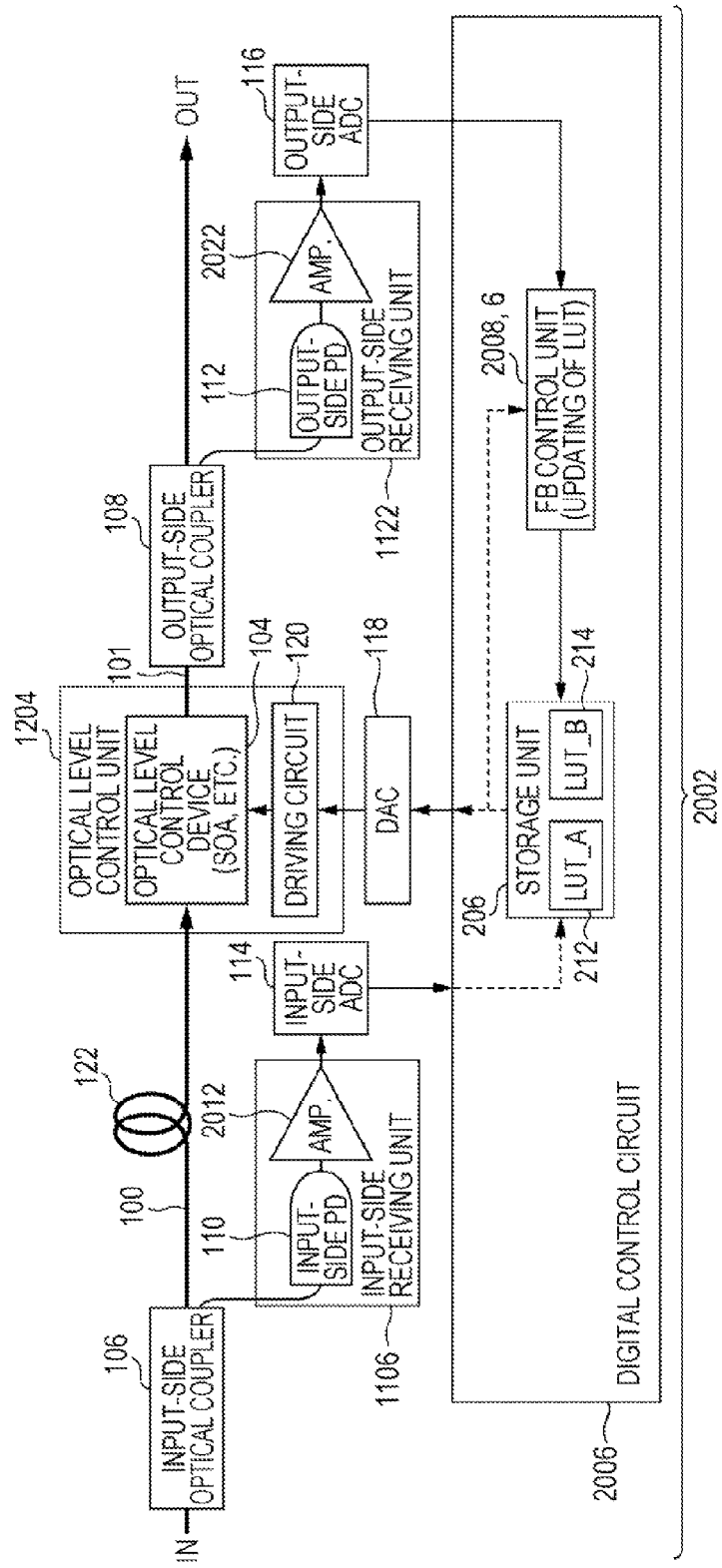
FIG. 81 is a diagram illustrating a configuration example of a level control system.
Figure 82:
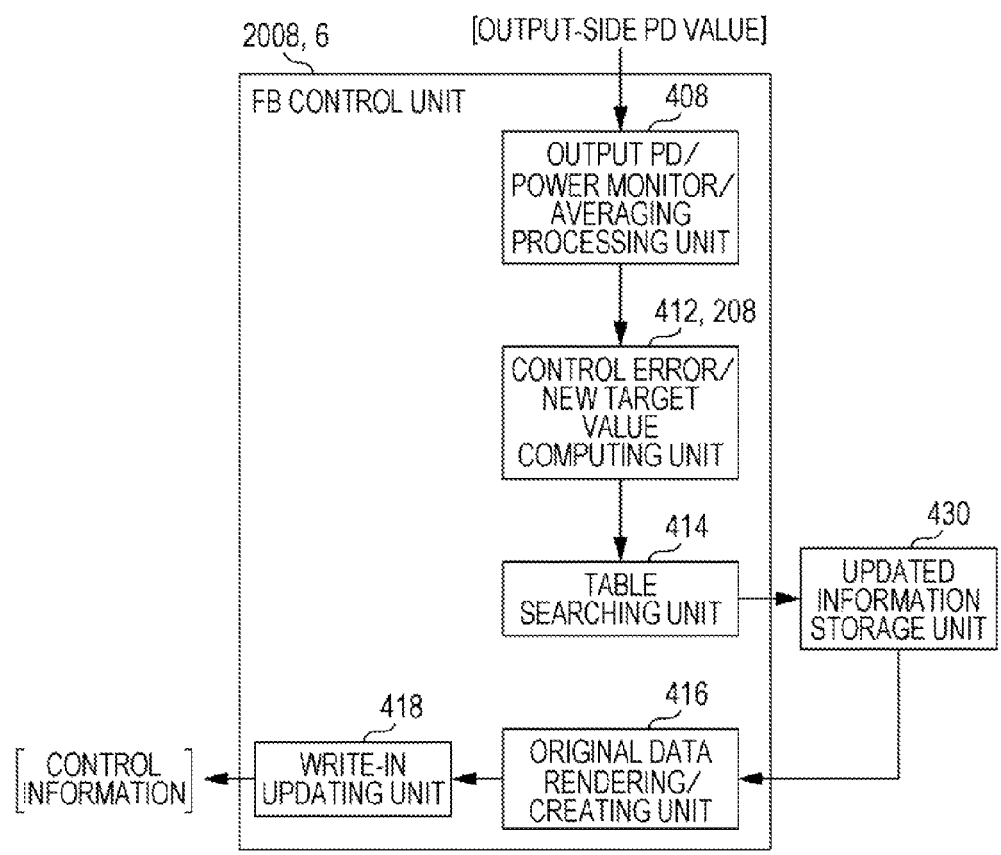
FIG. 82 is a diagram illustrating a configuration example of an FB control unit.

Next, FIG. 81 and FIG. 82 will be referenced to describe a level control system. FIG. 81 illustrates a configuration example of the level control system and FIG. 82 illustrates a configuration example of an FB control unit.

With this level control system 2002, as shown in already-described FIG. 77 and FIG. 81, not only a semiconductor optical amplifier (SOA), but also an optical level control device which used electro-optical effect and magneto-optical effect such as other LN and ferroelectrics is used as the optical level control device 104. With these configurations, processing for removing ASE components peculiar to the SOA is important.

With the level control system 2002, the delay line 122 is disposed on the input side of the optical level control unit 104 which makes the light strength variable, and delays the input light to the optical level control device nit 104 to a time sufficiently longer than the control delay time. In this delay line 122, optical fiber or the like is used, for example, as an optical delay device. This level control system 2002 disposes the input side optical coupler 106 on the input side of the delay line 122 and branches input light by the input side optical coupler 106. One input light is input to the delay line 122 and the other input light is input to the input side PD 110.

The input side PD 110 receives the optical packet signal (input light) on the input side and converts the optical packet signal into an electrical signal, for example. An amplifier 2012 receives and amplifies this electrical signal. The input-side ADC 114 then receives the electrical signal amplified by the amplifier 1012, converts the analog values into digital values, and outputs these as input-side PD values to the digital control circuit 2006. Note that the input-side PD 110 and amplifier 2012 make up the input-side receiving unit 1106. Note that the input-side PD value is an example of a signal level of the first input signal before level control.

The amplifier 2012 is an example of means to amplify a signal output by the input-side PD 110, and for example, is an input-side amplifier unit. A linear operational amplifier may be used, as example, for the amplifier 2012. The amplifier 2012 outputs the amplified signal toward the input-side ADC 114.

The input-side PD value is input to the storage unit 206 of the digital control circuit 2006. In the storage unit 206, for example a DAC value is generated and output as driving control amount with reference to the LUT_A212 or the LUT_B214, based on the input-side PD value.

With this level control system 2002, the output side optical coupler 108 is disposed on the output side of the optical level control device 104, and output light is branched by the output side optical coupler 108. One output light is output toward the outside of the level control system 2002. For example, upon the level control system 2002 made up as the level control unit 702 as shown in FIG. 61, one output light becomes light output toward the outside from this level control unit 702. The other output light is input to the output-side PD 112.

The output side PD 112 receives the optical packet signal (output light) on the output side and converts the optical packet signal into an electrical signal. An amplifier 2022 receives and amplifies this electrical signal. The output-side ADC 116 then receives the electrical signal amplified by the amplifier 2022, converts the analog values into digital values, and outputs these as output-side PD values to the digital control circuit 2006. Note that the output-side PD 112 and amplifier 2022 make up the output-side receiving unit 1122. Note that the output-side PD value is an example of a signal level of the second input signal.

The amplifier 2022 is an example of means to amplify the signal output from the output-side PD 112, and for example is an output-side amplifier. The amplifier 2022 outputs the amplified signal toward the output-side ADC 116. With the output-side receiving unit 1122, resolution is prioritized over speed in order to monitor the output signal level with high precision. Therefore, to the amplifier 2022, the log amplifier which has the advantage of greater amplification accuracy is used for a front-end circuit.

The FB control unit 2008 of the digital control circuit 2006 is an example of the information updating unit 6, for example, and updates control information of the storage unit 206 according to the output-side PD value. The FB control unit 2008 is made up, including output PD/power monitor/average processing unit 408 and the control error/new target value accumulated unit 412. The FB control unit 2008 shown in FIG. 82 is configured of the table searching unit 414, original data expansion creating unit 416, and write-in updating unit 418, in addition to processing unit 408 and calculating unit 412. The FB control unit 2008 is configured similar to the fifth embodiment by sending information to the updating information storage unit 430 and receiving information in the updating information storage unit 430. The output PD/power monitor/average processing unit 408, control error/new target value calculating unit 412, table searching unit 414, original data expansion creating unit 416, write-in updating unit 418 and updating information storage unit 430 are similar to the fifth embodiment, and the description thereof will be omitted.

In the event that a device which generates noise components such as ASE or the like at time of amplifying, a device such as SOA is used for example, noise such as ASE or the like is included in the optical signal output from the optical level control device 104. Thus, the control error/new target value calculating unit 412 of the FB control unit 2008 has a function to remove noise generated at the time of the optical level device 104 amplifying light (noise removing function), in addition to already-described functions and makes up a control information calculating unit for example, and performs processing to remove the noise. The output peak power only for signal components is made to be constant by subtracting noise components, rather than making the output peak power to be constant.

As described above, with this level control system 2002, an optical delay device (optical fiber) sufficiently longer than control delay is disposed before an optical level control device which varies the optical strength. The configuration is such that a function capable of controlling electrical delay amount is provided, and the difference of delay time between actual control delay time and time when passing through the delay line (optical fiber) compensated for by the delay function of the digital control circuit 2006. Thereupon, in order that accuracy by the feedback (FB) control and high speed by the feed forward (FF) control may both be achieved, a LUT (Look Up Table) with two or more sides, for holding a relation between "input signal strength versus driving voltage (current) value" which is used by the feed forward control, is provided, and a function to load a new target output value table as to the unused side (B side) of the LUT, based on the information that can be obtained by the feedback is provided. The level control system 2002 has a function that, upon table loading to the unused side (B side) ending, switching with the used side (A side) is performed, and repetition of table updating is performed as to the A side which has been an unused side this time, based on the information that can be obtained by the FB control again.

Heretofore, with the FB side, the average value of the ASE noise power amount output from average value of the time of the SOA driving current has been obtained, and calculating of control error and new target value has been performed using the average value of the ASE noise power amount thereof. However, in the event of performing level control of optical packet signals, SOA driving current is pulse driving and the time averaging ASE noise power amount may not always obtain a correct value. As shown in FIG. 80, even if the driving current value becomes N times, this does not mean that the ASE noise power will become N/K times in proportion. That is to say, driving current and ASE noise power do not have a linear relation so that the average value of ASE noise power cannot be calculated from the average value of the driving current, and accordingly error occurs. Generally, the ASE noise power has been calculated and feedback processing to draw in an output target value has been performed, based on the time averaging driving current value, error occurs.

As described above, we aim to realize a level control circuit that stabilizes output level as to an optical packet signal, whereby a constantly correct peak level (which does not mean the time-averaging level) can be stabilized without being influenced by line usage rate (driving duty ratio), response speed of the PD monitor circuit, and so forth.

Figure 83:
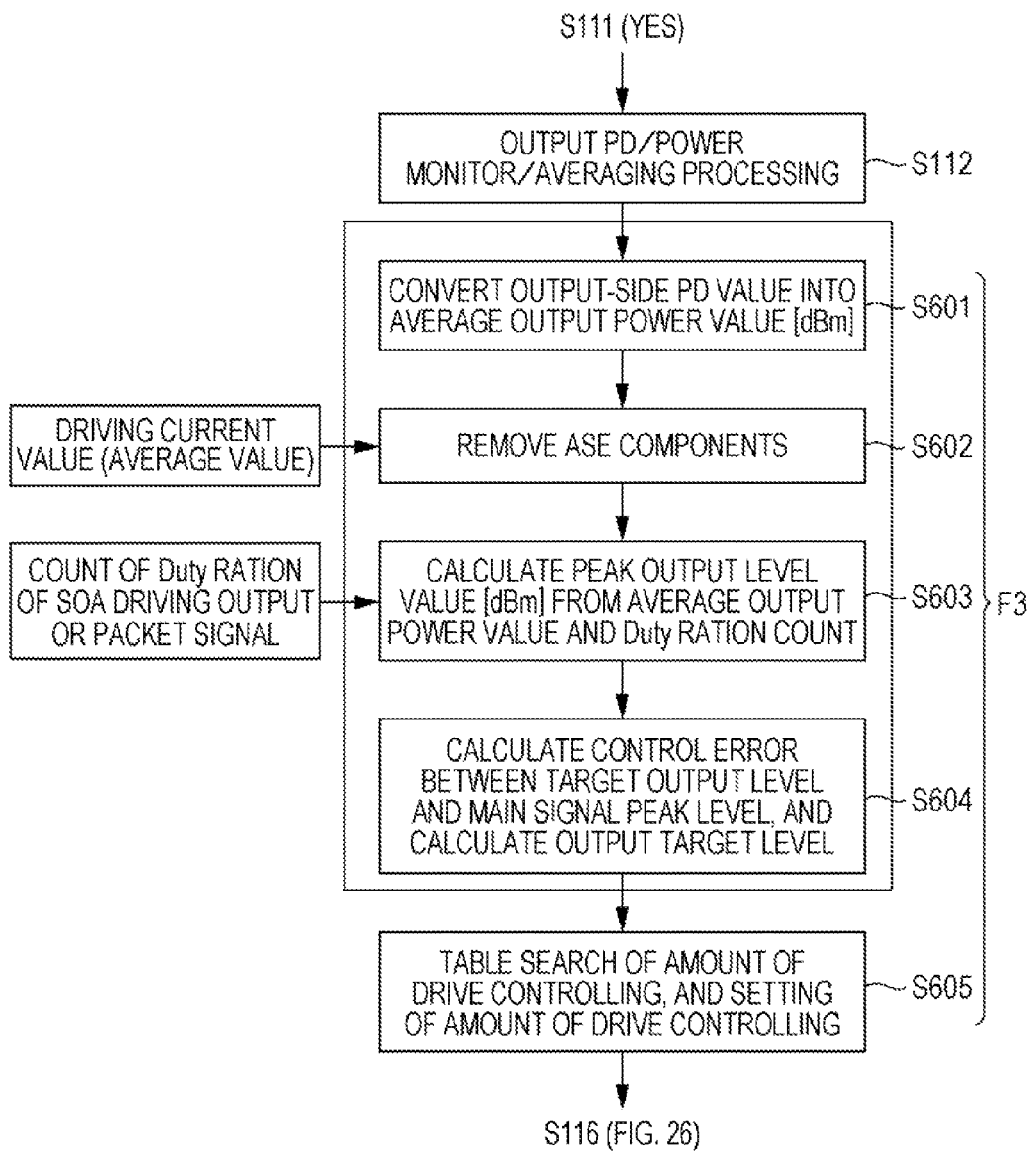
FIG. 83 is a flowchart describing an example of control error/new target value calculating processing.

Next, FIG. 83 will be referenced to describe processing of level control. FIG. 83 is a flowchart describing an example of control error/new target calculating processing. In the flowchart depicted in FIG. 83, the processing F3 is processing to be performed instead of steps S113 through S115 in the flowchart depicted in FIGS. 26A and 26B, for example. Also, steps S601 through S605 include the processing to remove the noise. The processing from the initial settings to the FB loop ON/OFF determination (steps S101 through S111 in FIG. 26) is similar to that of the fifth embodiment, for example so the descriptions and diagrams thereof will be omitted. Also, the processing from the data write-in updating of a table to the LUT flag updating (steps S116 and S117 in FIG. 26) is also similar to that of the fifth embodiment, so the descriptions and diagrams thereof will be omitted. The processing depicted in FIG. 83 is an example. The input PD/power monitor/average processing unit 404 may be omitted and step S102 depicted in FIG. 26 may be omitted. A configuration may be made so as to perform the step S102 similar to the fifth embodiment by providing the input PD/power monitor/average processing unit 404 to the digital control circuit 2006.

Upon receiving the output-side PD value of the output side optical signal, averaging processing of the received signal is performed (step S112). With this processing, the average value of the signal that the output-side PD 112 received with the monitor cycle of the output-side receiving unit 1122 is output. The average value is amplified with the amplifier 2022, and converted to a digital value with the output-side ADC 116. The output PD/power monitor/averaging processing unit 408 averages the digital values output with the output-side ADC 116 further toward an average value of FB cycle. The average value of the received light signal is thus obtained.

The average value output by the output PD/power monitor/averaging processing unit 408 is a PD value, and is an AD-converted value (ADC value), so conversion of the output side PD value to an average output power value dBm is performed with the control error/new target value calculating unit 412 (step S601). The average output power value dBm is an average value of output power. Note that the average value of the average output power is an example of an average value of the signal level (P_ave.), and indicates a value the signal level expressing the power of the output side.

The control error/new target value calculating unit 412 receives, for example, the average value of the driving current value as driving control amount and removes average output power value and ASE components from the average value of the driving current value (step S602). The control error/new target value calculating unit 412 receives, as signal state information, SOA driving output or duty ratio count of packet signal and calculates an average output power value and peak output level value dBm from the duty ratio count (step S603). The duty ratio count is a duty ratio count expressing the number counts of ON signals on an FB cycle. In this case, the control error/new target value calculating unit 412 obtains the duty ratio count and duty ratio from total clock number of the FB cycle. The count of ON signals of the SOA driving output, for example, may be configured similar to the eleventh embodiment, and counted by obtaining a signal output from the storage unit 206 toward the DAC 118. Also, the number of counts of ON signals of the packet signal may be configured similar to the eleventh embodiment, and counted based on the optical packet signal that the input-side PD 110 has received. The duty ratio is obtained from the duty ratio count and total clock in the FB cycle.

The control error/new target value calculating unit 412 calculates the difference (control error) between the target output level and peak output level which does not include noise due to noise removing (primary signal peak level), adds the amount equivalent to the control error thereof to the current target output level, and calculates a new target output level (step S604). Table searching of the driving control amount to be set, and setting of the found driving control amount (step S605) are then performed. Except for calculating the control error using the peak power value instead of the output-side PD value, this is similar to the fifth embodiment so the description thereof will be omitted. The average value and signal state information of the output signals may be used thus to update the LUT.

Figure 84:
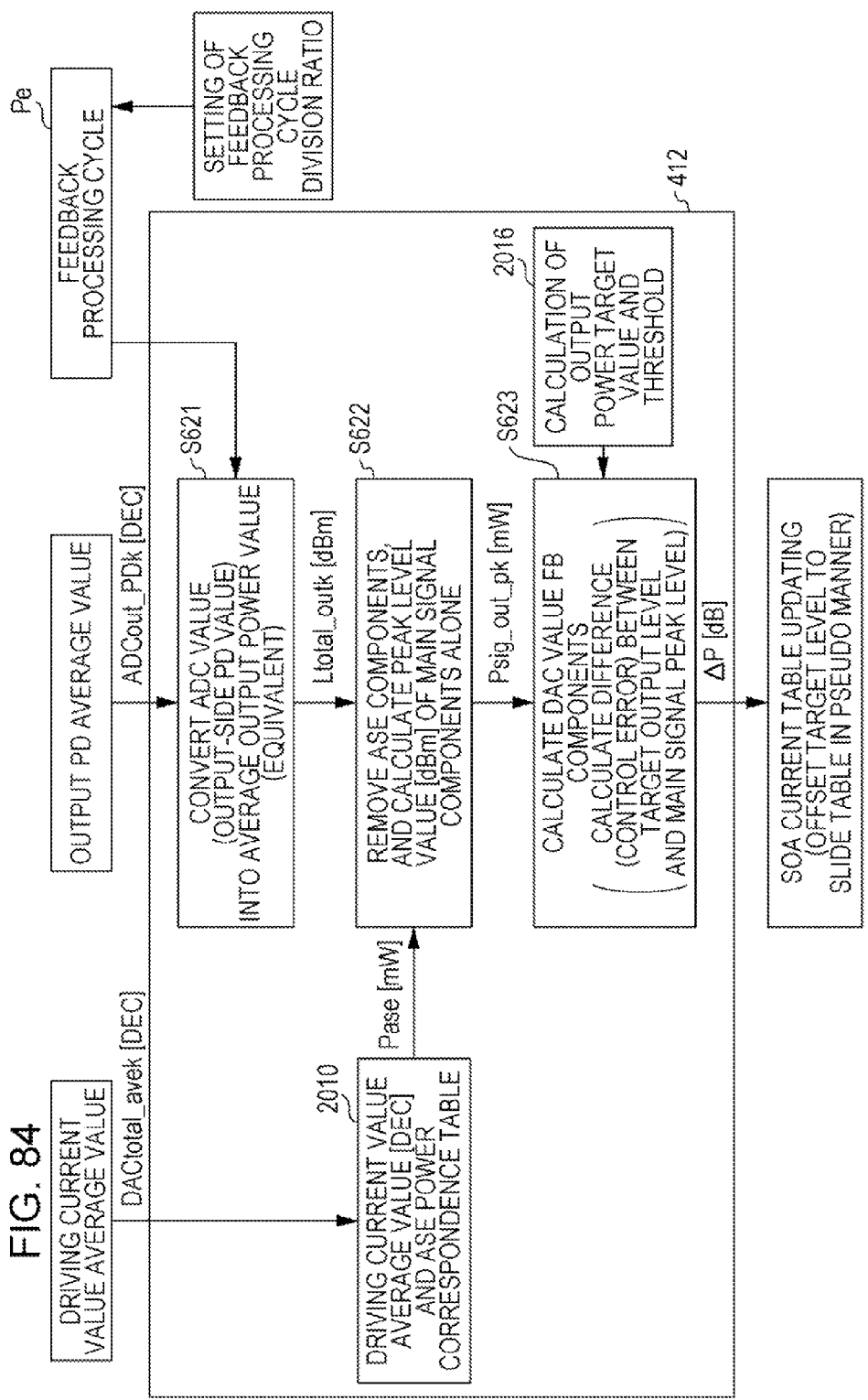
FIG. 84 is a flowchart describing an example of processing for obtaining control error by removing ASE components.

Next, FIG. 84 will be referenced to help better understanding regarding control of component reduction of ASE components. FIG. 84 is a flowchart illustrating an example of processing to obtain control error by removing the ASE components. The flowchart shown in FIG. 84 corresponds to ASE component reduction and calculating of the control error of the flowchart in FIG. 83. Step S621 in FIG. 84 corresponds to step S601 (FIG. 83) and step S622 and step s623 in FIG. 84 corresponds to processing (FIG. 83) up to calculating control error in step S604 from step S602 (FIG. 83). Note that, each block (S621, S622, S623, 2010, 2016) shown in FIG. 84 represents a function of the control error/new target value calculating unit 412. The configuration shown in FIG. 84 is an example and the present invention is not limited to this configuration.

The average value of output-side PD value (output PD average value) ADC out_PDK [DEC] is temporal average value of the output PD monitor within one processing section and may be obtained by averaging processing (step S112 in FIG. 83) this output PD average value may be obtained using Expression (26), for example. Note that the output PD monitor accumulated value is the monitor accumulated value of the output PD value obtained by accumulating the output PD value during an FB processing cycle. The output PD monitor accumulated number is the number of times of having performed accumulation of the output PD value within the a section of accumulated output PD values, i.e., the already-described FB processing cycle, and is the monitor accumulated number of the output PD value. Note that [DEC] represents that the value is the value expressed by decimal number (Decimal).

temporal average value of the output PD monitor (output PD average value)=output PD monitor accumulated value/accumulated number of output PD monitor    (26)

The output-side PD value is converted into an average output power value dBm (step S621). With this processing, the output PD average value obtained by Expression (26) is converted into an average output power L total_outk (increment: dBm) (increment: dBm) (step S621). The average output power L total_outk dBm may obtain an average output power P total_outk mW by converting toward a further linear value. A peak output level P sig_outk mW may be calculated, using P total_outk mW.

In step S621, duty ratio of line usage representing usage rate of signal line is accumulated and P sig_outk mW are calculated by considering this line usage duty ratio. In this case, Psig_outk mW can be obtained by the following Expression (27) and Expression (28). Note that ON level count is the count of ON signals in the FB cycle, and is the number which were counted the number of ON signals, i.e. packet signals passing though the control circuit at a predetermined interval. Total count of FB cycle is the total number of signals in FB cycle, and for example, is the total of count of ON signals and count of OFF signals. Also, FB cycle may be obtained from feedback processing cycle Pe set based on the frequency dividing rate setting of the feedback processing cycle set in the digital control circuit 2006.

$P\text{sig\_out}k \, mW = P\text{total\_out}k \, mW \times \text{inverse of duty ratio}$    (27)

Inverse of Duty ratio=total count in FB cycle/ON level count    (28)

In the event of not considering line usage duty ratio and in the event of the line usage duty ratio being 1, Psig_outk mW is calculated as Psig_outk mW=Ptotal_outk mW.

Peak output level P sig_outk mW and ASE average power Pase mW are used for processing to remove ASE components and calculate peak level value only of primary components (step S622). ASE average power Pase mW in 1 feedback section is an example of information relating to noise, i.e. noise information and may be obtained using an driving current value average value [DEC]-ASE power corresponding table 2010, for example. This driving current value average value [DEC]-ASE power corresponding table 2010 is, for example, "driving current value average value [DEC] versus ASE power (device output corresponding value mW) corresponding table". The average value of this driving current value is a value represented by DAC total_avek "DEC", and for example, may be obtained by acquiring a driving current value output from the storage unit 206 toward the DAC 118. This driving current value average value DAC total_avek "DEC" is calculated as temporal average in one feedback section. When driving current value average value [DEC]-ASE power corresponding table 2010 is used, the ASE average power Pase mW corresponding to this current value average value from the driving current value average value DAC total_avek "DEC" can be obtained. The average value of the driving current value is the average value in one feedback section, and so the obtained ASE power value is the average power of ASE in one feedback section. Note that one feedback section is equivalent to one FB processing cycle period.

Figure 85:
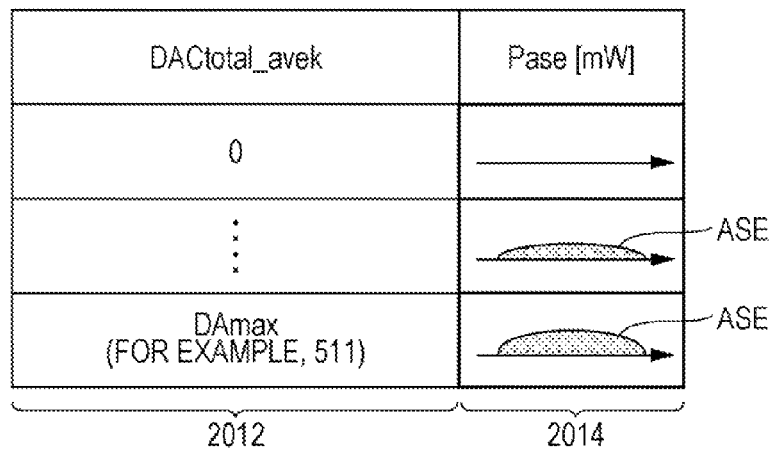
FIG. 85 is a diagram illustrating an example of a driving current value average value [DEC]-ASE power corresponding table.

FIG. 85 will be referenced to describe a driving current value average value [DEC]-ASE power corresponding table 2010. The driving current value average value [DEC]-ASE power corresponding table 2010 shown in FIG. 85 is formed with a storage region 2012 for the average value DAC total_avek driving current value, and a storage region 2014 for ASE average power Pase mW. In the DAC total_avek storage region 2012, numerical values from minimum value 0 of the DAC total_avek value up to 511 as maximum value DAmax, for example, are stored. In the Pase mW storage region 2014, Pase mW is stored corresponding to DAC total_avek. Therefore, when DAC total_avek is determined, corresponding Pase mW value can be determined. With this driving current value average value [DEC]-ASE power corresponding table 2010, a digital discrete value of the driving current value is recorded. As a result of having averaged the driving current in a predetermined section, when the average value of the driving current value is found to not exist in this table, from nearest driving current and Pase mW table of the average value of this non-existing driving current value, Pase is calculated using linear interpolation by the ratio. That is to say, in the event that the specified DAC total_avek value does not exist in the DAC total_avek storage region 2012, value DAd out of the stored values which is larger than the specified DAC total_avek, and the greatest value DAd that is smaller than the DACtotal_avek specified as the minimum value DAu, is set. Supplementary processing then may be performed by two Pase values corresponding to the value DAu and the value DAd, and the specified DACtotal_avek, and may be calculated the Pase value corresponding to the specified DACtotal_avek. Linear interpolation by ratio may be used for supplementary processing. For example, two Pase values corresponding to the DAu and DAd and nearest to the specified DACtotal_avek may be virtually connected with a straight line. The already-described virtual straight line may be divided and the Pase value corresponding to the specified DACtotal_avek calculated, using amount of difference between the value DAu and specified DACtotal_avek and amount of difference between the value DAd and the specified DACtotal_avek.

The peak output level Psig_out_pk mW after reduction of ASE components may be obtained by Expression (29). Thereby, the ASE components are removed from a peak output level Psig_outk mW and only primary signal components are calculated (step S622). Note that the peak output level Psig_out_pk mW after the reduction of the ASE components is a peak level of the primary signal which does not include ASE components (primary signal peak level).

$P\text{sig\_out}\_pk \, mW = P\text{sig\_out}k\, mW - P\text{ase}\, mW$    (29)

Figure 86:
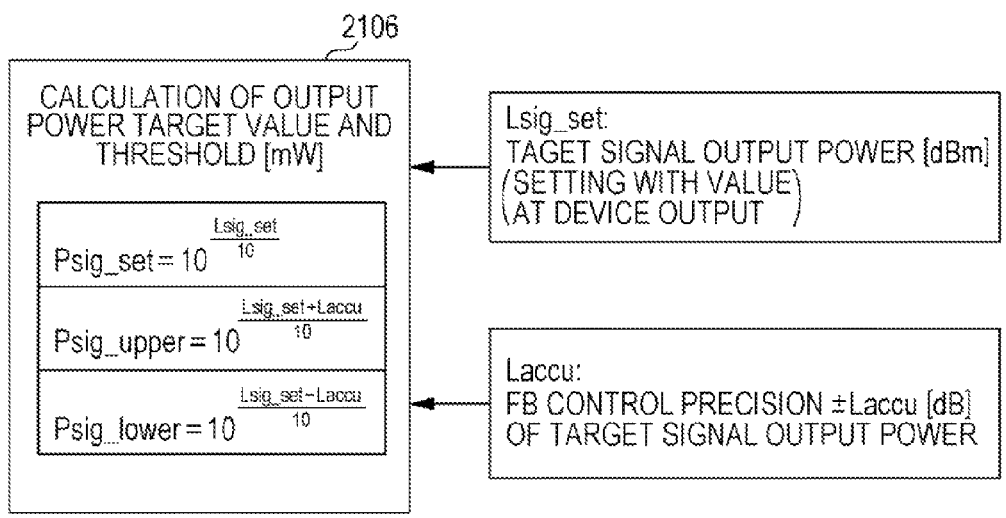
FIG. 86 is a diagram illustrating an example of calculating the target values and thresholds of output power.

Next, FB components of DAC value may be calculated to control so as to match the target output level with the primary signal peak level (step S623). That is to say, difference control error between the target output level (a target output level) Psig_set mW and the primary signal peak level may be obtained by Expression (30), for example. Note that the target output level Psig_set is set by calculating shown in FIG. 86. That is, the target output level Psig_set may be set as in Expression (31).

$$\text{Control error} = P\text{sig\_set mW} - P\text{sig\_out\_}pk \text{ mW} \qquad (30)$$

[Mathematical Expression 9]

$$P_{sig\_set} = 10^{\frac{L_{sig\_set}}{10}} \qquad (31)$$

where Lsig_set represents target signal output power (target output power) dBm, and this target signal output power is set as a value by device output.

In this way, after having obtained the control error, error ΔP dB displayed the control error by dB may be obtained. By using this error ΔP dB, updating of the SOA current table, i.e. LUT_A212 and LUT_B214 stored in the storage unit 206 may be performed so that this error ΔP dB will converge within a certain error value or lower. Note that the upper-limit threshold Psig_upper and the lower-limit threshold Psig_lower shown in FIG. 86 may be set for example, because of determination if performing updating or not. That is to say, the upper-limit threshold Psig_upper and the lower-limit threshold Psig_lower may be set by calculating the following Expressions (32) and (33).

[Mathematical Expression 10]

$$P_{sig\_upper} = 10^{\frac{L_{sig\_set} + L_{accu}}{10}} \qquad (32)$$

[Mathematical Expression 11]

$$P_{sig\_lower} = 10^{\frac{L_{sig\_set} - L_{accu}}{10}} \qquad (33)$$

where Laccu represents precision of FB control of the target signal output power, the precision thereof becomes± (plus or minus) Laccu dB.

As conditions to update a table, table updating conditions then may be set and determined if updating is performed or not in accordance with the table updating conditions. In the event of updating the table, data of target level, for example, LUT_A212 and LUT_B214 are offset and can slide a table in a pseudo manner. The following (1), (2), and (3) are examples of the table updating conditions.

(1) In the event of Psig_lower<Psig_out_pk<Psig_upper, the table is not updated. That is, the table is held.

(2) In the event of Psig_out_pk<Psig_lower, the table is slid to increase absolute value of error ΔP, i.e. the value by |Psig_set-Psig_out_pk|.

(3) In the event of Psig_upper<Psig_out_pk, the table is slid to reduce the absolute value of error ΔP, i.e. the value by |Psig_set-Psig_out_pk|.

With the processing procedures to remove ASE components shown in FIG. 84, average power Pase mW of ASE is obtained using the average value of the driving current value. ASE components are removed from peak output power level Psig_outk mW and calculates only primary signal components. The difference between a target output level and primary signal components are obtained as error ΔP and determines change amount of the table by updating. That is to say, a table is updated using primary signal components Psig_out_pk mW from which ASE components have been removed so that primary signal components level after the FB processing may be controlled to the target output level.

With this level control system 2002, the average value of the ASE noise power is obtained from the average value of the driving amount of the optical amplifier. Although output peak power only of signal components are calculated deducting the ASE components, an error will occur to the average value of the ASE noise power. However, when the average value of the ASE noise power is obtained from the average value of the optical amplification device driving amount, the average value of the ASE noise power may be obtained, for example, as once to one cycle of the FB control, thereby taking advantage of reducing a work load.

Above all, the described problems will be summarized below and exemplified hereinafter.

(1) Not only is output peak power made constant, but also the output peak power only of signal components is made constant by deducting ASE components.

(2) In the event that a signal of which input peak level is different is input, as shown in FIG. 76, processing to make output peak level constant are performed, Total power of Pase+Psig_out_pk may be controlled constantly. However, the level of necessary Psig_out_pk varies with this processing, and reception quality becomes unstable. Thus driving current is changed according to an input level, ASE noise power Pase thereby changes necessarily, but signal components Psig_out_pk may be controlled constantly, taking into consideration the amount of Pase variation.

(3) In the event that only waveform of temporally averaged Total power may be acquired with output PD monitor as shown in FIG. 76C, control to constantly keep Psig_out_pk is performed as shown in FIG. 76B. When line usage density (the duty ratio) changes, a state in which only temporally averaged output power can be monitored arises, but, in this state, the ASE components are deleted and control to make only the peak power of signal components in constant level is performed.

[II] Thirteenth Embodiment

Figure 87:
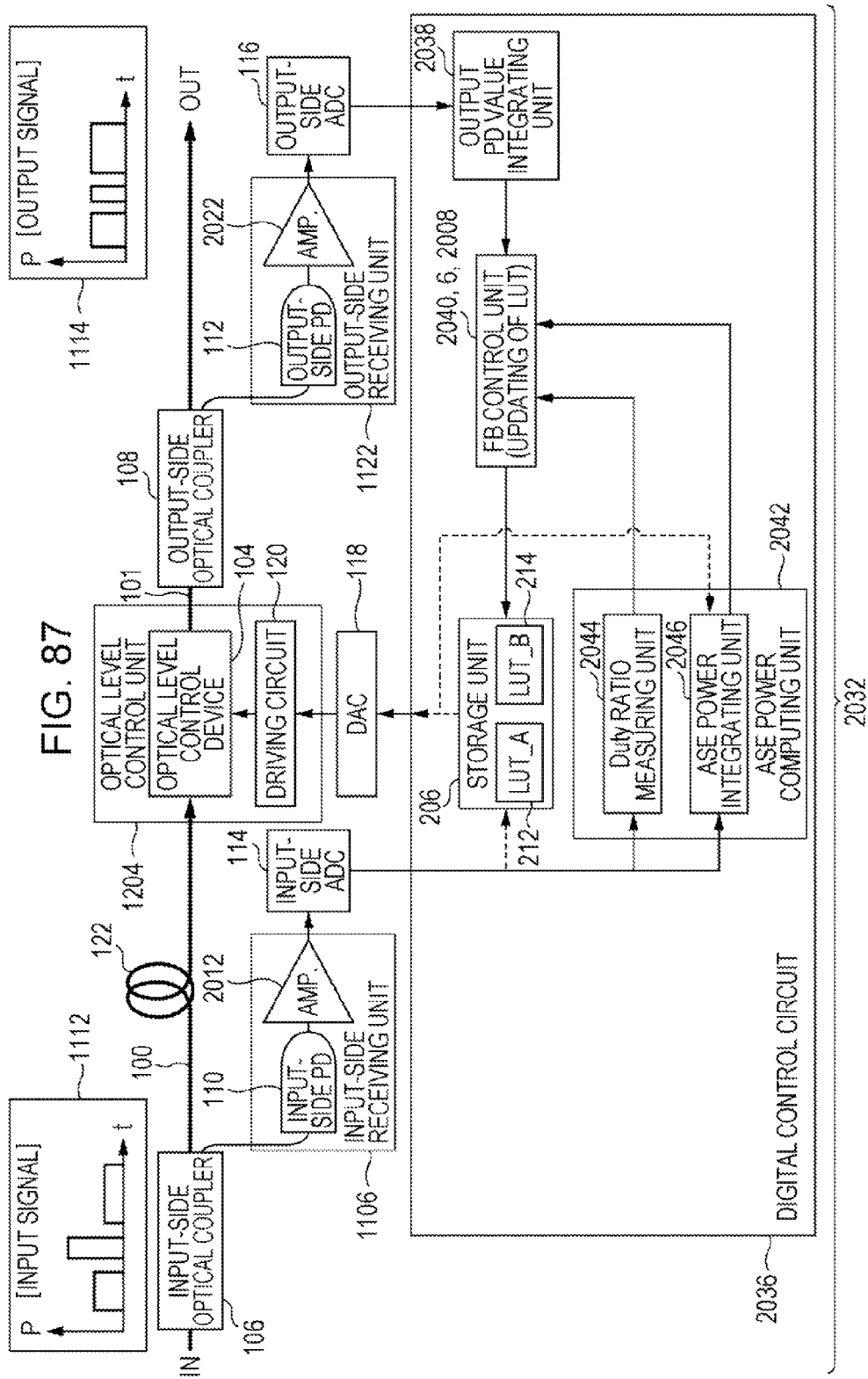
FIG. 87 is a diagram illustrating an example of a level control system according to the thirteenth embodiment.

FIG. 87 will be referenced to describe a level control circuit according to the thirteenth embodiment which has solved these problems. FIG. 87 is a diagram depicting an example of a level control system relating to the thirteenth embodiment. Note that the configuration depicted in FIG. 87 is an example, and the present invention is not to be limited to this configuration. The portions that are similar to configuration diagrams according to already-described embodiment are denoted by the same reference numerals.

With level control system 2032 shown in FIG. 87, ASE component removing processing has been further improved, to stabilize the output level with high precision. With this level control system 2032, SOA outputting ASE noise power is exemplified as optical level control device 104, but is not limited to this.

As already-described with above embodiment, a new target value are calculated and an LUT is updated at an FB control unit based on ON/OFF time ratio (duty ratio) of driving signal counted at the digital control circuit and the value accumulated and temporally averaged an output-side PD value. However, it is the ASE power calculating unit 2042 which is important here. LUT is updated every certain cycle (feedback processing cycle). That is to say, how accurate ASE power is calculated in an increment of feedback processing cycle, and is deducted from output PD monitor accumulated value, is the issue. If accurate ASE noise power within a certain cycle (feedback processing cycle) section with the ASE power calculating unit 2042 is accumulated, an accurate target signal output level can be calculated by subtracting ASE components from the output power accumulated at the output PD value accumulation unit 2038.

In the thirteenth embodiment, a function to remove a noise (noise reduction function) included in an optical signal output from optical level control device 104 such as SOA is had, and processing to remove noise is performed. Output peak power is not made to be constant then, but output peak power only of signal components (primary signal peak level) is made to be constant by deducting noise components.

The output PD value accumulation unit 2038 is an example of the means to accumulate an output-side PD value input into the digital control circuit 2036, and makes up an accumulation unit. The output PD value accumulation unit 2038 receives an output-side PD value from output side ADC 116, monitors and accumulates the output-side PD value received during a feedback processing cycle. The output PD value accumulation unit 2038 accumulates the monitor value which monitored an output-side PD value and outputs toward an FB control unit 2040 as output PD monitor accumulation value MV. Also, the output PD value accumulation unit 2038 counts the number of times that accumulated monitor values within a cycle section that accumulated monitor values, and outputs the accumulated number of times toward an FB control unit 2040 as output PD monitor accumulation number of times MN.

The ASE power calculating unit 2042 is an example of the means to calculate related information (noise information) of the noise reduction, and provides Duty ratio measurement unit (duty ratio measurement unit) 2044 and ASE power accumulation unit 2046. The ASE power calculating unit 2042 operates, for example, in a cycle same as with an FF control side or in a cycle approximately same as with an FF control side, and performs signal processing.

The duty ratio measurement unit 2044 is an example of the means to measure the time ratio that the ON level signal in the intermittent signal occupies, and makes up a ratio measurement unit. The Duty ratio measurement unit 2044 receives an input-side PD value output from input side ADC114, and determines whether input light is the signal of ON level, i.e. the signal of High level, or the signal of OFF level, i.e. the signal of LOW level or not. The Duty ratio measurement unit 2044 also may determine whether the signal level is ON or OFF, from signals turning the control device 1040N and OFF under driving control amount output from the storage unit 206. The Duty ratio measurement unit 2044 accumulates, for example, the signal number of times of the ON level within an FF cycle section and outputs the count number of the ON level to the FB control unit using the cycle of the FF control processing, i.e. the FF cycle. The number of the counts of the ON level is numerical value used for calculating of the Duty ratio and is an example of the Duty ratio measurement information.

ASE power accumulation unit 2046 is one case of the means to multiply quantity of noise from drive control quantity of light level control device 104 and is an example of the noise accumulation unit. The ASE power accumulation unit 2046 acquires, for example, a DAC value as an output signal output for DAC118 from the storage unit 206 and, for example, calculates an accumulation value of the ASE power sequentially every FF cycle. Note that ASE power is an example of noise amount and the noise information.

The FB control unit 2040 is one example of information updating unit 6 and, for example, updates LUT in the storage unit 206 in accordance with an output-side PD value. Also, the control error/new target value calculating unit 412 of the FB control unit 2040 has a function to remove a noise (noise reduction function) and for example makes up control information calculating unit and performs processing to remove noise. Output peak power is not made constant then but makes the output peak power only of signal components by deducting noise components. The configuration of the FB control unit 2040 is similar to the FB control unit 2008 shown in already-described FIG. 82, so description will be omitted. The FB control unit 2040 receives information of the output side PD value, output from the output PD value calculating unit 2038, and receives the ON level count CN and ASE power accumulation value PV from the ASE power calculating unit 2042. The FB control unit 2040 performs updating of LUT, based on the information of the output-side PD value, number of the counts CN of the ON level and ASE power accumulation value PV.

Figure 88:
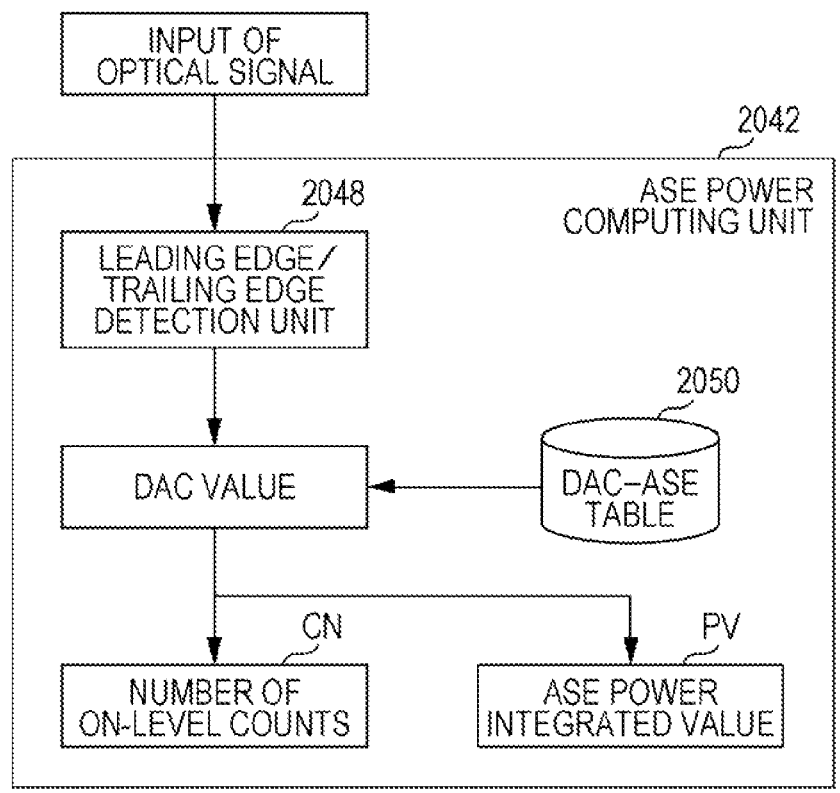
FIG. 88 is a diagram illustrating a configuration example of an ASE power calculating unit.

The ASE power calculating unit 2042 shown in FIG. 88 has leading edge/trailing edge detecting unit 2048 (referred to as "edge detecting unit 2048", hereinafter.) and DAC-ASE table 2050 to calculate number of the counts CN of the ON level and accumulation value PV of the ASE power. The edge detecting unit 2048 detects a leading edge and falling edge of the input-side PD value, upon receipt of the input of the input-side PD value as an optical signal input. For example, the edge detecting unit 2048 has a function similar to the edge detecting processing unit 406 according to the fifth embodiment and can detect an edge by performing similar processing.

The ASE power calculating unit 2042 acquires a DAC value output for DAC118 from the storage unit 206. The ASE power calculating unit 2042 accumulates a DAC value every FF processing cycle and obtains the accumulation value. DAC-ASE table 2050 is, for example, SOA driving amount—ASE amount table and is made up, for example, like DAC-ASE table 2050 shown in FIG. 89. The DAC-ASE table 2050 is formed including a storage region 2052 of the DAC value as SOA driving amount and a storage region 2054 of the ASE amount mW to represent ASE amount. In the storage region 2052 of the DAC value, numerical value from minimum 0 of the DAC value, for example to 4095 as maximum value DACmax is stored. In the storage region 2054 of the ASE amount mW, ASE amount corresponding to each DAC value is stored. Thus, upon the DAC value being determined, the corresponding ASE amount can be determined. With regard to the DAC value, for example, in the case of storing a SOA driving current value, the relation between the SOA driving current value and the ASE amount is a the relation of ASE noise power as to SAO driving current value shown in FIG. 80. Note that in this case the ASE noise power is equivalent to the ASE amount.

Other configurations are similar to the already-described level control system 2002 so description is omitted.

Figure 90:
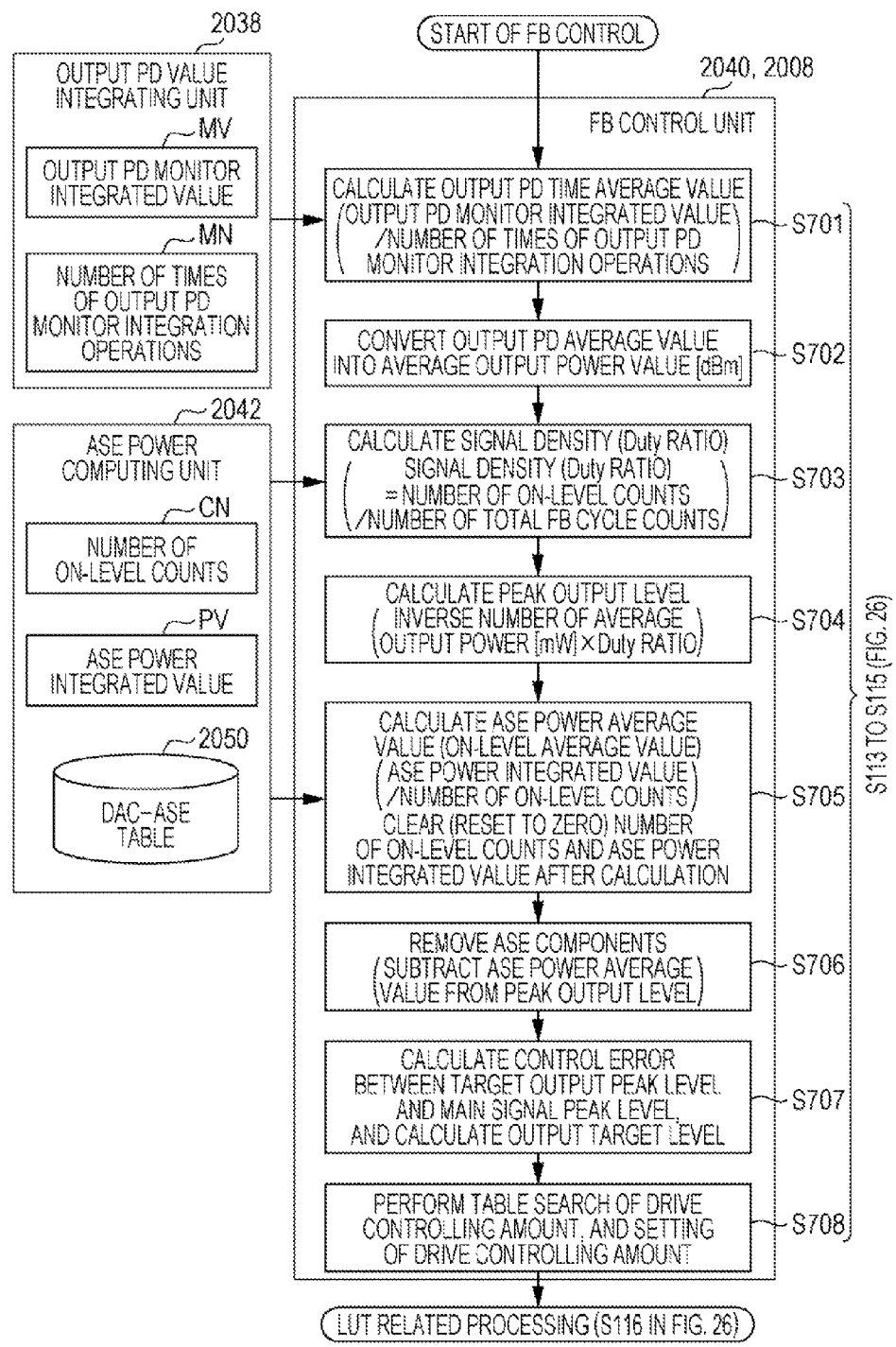
FIG. 90 is a flowchart describing an example of processing procedures of the FB control.

Next, FIG. 90 will be referenced to describe processing procedures of FB control. FIG. 90 is a flowchart illustrating an example of the processing procedures of the FB control. This FB control processing is an example of the level control method and level control program according to the present disclosure and the present invention is not limited to these configurations. Note that the processing procedures shown in FIG. 90 is a portion of the processing procedures executed in FB control unit 2040, of the FB processing shown in FIG. 26

(step S113 through step S117), and is processing executed instead of step S113 through step S115.

A new target value is calculated and the LUT is updated at the FB control unit, based on the value which accumulated and temporally averaged ON/OFF time ratio (the duty ratio) and an output PD value, similar to the level control system 2002 shown in FIG. 81. Note that in this embodiment, an optical signal input is detected in the edge detecting unit 2048, calculates ON level counts CN, and calculates a duty ratio in FB control unit 2040. Also, ASE power calculating unit 2042 calculates ASE power in order to update the LUT updated every feedback processing cycle, as a certain cycle, in increments of feedback processing cycle, precisely or accurately. If the accurate ASE noise power within the section of a certain cycle is accumulated in ASE power calculating unit 2042, a right target signal output level becomes capable of being calculated by subtracting ASE components from output power accumulated with output PD value accumulation unit 2038.

Upon FB control processing (FB processing) being started, the FB control unit 2040 receives output PD monitor accumulation value MV and output PD monitor accumulation number of times MN from the output PD value accumulation unit 2038. The output PD monitor accumulation value MV is the value of the output PD monitor value having been accumulated during a feedback processing cycle, and the output PD monitor accumulation number of times MN is the number of times to represent how many times it has been accumulated within the cycle sections for the accumulating output PD monitor accumulation value MV. The temporal average value of the output PD monitor within one processing section is obtained like Expression (34). In this way, the temporal average value of the output PD is calculated. (step S701).

Temporal average value of output PD monitor (output PD average value)

=output PD monitor accumulation value/output PD monitor accumulation number of times (34)

From the output PD average value obtained by Expression (34), conversion is made into the average output power Ltotal_outk dBm (step S702). Transformation parameters ($\alpha$, $\beta$, $\gamma$, and $\delta$) (FIG. 94) are used for this conversion. The average output power Ltotal_outk dBm further converts into a linear value (linear value) mW and obtains average output power Ptotal_outk mW. The peak output level Psig_outk mW is calculated using Ptotal_outk mW. Note that average output power Ltotal_outk dBm represents the power (device output power) of the signal to output from a level control system to outside.

In order to calculate peak output level Psig_outk, the ON level counts CN is received from ASE power calculating unit 2042 and these counts CN are divided with the total counts of the FB cycle and calculated signal density (Duty ratio) (step S703). Note that the FB cycle is acquired from a feedback processing cycle Pe (FIG. 94) based on frequency dividing rate settings of the feedback processing cycle to be set to the digital control circuit 2006. An expression for calculating of the signal density is represented, for example, in Expression (35).

Signal density=ON level count/Total counts of FB cycle (35)

Peak output level Psig_outk is calculated using Expression (36) with an average output power Ptotal_outk multiplied the inverse of the Duty ratio. (step S704).

$P$sig_out$k$ mW=$P$total_out$k$ mW multiplied the inverseofDutyratio (36)

ASE power accumulation value PV is then acquired from ASE power calculating unit 2042 and calculates average power (the ASE power average value) Pase mW in one feedback section (step S705) is calculated. The ASE power average value is obtained, for example, by Expression (37). That is to say, in the calculating of the peak output level, the clock unit of control circuit sufficiently faster than a feedback cycle, e.g., ON level count CN accumulated in an FF cycle is used. Also, ASE power mW that has been calculated from the DAC-ASE table 2050 is sequentially accumulated based on the value that performed driving current output in the ON state, and the accumulated ASE power accumulated value mW within the period of the feedback cycle is used for calculating peak output level. The peak output level is represented by the ON level count CN and ASE power accumulation value PV mW. Note that, after having calculated ASE power average Pase, the ON level count CN and ASE power accumulation value PV are made clear and set value 0.

$P$ase mW=ASE power accumulation value mW/ON level counts (37)

ASE components are removed from a peak output level, using ASE power average value Pase mW calculated from number of the ON level counts CN and ASE power accumulation value PV mW (step S706). Peak output level Psig_out_pk mW from which ASE components have been removed is calculated by Expression (38). Thereby, ASE components are removed from peak output level Psig_outk mW and the primary signal peak level only of primary signal components are calculated.

$P$sig_out_$pk$mW=$P$sig_out$k$ mW−$P$ase mW (39)

Upon peak output level Psig_out_pk from which ASE components have been removed being calculated, the obtained peak output level Psig_out_pk mW after the ASE components removal are controlled so as to match with a target output peak level. In this case, calculating of the control error between a target signal output level and primary signal peak level using the peak output level from which ASE components have been removed, and calculating of the output target level (step S707) are performed. The control error with target output peak level Psig_set mW is obtained by the following Expression (39).

Control error=$P$sig_set mW−$P$sig_out_$pk$ mW (39)

Updating of an SOA electric current table stored in the storage unit 206, i.e. LUT (LUT_A212 and LUT_B214) of the FF control side is performed so that error $\Delta$P dB in which this control error has been displayed in dB converges to a certain error value or less. The LUT reference level is different regarding whether to increase or decrease values to refer to from the look-up table (LUT) depending whether the error is a positive or negative value. Calculating of control error and output target level (step S707), and a table search of driving control amount and setting of driving control amount (step S708), for example, can be performed similar to the FB processing according to the fifth embodiment. That is to say, similar to the fifth embodiment, processing to calculate the difference with the target output level to determine output target level and processing to search a table value close to the output target level from updating information storage unit may be performed. These processing correspond to the steps S113 and S115 in FIG. 26, and description is omitted. After such processing, processing after the processing to make a table of an output target level (step S116 of FIG. 26) is executed in an FB control unit, and updating of the LUT is performed.

Processing to update the LUT by magnitude of control error ΔP dB may be performed regularly regardless of the magnitude of the control error similar to already-described embodiment of the present invention, or may be performed only in the case the error exceeds a certain value. If the LUT is updated only in the case that the determination is made that there has a large margin of control error, the frequency to update the LUT drops and the write lifespan for the medium which stores the LUT such as a register or memory is extended, thereby reducing the rate of malfunctioning of the control circuit.

Thus, the peak level of the primary signal after the level control may be controlled to a target output peak level by performing control using Psig_out_pk mW.

Figure 91:
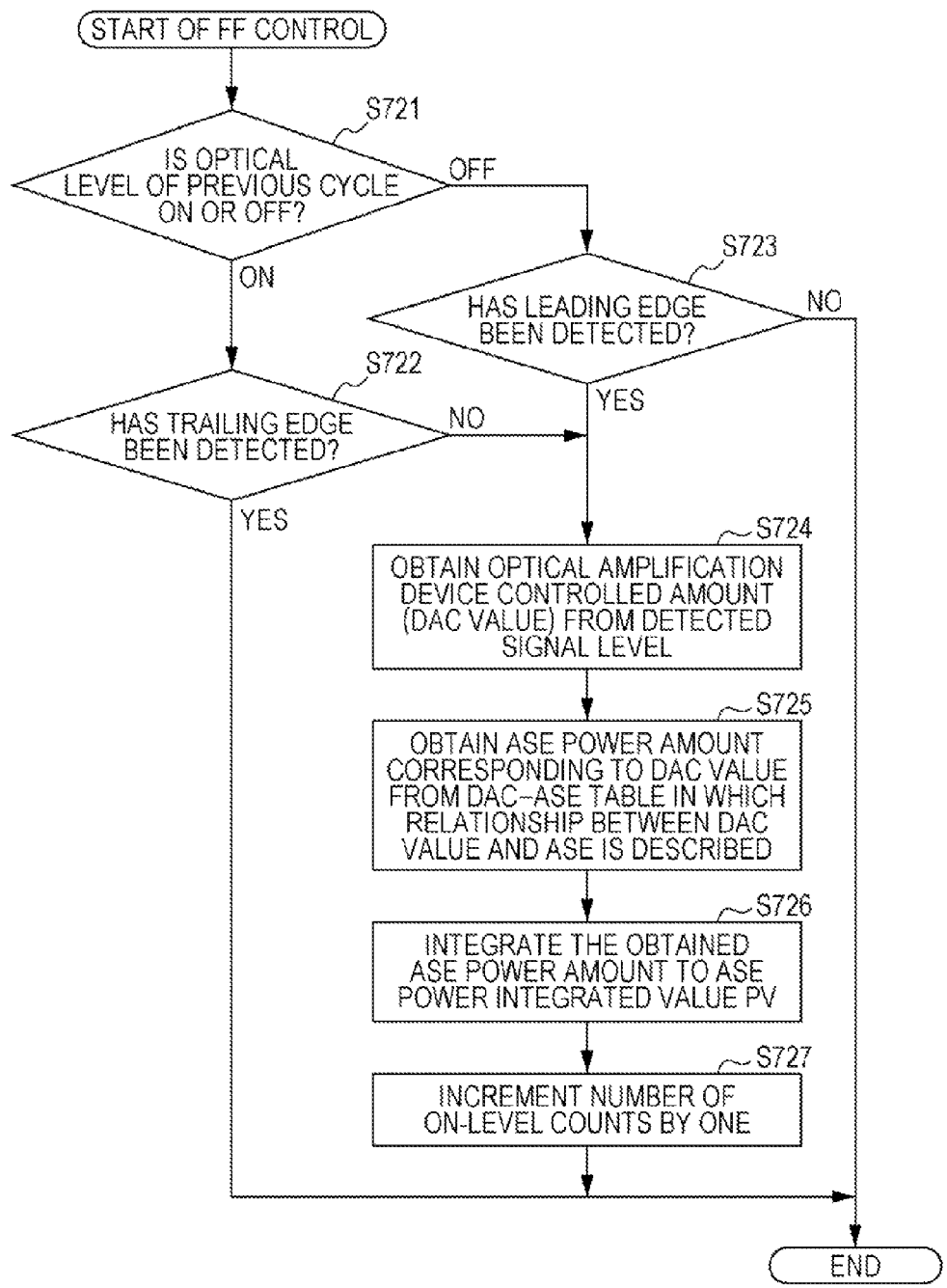
FIG. 91 is a flowchart describing an example of processing procedures for calculating ON level count and ASE power accumulated values.

Next, FIG. 91 will be referenced to describe the processing procedures for calculating ON level count CN and ASE power accumulation value PV. FIG. 91 is a flowchart illustrating an example of processing procedures for calculating ON level count CN and ASE power accumulation value. This calculating processing is an example of a level control method and level control program according to the present disclosure and is not limited to these configurations.

The processing procedures to calculate an ON level counts CN and ASE power accumulation value PV is executed in the ASE power calculating unit 2042. This processing is performed, for example, once every clock unit of a control circuit (the digital control circuit 2036), i.e. a feedforward cycle. That is to say, processing from "FF control START" to "END" is executed in each feedforward cycle and repeated. Note that execution in the feedforward cycle is an example and is not limited in this cycle. The processing from "FF control START" to "END" may be executed and repeated at sufficiently fast speed as to FB processing. This ASE power calculating processing is performed at high speed and accordingly, is realized with hardware without firmware, for example. That is to say, ASE power calculating unit 2042 is made up, for example, of hardware and executes these processing at a clock unit of hardware.

Upon FF control processing being started, at first, a determination is made whether an optical level in the last cycle (pre-cycle) was an ON level, or an OFF level (step S721). In the event that an optical level in the pre-cycle is an ON level (ON in step S721), the detection of the falling edge is determined (step S722). In the event that the falling edge is detected (Yes in step S722), this processing is ended because the signal level is OFF in this cycle. In the event that the falling edge is not detected (No in step S722), it advances to the acquisition processing of optical amplification device control amount (DAC value) (step S724) because the signal level is ON in this cycle.

In the event that an optical level in pre-cycle is an OFF level (OFF in step S721), the detection of the leading edge is determined (step S723). In the event that the leading edge is not detected (No in step S723), this processing is end because the signal level is OFF in this cycle. In the event that the leading edge is detected (Yes in step S723), it advances to the acquisition processing of optical amplification device control amount (DAC value) (step S724) because the signal level is ON in this cycle.

When a signal level is ON (Yes of No of step S722 and step S723), a signal output for DAC118 is detected in storage unit 206 and, from this detected signal level, acquires light amplification device control amount (DAC value) (step S724).

The ASE power amount corresponding to the DAC value is acquired with the DAC-ASE table 2050 where the relation between a DAC value and ASE has described (step S725) and accumulates this acquired ASE power amount to ASE power accumulation value PV (step S726). With the ON level counts as +1 (step S727), the processing is end. The acquired ASE power amount PV is accumulated by repeating this processing, and the ON level count CN is added. The accumulation and addition of the value are performed until the FB control unit 2040 acquires ON level counts CN and ASE power accumulation value PV at the timing when the FB control unit 2040 calculates the ASE power average value (the ON level average value). The FB control unit 2040 acquires the ON level counts CN and ASE power accumulation value PV, and after that, these values are cleared and set to zero.

The ASE power amount corresponding to the DAC value in this way is acquired at sufficiently faster, for example, FF control processing than that of FB processing and accumulates this ASE power amount to be an ASE power accumulation value, so that more accurate ASE average power value can be obtained in comparison with a case that ASE power amount is converted in an FB processing cycle.

Figure 92:
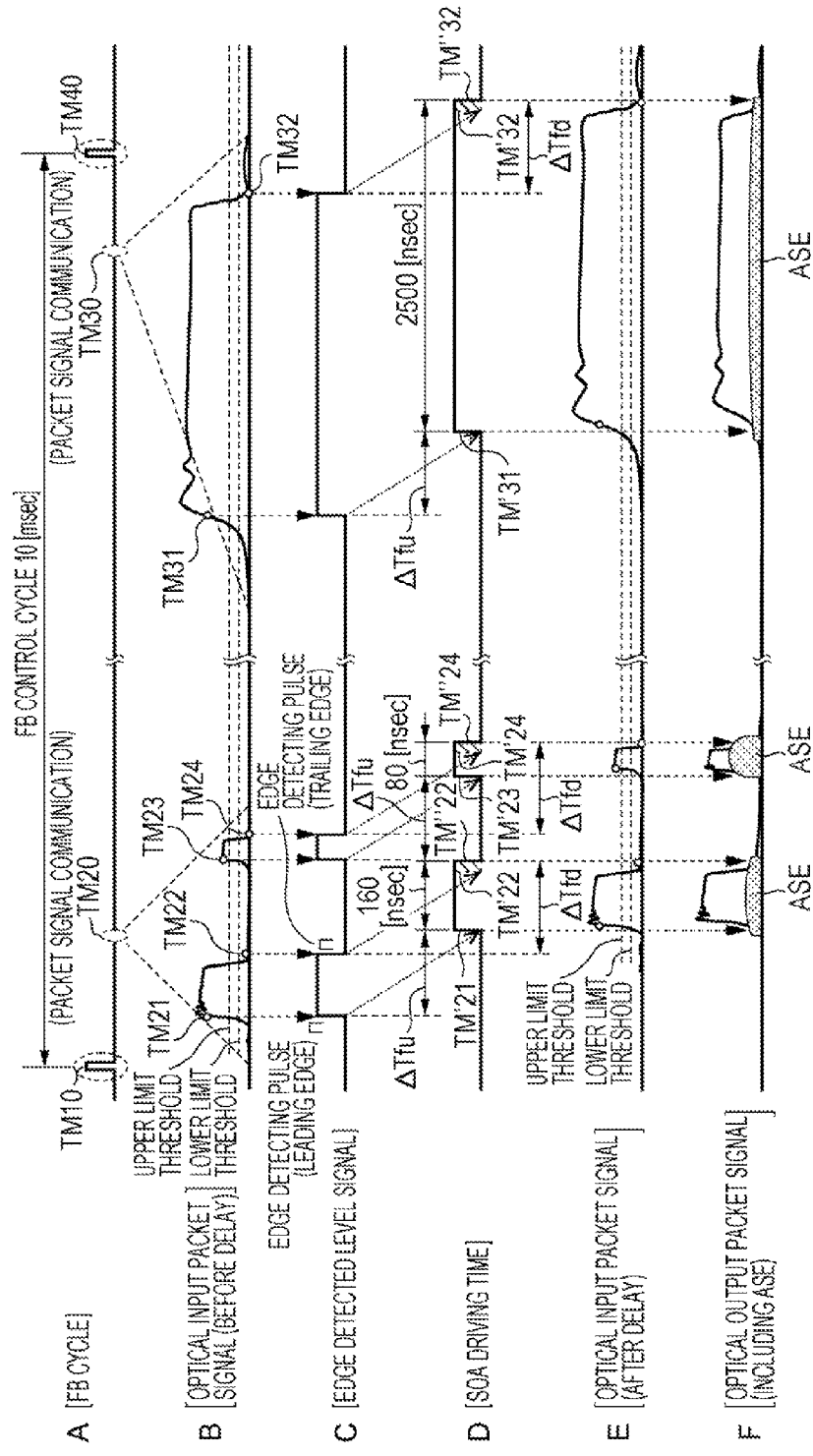
FIG. 92 is a diagram illustrating an example of a timing chart regarding calculating of the ASE power average value.
Figure 93:
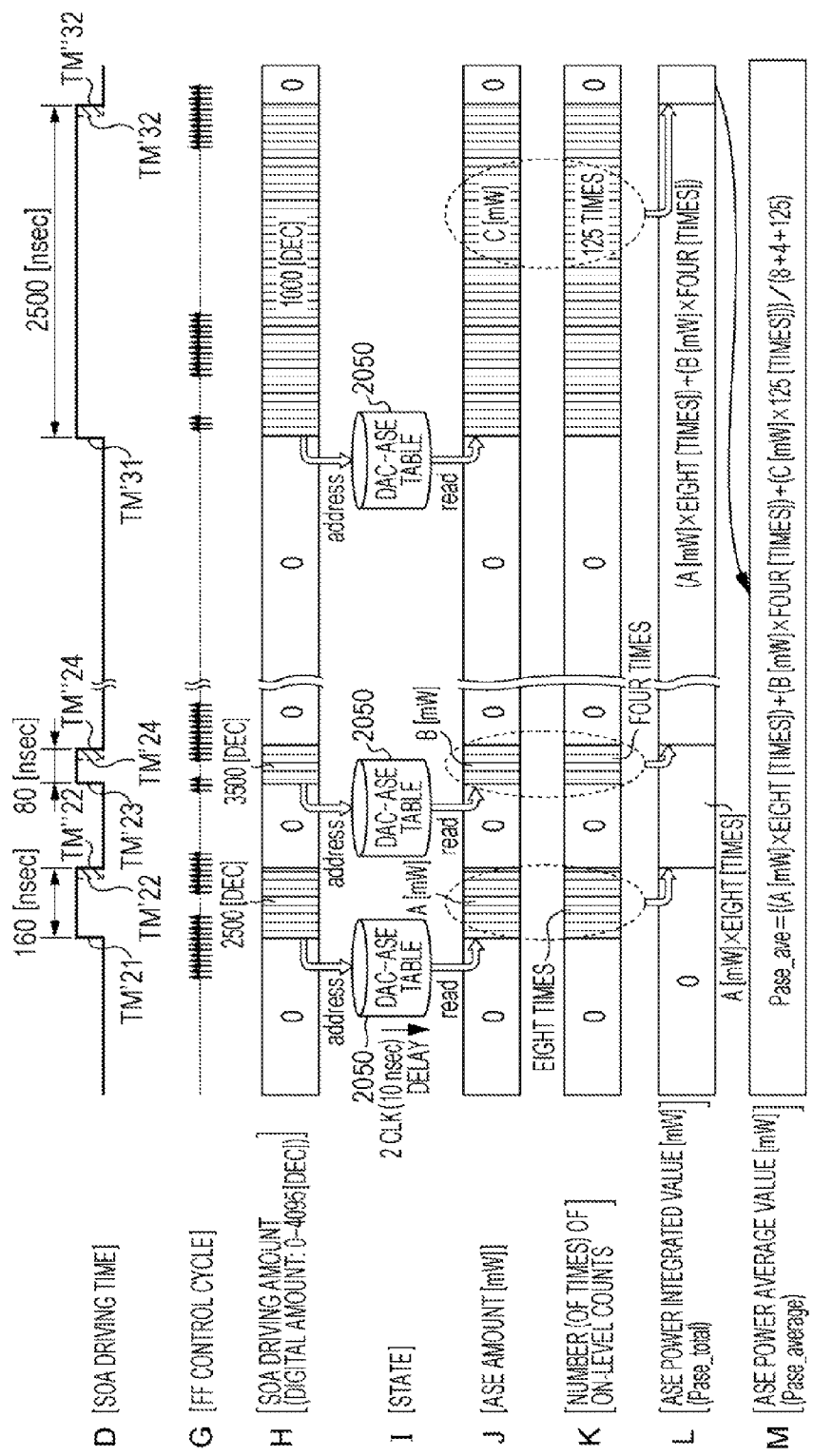
FIG. 93 is a diagram illustrating an example of a timing chart regarding calculating of the ASE power average value.

Next, FIGS. 92 and 93 will be referenced to describe calculating of ASE power average value Pase mW. FIG. 92 and FIG. 93 illustrate an example of a timing chart regarding calculating of the ASE power average value. FIG. 93 is a diagram relating to FIG. 92 and represents the timing to process an optical input packet signal shown in FIG. 92B. The signal processing illustrated in FIG. 93 is performed based on a timing of the SOA driving time. A timing of the SOA driving time is illustrated in both FIGS. 92 and 93 to clarify the mutual connection of FIGS. 92 and 93. A timing of the SOA driving time is illustrated in both FIGS. 92 and 93 to clarify the mutual connection of FIGS. 92 and 93. Note that the timing shown in FIGS. 92 and 93 is an example, and the present invention is not limited in such timing.

In the FB cycle shown in FIG. 92A, a feedback cycle is set, for example, in 10 milliseconds as an example of the FB control cycles, and operated. During the feedback cycle, optical packet signals with different level and length are input. In the FB cycle in FIG. 92A, an interval from time TM10 through time TM40 is one cycle. A packet signal passes at the time TM20 and the time TM30 within this cycle. Optical packet signals shown in FIG. 92B are the packet signal which has passed in the time TM20 and the packet signal which has passed in the time TM40, enlarged, respectively. The optical packet signals shown in FIG. 92B are signals before passing the delay line 122, i.e. signals before delay. The packet signal which has passed at time TM20 is made up of two packet signals above the upper limit threshold value, (ON signal). The first packet signal rises above the upper threshold value at time TM21 and falls to the lower threshold value or less at time TM22.

The second packet signal rises above the upper threshold value at time TM23 and drops at time TM24 to the lower threshold value or less. The packet signal which has passed in the time TM30 is made up of one packet signal above the upper limit threshold value (ON signal). This packet signal (third packet signal) rises above the upper threshold value at time TM31 and drops at time TM32 to the lower threshold value or less. In the event that such optical input packet signals are input, an edge detection level signal shown in FIG. 92C will be detected with the ASE power calculating unit 2042.

As for the edge detection level signal, the signal level varies in response to the first packet signal, the second packet signal and the third packet signal. With the edge detection level signal, after a signal rises in response to the leading edge detection pulse which occurs in the time TM21, maintains a high signal level, and then the signal falls in response to the trailing edge detection pulse which occurs in the time TM22.

With the edge detection level signal, after a signal rises in response to the leading edge detection pulse which occurs in the time TM23, maintains a high signal level, and then the signal falls in response to the trailing edge detection pulse which occurs in the time TM24. With the edge detection level signal, after a signal rises in response to the leading edge detection pulse which occurs in the time TM31, maintains a high signal level, and then the signal falls in response to the trailing edge detection pulse which occurs in the time TM32.

When the input of the optical packet signal is detected by the edge detection unit 2048 of the input PD side, SOA turns on in the section where an optical packet signal is detected so that packet signal light passes through. At the time, while input power is monitored and the optical packet signal is being delayed, SOA driving amount for obtaining target output peak level is calculated with reference to the LUT and a predetermined driving voltage (electric current) is applied to SOA. The SOA driving time shown in FIG. 92D represents the driving time of SOA turned on in this way. In the SOA driving time, a signal is delayed from an edge detecting level signal for generating of the SOA driving control amount, and varied. Rising of the signal is delayed by ΔTfu for example, and falling of the signal is delayed by ΔTfd for example. Differences between ΔTfu and ΔTfd are due to the differences due to having made a margin.

This is similar to the eleventh embodiment with regard to the margin, and description is omitted. In the SOA driving time shown in FIG. 92D, driving is started at time TM' 21 and stopped at time TM" 22. In the SOA driving time, driving is started at time TM' 23 and stopped at time TM" 24. In the SOA driving time, driving is started at time TM 31 and stopped at time TM" 32. During this SOA driving time, SOA releases ASE. The release of ASE releases including wait time preparing for the driving (which is the difference between ΔTfu and ΔTfd, and the time corresponding to the time between time TM' 22—time TM" 22 at an interval, time TM' 24—time in TM" 24 at an interval, the time in TM' 32—time in TM" 32 at an interval).

The optical packet signal shown in FIG. 92B is delayed by the delay line 122 and the optical packet signal shown in FIG. 92E almost matches with SOA driving time. Thus, the signal after the level control processing is an output signal including ASE noise, similar to an optical output packet signal as shown in FIG. 92F.

A feedforward cycle is sufficiently faster than a feedback cycle and, for example, is several nanoseconds. The arrow shown in FIG. 93G represents a cycle of the FF control. Note that a cycle of the FF control is a predetermined cycle and is continuous and, in FIG. 93G, is illustrated with a part thereof omitted. The cycle of the FF control is, for example, 20 nanoseconds which corresponds to the ASE accumulation cycle.

The SOA driving amount shown in FIG. 93H is accumulated to each of the SOA driving time. As shown in FIG. 93D, in the event that the driving time as to the first packet signal is 160 nanoseconds and the accumulation cycle is 20 nanoseconds, the number of the ON level counts CN is eight times as shown in FIG. 93K. In the event that the driving time as to the second packet signal is 80 nanoseconds and the accumulation cycle is 20 nanoseconds, the number of the ON level counts CN is four times as shown in FIG. 93K. In the event that the driving time as to the third packet signal is 2500 nanoseconds and the accumulation cycle is 20 nanoseconds, the number of the ON level counts CN is 125 times as shown in FIG. 93K. The driving amount as to the first packet signal, the driving amount as to the second packet signal, the driving amount as to the third packet signal are, for example, 2500 [DEC], 3500 [DEC], 1000 [DEC], respectively, as shown in FIG. 93H.

For example, this driving amount is set to be an invariable value during one SOA driving time. In this case, the driving amount is converted into the ASE amount at the DAC-ASE table 2050, the ASE amount becomes A mW, B mW, C mW, respectively for example, similar to ASE amount shown in FIG. 93J. This ASE amount represents one time worth of converting amount for driving control amount. When SOA driving amount is constant during one SOA driving time, the ASE amount becomes constant. Note that, when this conversion is performed on hardware, for example, it can be processed in 2 CLK (about 10 nanoseconds). Also, the SOA driving amount is a digital amount and, for example, is a value from 0 to 4095.

The ASE power accumulation value mW shown in FIG. 93L is the value of Pase_total, and equals to the value which has been multiplied by ASE amount and ON level counts. For example, the accumulation value to the first packet signal and the accumulation value to the second packet signal are A mW×8 times and B mW×4 times, respectively. Also, for example, with the accumulation value to the third packet signal, an ASE power accumulation value is C mW×125 times. The SOA driving amount shown in FIG. 93H, ASE amount shown in FIG. 93J, and a vertical line in ON level count CN shown in FIG. 93 K, representatively illustrate one clock of the digital control circuit, and represent that the driving amount is acquired in increment of one clock or several clocks, or ASE amount is accumulated. Also, this represents that the ON level is counted in increments of one clock or several clocks.

The average value of the ASE power in the FB cycle becomes the value dividing the accumulation value PV of the ASE power by the number of times of the ON level. With the ASE power average value mW shown in FIG. 93M, it becomes Pase_ave={(A mW×8 times)+(B mW×4 times)+(C mW×125 times)}÷(8+4+125).

The section which an optical packet signal continues is detectable in the edge detection unit 2048 of the input PD monitor side so that in the section how much time (how many clocks) the control circuit itself has applied to SOA can be comprehended. Also, the SOA driving amount can be comprehended at the same time, too. Therefore, the SOA driving amount can be converted into ASE amount using the SOA driving amount (DAC)-ASE table 2050. Performing this conversion enables comprehending how much ASE was output within a feedback cycle of 10 milliseconds with the ASE amount (ASE power accumulation value mW) accumulated by a unit in a feedforward cycle. Also at the same time, how many clock ON were made in feedback cycles of 10 milliseconds, or the ON level counts CN can be comprehended, too. ASE power average value Pase output in the feedback section can be calculated by accumulating and calculating those values in one feedback section. With this processing, the duty ratio is added by the number of the ON level counts so that calculation is performed without using the line usage duty ratio (the ON/OFF ratio) computationally.

Figure 94:
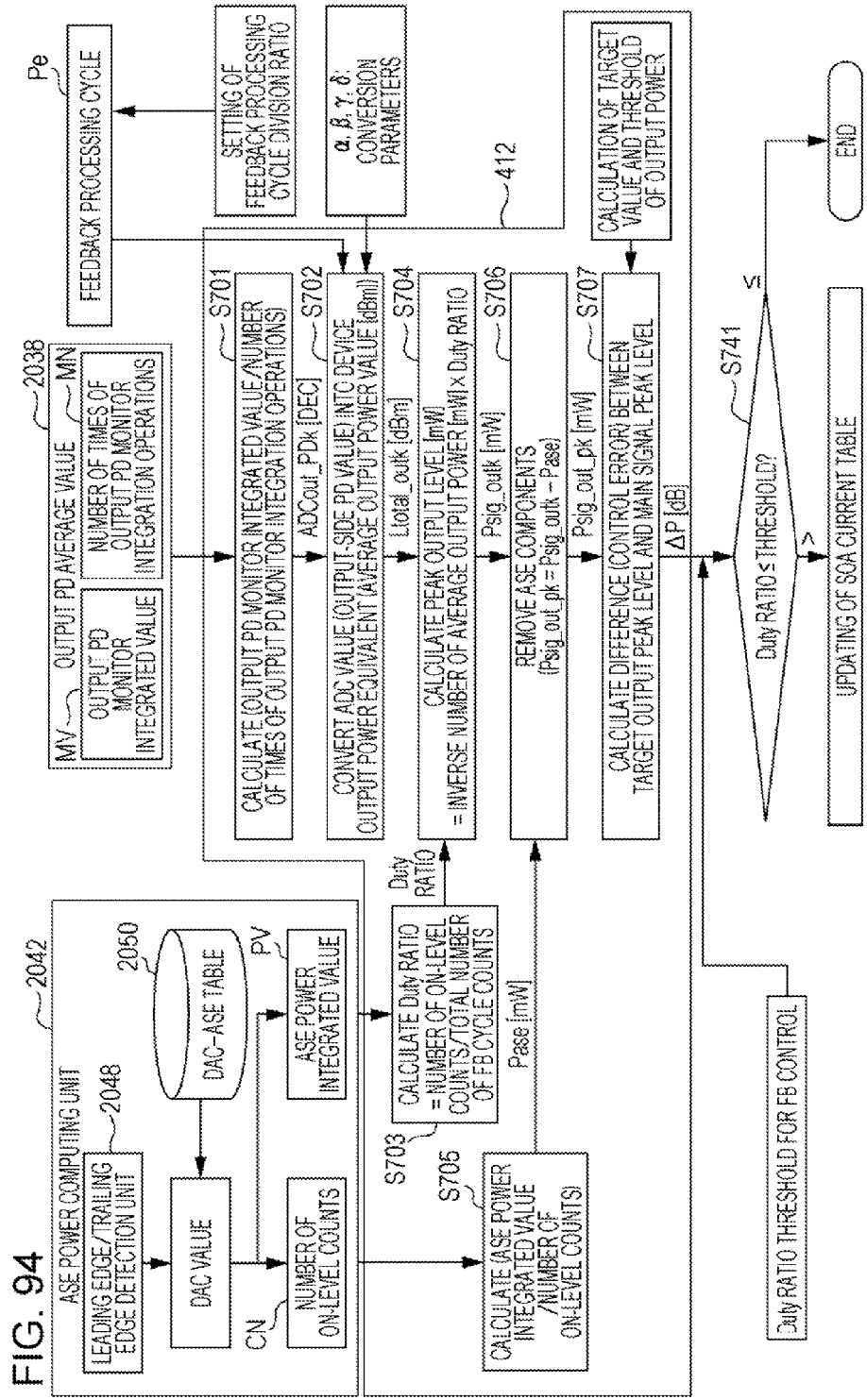
FIG. 94 is a flowchart describing an example of processing for obtaining control error by removing ASE components.

Next, FIG. 94 will be referenced to describe processing for removing ASE components and obtaining control error. In FIG. 94, to help the understanding of the processing procedure (FIG. 90) of the already-described FB control, connections of each processing, each function or each component are represented. In the control error/new target value calculating unit 412 shown in FIG. 94, output PD monitor accumulation value MV and output PD monitor accumulation number of times MN are acquired from the output PD value accumulation unit 2038 and acquire ON level count CN and ASE power accumulation value PV from the ASE power calculating unit 2042.

The control error/new target value calculating unit 412 has each function (function unit) performing each processing of the already-described steps S701 through S707, removes ASE components and obtains a control error. That is to say, the control error/new target value calculating unit 412 includes the average output PD calculating unit to calculate a time average value of output PD (S701), the average output power converting unit to convert into an average output power value (S702), and the signal density calculating unit to calculate signal density (S703).

Also, the control error/new target value calculating unit 412 includes the peak output level calculating unit to calculate peak output level (S704), and the average ASE power calculating unit and reset unit to calculate ASE power average value and to reset the number of the count and the accumulated value (S705). Also, the control error/new target value calculating unit 412 includes the ASE removing unit to remove ASE components (S706), and the error calculating unit to calculate a control error (S707). Comparing with the Duty ratio threshold and Duty ratio for FB control set in the digital control circuit 2036 beforehand, in the event that the Duty ratio is the threshold or less (Yes in step S741), SOA current table updating is not performed and the processing is ended. In the event that the Duty ratio is not the threshold or less (No in step S741), SOA current table updating, i.e. already-described LUT updating processing is performed.

With the thirteenth embodiment, problems described with the background of the thirteenth embodiment are solved, by providing already-described configuration and performing already-described processing.

The thirteenth embodiment aims to have, as the third object thereof, stabilizing the output in an target peak level without being affected by density and input level of the optical packet signals, in addition to the already-described objects. In addition to the advantages of the above embodiment, the following advantages are provided.

(1) Level adjustment in increments of optical packet unit or optical burst signal unit can be performed as to optical packets and optical burst signals as well, enabling output level stabilization at a target value with high precision, thereby yielding stability and reliability of reception properties. As a result, a more flexible optical network can be constructed.

(2) The output level tolerance value of the optical transmitter and the input level tolerance value of the receiver can be eased, whereby the cost of the optical packet transmitter/receiver can be reduced.

(3) Doing away with the need for a strict optical level schedule design of the optical packets and optical burst network is effected, and the network design costs and operating costs can be reduced.

(4) The output in an target peak level can be stabilized without being affected by density and input level of the optical packet signals.

Fourteenth Embodiment

Figure 95:
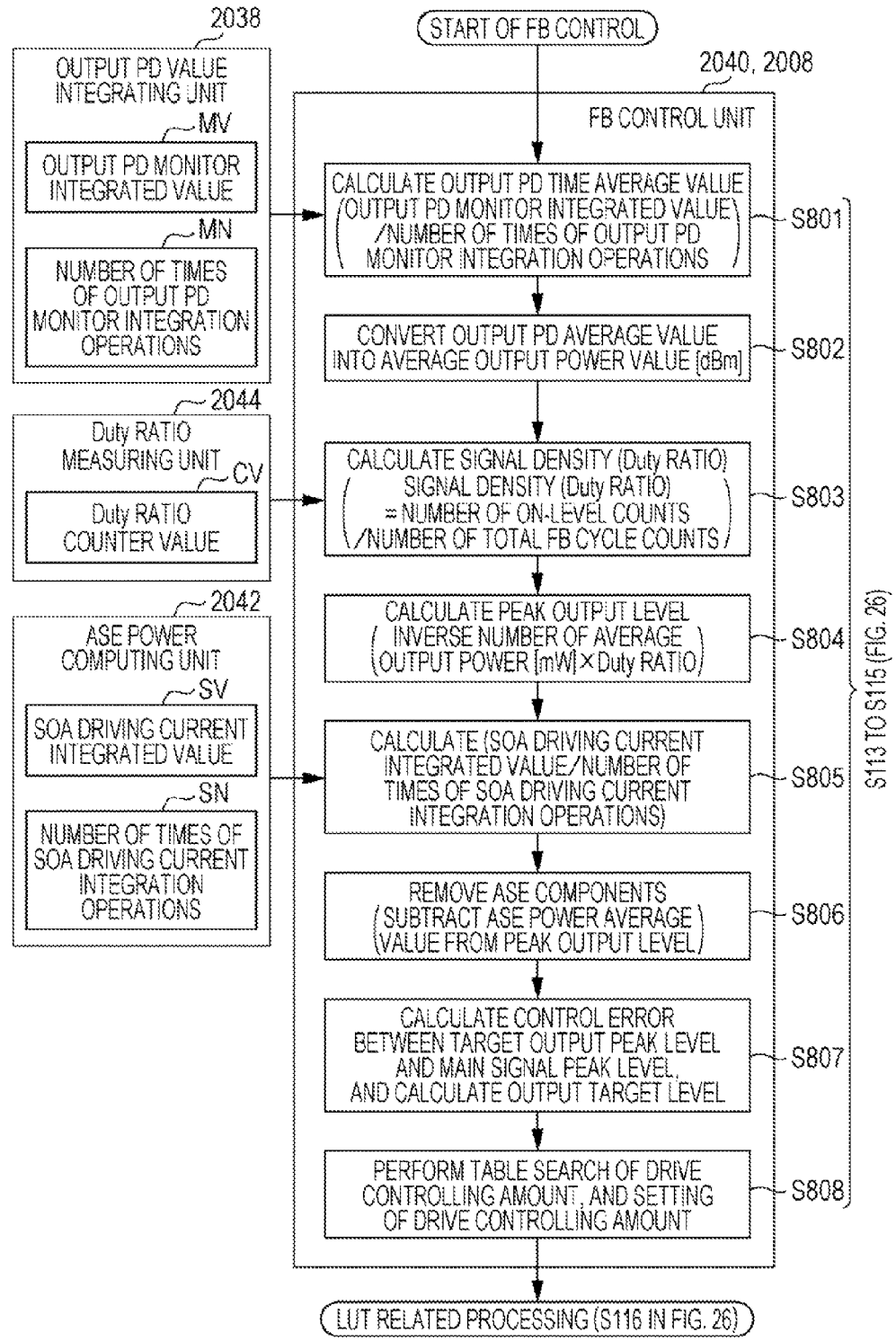
FIG. 95 is a flowchart describing an example of processing procedures of the FB control according to a fourteen embodiment.
Figure 96:
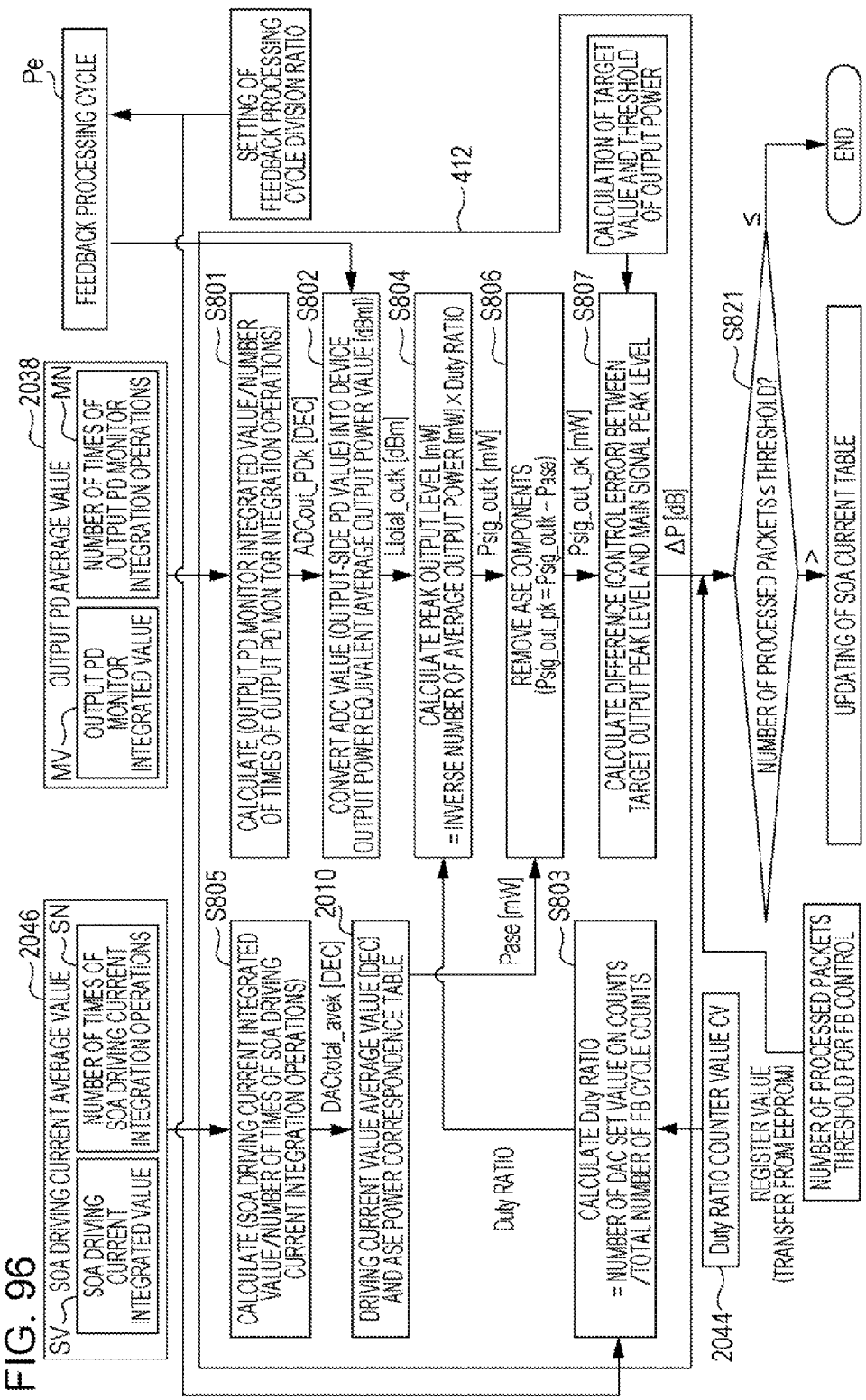
FIG. 96 is a flowchart describing an example of processing for obtaining control error by removing ASE components.

Next, FIGS. 95 and 96 will be referenced to describe a fourteenth embodiment. FIG. 95 illustrates an example of the processing procedures of FB control according to the fourteenth embodiment, and FIG. 96 illustrates an example of processing to remove ASE components to obtain control error. This FB control processing and processing to remove ASE components to obtain control error are an example of the level control processing and level control program, and the present invention is not limited to these configurations.

This embodiment makes up a level control system shown in FIG. 87, similar to the same configuration according to the thirteenth embodiment. In the thirteenth embodiment, ASE power is accumulated in the clock cycle of the control circuit (feedforward cycle) and ASE power accumulation value PV is obtained. Therefore ASE accumulation processing is operated at speed same as in the clock cycle of the control circuit (feedforward cycle). In this embodiment, the average value of the ASE power is obtained in the cycle when the ASE power calculating unit 2042 is sufficiently slower than a clock cycle, e.g., a cycle same as the feedback processing.

The ASE power calculating unit 2042 is in a cycle sufficiently slower than a clock cycle, and accordingly, the ASE power calculating unit 2042 may be firmware as well as hardware. Also, a high processing speed is not required, so various forms can be realized and implementation is facilitated. In this embodiment, the ASE power calculating unit 2042 generates the SOA driving current accumulation value SV and the SOA driving current accumulation number of times SN, and the Duty ratio measurement unit 2044 generates the Duty ratio counter value CV. The SOA driving current accumulation value SV is an example of an accumulation value and the accumulation value of the driving control amount, and is the value of the driving current as to SOA having been accumulated.

The SOA driving current accumulation value SV is obtained by accumulating the SOA drive ON, OFF state and SOA drive current value only in the section of the feedback processing cycle. The SOA driving current accumulation number of times SN is an example of the accumulation number of times and the accumulation number of times of the drive control amount and is the accumulation number of times of the SOA driving current in SOA driving current accumulation value SV.

In the event that accumulation of the driving current to SOA is performed once per packet, SOA driving current accumulation number of times SN represents the number of times of the packet processing of the SOA driving current. Note that one processing frequency per one packet is only one example, and accumulation may be performed at other frequencies. Duty ratio counter value CV is an example of the counter value, and is the count where the DAC setting value in a signal (DAC value) output for DAC118 from the storage unit 206 is ON. This Duty ratio counter value CV is a count that is, for example, the ON between one FB cycles (ON level counts). The FB control unit 2040 performs FB control using SOA driving current accumulation value SV, the SOA driving current accumulation number of times SN, and Duty ratio counter value CV.

The FB control shown in FIG. 95 is executed by the FB control unit 2040. The FB control unit 2040 calculates an output PD temporal average value (step S801). Averaged processing of the output PD monitor value is calculated using Expression (40), and is performed every one feedback section, for example, one feedback section as a unit.

The output side PD average [DEC]=output side PD accumulation value [DEC]/output PD accumulation number of times (40)

This output PD average value [DEC] is converted into an average output power value dBm (step S802) and obtains peak output level Psig_outk mW by Expression (41) and Expression (42) by accumulating the line usage duty ratio (the ON/OFF ratio) (step S804).

$$P\text{sig\_out}k \text{ mW} = P\text{total\_out}k \text{ mW} \times \text{Inverse of Duty ratio} \qquad (41)$$

$$\text{Inverse of Duty ratio} = \text{Total counts in FB cycle/ON level counts} \qquad (42)$$

Note that in FB control unit 2040, the Duty ratio counter value CV is received and the ON level counts of this Duty ratio counter value CV is divided by the total counts in an FB cycle, and the signal density (Duty ratio) is calculated. Also, the total count of the FB cycle is acquired in a feedback processing cycle Pe to be set based on the frequency dividing rate setting in a feedback processing cycle to be set to the digital control circuit 2006. Processing to calculate an output PD temporal average value, processing to convert into an average output power level and processing to calculate a peak output level, are similar to the processing (step S701, step S702, step S704) that FB control unit 2040 performs in the thirteenth embodiment.

Next, SOA driving current average value in one feedback section is calculated by Expression (43) (step S805).

$$\text{SOA driving current average value in one feedback section} = \text{SOA driving current accumulated value/SOA driving current accumulated number of times} \qquad (43)$$

In the thirteenth embodiment, ASE power average value Pase mW was calculated as follows. (a) An expression which represented ASE power average value Pase mW=ASE power accumulation value mW/ON level counts was used as a basis. (b) ON level counts CN accumulated by clock units of a control circuit sufficiently faster than the feedback cycle, and a value of driving current output when ON, were used as a basis. (c) ASE power mW calculated from the DAC-ASE table 2050 was accumulated sequentially. (d) An ASE power accumulation value mW accumulated within a period of feedback cycle was used. (e) Using ASE power average Pase mW, peak output level Psig_out_pk mW with ASE components removed, was calculated.

In this embodiment, ASE power Pase is obtained using drive current value average value-ASE power corresponding table 2010. ASE components are removed by Expression (44) using Psig_outk mW and Pase mW then and peak output level Psig_out_pk mW after ASE component removal is obtained (step S806).

$$P\text{sig\_out\_}pk \text{ mW} = P\text{sig\_out}k \text{ mW} - P\text{ase mW} \qquad (44)$$

Next, FB control unit 2040 calculates the control error with an target output peak level and primary signal peak level and calculates an output target level (step S807), and searches a table of driving control amount and sets a driving control amount (step S808). These processing can be performed with processing similar to the thirteenth embodiment.

Next, FIG. 96 will be referenced to describe processing to remove ASE components to obtain control error. In FIG. 96, to help the understanding of the processing procedure (FIG. 95) of the already-described FB control, connections of each processing, each function or each component are represented. In the control error/new target value calculating unit 412 shown in FIG. 96, output PD monitor accumulation value MV and output PD monitor accumulation number of times MN are acquired from the output PD value accumulation unit 2038, and SOA driving current accumulation value SV and OA driving current accumulation number of times SN are acquired from the ASE power calculating unit 2042. In the control error/new target value calculating unit 412, Duty ratio counter value CV is acquired from Duty ratio measurement unit 2044. The control error/new target value calculating unit 412 has each function (function unit) performing each processing of the already-described steps S801 through S807, removes ASE components and obtains control error.

That is to say, the control error/new target value calculating unit 412 includes the average output PD calculating unit to calculate a time average value of output PD (S801), the average output power converting unit to convert into an average output power value (S802), and the signal density calculating unit to calculate signal density (S803). Also, the control error/new target value calculating unit 412 includes the peak output level calculating unit to calculate peak output level (S804), and the driving current average value calculating unit to calculate SOA driving current average value (S805). Also, the control error/new target value calculating unit 412 includes the ASE removing unit to remove ASE components (S806), and the error calculating unit to calculate a control error (S807). Comparing the packet processing number threshold with the packet processing number for FB control set in the digital control circuit 2036 beforehand, in the event that the packet processing number is at the threshold or below (Yes in step S821), SOA current table updating is not performed and the processing is ended. In the event that the packet processing number is not the at threshold or below (No in step S821), SOA current table updating, i.e. already-described LUT updating processing is performed.

With this embodiment, an expression that obtains peak output level after ASE components is similar to the thirteenth embodiment, but deriving means of Pase are different, so that implementation is enabled even if processing speed of the ASE power calculation unit 2042 is sufficiently slower than clock frequency.

Features, advantages, modifications or the like will be exemplified for the above-described thirteenth and fourteenth embodiments.

(1) With the system according to the thirteenth embodiment, ASE amount is consecutively obtained and averaged in clock units of the control circuit, and accordingly Pase values have high precision.

(2) With the system according to the fourteenth embodiment, implementation is enabled even if processing speed of the ASE power calculating unit 2042 is sufficiently slower than clock frequency, so hardware demand is not high, and realization is easy.

(3) The system according to the thirteenth embodiment is excellent, in the sense of accuracy. However, with a graph of SOA driving current value (DAC value)-ASE noise power shown in FIG. 80, driving current value and ASE noise power has linear relation in the continuously-increasing part of the graph. In this region, accurate control of Pase can be realized with the system according to the fourteenth embodiment. In other words, with the system according to the fourteenth embodiment, a system can be easily constructed using a region where driving current value and ASE noise power has linear-relation as a main region. This has an advantage in a case of constructing a small system or the like.

Other Embodiments (1) The level control device is not limited to an SOA. For example, an optical attenuator may be used wherein output light strength may be varied due to current or voltage using an electro-optical effect (EO effect), acousto-optical effect (AO effect), or magneto-optical effect (MO effect). Such an optical attenuator may be, for example, an optical attenuator that uses an EO effect using ferroelectrics such as lithium niobate (LN: LiNbO3) or lead zirconate titanate (PLZT: (Pb, La) (Zr, Ti) O3), a variable optical attenuator that uses a modulator such as an acousto-optic modulator (AOM), or an optical attenuator that uses an MO effect using a Faraday rotator.

Also, in the case of operating at a slower speed than a microsecond, the optical variable attenuator may be realized using a thermo-optical effect (TO effect).

Figure 97:
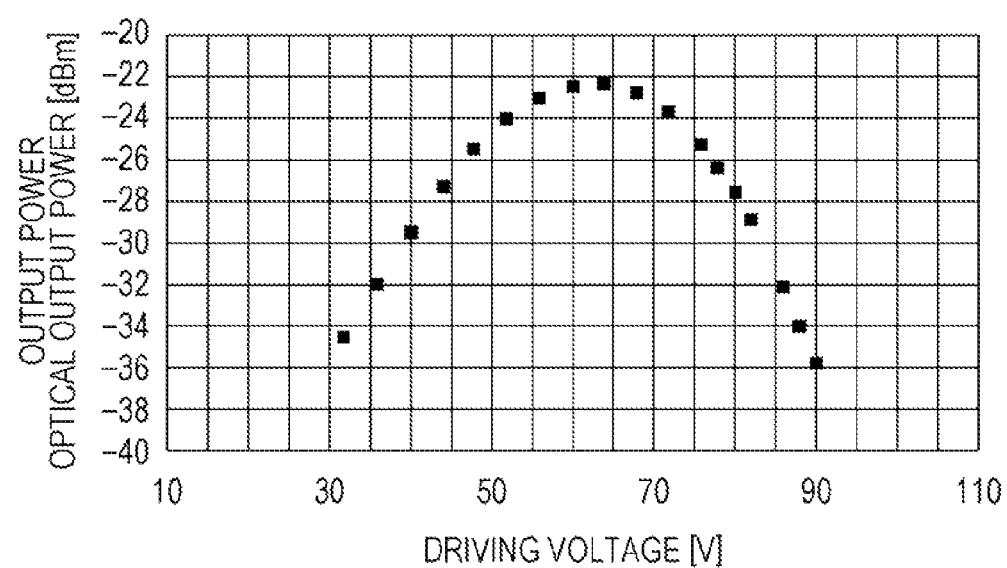
FIG. 97 is a diagram illustrating an example of an output power properties as to the driving voltage of the optical level control device.

(2) A variable optical attenuator (VOA) using the ferroelectrics PLZT has a property wherein output power decreases when the driving voltage increases in a region that the driving voltage exceeds 65V, as depicted in FIG. 97. In this case, for the original LUT data, when the number of rows for input power increases, the values stored in the table also may be increased, as depicted in FIG. 98. In the case of computing a table of target setting levels from such a table, interpolating with two values disposed above and below the target level with a proportional relation is performed.

Figure 99:
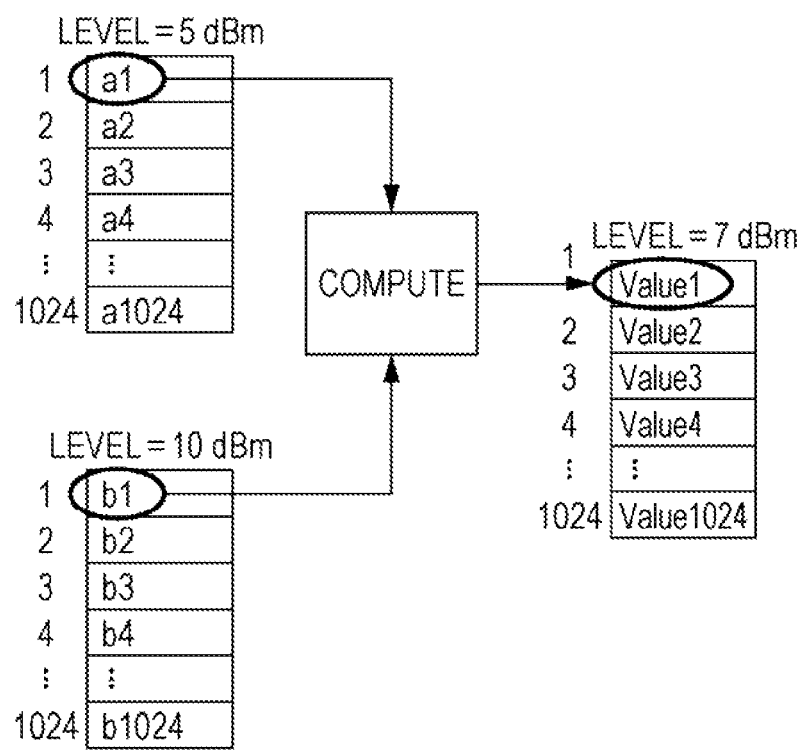
FIG. 99 is a diagram illustrating an example of table creation.
Figure 100:
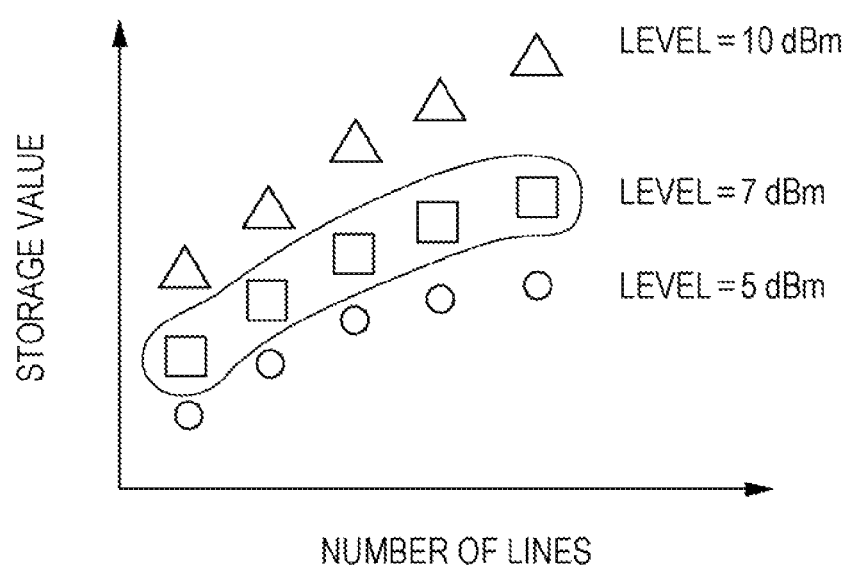
FIG. 100 is a diagram illustrating an example of table values as to the number of rows.

As depicted in FIG. 99, in the case of obtaining a first element (Values) of the level 7 dBm table from the first table element (a1) of the level 5 dBm table and the first table element (b1) of the level 10 dBm table, this is computed with Expression (26) using the level difference.

$$\text{Value1} = a1 + (b1 - a1) \times (7 - 5)/(10 - 5) \quad (26)$$
$$= (3 \times a1 + 2 \times b1)/5$$

Now, in the case of obtaining a k'th element (Value k) of a level x (dBm) table from the k'th element (ak) of the level m (dBm) table and the k'th element (bk) of the level n (dBm) table, Expression (27) may be used for computation. Note that FIG. 99 is an example in the case that level m is 5, level x is 7, level n is 10, and k is 1.

$$\text{Value } k = ad + (bk - ak) \times (x - m)/(n - m) \quad (27)$$

Data creating processing is simplified as compared to the case wherein a level control device is used which has a property that upon the driving voltage increasing, the output power increases.

The values exceeding the threshold in this case, as depicted in FIG. 98, for example, are set to 0 as to the input PD value when the driving current value is smaller than the threshold. Also, in order to preheat the optical level control device, a preheating level of driving current value may be set instead of 0. If a preheating level of driving current value is set, the input PD value increases, and the operations may be stabilized in the event of starting the level control with the optical level control device. Note that the threshold is set according to the detection level of the rising or falling of the input PD value.

Figure 101A:
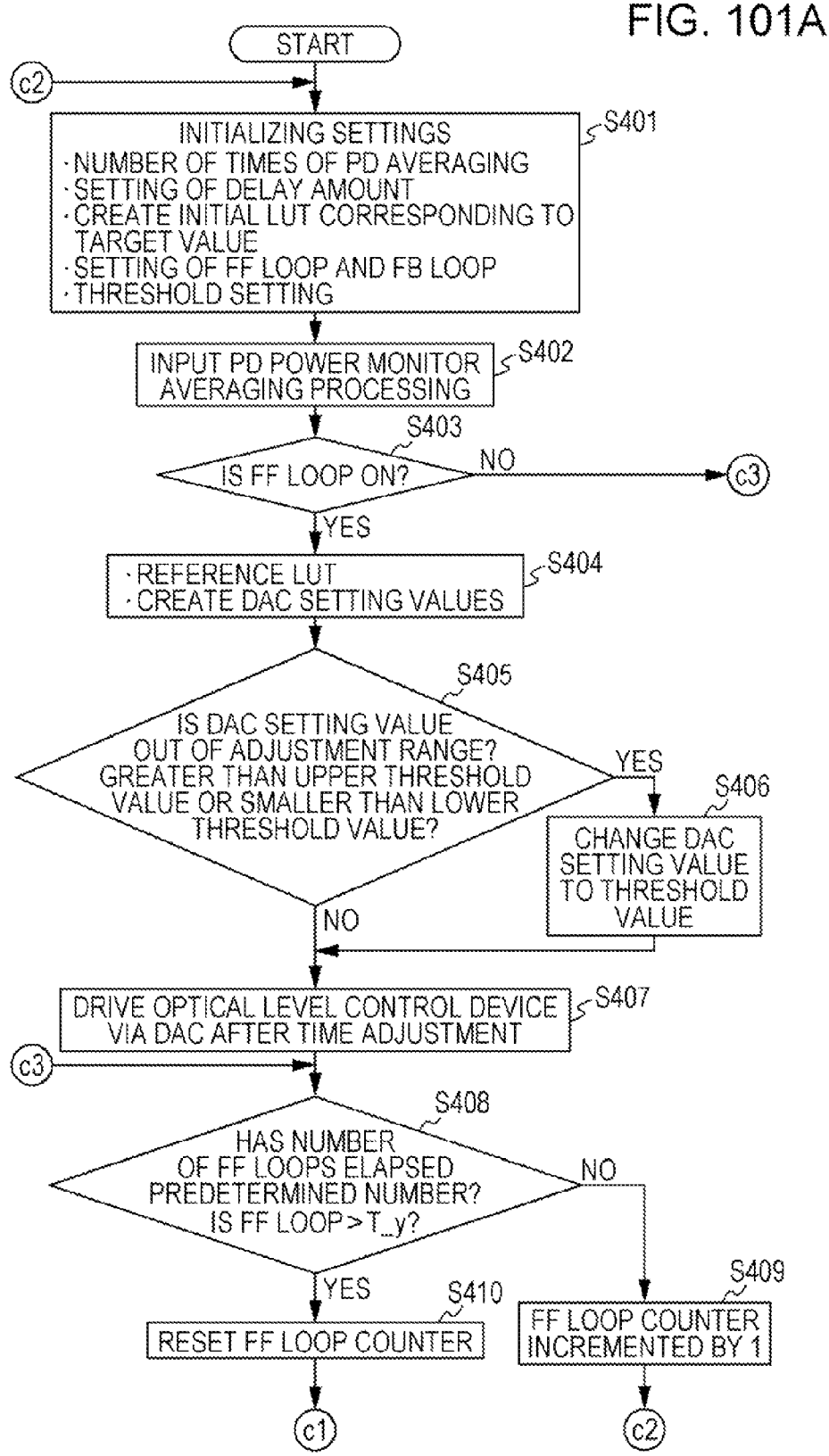
FIGS. 101A, 101B illustrate a flowchart describing an example of level control processing relating to other embodiments.
Figure 101B:
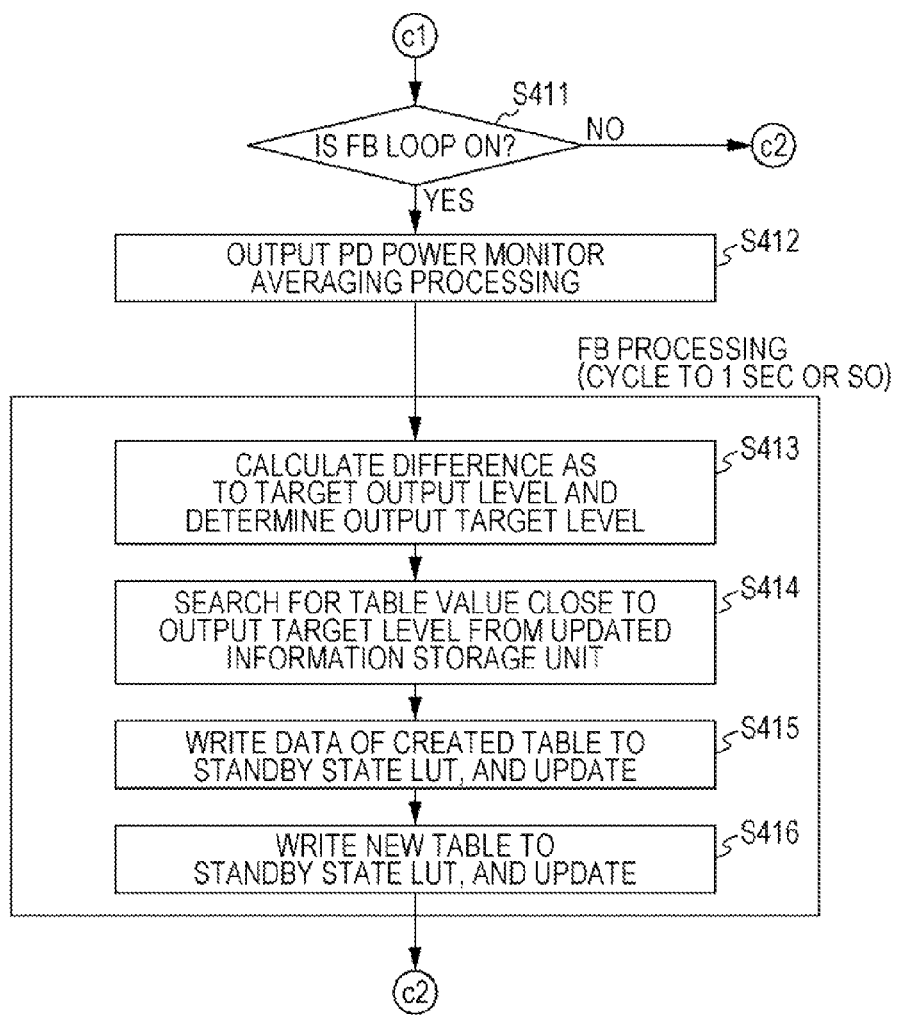

(3) As depicted in FIGS. 101A, 101B, a new table is written in the LUT in standby state, and upon updating (step S416), the processing may return to before the initial setting. Thus, for example the number of times of PD averaging and so forth may be changed. Other processing is similar to the processing depicted in FIGS. 26A, 26B, so the description thereof will be omitted.

(4) In the case of using an optical level control device wherein the relation between the output power change amount and driving voltage change amount are linear, the control error amount thereof may be understood on the FB loop processing side, whereby control may be made by changing the fixed value portion of the driving voltage amount equivalent to the control error. In other words, as depicted in FIG. 102, the fixed amount a equivalent to the control error is added to or subtracted from the LUT driving control amount, resulting in a new driving control amount.

Figure 103:
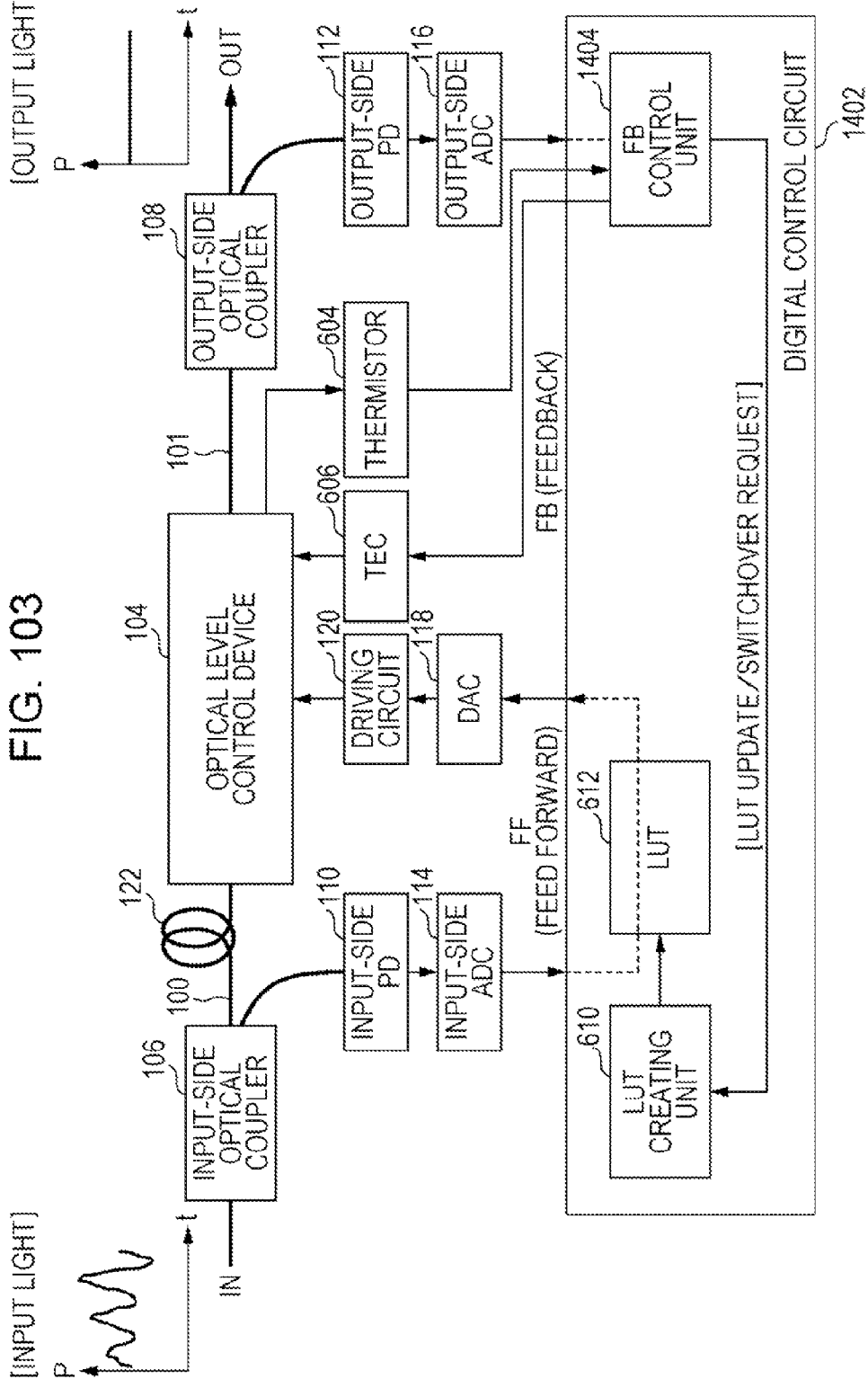
FIG. 103 is a diagram illustrating an example of a level control system relating to another embodiment.

(5) As depicted in FIG. 103 a digital control circuit 1402 has an FB control unit 1404, and the FB control unit 1404 may control the TEC 606 to control the temperature of the optical level control device 104. Also, instead of the temperature control with the TEC 606, the temperature difference may be computed between the reference temperature at the time of obtaining the original data of the LUT 612 and the temperature information of the optical level control device 104 during control, the LUT 612 may be updated with consideration for the temperature difference. In the case that the temperature of the optical level control device 104 is higher than the reference, the driving control amount is increased and the output level of the optical level control device 104 is increased. In the case that the temperature of the optical level control device 104 is lower than the reference, control may be performed so that the driving control amount is decreased and the output level of the optical level control device 104 is decreased. In the case of updating the data of the LUT 612, updating may be performed by shifting the output target level with consideration for the temperature information.

(6) According to the above-described embodiment, the LUT is expanded to a register within the FPGA or the RAM for reference, but the LUT may be arranged so as to be read out from the ROM.

(7) In the case of computing the data stored in the LUT 612 with a computation, data requested for computation may be stored in the digital control circuit and the LUT 612 may be created with the LUT creating unit 610.

Figure 104:
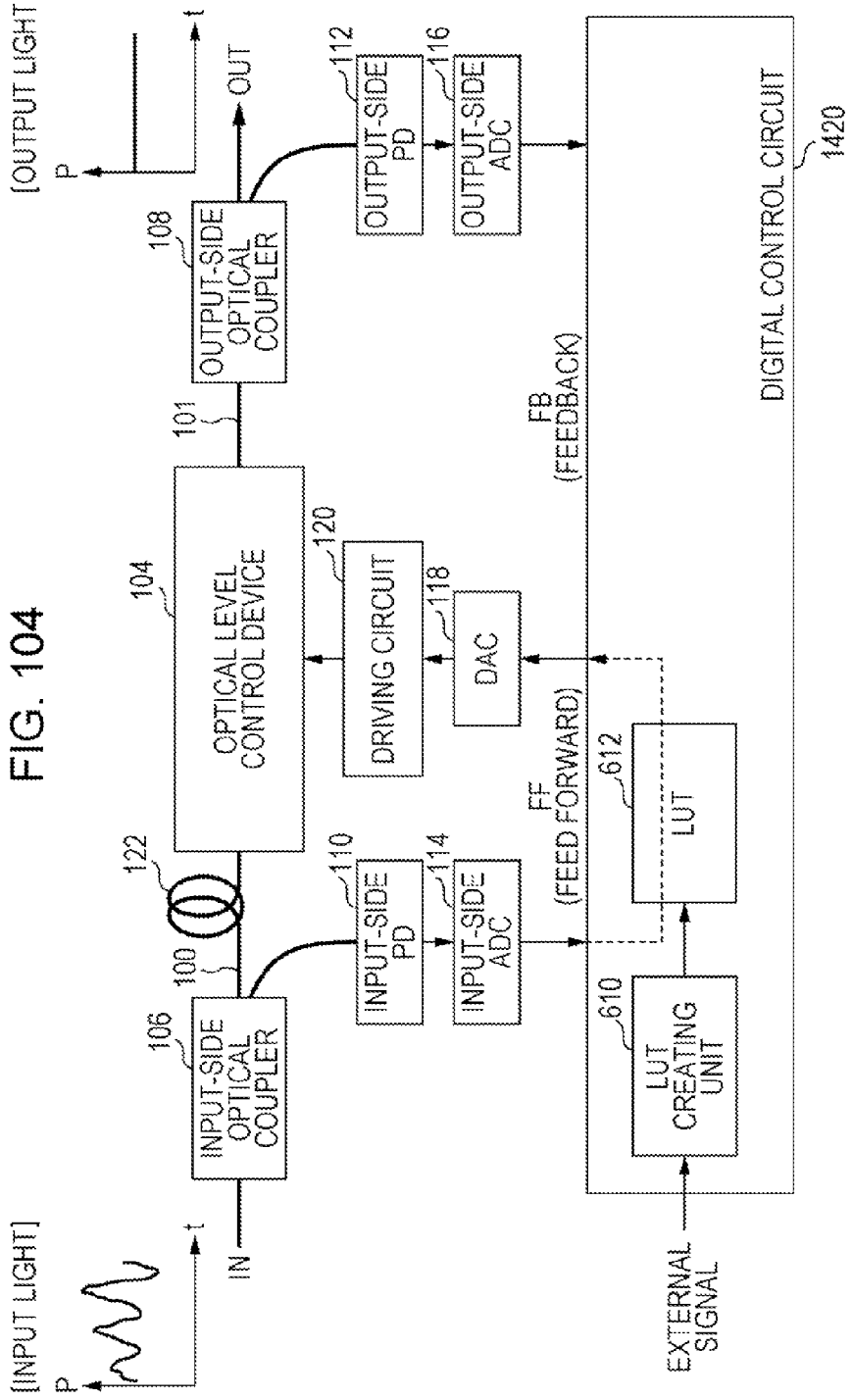
FIG. 104 is a diagram illustrating an example of a level control system relating to another embodiment.
Figure 105:
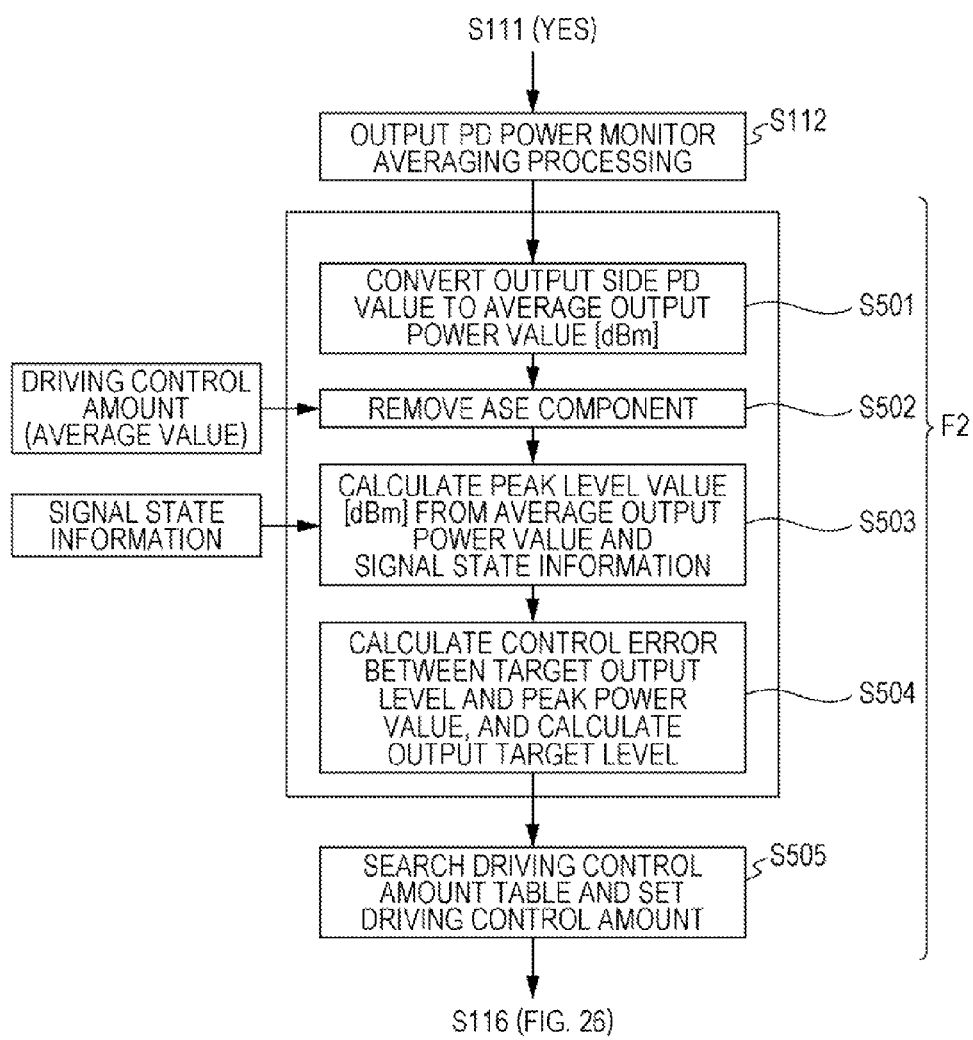
FIG. 105 is a flowchart describing an example of output target level determining processing relating to another embodiment.

(8) The LUT creating unit 610 may receive signals from outside of the digital control circuit 1420 to create the LUT, as depicted in FIG. 104. If the output target level information to be set in the LUT 612 is included in the external signal, the data of the LUT 612 is created with the LUT creating unit 610, and the LUT 612 may be updated.

(9) Using a PD having a tap function (tap PD), the optical coupler and PD may be configured as one part.

(10) Level control is not be limited to optical signals, and level control of electrical signals may also be made. In the case of controlling an electrical signal, the electrical signal flowing through an electrical cable is split out with a splitter, to receive the signal level. A dielectric line wherein a dielectric body is covered with an insulator or a dielectric cable may be used as the electrical cable.

(11) In the eleventh embodiment (FIGS. 67 and 72) a peak level of the intermittent signal is obtained using the average value of signal levels including the ASE, but the peak level may be obtained while removing the ASE from the signal level average value. For example, the ASE amount included in the output-side optical packet signal is determined by the driving amount of the optical level control unit 1204, whereby the ASE amount may be computed from the driving control amount input into the optical level control device. Thus, upon converting the PD value after performing averaging processing with the control error/new target value computing unit 1234 into a power value (step S501), ASE removal is performed (step S502).

ASE removal is performed such that the driving control amount output from the storage unit 206 is input in the control error/new target value computing unit 1234, and based on this driving control amount the control error/new target value computing unit 1234 computes the amount of ASE. Upon removing the ASE amount from the converted power value, the peak level value (unit: dBm) is computed this power value and from the signal state information (step S503). By obtaining the peak level value, the control error and a new target output level may be computed (step S504), and table searching of the driving control amount and setting processing of the driving control amount (step S505) may be performed. Thus, by removing the ASE value from the average value of the signal levels used to compute the peak level, the peak level may be computed without consideration for influence from the ASE. Note that in the case of driving the optical level control unit 1204 using the driving current value as the driving control amount, the ASE amount may be computed from the temporal average value of the driving current.

Next, features, advantages, modifications or the like will be exemplified for the above-described embodiment.

(1) Regarding the optical communication network, current or voltage is applied to a variable attenuator using ferroelectrics or a semiconductor optical level control device using a compound semiconductor, and the current amount or voltage amount thereof is controlled, whereby output light strength may be changed to the order of less than a microsecond.

(2) Input power variations of ½ the operating frequency of the digital control circuit may also be managed. In the case that the control circuit is operating with an operating frequency of 133 MHz, an input power variation of 66 MHz may also be managed. This speed is 1000 times or faster as compared to an ALC or AGC control cycle. Also, by updating the control information, long-term stability may be secured at the same time.

(3) By providing an output time adjusting unit, the optical fiber length equivalent to the control delay does not need to be adjusted with precision, and with the adjustments by the output time adjusting unit, the timings of level control may be adjusted.

(4) Installing an optical fiber network is easier, the burden of environmental improvements accompanying fiber facilities may be reduced, and costs relating to laying fiber may be reduced.

(5) An upstream-side tap PD that is disposed upstream from the optical level control device for monitoring the input optical level, a downstream tap PD that is disposed downstream for monitoring the output light level from the optical level control device, a delay line disposed between the upstream-side tap PD and the optical level control device, and an LUT storing the driving control amount to the optical level control device as to the light input level monitored with the upstream-side tap PD according to a light output level which may be set optionally, are provided, the LUT is referenced in accordance with variations to the input level, and the processing which instantly changes the control signal to the optical level control device is configured with hardware only, without using any firmware, whereby the control error obtained by computing the difference between the light output level from the optical level control device monitored with the downstream-side tap PD and the output target level is reflected in the LUT, and whereby the optical output level may be adjusted in the order of MHz.

(6) If two or more look-up table (LUT) faces are provided, while the control signal is instantly being changed in one LUT, the control error may be reflected in the other LUT, and upon the reflection of the control error ending, the LUT used to change the control signal is switched, and by repeating this switching, the LUT may constantly be maintained in the newest state.

(7) By providing the delay time variable device of the electrical signal between the driving circuit and control circuit of the optical level control device, the timing of reflecting the LUT value to the control signal to the optical level control device may be delayed.

(8) By providing a delay amount setting unit that may vary the delay amounts of the electrical delay variable device, the timing to be delayed by the settings of the delay amount setting unit may be changed.

(9) By providing a time adjusting unit that delays, in operation clock units, the timing to output the control signals generated by the LUT reference to the driving circuit of the optical level control device, the control signal may be output after delay by the number of operating clocks that has been set.

(10) The upstream-side tap PD has a monitoring circuit including a linear operating amplifier, and the downstream-side tap PD has a monitoring circuit including a log amplifier, whereby signals may be amplified.

(11) A table may be created by computing the relational curves at an unmeasured output level, from relational curves of the driving control amount of the level control device and input power values measured with a discrete output level values, and from the values of the intersections between a maximal value line of input power and a maximal value line of the driving control amount of the level control device.

(12) Relational curves of the input power values and driving control amounts of the level control devices are computed from the gain value equivalent to when the driving current of the level control device is 0, the approximate gain value when the driving current is sufficiently large, the driving current value corresponding to the averaging gains herein, the parameters expressing a non-linear relation between current and gain, saturation light output, and output target level values. In the case that the computed driving control amount of the level control device exceeds the maximum value of the level control device, a desired relational curve that is the maximum value or less of the driving control amount is provided as the driving control amount of the level control device. A table may also be created in this manner.

Figure 106:
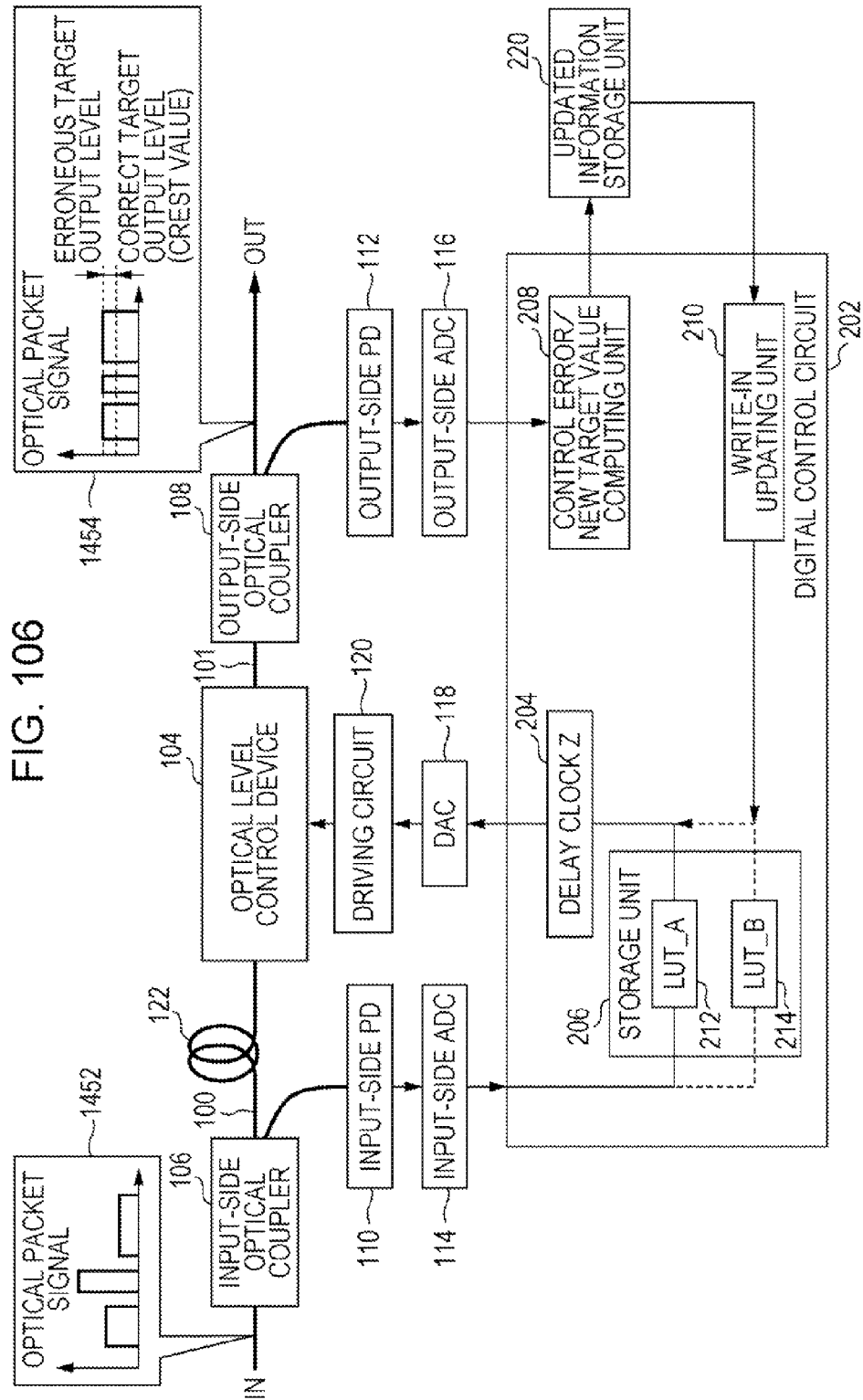
FIG. 106 is a diagram illustrating a modification of the level control system relating to the third embodiment.

(13) In the case that the packet density of the optical packet signal to be amplified does not vary, or in the case that the variance is small, level control of an optical packet signal may be performed using the level control circuit, level control method, or level control system according to the first through ninth embodiments. For example, in the case of subjecting the optical packet signal to level control with digital control according to the third embodiment, the input-side optical packet signals 1452 having different levels may be subjected to FF processing and FB processing, whereby the peak levels may be fixed in the output-side optical packet signal 1454, as depicted in FIG. 106. With the control error/new target value computing unit 208, as a result of processing the intermittent signal, the output-side signal level becomes a value lower than the target output level. If FB processing is performed in this way an erroneous target output level may result in being set, so a normal target output level is set with consideration for influence of the packet density, and the difference from the output-side signal level is obtained. Thus, the level may be maintained with the FB processing.

Figure 107:
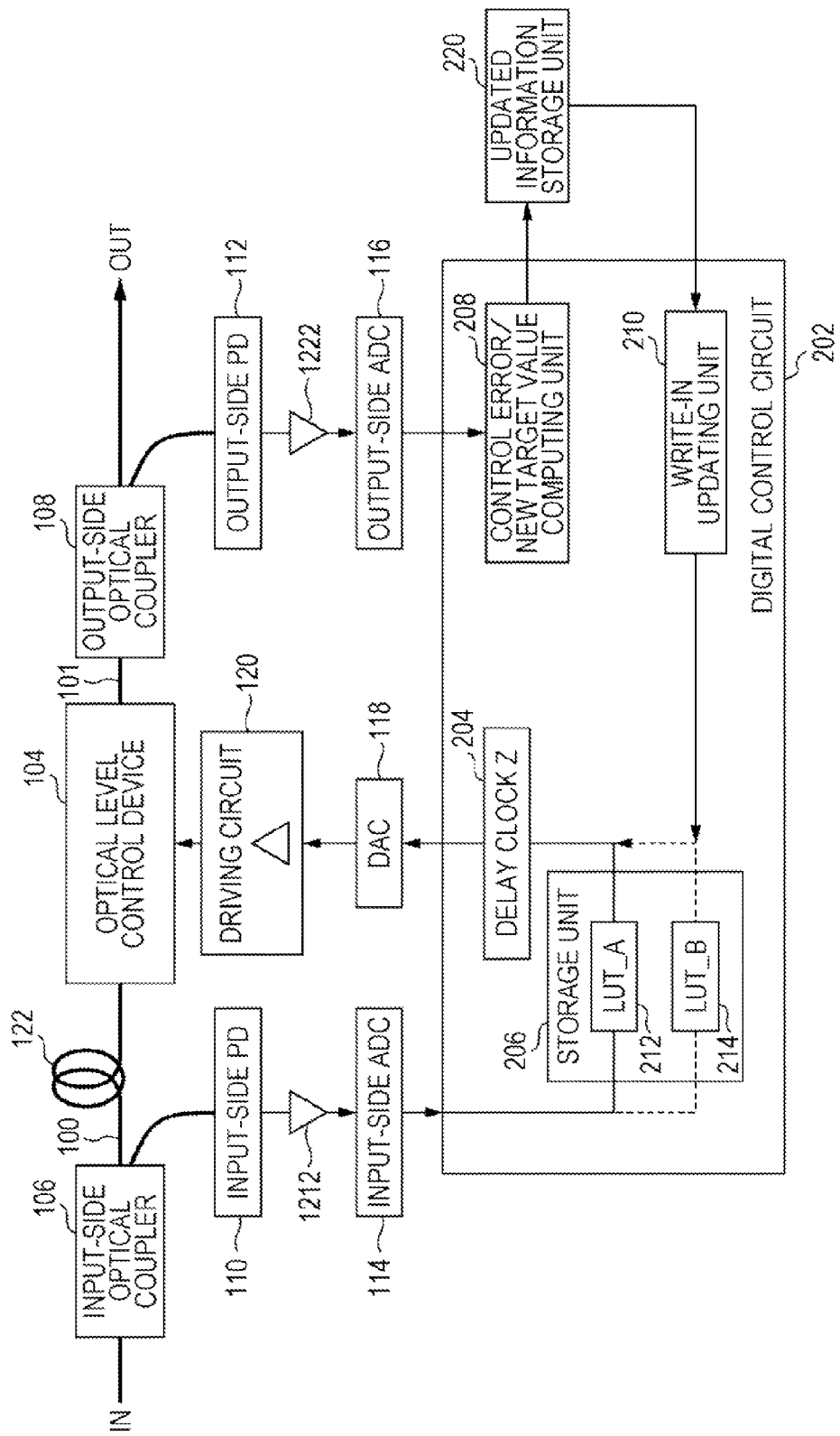
FIG. 107 is a diagram illustrating a modification of the level control system relating to the third embodiment.

Application of the intermittent signal to the level control is not limited to the first through ninth embodiment. For example, as depicted in FIG. 107, a configuration may be arranged wherein an input-side amplifier 1212 may be disposed between the input-side PD 110 and input-side ADC 114, and an output-side amplifier 1222 may be disposed between the output-side PD 112 and output-side ADC 116, whereby the input values thereof are amplified.

(14) According to the eleventh and twelfth embodiments, the output-side PD values are amplified with a log amplifier, but is not be limited to this. If sufficient output value is obtained, an amplifier does not have to be used. In this case, the segments of the driving signal counted by the computing unit 1126 and the segments of the signal received by the output-side receiving unit 1122 are made to match one another, and the average value of the signal levels from reception by the output-side receiving unit 1122 is divided by the duty ratio, whereby the peak level of the segment thereof is computed. The peak level is computed with Expression (28) below. Note that an optional segment is a fixed time period corresponding to each FB cycle, for example.

$$\text{Peak power of optional segment} = \text{average value of optional segment signal level/duty ratio of optional segment} \quad (28)$$

Figure 108:
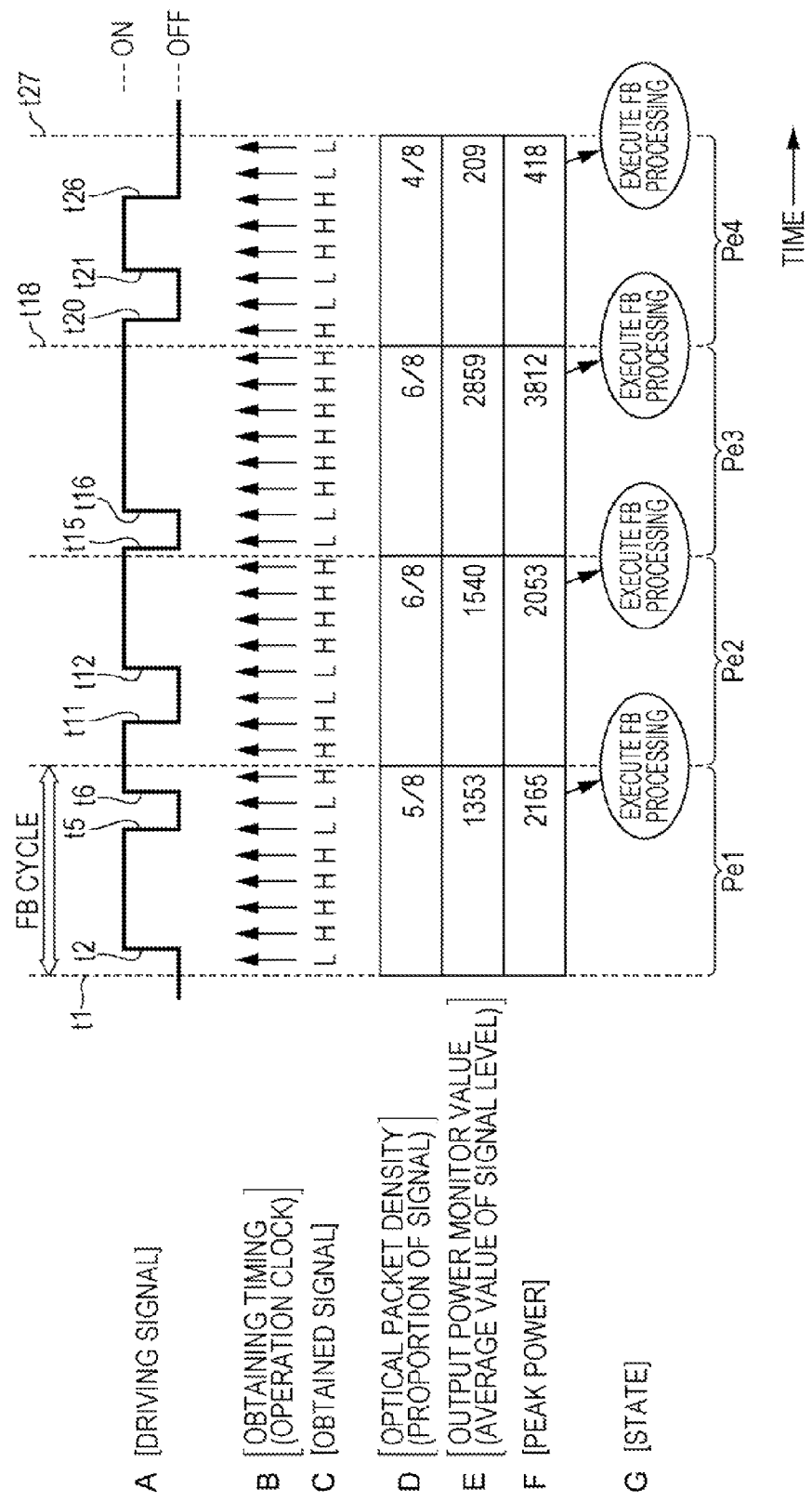
FIG. 108 is a diagram illustrating an example of the relation between driving signal, monitor values, and peak power.

FIG. 108 will be referenced to describe the case of obtaining peak power from the driving signal. For example, let us say that the driving signal varies as depicted in FIG. 108A. Also, let us say that the signal obtaining timing which the digital control circuit executes every operating clock is as in FIG. 108B, for example. In this case, the obtained signal is as depicted in FIG. 108C. Note that in FIG. 108C, the ON signal of the driving signal is expressed with an H and the OFF signal is expressed with an L. The density of the driving signals of the FB cycles Pe1, Pe2, Pe3, Pe4 (signal ratios) are obtained by dividing the number of obtained H signals in each cycle by the total number of obtained signals in the cycle, as depicted in FIG. 108D. The density of the driving signal in FB cycle Pe1 is ⅝, the density of the driving signal in FB cycle Pe2 is ⅚, the density of the driving signal in FB cycle Pe3 is ⅚, and the density of the driving signal in FB cycle Pe4 is ⅘.

Figure 109:
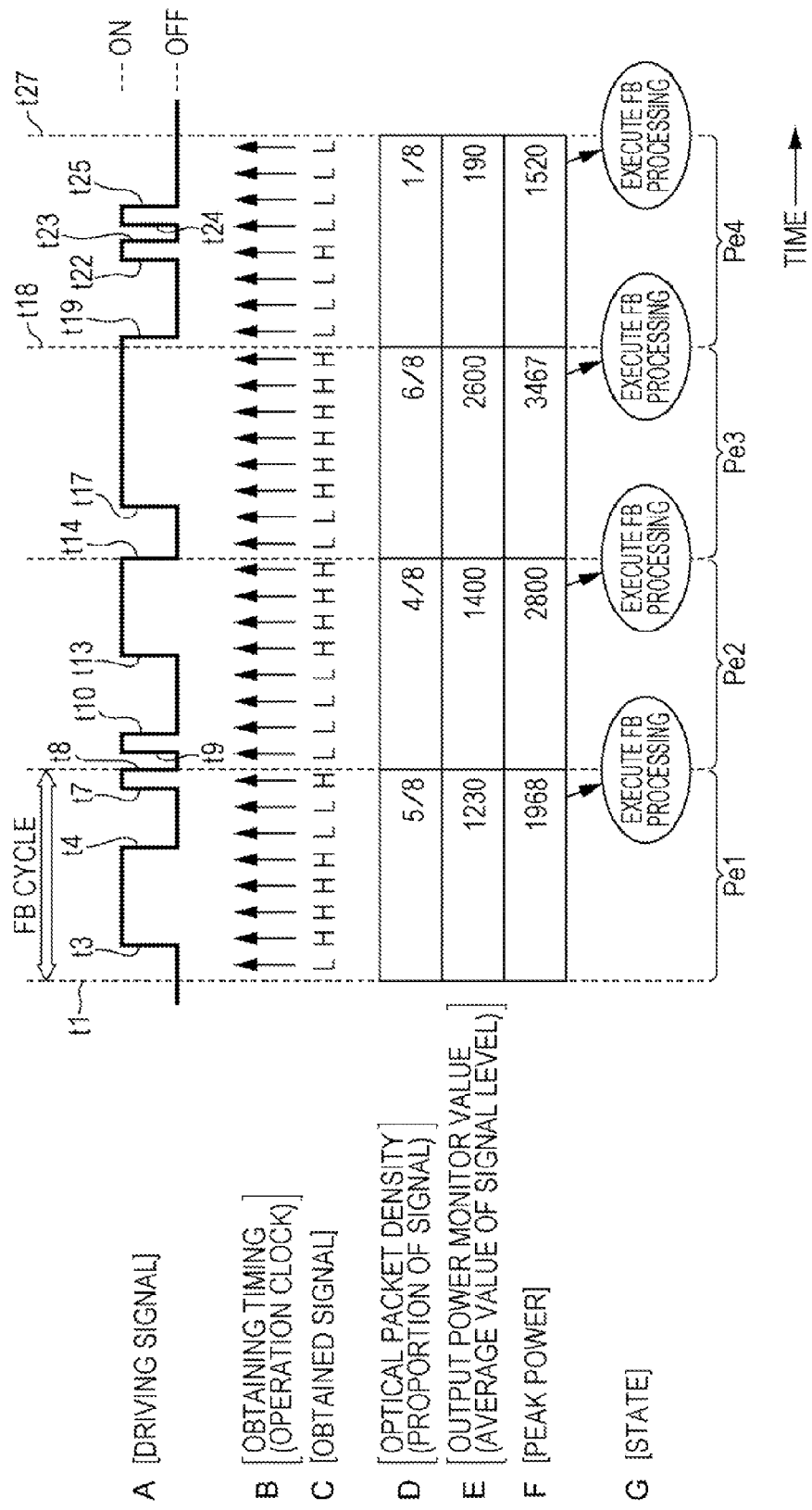
FIG. 109 is a diagram illustrating an example of the relation between an optical packet signal, monitor values, and peak power.

Thus, the peak power of the FB cycles Pe1, Pe2, Pe3, and Pe4 are obtained with the Expression (28) from the density of the driving signals and the average value of the signal levels depicted in FIG. 108E. FIG. 109 is an example of peak power values of the FB cycles Pe1, Pe2, Pe3, and Pe4. The control information stored by the storage unit 206 is updated according to the peak levels herein, whereby the levels may be adjusted with the intermittent signal units. Consequently, an intermittent signal having different strengths may be maintained at a fixed strength. Thus, a flexible network may be built.

FIG. 109 will be referenced to describe the case of obtaining peak power from the input-side optical packet signals. Let us say that the input-side optical packet signal varies as depicted in FIG. 109, for example. Also, let us say that signal obtaining timing which the digital control circuit executes every operating clock is as in FIG. 109, for example. In this case, the obtained signal becomes as depicted in FIG. 109. Note that in FIG. 109, the signal-existing state of the input-side optical packet signal is denoted by H, and the no-signal state is denoted by L. The optical packet signal density (signal ratio) of each FB cycle Pe1, Pe2, Pe3, and Pe4 are obtained by dividing the number of obtained H signals from each cycle by the overall number of signals from each cycle, as depicted in FIG. 109.

The density obtained of the optical packet signal in the FB cycle Pe1 is ⅝, the density of the optical packet signal in the FB cycle Pe2 is ⅘, the density of the optical packet signal in the FB cycle Pe3 is ⅚, and the density of the optical packet signal in the FB cycle Pe4 is ⅛. The driving signal includes a margin as to the input side optical packet signal, whereby the density of the optical packet signal will have the same density as, or lesser density than, the density of the driving signal. Thus, the peak power of the FB cycles Pe1, Pe2, Pe3, and Pe4 are obtained from the optical packet density herein and the average value of the signal levels depicted in FIG. 109 with Expression (28). FIG. 109 is an example of peak power values of the FB cycles Pe1, Pe2, Pe3, and Pe4. The control information stored by the storage unit 206 is updated according to the peak level herein, whereby level adjustments may be made in units of the intermittent signal. Consequently, the intermittent signals having different strengths may be maintained at a fixed strength. Thus, a flexible network may be built.

(15) According to the eleventh and twelfth embodiments, the duty ratio is obtained from the clock count in the case of ON signals or OFF signals and the clock count between FB cycles, but is not be limited to this. For example, by confirming both the ON signals and OFF signals of the driving signal for every operating clock unit of the digital control circuit, the ON time and OFF time are confirmed. The ON time and OFF time are understood as the count of ON signals and OFF signals. The duty ratio is then computed as (ON time)/(ON time+OFF time). The duty ratio may be computed in this manner.

(16) The delay clock Z 204 may be provided to the level control system according to the thirteenth and fourteenth embodiments, so as to control the delay amount of electrical signals. Also, the level control system according to the thirteenth and fourteenth embodiments may be provided with the signal delay device 304, delay amount setting unit 306, and enable signal 350. By providing with the delay clock Z 204 or signal delay device 304 or the like, freedom of time adjustment is raised, so work and time for adjustment can be alleviated. The delay clock Z 204 can be implemented in the same way as with the third embodiment. Also, the signal delay device 304, delay amount setting unit 306, and enable signal 350 can be implemented in the same way as with the fourth embodiment. In addition to these, devices of the level control system or control circuits of other embodiments can be added to the level control system or control circuits of the above-described embodiments, so as to obtain a level control system or control circuit with more full functionality.

Figure 110:
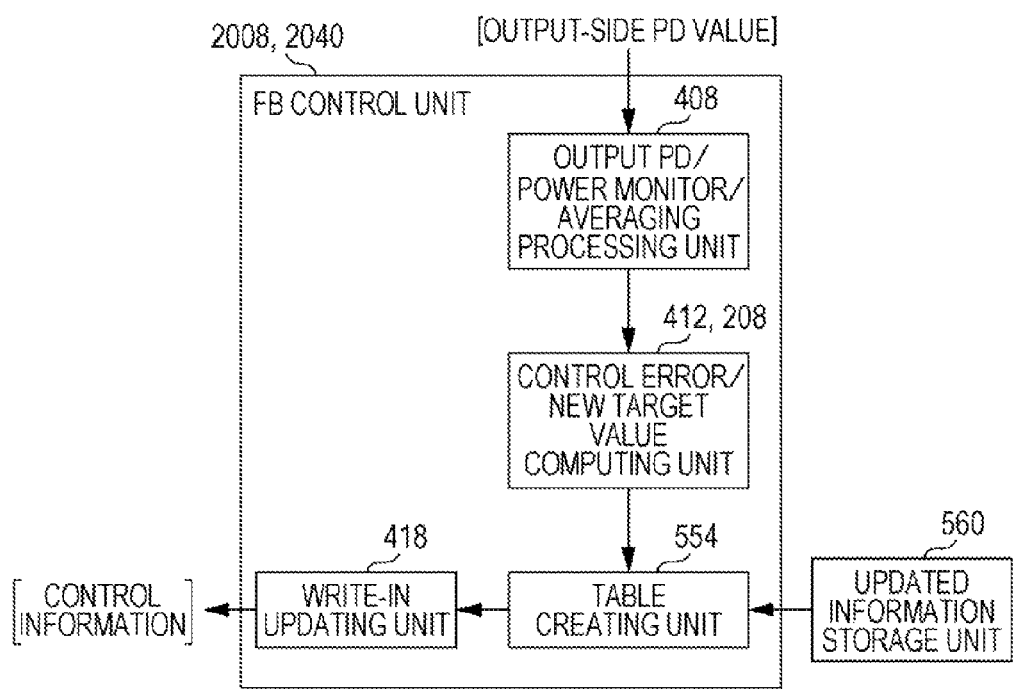
FIG. 110 is a diagram illustrating a modification of the FB control unit.

(17) With the thirteenth and fourteenth embodiments, the configuration is such that the storage unit 206 has the LUT_A212 and LUT_B214, being switched by the FB control unit 2008 or FB control unit 2040, but is not restricted to this. For example, a configuration may be made where a digital control circuit has the FB control unit 608, LUT creating unit 610, and LUT 612, as with the eighth embodiment for example, such that the LUT creating unit 610 creates control information under reception of a request from the FB control unit 608, so as to update the control information of the LUT 612. Also, the FB control unit 2008 or FB control unit 2040 may be configured as the FB control unit 2008 (FB control unit 2040) shown in FIG. 110. The FB control unit 2008 shown in FIG. 110 includes, in addition to the output PD/power monitor/averaging processing unit 408 and control error/new target computing unit 412, the table creating unit 554 and write-in updating unit 418. The configuration is such that information is acquired at the table creating unit 554 from the updated information storage unit 560, so as to be configured in the same way as with the seventh embodiment. Note that a configuration may be made where the FB control unit 2008 includes the updated information storage unit 560. With this configuration, a configuration can be made in which tables are created in the same way as with the seventh embodiment.

Figure 111:
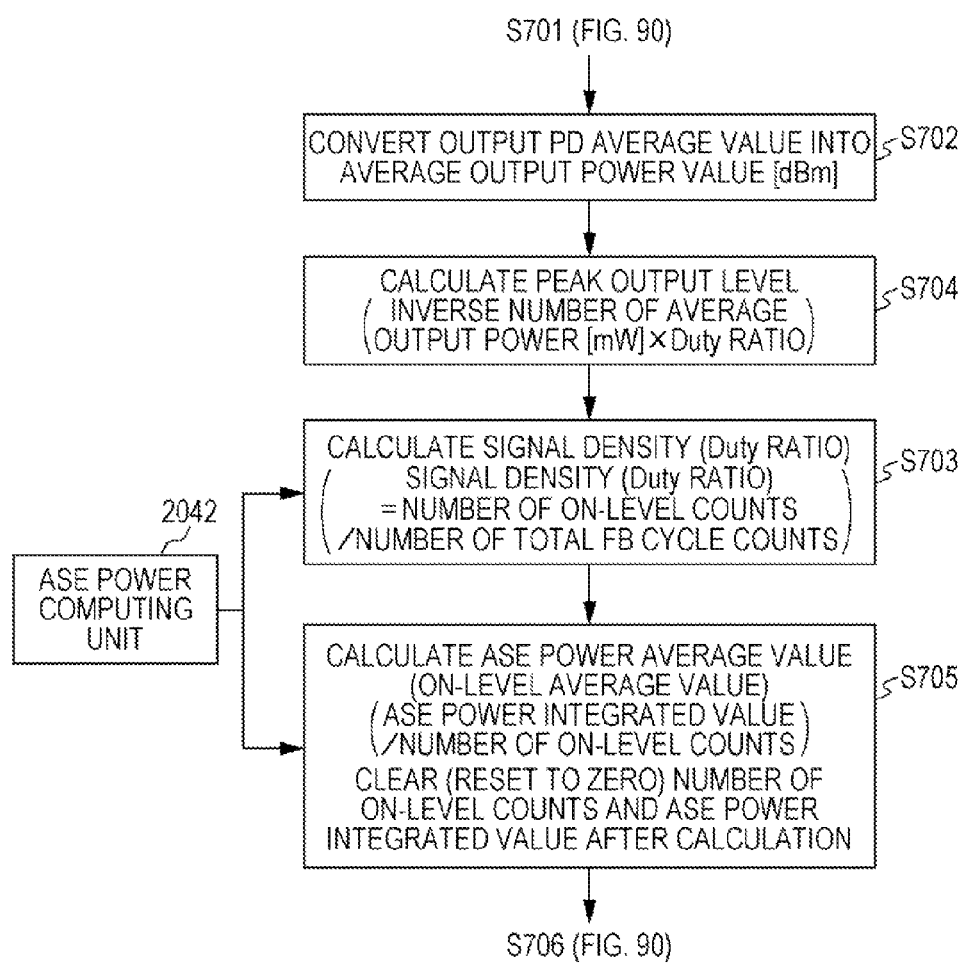
FIG. 111 is a flowchart illustrating a modification of processing procedures of the FB control unit.

(18) The processing procedures in the already-described embodiments are only exemplary, and various types of processing can be performed with the processing procedures being interchanged in various manners. For example, with the processing procedures of FB control illustrated in FIG. 111, a configuration of processing procedures is made where the signal density calculation processing (step S703) and the peak output level calculation processing (step S704) have been interchanged. This interchanging can be realized by, for example, performing peak output level calculation using the output PD monitor accumulation number of times MN and total number of times per FB cycle.

Figure 112:
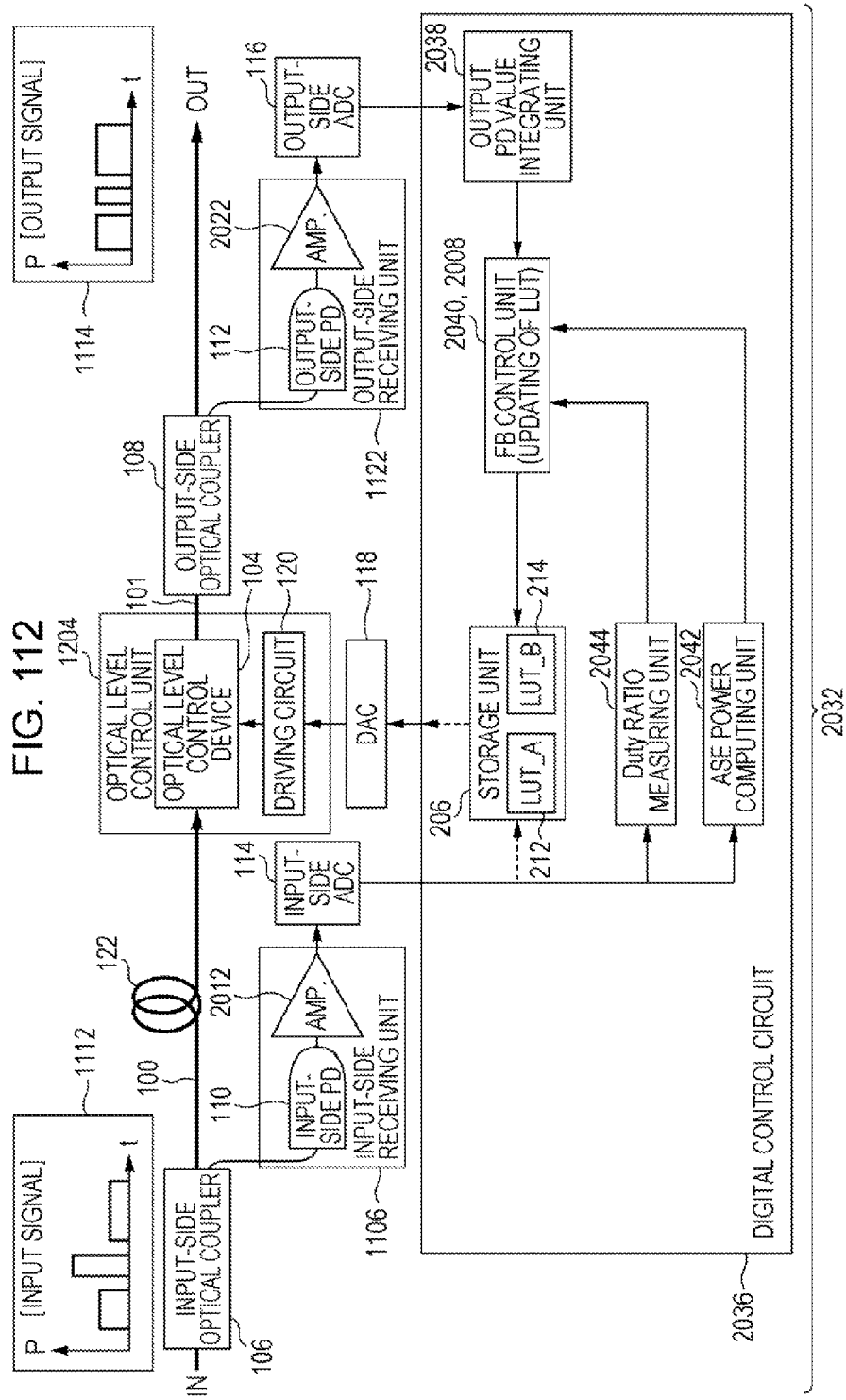
FIG. 112 is a diagram illustrating a modification of the level control system.

(19) Various modifications can be made to the already-described embodiments. With the level control system 2032 according to the thirteenth and fourteenth embodiments, the duty ratio measurement unit 2044 makes up a part of the ASE power calculating unit 2042. The duty ratio measurement unit 2044 may be formed as a separate component from the ASE power calculating unit 2042, as shown in FIG. 112, for example, rather than the above-described form. Also, ASE power can be calculated with the ASE power calculating unit 2042 using signals output from the input side ADC 114. Thus, it can be understood that various modifications can be made.

(20) Description of the background of the thirteenth embodiment has been made with regard to description of the thirteenth embodiment. Any description made regarding the background of the thirteenth embodiment has been made to facilitate comprehension of the thirteenth embodiment, and no description made regarding the thirteenth embodiment should be construed as being restrictive regarding the present invention. Also, the level control system 2002 described in the background of the thirteenth embodiment solves the above-described problem to be solved by the invention, and makes up an embodiment of the invention.

Figure 113:
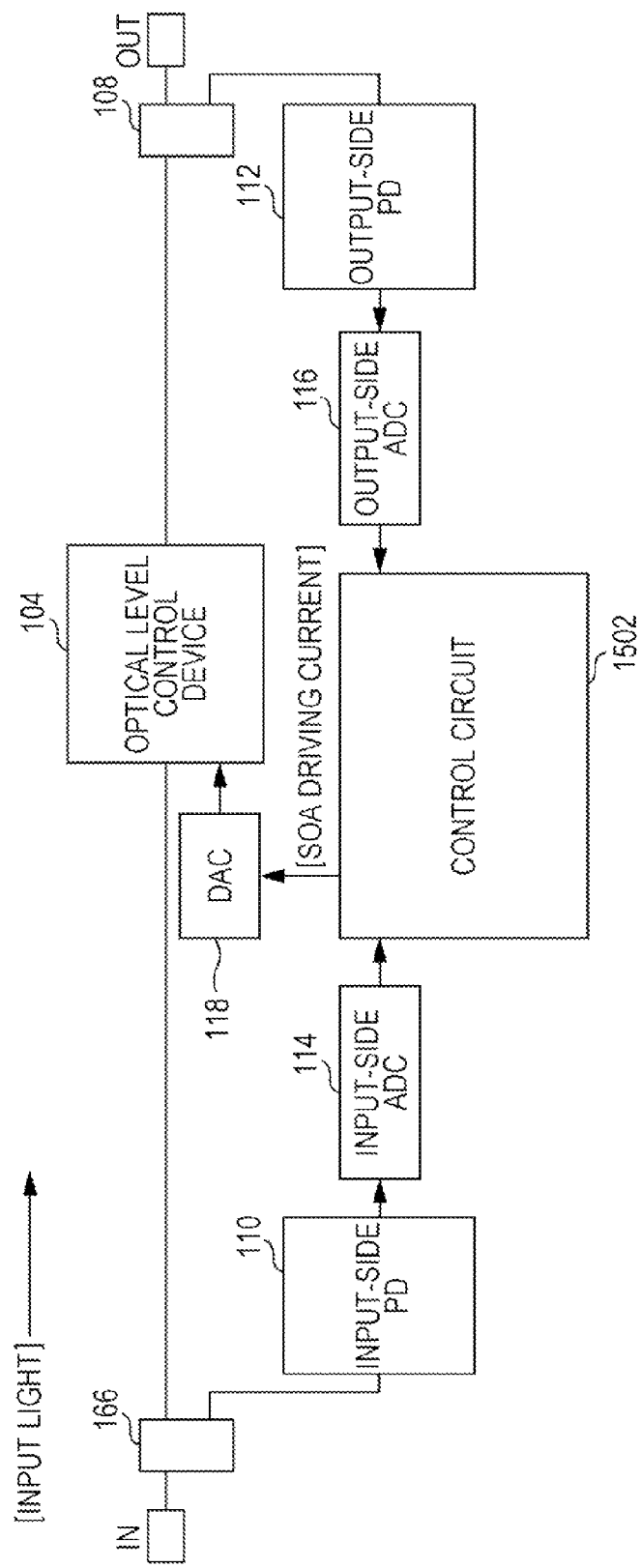
FIG. 113 is a diagram illustrating an example of level control relating to a first comparative example, second comparative example, and third comparative example.

Next, FIG. 113 will be referenced to discuss comparison examples of the control means. FIG. 113 depicts an example of level control relating to a first comparative example, second comparative example, and third comparative example.

First Comparative Example

Relating to an automatic current control (ACC), as depicted in FIG. 113, a control circuit 1502 performs control so as to set the driving current of the optical level control device 104 to be a constant, regardless of input/output levels. Operations are performed so that the driving current of the optical level control device 104 will be constant.

Second Comparative Example

Relating to an automatic gain control (AGC), as depicted in FIG. 113, the control circuit 1502 controls the driving current of the optical level control device 104 so that the difference between measured output level and the output target level according to the computed input level becomes 0. The difference in power between input and output of the optical level control device 104 is a constant. Thus, the gain between input and output of the optical level control device 104 becomes a constant. With an automatic gain control, the input light and output light of the optical level control device 104 are each monitored, and the driving current of an excited LD is subjected to feedback control so that the ratio thereof becomes a constant.

Third Comparative Example

Relating to an automatic level control (ALC), as depicted in FIG. 113, the control circuit 1502 controls the driving current of the optical level control device 104 so that the difference between the measured output level and the computed output target level becomes 0. Operations are then performed so that the output power of the optical level control device 104 becomes a constant. In the case of performing automatic level control, a constant output light strength may be realized by splitting the output light of the optical level control device 104 by several percent with a light splitter, monitoring the output light strength with a PD, subjecting the monitor value of the PD thereof to feedback to the driving current of the excited LD so as to become constant, and controlling the excitation light strength.

Figure 114:
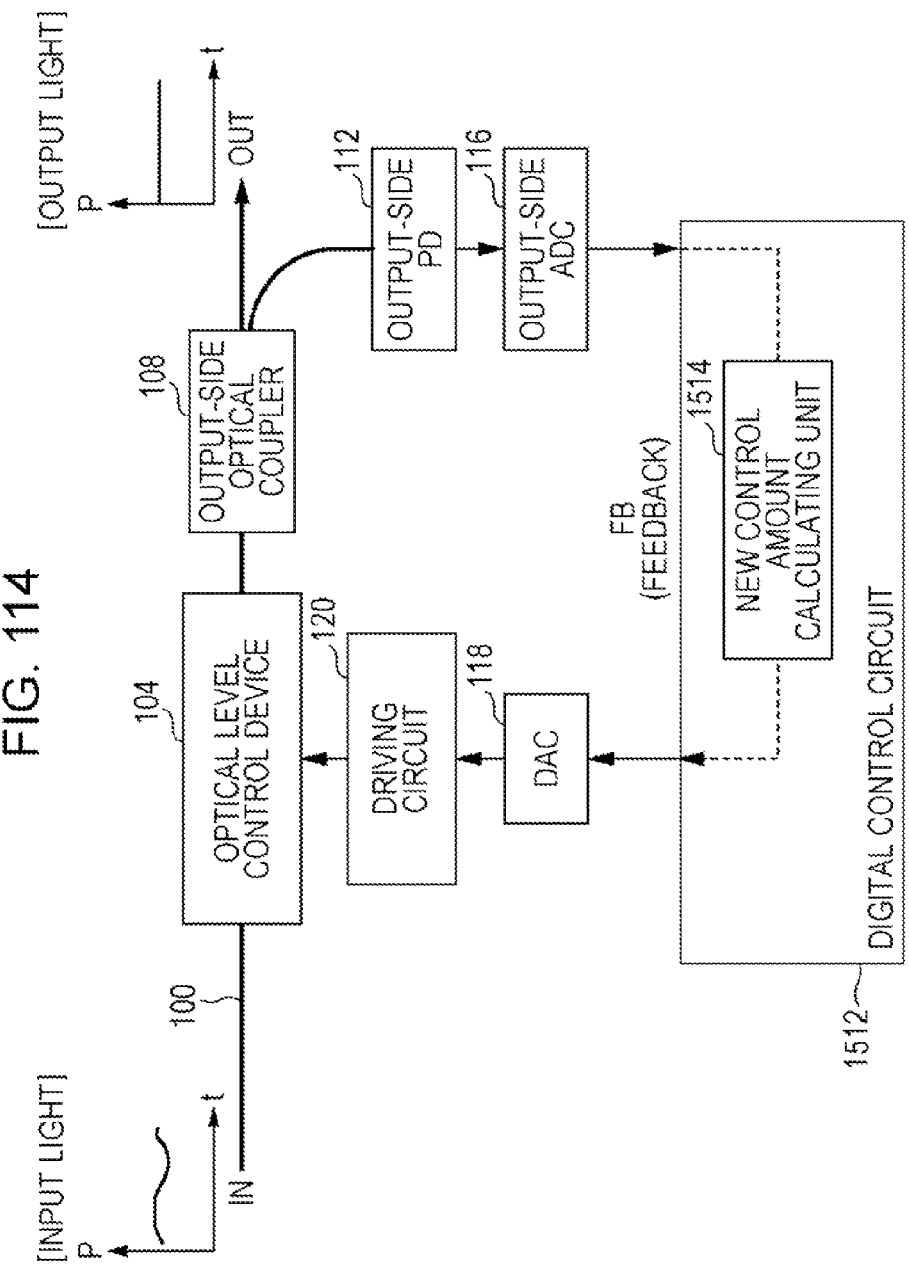
FIG. 114 is a diagram illustrating an example of a level control system relating to the third comparative example.
Figure 115C:
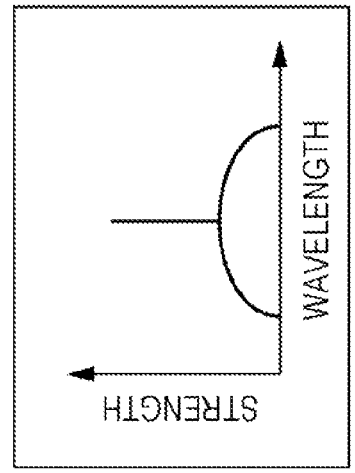
FIGS. 115A, 115B, and 115C are diagrams illustrating an example of a target value of the level control system relating to the third comparative example.
Figure 115B:
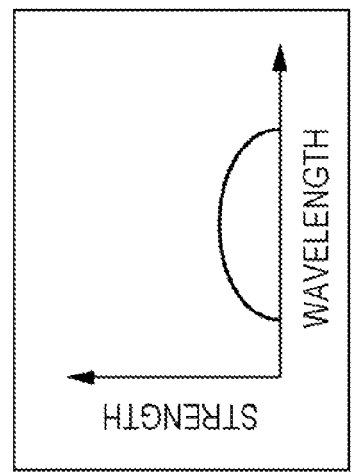
Figure 115A:
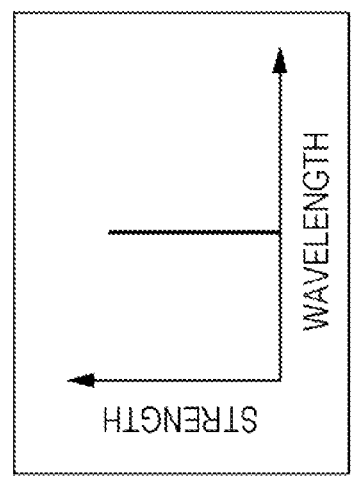
Figure 116A:
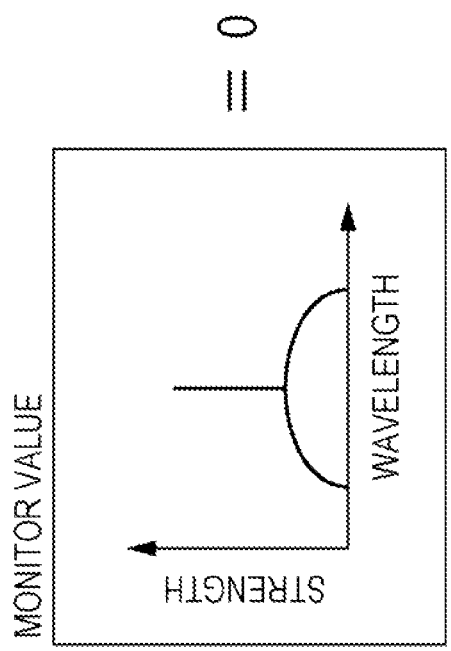
FIGS. 116A and 116B are diagrams illustrating an example of the comparison between the target values and the actual measurement values relating to the third comparative example.
Figure 116B:
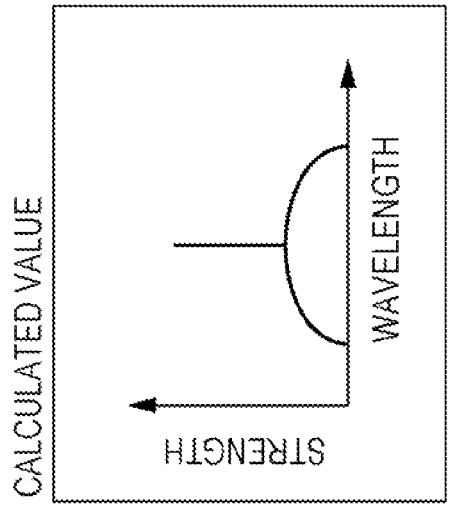

With the automatic level control, for example, the digital control circuit 1512 has a new control amount calculating unit 1514, and the new control amount calculating unit 1514 receives the output-side level and confirms the difference from the output target level to perform control, as depicted in FIG. 114. Thus, with this comparative example, the automatic level control is a feedback control. The automatic level control measures the light strength of only primary signals as a target value (FIG. 115A) and the ASE strength with an identified driving current value (FIG. 115B) beforehand, and saves the calculation value of the sum of the light strength and ASE strength of the primary signal in the ROM, as a target output level (FIG. 115C), as depicted in FIG. 114. With the PD monitoring after control, control is performed so that a level including the ASE and the primary signal is detected (FIG. 116B), and the value wherein the detected level (FIG. 116B) is subtracted from the calculation value (FIG. 116A) becomes 0.

With feedback-type control, the actual output level is monitored, while becoming close to the target value, whereby highly precise control may be made, and stands up well to aging degradation. However, feedback is applied after output by the optical level control device 104, whereby the response is delayed, and further a new control amount is computed with firmware, whereby several kHz to several hundred kHz becomes the limit for feedback. Therefore, high speed input power variations may not be followed. Also, the feedback control does not use the digital control circuit but may be configured with all analog circuits and therefore may have a feedback speed of several hundred kHz, but modifying the target level which is a control parameter becomes difficult.

With the automatic gain control and automatic level control using feedback control, while adjustment precision of output light strength is high, in the case of considering the time until feedback, i.e. the fiber transporting time until the PD, after the monitoring time of the PD, the time that it takes to be converted to voltage, an excitable LD driving current proportional thereto is newly reflected and the EDFA output level changes, at least several microseconds to several tens of microseconds are needed. Therefore, as to frequency components wherein level variations of the optical signal are fast, automatic gain control and automatic level control that performs feedback control does not have enough time and may not function.

Fourth Comparative Example

In order to respond to an optical network wherein high speed is requested such as switching between optical burst signals and optical packet signals, automatic level control is performed with feed forward monitoring, as depicted in FIG. 117. With feed forward control, speed and the control cycle have priority, whereby control is performed using the already-measured LUT 1524, as depicted in FIG. 118, instead of controlling while monitoring the output power.

In the case of causing an optical packet signal or optical burst signal to pass through, an EDFA corresponding to the optical burst may be used as the feed forward control. The EDFA corresponding to the optical burst monitors the EDFA input light, and before the signal light reaches the EDF unit, the excitable LD light strength is controlled, or an optical variable attenuator capable of high speed response is disposed in front of the EDF and the optical variable attenuator is controlled so as to continually maintain a constant input power to the EDF, whereby the output level may be controlled at a high speed. However, since the output level is controlled at high speed, the output light strength is monitored and not controlled. Therefore, a shift from the desired target light level may occur, and become inferior in terms of long-term stability. Also, managing in cases of wear and tear over time is difficult, and the control error grows as time passes.

The configurations in the first through fourth comparative examples may not be considered means for handling high-speed optical level variations in the order of single-digit MHz to double-digit MHz. That is to say, the current optical network also has a pre-condition to arrange an environment and arrange an optical fiber network so that high-speed level variations do not occur.

Fifth Comparative Example

Figure 119:
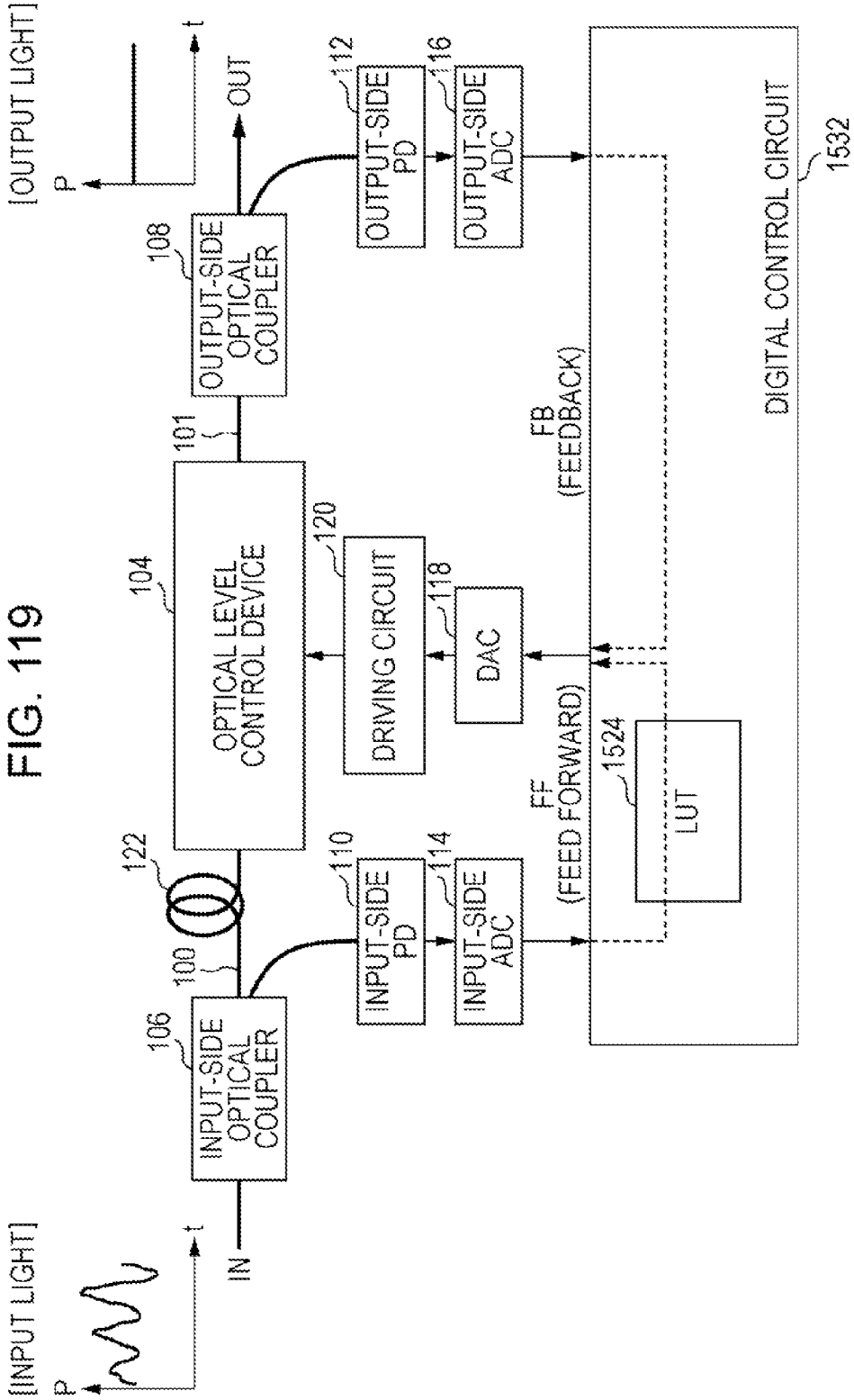
FIG. 119 is a diagram illustrating an example of a level control system relating to a fifth comparative example.

The feedback control in the third comparative example and the feed forward control in the fourth comparative example are combined, and as depicted in FIG. 119, high-speed control by the feed forward and control by the feedback are performed. In this case, the feed forward control and the feedback control each have separate operations, and lack in signal stability after control.

Figure 120:
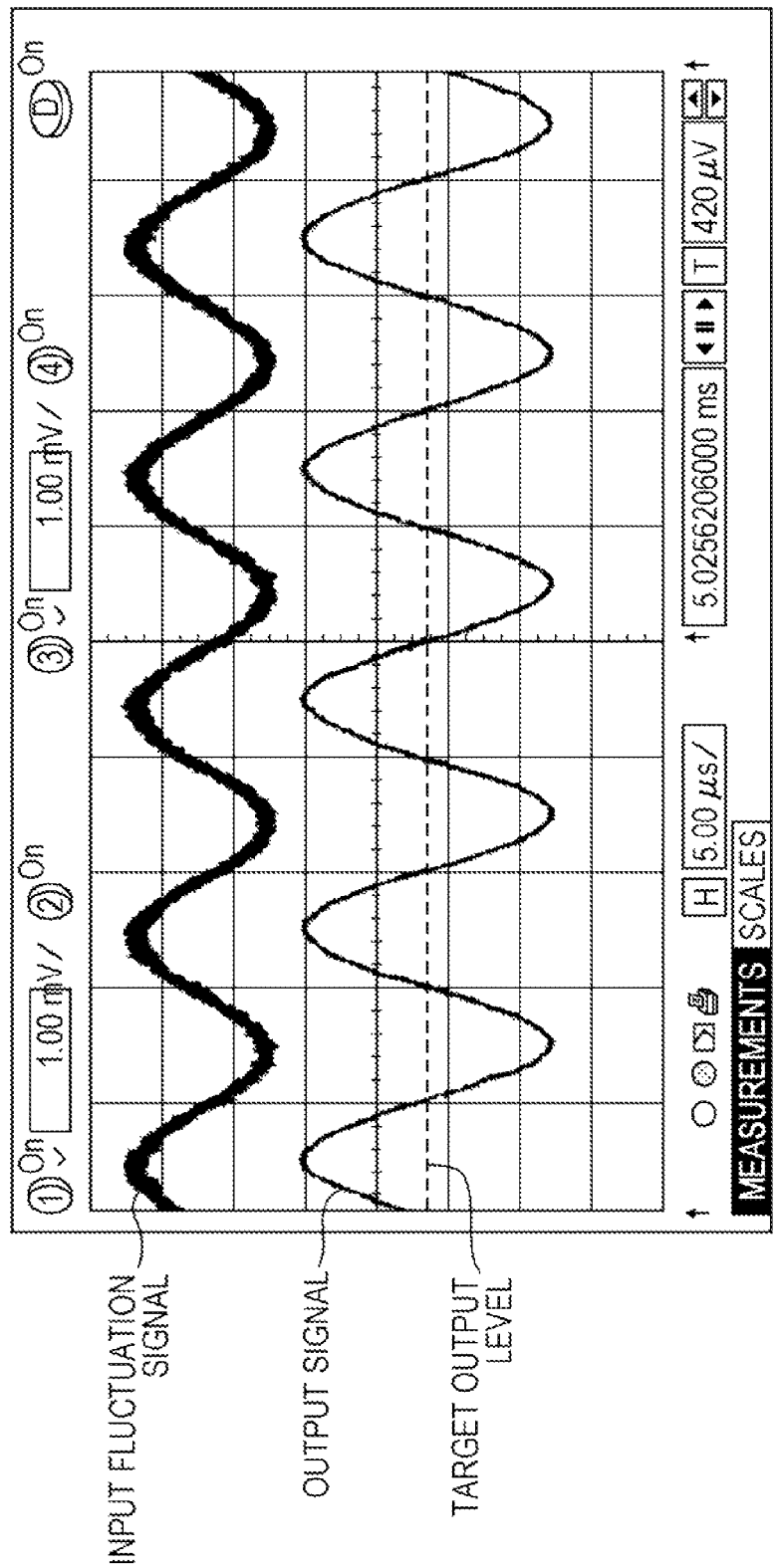
Figure 121:
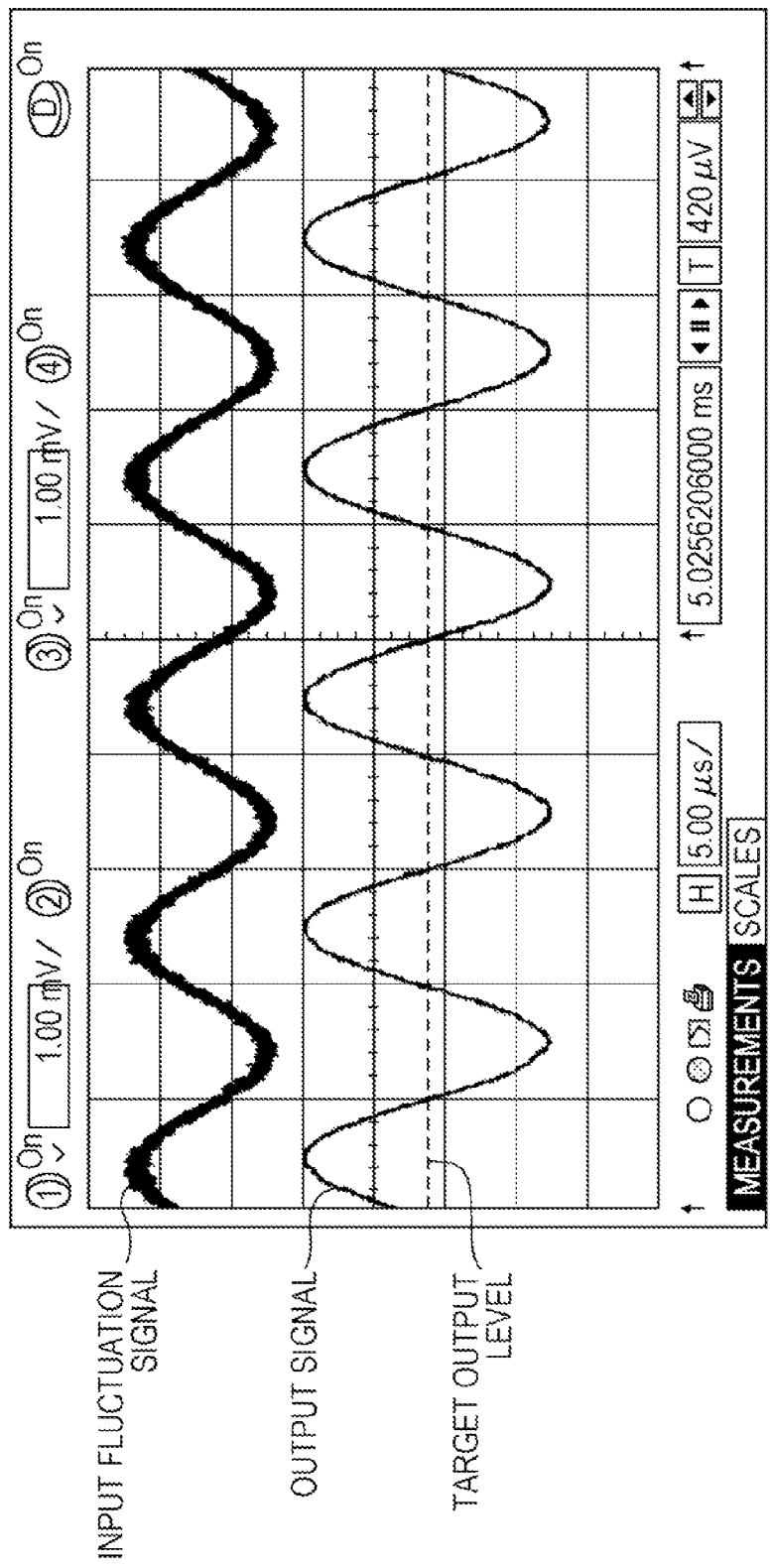
Figure 122:
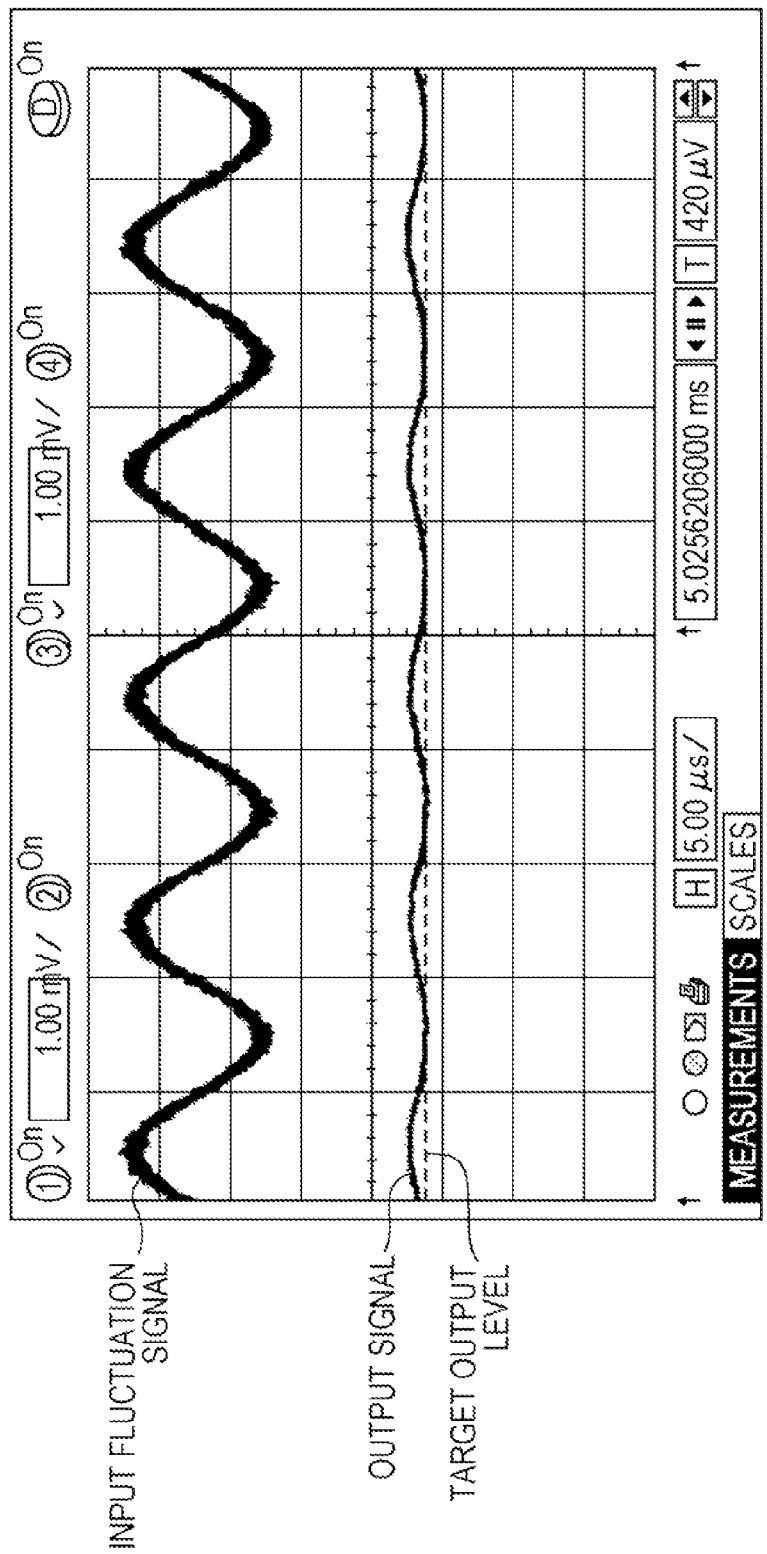
Figure 123:
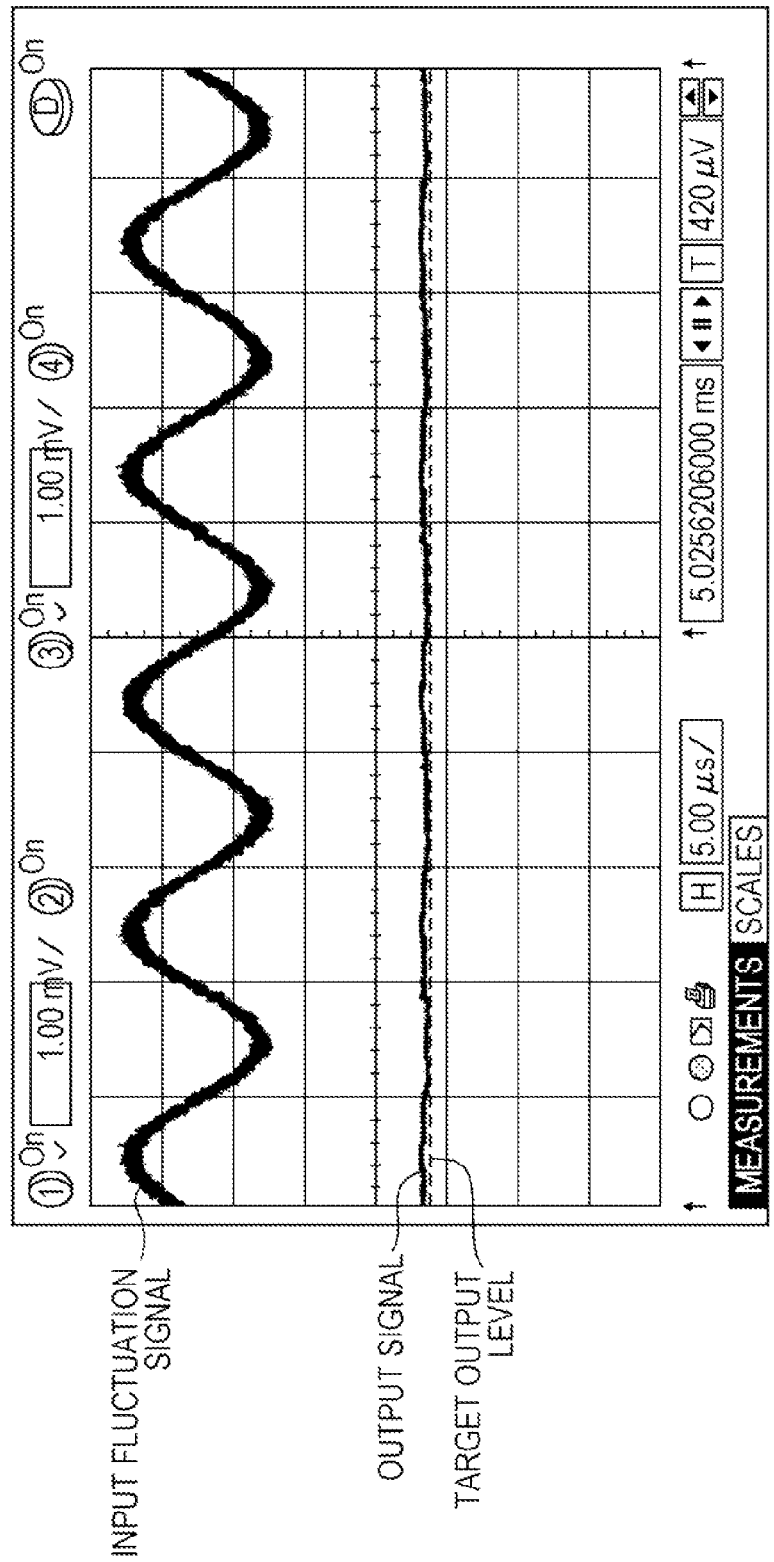

Next, FIGS. 120 through 123 are reference to describe the results of comparing the first, third and fourth comparative examples with the presently disclosed embodiments. FIG. 120 depicts an example of an output signal of the first comparative example, FIG. 121 depicts an example of an output signal of the third comparative example, FIG. 122 depicts an example of an output signal of the fourth comparative example, and FIG. 123 depicts an example of an output signal of the embodiment.

The results depicted in FIGS. 120 through 123 depict results of measuring the output waveform of an optical level control device with an oscilloscope in the case wherein a signal having a 100 kHz cycle and amplitude that varies 2 to 3 dB is input into the optical level control device, and the output level is controlled by the control means of the first, third and fourth comparative examples and the present embodiment. Note that the optical level control device is an SOA.

In the case of the first comparative example, the driving current to the optical level control device is not changed, whereby the input variation also depicts as is in the output signal. In the case of the feedback control in the third comparative example also, the control cycle is slow, only several kHz, and may not follow an input variation of 100 kHz, whereby the output waveform is similar to that of the first comparative example.

With the feed forward control in the fourth comparative example, the driving current is set in the DAC 118 at the same 133 MHz frequency of the operation clock of the digital control circuit 1522 and realized with the digital control circuit 1522 (FIG. 117), whereby the input variations of 100 kHz is small in an output signal. However, this is not controlled by the target output level, and the input variations may not be completely removed. This is because a shift occurs between the output level after control and the output level that is targeted. When a shift occurs between the LUT used for control and the LUT of the target level, variations occur in the output signal of the same frequency components as the input variations. If the shift between the output level after control and the output level to be target increases, the difference between the target output level and output level increases, and it may be assumed that the amplitude of the output signal variations will also increase.

On the other hand, according to the embodiments of the present invention, two LUTs are provided, DAC setting is performed by the FF control with a 133 MHz frequency, and the LUT is updated every other second while monitoring the output power with the FB control, whereby, as depicted in 123, control is performed at a level that matches the target output level, and the input variation components also may be suppressed to less than ±0.1 dB.

Thus, several LUTs to be used for the FF control are provided, the difference from the target level is recognized with the FB control, and the LUTs may be updated and switched, whereby a stable output level control is enabled over a long period of time as to high speed variations of the input signals. Actually the control circuit may be realized with the FPGA and firmware, and the advantages of the present invention may be confirmed from these confirmed results.

Next, the following appendices are further disclosed regarding the above-described embodiments. The present invention is not limited to the following appendices.

As described above, favorable embodiments of a level control circuit, level control program, level control method, level control system, or monitoring circuit have been described, but the present invention is not to be limited to the above descriptions, and it goes without saying that various modifications and changes may be made by one skilled in the art, based on the intent of the invention disclosed with the embodiments which are for executing the invention, and such modifications and changes are included in the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

(Appendix 1)

A level control circuit that generates output signal for level control comprising:

a control information storage that stores control information corresponding to a signal level, a control information circuit that outputs the output signal for level control corresponding to the signal level of a first input signal based on the control information stored in the control information storage; and an information update circuit that updates the control information of the control information storage according to the signal level of a second input signal.

(Appendix 2)

The level control circuit according to Appendix 1, wherein updated control information is generated according to the signal level of the second input signal, and wherein the control information is updated to the updated control information.

(Appendix 3)

The level control circuit according to Appendix 2, wherein the control information storage unit includes two tables or more, outputs the control information from one table, and stores the update control information on the other table.

(Appendix 4)

The level control circuit according to Appendix 1, further including:

an update information storage unit configured to store update information of the control information;

wherein the information updating unit updates the control information based on the update information of the update information storage unit.

(Appendix 5)

The level control circuit according to Appendix 1, further including:

an output time adjustment unit that adjusts time to output the control information.

(Appendix 6)

The level control circuit according to Appendix 5, wherein the output time adjustment unit adjusts one clock time of the output time adjustment unit or time of an integer multiple thereof.

(Appendix 7)

The level control circuit according to Appendix 1, wherein the information updating unit determines update of the control information, based on the difference between the signal level of the second input signal and target signal level of the level control.

(Appendix 8)

The level control circuit according to Appendix 1, wherein the information updating unit generates update information of which output level is different, using the signal level, a curve that is formed by update information corresponding to the signal level, and a signal level where the curve becomes the maximum value of the update information.

(Appendix 9)

A level control program that causes a computer to generate level control output, causing a computer to realize a function to store control information corresponding to a signal level in a control information storage unit, receive a first input signal, and output control information corresponding to the level of the signal; and a function to update the control information of the control information storage unit according to the signal level of a second input signal.

(Appendix 10)

The level control program according to Appendix 9, storing update control information that updates the control information in the control information storage unit according to the signal level of the second input signal, switches the update control information and control information, and updates the control information.

(Appendix 11)

The level control program according to Appendix 10, wherein the control information storage unit includes two tables or more, outputs the control information from one table and stores the update control information on the other table.

(Appendix 12)

The level control program according to Appendix 9, including:

a function to further store update information of the control information in the update information storage unit;

wherein the control information is updated based on the update information of the update information storage unit.

(Appendix 13)

The level control program according to Appendix 9, further including:

a function to adjust time to output the control information.

(Appendix 14)

The level control program according to Appendix 13, wherein time of one clock time or an integer multiple thereof of the computer is adjusted for time to output the control information.

(Appendix 15)

The level control program according to Appendix 9, further including:

a function to determine update of the control information, based on the difference between the signal level of the second input signal and the target signal level of the level control.

(Appendix 16)

The level control program according to Appendix 9, generating update information of which output level is different, using the signal level, a curve that is formed by update information corresponding to the signal level, and a signal level where the curve becomes the maximum value of the update information.

(Appendix 17)

A level control method to generate level control output, including:

storing control information corresponding to a signal level in a control information storage unit, receiving a first input signal and outputting the control information corresponding to the level of the signal, and updating the control information of the control information storage unit according to a signal level of a second input signal.

(Appendix 18)

The level control method according to Appendix 17, wherein update control information corresponding to the signal level of the second input signal is generated, and the control information in the update control information is updated.

(Appendix 19)

The level control method according to Appendix 18, wherein the control information storage unit includes two tables or more, outputs the control information from one table, and stores the update control information on the other table.

(Appendix 20)

The level control method according to Appendix 17, further including:

storing update information of the control information in the update information storage unit, updating the control information based on the update information of the update information storage unit.

(Appendix 21)

The level control method of Appendix 17, further including:

adjusting time to output the control information.

(Appendix 22)

The level control method according to Appendix 17, further including:

determining update of the control information, based on the difference between the signal level of the second input signal and the target signal level of the level control.

(Appendix 23)

The level control method according to Appendix 17, wherein update information of which output level is different is generated, using the signal level, a curve that is formed by update information corresponding to the signal level, and a signal level where the curve becomes the maximum value of the update information.

(Appendix 24)

A level control system including:

a level control device configured to obtain output signal performed level control by control information from an input signal, and a level control circuit configured to output the control information; the level control circuit further including a control information storage unit configured to stored the control information corresponding to a signal level of the input signal is stored, and output the control information corresponding to input signal level, and an information updating unit configured to update the control information of the control information storage unit according to the output signal level.

(Appendix 25)

The level control system according to Appendix 24, generating update control information according to the signal level of the output signal and updating the control information to the update control information.

(Appendix 26)

The level control system according to Appendix 25, wherein the control information storage unit includes two tables two or more, outputs the control information from one table and stores the update control information on the other table.

(Appendix 27)

The level control system according to Appendix 24, further including:

an update information storage unit configured to store update information of the control information;

wherein the information updating unit updates the control information, based on the update information of the update information storage unit.

(Appendix 28)

The level control system according to Appendix 24, further including:

an output timing unit to adjust time to output the control information.

(Appendix 29)

The level control system according to Appendix 28, wherein the output time adjustment unit adjusts one clock time or an integer multiple thereof of the output time adjustment unit.

(Appendix 30)

The level control system according to Appendix 24, wherein the information updating unit determines update of the control information, based on the difference between the signal level of the output signal and the target signal level of the level control.

(Appendix 31)

The level control system according to Appendix 24, wherein the information updating unit generates update information of which output level is different, using the signal level, a curve that is formed by update information corresponding to the signal level, and a signal level where the curve becomes the maximum value of the update information.

(Appendix 32)

The level control system according to Appendix 24, further including:

a transmission time adjustment unit configured to delay the transmission of the input signal.

(Appendix 33)

The level control system according to Appendix 24, further including:

a linear operational amplifier configured to amplify the input signal, and a log amplifier configured to amplify the output signal.

(Appendix 34)

The level control system according to Appendix 24, wherein the information updating unit further includes a generating unit configured to generate the control information, using a gain information of the level control device, driving amount information corresponding to the gain information, non-linear information representing the relation between the gain information of the level control device and the driving amount information, and output information of the level control device.

(Appendix 35)

The level control circuit according to Appendix 35, wherein storage information of the control information storage unit is updated, using at least any of the signal level of the second input signal, or signal state information representing information amount of the second input signal.

(Appendix 36)

The level control circuit according to Appendix 35, wherein the signal state information is information that is output from the control information storage unit and generated based on the driving signal of the level control, and information that is generated based on the first input signal.

(Appendix 37)

The level control circuit according to Appendix 35, wherein the second input signal is converted into a logarithm by a log amplifier and amplified, and after converting the signal state information into the logarithm, the information updating unit adds the logarithm of the second input signal and the logarithm of the signal state information.

(Appendix 38)

The level control circuit according to Appendix 35, further including:

a time adjustment unit configured to adjust difference between reading time of the signal state information, and receiving time of the signal level of the second input signal.

(Appendix 39)

The level control circuit according to Appendix 1, further including:

a calculation unit configured to sample a monitoring value obtained from the second input signal a plurality of times, and calculate the average value of the monitoring value.

(Appendix 40)

A monitor circuit including:

a receiving unit configured to receive a first or second input signal; and an information updating unit configured to update the control information of a storage unit storing the control information corresponding to a signal level of the first input signal by the second input signal received at the receiving unit, and output the control information from the storage unit according to the signal level of the second input signal received at the receiving unit.

wherein control information is output from the storage unit according to the signal level of the first input signal received at the receiving unit.

(Appendix 41)

The monitor circuit according to Appendix 40, wherein the information updating unit updates storage information of the storage unit, using any of at least the signal level of the second input signal, or signal state information representing information amount of the second input signal.

(Appendix 42)

The monitor circuit according to Appendix 41, wherein signal state information is information that is output from the storage unit and generated based on the driving signal of the level control.

(Appendix 43)

The monitor circuit according to Appendix 41, wherein signal state information is information including the signal status information which is information generated based on the first input signal.

(Appendix 44)

The monitor circuit according to Appendix 41, the receiving unit further including a log amplifier amplifying the second input signal, wherein the log amplifier amplifies the second input signal, and converts into a logarithm, and after converting the signal state information into the logarithms, the information updating unit adds the logarithms of the second input signal and signal state information.

(Appendix 45)

The monitor circuit according to Appendix 41, further including:

a time adjustment unit configured to adjust the difference between the reading time of the signal state information, and receiving time of the signal level of the second input signal.

(Appendix 46)

The monitor circuit according to Appendix 40, further including:

a calculation unit configured to sample a monitoring value obtained from the second input signal a plurality of times, and calculate the average value of the monitoring value.

(Appendix 47)

The level control circuit according to Appendices 1 or 2, further including:

a noise accumulation unit configured to consecutively calculate noise information generated by controlling to the signal level, a control information calculation unit configured to calculate noise-removed control information based on the control information obtained in the control information storage unit and noise information obtained in the noise accumulation unit.

(Appendix 48)

The level control circuit according to Appendix 47, the information calculation unit further including a signal density calculating unit configured to calculate predetermined signal density from a ratio at which signals input to the optical level control device have been turned ON and OFF within a predetermined time.

(Appendix 49)

The level control circuit according to Appendices 47 or 48, the control information calculation unit further including a peak level calculation unit configured to calculate the peak output level of the signal, from predetermined time average output power value and signal density.

(Appendix 50)

The level control circuit according to Appendix 47, further including:

a detecting unit configured to identify the number of packet signals over a certain amount of time, wherein the control information calculating unit has a reset unit that resets the number of packet signals which have passed through after a predetermined time has elapsed.

(Appendix 51)

The level control circuit according to Appendix 50, wherein a noise average value is calculated over a predetermined time, from the accumulated value of the passed packet signals and output noise information.

(Appendix 52)

The level control circuit according to Appendices 49 or 51, the control information calculating unit further including a main signal peak level calculating unit configured to calculate the peak level of the main signal of a certain time by subtracting the noise average value from the peak output level of the signal of a predetermined time.

(Appendix 53)

The level control circuit according to Appendix 47, wherein a cycle to monitor the input level, a cycle to refer to the control information storage unit, a cycle to accumulate noise information, and a control cycle of the level control device, are FF processing cycles and are the same.

(Appendix 54)

The level control circuit according to Appendix 49, a cycle to temporally average output level, a cycle to temporally average the signal density, a cycle to calculate the peak level from the signal density, and a cycle to calculate a control peak level from the accumulated noise information with the peak level, are FB processing cycles and are the same.

(Appendix 55)

A level control circuit having both features according to Appendices 53 and 54 at the same time.

(Appendix 56)

The level control circuit according to Appendix 52, further including:

a function to update control information accumulated in the control information storage unit.

(Appendix 57)

The level control circuit according to Appendix 56, further including:

a function to compare the current control information with the true information, and not to update the control information when an error is small.

(Appendix 58)

A level control system, including the level control circuit according to any of Appendices 47 through 57.

(Appendix 59)

The level control system according to Appendices 24 or 25, further including:

a table representing a relation between driving current of a semiconductor optical amplifier of which the level control device is configured, and the noise output from the semiconductor optical amplifier;

wherein the noise amount output in a predetermined time is obtained, based on the table.

(Appendix 60)

The level control system according to Appendix 59, further including: a table representing the relation between the average value of the driving current of the semiconductor optical amplifier at a predetermined time and the ASE noise power output from the semiconductor optical amplifier:

wherein the ASE noise power amount output at a predetermined time is obtained based on the table.

(Appendix 61)

The level control program according to Appendices 9 or 10, wherein noise information which is generated by controlling to the signal level is consecutively calculated;

and wherein control information with noise removed therefrom is obtained based on control information obtained at the control information storage unit in accordance with the signal level of the second input signal and the obtained noise information.

(Appendix 62)

The level control method according to Appendices 17 or 18, further comprising:

calculating the noise information consecutively generated by controlling to the signal level; and calculating control information with noise removed, based on control information obtained at the control information storage unit in accordance with the signal level of the second input signal and the obtained noise information.

The invention claimed is:

1. A level control circuit that generates an output signal for level control comprising:
   a control information storage unit that stores control information corresponding to a signal level;
   a control information circuit that outputs the output signal for level control corresponding to a signal level of a first input signal based on the control information stored in the control information storage unit; and
   an information update circuit that updates the control information stored in the control information storage unit according to a signal level of a second input signal of the level control circuit, wherein
   updated control information is generated according to the signal level of the second input signal,
   the control information is updated to the updated control information, and
   the control information storage unit includes two tables or more, outputs the control information from one table, and stores the updated control information on another table.

2. The level control circuit according to claim 1, further including:
   an update information storage unit configured to store update information of the control information;
   wherein the information updating unit updates the control information based on the update information of the update information storage unit.

3. The level control circuit according to claim 1, further including:
   an output time adjustment unit that adjusts time to output the control information.

4. The level control circuit according to claim 3, wherein the output time adjustment unit adjusts one clock time of the output time adjustment unit or time of an integer multiple thereof.

5. The level control circuit according to claim 1, wherein the information updating unit determines update of the control information, based on a difference between the signal level of the second input signal and a target signal level of the level control.

6. The level control circuit according to claim 1, wherein the information updating unit generates update information of which output level is different, using the signal level, a curve that is formed by update information corresponding to the signal level, and a signal level where the curve becomes the maximum value of the update information.

7. A level control method to generate level control output, comprising:
   storing control information corresponding to a signal level in a control information storage unit;
   receiving, by a level control circuit, a first input signal; and
   outputting the control information corresponding to a level of the first input signal; and
   updating the control information stored in the control information storage unit according to a signal level of a second input signal of the level control circuit;
   generating the updated control information according to the signal level of the second input signal; and
   updating the control information to the updated control information, wherein
   the control information storage unit includes two tables or more, outputs the control information from one table, and stores the updated control information on another table.

8. A level control system comprising:
   a level control device configured to obtain output signal performed level control by control information from input signals; and
   a level control circuit configured to output the control information; the level control circuit including:
      a control information storage unit configured to store the control information corresponding to a signal level of an input signal, and output the control information corresponding to signal level input, and
      an information updating unit configured to update the control information stored in the control information storage unit using another input signal of the level control circuit according to the output signal level, wherein
   updated control information is generated according to the signal level of the other input signal,
   the control information is updated to the updated control information, and
   the control information storage unit includes two tables or more, outputs the control information from one table, and stores the updated control information on another table.

9. The level control system according to claim 8, further including:
   a transmission time adjustment unit configured to delay the transmission of the input signal.

10. The level control system according to claim 8, further including:
    a linear operational amplifier configured to amplify the input signal, and
    a log amplifier configured to amplify the output signal.

11. The level control system according to claim 8, wherein the information updating unit further includes a generating unit configured to generate the control information, using a gain information of the level control device, driving amount information corresponding to the gain information, non-linear information representing the relation between the gain information of the level control device and the driving amount information, and output information of the level control device.

12. The level control circuit according to claim 1, wherein storage information of the control information storage unit is updated, using at least any of the signal level of the second input signal, or signal state information representing information amount of the second input signal.

13. The level control circuit according to claim 12, wherein the signal state information is information that is output from the control information storage unit and generated based on the driving signal of the level control, and information that is generated based on the first input signal.

14. The level control circuit according to claim 1, further including:
    a noise accumulation unit configured to consecutively calculate noise information generated by controlling to the signal level,
    a control information calculation unit configured to calculate noise-removed control information based on the control information obtained in the control information storage unit and noise information obtained in the noise accumulation unit.

15. The level control circuit according to claim 14, the information calculation unit further including a signal density calculating unit configured to calculate predetermined signal density from a ratio at which signals input to the optical level control device have been turned ON and OFF within a predetermined time.

16. The level control circuit according to claim 14, the control information calculation unit further including a peak level calculation unit configured to calculate a peak output level of the signal, from predetermined time average output power value and signal density.

17. The level control circuit according to claim 14, further including:
a detecting unit configured to identify a number of packet signals over a certain amount of time, wherein the control information calculating unit has a reset unit that resets a number of packet signals which have passed through after a predetermined time has elapsed.

18. The level control circuit according to claim 14, the control information calculating unit further including a main signal peak level calculating unit configured to calculate a peak level of the main signal of a certain time by subtracting a noise average value from the peak output level of the signal of a predetermined time.

19. The level control circuit according to claim 14, wherein a cycle to monitor the input level, a cycle to refer to the control information storage unit, a cycle to accumulate noise information, and a control cycle of the level control device, are FF processing cycles and are the same.

20. The level control system according to claim 8, further including:
a table representing a relation between driving current of a semiconductor optical amplifier of which the level control device is configured, and noise output from the semiconductor optical amplifier;
wherein a noise amount output in a predetermined time is obtained, based on the table.

21. The level control system according to claim 20, further including:
a table representing the relation between an average value of the driving current of the semiconductor optical amplifier at a predetermined time and ASE noise power output from the semiconductor optical amplifier,
wherein an amount of the ASE noise power output at a predetermined time is obtained based on the table.

* * * * *